(12) United States Patent
Shim et al.

(10) Patent No.: US 10,003,596 B2
(45) Date of Patent: *Jun. 19, 2018

(54) DEVICE AND METHOD OF SETTING OR REMOVING SECURITY ON CONTENT

(71) Applicant: SAMSUNG ELECTRONICS CO., LTD., Suwon-si (KR)

(72) Inventors: Woo-chul Shim, Yongin-si (KR); In-kuk Yun, Suwon-si (KR); In-hwan Lee, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days. days.

This patent is subject to a terminal disclaimer.

(21) Appl. No.: 14/853,380

(22) Filed: Sep. 14, 2015

(65) Prior Publication Data
US 2016/0036811 A1  Feb. 4, 2016

Related U.S. Application Data

(63) Continuation of application No. 14/813,655, filed on Jul. 30, 2015, now Pat. No. 9,614,842.

(30) Foreign Application Priority Data

| Jul. 31, 2014 | (KR) | 10-2014-0098588 |
| Jan. 30, 2015 | (KR) | 10-2015-0015584 |
| Apr. 2, 2015 | (KR) | 10-2015-0046861 |

(51) Int. Cl.
*H04L 29/06* (2006.01)
*G06F 21/32* (2013.01)
(Continued)

(52) U.S. Cl.
CPC ........ *H04L 63/0861* (2013.01); *G06F 21/32* (2013.01); *G06F 21/6218* (2013.01);
(Continued)

(58) Field of Classification Search
CPC .................................................. G06F 21/32
See application file for complete search history.

(56) References Cited

U.S. PATENT DOCUMENTS 5,719,950 A    2/1998  Osten et al.
6,038,334 A *  3/2000  Hamid ............... G06K 9/00006
                                                 382/124
(Continued)

FOREIGN PATENT DOCUMENTS

CN    101136749 A    3/2008
CN    101296080 A    10/2008
(Continued)

OTHER PUBLICATIONS

International Search Report and Written Opinion dated Nov. 13, 2015 by the International Searching Authority in counterpart International Application No. PCT/KR2015/007834, (PCT/ISA/220, PCT/ISA/210, & PCT/ISA/237).
(Continued)

*Primary Examiner* — Kambiz Zand
*Assistant Examiner* — Thanh Le
(74) *Attorney, Agent, or Firm* — Sughrue Mion, PLLC

(57) ABSTRACT

A device for removing security on content using biometric information includes a memory configured to store content on which security has been set based on first biometric information of a user; and a controller configured to obtain second biometric information of the user, which is of a different type than the first biometric information, and remove the security on the content based on the second biometric information, in response to a user input for executing the content.

28 Claims, 118 Drawing Sheets

(51) Int. Cl.
*H04W 12/06* (2009.01)
*G06F 21/62* (2013.01)

(52) U.S. Cl.
CPC ........ *G06F 21/6245* (2013.01); *H04L 63/083* (2013.01); *H04W 12/06* (2013.01); *G06F 2221/2131* (2013.01)

(56) References Cited

U.S. PATENT DOCUMENTS

| | | | |
|---|---|---|---|
| 7,007,298 | B1 | 2/2006 | Shinzaki et al. |
| 8,181,031 | B2 * | 5/2012 | Narayanaswami ... G07C 9/00158 713/186 |
| 8,499,164 | B2 * | 7/2013 | Ortiz ................. H04L 63/0861 713/182 |
| 9,135,417 | B2 | 9/2015 | Wang et al. |
| 9,258,299 | B2 | 2/2016 | Derek |
| 2005/0036665 | A1 | 2/2005 | Higuchi |
| 2007/0061590 | A1 * | 3/2007 | Boye ..................... G06F 21/305 713/186 |
| 2007/0255963 | A1 | 11/2007 | Pizano et al. |
| 2011/0010563 | A1 | 1/2011 | Lee et al. |
| 2012/0014520 | A1 | 1/2012 | Baughman |
| 2012/0046077 | A1 * | 2/2012 | Kim .................. H04M 1/72577 455/566 |
| 2013/0208103 | A1 | 8/2013 | Sands et al. |
| 2013/0297945 | A1 | 11/2013 | Harris |
| 2013/0333015 | A1 | 12/2013 | Reynolds |
| 2013/0336545 | A1 | 12/2013 | Pritikin et al. |
| 2014/0032924 | A1 | 1/2014 | Durham et al. |
| 2014/0085460 | A1 | 3/2014 | Park et al. |
| 2014/0095870 | A1 | 4/2014 | Dewan et al. |
| 2014/0157401 | A1 | 6/2014 | Alameh et al. |
| 2014/0181959 | A1 * | 6/2014 | Li ........................... G06F 21/32 726/19 |
| 2014/0369572 | A1 * | 12/2014 | Setlak ................ G06K 9/00013 382/124 |
| 2015/0035643 | A1 * | 2/2015 | Kursun ............. G07C 9/00158 340/5.52 |

FOREIGN PATENT DOCUMENTS

| | | |
|---|---|---|
| CN | 101940803 A | 1/2011 |
| CN | 102215223 A | 10/2011 |
| CN | 103236930 A | 8/2013 |
| EP | 1251468 A2 | 10/2002 |
| EP | 2230623 A1 | 9/2010 |
| EP | 2 421 236 A2 | 2/2012 |
| EP | 2738706 A1 | 6/2014 |
| JP | 2000-259278 A | 9/2000 |
| JP | 2002-230553 A | 8/2002 |
| JP | 2007-235659 A | 9/2007 |
| KR | 10-1052294 B1 | 7/2011 |
| TW | 201346616 A | 11/2013 |
| TW | 201349850 A | 12/2013 |

OTHER PUBLICATIONS

Communication dated Dec. 10, 2015 by the European Patent Office in counterpart International Application No. 15179207.4.
Communication dated Sep. 12, 2016, issued by the Taiwan Intellectual Property Office in counterpart Taiwanese Patent Application No. 104124612.
Communication dated Jun. 16, 2017, issued by the Taiwanese Intellectual Property Office in counterpart Taiwanese Patent Application No. 104124612.
Communication issued by the State Intellectual Property Office of P.R. China dated Nov. 27, 2017 in counterpart Chinese Patent Application No. 201510465022.X.
Communication dated Mar. 20, 2018, issued by the European Patent Office in counterpart European Application No. 17208149.9.

* cited by examiner

FIG. 47

| DECRYPTION KEY GENERATED BASED ON BASE BIOMETRIC INFORMATION | ENCRYPTED ENCRYPTION KEY | ENCRYPTED CONTENT |
|---|---|---|
| FIRST BIOMETRIC INFORMATION OF FIRST USER -> Key_A | ←E[key_con]key_A← | |
| SECOND BIOMETRIC INFORMATION OF SECOND USER -> Key_B | ←E[key_con]key_B← | ←E[content]key_con |

FIG. 54

| DECRYPTION KEY GENERATED FROM BASE BIOMETRIC INFORMATION | ENCRYPTED CONTENT |
|---|---|
| SECOND BIOMETRIC INFORMATION -> Key_B<br>FIRST BIOMETRIC INFORMATION -> Key_A | E[E[content][key_A]key_B |
| FIRST BIOMETRIC INFORMATION -> Key_A<br>SECOND BIOMETRIC INFORMATION -> Key_B | E[E[content][key_B]key_A |

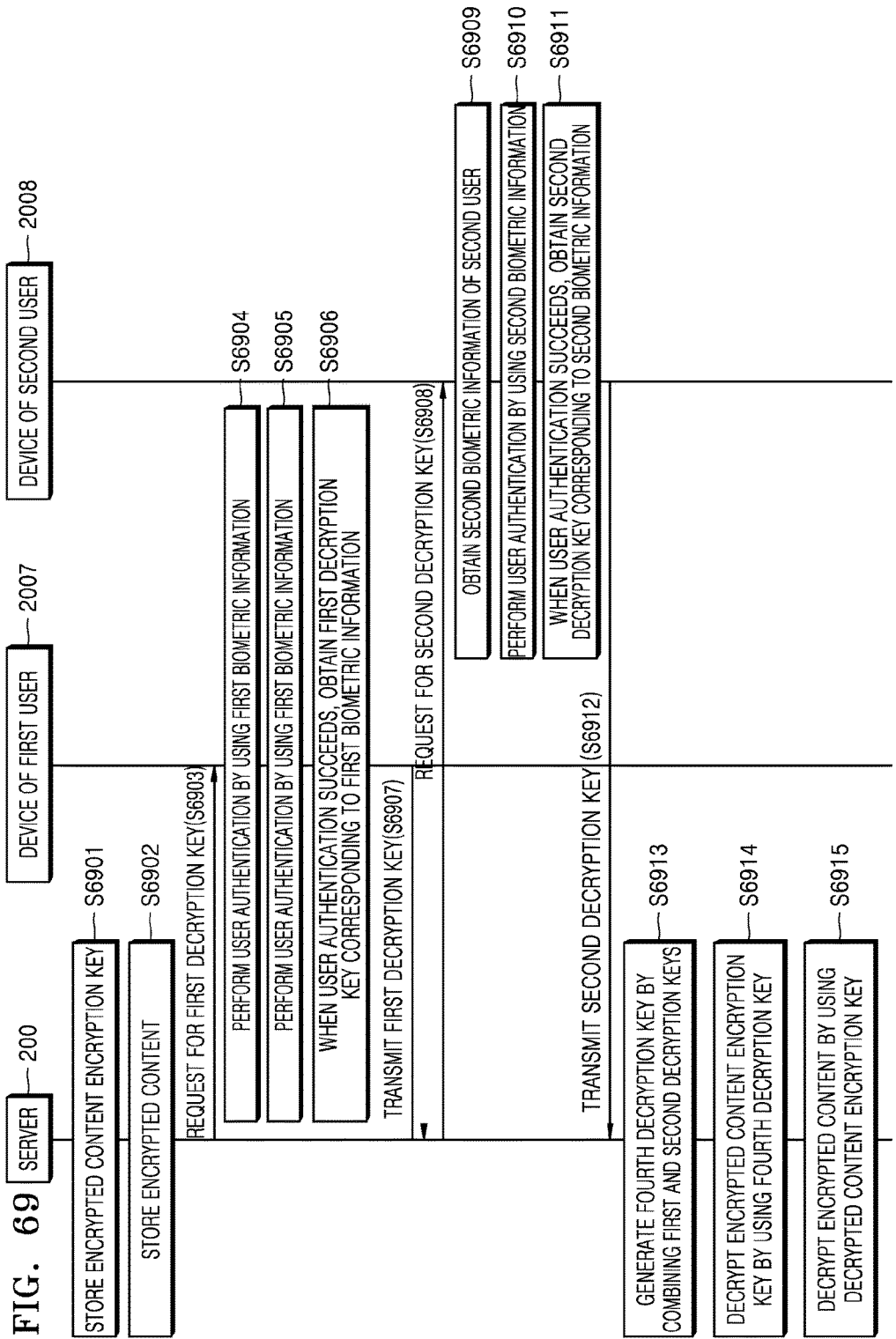

FIG. 70

| DECRYPTION KEY GENERATED FROM BASE BIOMETRIC INFORMATION | | ENCRYPTED ENCRYPTION KEY | ENCRYPTED CONTENT |
|---|---|---|---|
| BIOMETRIC INFORMATION OF FIRST USER -> Key_1<br>BIOMETRIC INFORMATION OF SECOND USER -> Key_2 | Key_4' | | |
| BIOMETRIC INFORMATION OF SECOND USER -> Key_2<br>BIOMETRIC INFORMATION OF THIRD USER -> Key_3 | Key_4'' | E[key_con]key_4 | E[content]key_con |
| BIOMETRIC INFORMATION OF FIRST USER -> Key_1<br>BIOMETRIC INFORMATION OF THIRD USER -> Key_3 | Key_4''' | | |

DEVICE AND METHOD OF SETTING OR REMOVING SECURITY ON CONTENT

CROSS-REFERENCE TO RELATED APPLICATION

This application is a continuation of U.S. application Ser. No. 14/813,655, filed Jul. 30, 2015, which claims priority from Korean Patent Application No. 10-2014-0098588, filed on Jul. 31, 2014, Korean patent Application No. 10-2015-0015584, filed on Jan. 30, 2015, and Korean Patent Application No. 10-2015-0046861, filed on Apr. 2, 2015, in the Korean Intellectual Property Office, the disclosures of which are incorporated herein in their entireties by reference.

BACKGROUND

1. Field

Apparatuses and methods consistent with one or more exemplary embodiments relate to a device and method of setting or removing security on content, and more particularly, to a device and method of setting or removing security on content by using biometric information.

2. Description of the Related Art

Biometrics is an authentication method wherein unique biometric information of an individual, such as a fingerprint, voice, a face, an iris, a structure of sweat glands, and blood vessels, is extracted and informationized. Characteristics of an individual, such as a face shape, voice, a fingerprint, and an eyeball, are unable to be illegally used or copied by another person like in the case of a key or a password, and are rarely changed or lost. Thus, such characteristics are widely used in security fields.

Recently, technologies of using biometric information for user authentication have been developed.

Accordingly, there is demand for research into methods of setting and removing security on content by effectively using biometric information.

SUMMARY

Aspects of one or more exemplary embodiments provide a device and a method of setting or removing security on content by using a plurality of pieces of biometric information.

Additional aspects will be set forth in part in the description which follows and, in part, will be apparent from the description, or may be learned by practice of the presented exemplary embodiments.

According to an aspect of an exemplary embodiment, there is provided a device for removing security on content using biometric information, the device including: a memory configured to store content on which security has been set based on first biometric information of a user; and a controller configured to obtain second biometric information of the user, which is of a different type than the first biometric information, and remove the security on the content based on the second biometric information, in response to a user input for executing the content.

The controller may be configured to remove the security on the content using at least one of a password and a decryption key when the user is authenticated using the second biometric information.

The password may be at least one of a common password that is used for both the first biometric information and the second biometric information, or a second password that corresponds to the second biometric information, and when the security on the content is removed, the controller may be configured to remove restriction on access to the content using the password.

The decryption key may be at least one of a common decryption key that is commonly used for both the first biometric information and the second biometric information, or a second decryption key that corresponds to the second biometric information, and when the security on the content is removed, the controller may be configured to decrypt the content that is encrypted using the decryption key.

When the decryption key is the second decryption key, the controller may be configured to decrypt an encrypted first encryption key corresponding to the first biometric information using the second decryption key, and to decrypt the content using a first decryption key obtained by decrypting the encrypted first encryption key.

A second decryption key corresponding to the second biometric information may be generated using a base second biometric information that is for user authentication and is pre-stored in the memory.

The controller may be configured to obtain the second biometric information when the second biometric information is selected through a screen for selecting one of the first biometric information and the second biometric information.

The device may further include a communicator, wherein the second biometric information may be obtained from at least one external device through the communicator.

The device may further include at least one biometrics sensor configured to recognize biometric information of the user, wherein the second biometric information is obtained from the at least one biometrics sensor.

According to an aspect of another exemplary embodiment, there is provided a device for logging in to a server by using biometric information, the device including: a communicator configured to communicate with the server located outside the device; and a controller configured to log in to the server based on first biometric information of a user, and after the device is logged off from the server, obtain second biometric information of the user, which is of a different type than the first biometric information, transmit a password related to the second biometric information to the server through the communicator, and re-log in to the server when the user is authenticated using the password.

According to an aspect of another exemplary embodiment, there is provided a method of removing security on content using biometric information, the method including: storing content on which security is set based on first biometric information of a user; obtaining second biometric information of the user, which is of a different type than the first biometric information, according to a request to execute the content; and removing the security on the content based on the second biometric information.

The removing of the security may include, in response to the user being authenticated using the second biometric information, removing the security on the content using at least one of a password and a decryption key.

The password may be at least one of a common password that is commonly used for both the first biometric information and the second biometric information, or a second password that corresponds to the second biometric information, and the removing of the security includes removing restriction on access to the content using the password.

The decryption key may be at least one of a common decryption key that is commonly used for both the first biometric information and the second biometric information, or a second decryption key that corresponds to the second biometric information, and the removing of the security may include decrypting the content that is encrypted using the decryption key.

When the decryption key is the second decryption key, the decrypting of the content may include decrypting an encrypted first encryption key corresponding to the first biometric information using the second decryption key; and decrypting the content by using a first decryption key obtained by decrypting the encrypted first encryption key.

A second decryption key corresponding to the second biometric information may be generated using a base second biometric information that is for user authentication and is pre-stored in a memory.

The obtaining of the second biometric information may include, when the second biometric information is selected through a screen for selecting one of the first biometric information and the second biometric information, obtaining the second biometric information.

The obtaining of the second biometric information may include obtaining the second biometric information from at least one external device.

The obtaining of the second biometric information may include obtaining the second biometric information from at least one biometrics sensor configured to recognize biometric information of the user.

According to an aspect of another exemplary embodiment, there is provided a method of logging in to a server using biometric information, the method including: logging in to the server based on first biometric information of a user; obtaining second biometric information of the user, which is of a different type than the first biometric information, when logged off from the server; transmitting a password related to the second biometric information to the server; and re-logging in to the server when the user is authenticated using the password received by the server.

According to an aspect of another exemplary embodiment, there is provided a method of managing security of a content stored on a first device, the method including obtaining a first biometric information; receiving from a second device a second biometric information; and setting security on the content based on the first biometric information and the second biometric information.

The setting the security on the content based on the first biometric information and the second biometric information may include: generating a first encryption key associated with the first biometric information; encrypting the content using the first encryption key; receiving a second encryption key associated with the second biometric information; and encrypting the encrypted content using the second encryption key.

The setting the security on the content based on the first biometric information and the second biometric information may include: generating a first encryption key associated with the first biometric information; receiving a second encryption key associated with the second biometric information; generating a third encryption key by combining at least a portion of the first encryption key with at least a portion of the second encryption key; and encrypting the content using the third encryption key.

According to an aspect of another exemplary embodiment, there is provided a method of managing security of a content stored on a first device, the method including: obtaining a first biometric information; setting security on the content based on the first biometric information; receiving from a second device a second biometric information; and removing the security from the content based on the second biometric information The setting the security on the content based on the first biometric information may include: generating a first encryption key associated with the first biometric information; encrypting the content using the first encryption key; generating a first decryption key corresponding to the first encryption key; and encrypting the first decryption key using a second encryption key associated with the second biometric information.

BRIEF DESCRIPTION OF THE DRAWINGS

These and/or other aspects will become apparent and more readily appreciated from the following description of exemplary embodiments, taken in conjunction with the accompanying drawings in which:

FIG. 47 is a table for describing a decrypting method according to another exemplary embodiment;

FIG. 54 is a table for describing a decrypting method according to another exemplary embodiment;

FIGS. 68 and 69 are flowcharts of a method of decrypting content, according to other exemplary embodiments;

FIG. 70 is a table for describing a decrypting method according to another exemplary embodiment;

DETAILED DESCRIPTION

Figure 1:
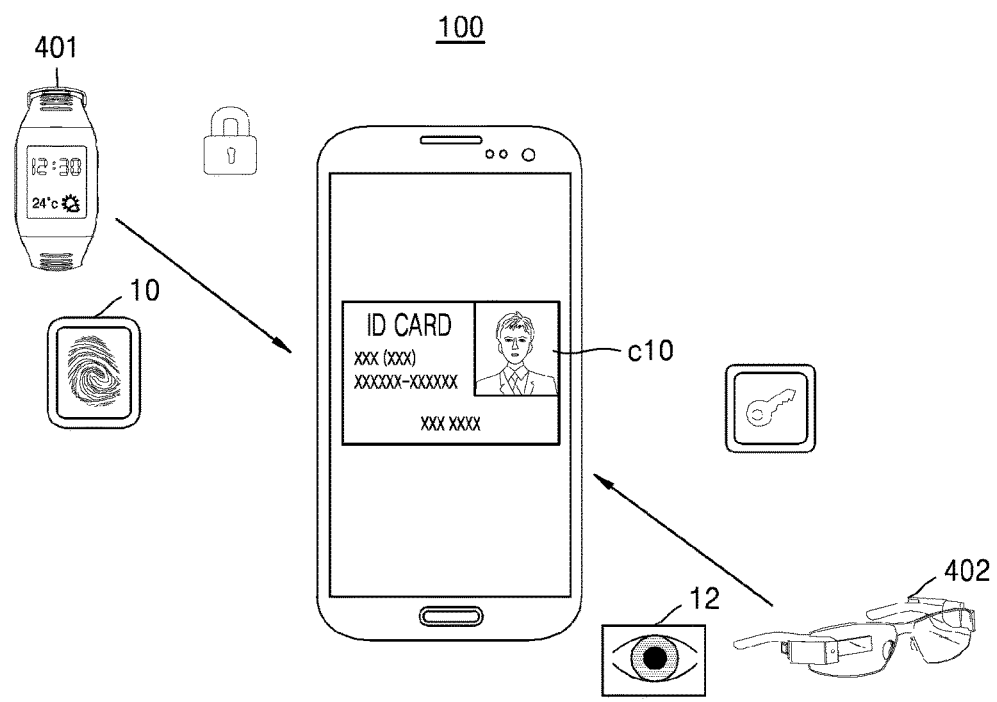
FIG. 1 is a diagram for describing a device according to an exemplary embodiment.

One or more exemplary embodiments will now be described more fully with reference to the accompanying drawings. However, it is understood that exemplary embodiments may be embodied in many different forms, and should not be construed as being limited to the exemplary embodiments set forth herein; rather, these exemplary embodiments are provided so that this disclosure will be thorough and complete, and will fully convey the concept of one or more exemplary embodiments to those of ordinary skill in the art. In the following description, well-known functions or constructions are not described in detail since they would obscure one or more exemplary embodiments with unnecessary detail, and like reference numerals in the drawings denote like or similar elements throughout the specification.

Advantages and features of one or more exemplary embodiments and methods of accomplishing the same may be understood more readily by reference to the following detailed description of the exemplary embodiments and the accompanying drawings. Also, while describing the one or more exemplary embodiments, detailed descriptions about related well-known functions or configurations that may diminish the clarity of the points of the present invention are omitted. It will be understood that although the terms "first", "second", etc. may be used herein to describe various components, these components should not be limited by these terms. These components are only used to distinguish one component from another.

Hereinafter, a device according to one or more exemplary embodiments will be described in detail with reference to accompanying drawings. Terms such as "module" or "unit" are used only for the purpose of ease of preparation of the specification, and thus shall be considered in a broad sense and are not limited to any particular meaning or role.

Examples of a device described herein include a mobile phone, a smart phone, a tablet personal computer (PC), a laptop, a digital broadcasting terminal, a personal digital assistant (PDA), a portable multimedia player (PMP), and a navigation device. However, it will be obvious to one of ordinary skill in the art that configurations according to one or more exemplary embodiments may also be applied to a fixed terminal, such as a digital television (TV) or a desktop computer, except for a case when a configuration is applicable only to a mobile terminal.

In the specification, when a region is "connected" to another region, the regions may not only be "directly connected", but may also be "electrically connected" via another device therebetween. Also, when a region "includes" an element, the region may further include another element instead of excluding the other element, otherwise differently stated.

As used herein, the term "and/or" includes any and all combinations of one or more of the associated listed items. Expressions such as "at least one of," when preceding a list of elements, modify the entire list of elements and do not modify the individual elements of the list.

Terms used herein will be first described together with brief description of one or more exemplary embodiments.

A device according to an exemplary embodiment may set security on content by using biometric information. The device may set security on content by using certain biometric information (first biometric information), and remove the security on the content by using another biometric information (second biometric information) different from the biometric information (the first biometric information) used to set the security.

Throughout the specification, biometric information may denote information for identifying each individual, such as a fingerprint or an iris, which is detectable from a body of each individual.

Examples of the biometric information include a fingerprint, voice, a face, an iris, palm lines, vein distribution, a retina, a movement pattern such as a gait, an electrocardiogram (ECG), and a palm pattern, but are not limited thereto.

Examples of content include text (for example, work-related documents, memos, emails, text messages, and electronic books), still images (for example, photographs and images), moving images (for example, video on demand (VOD), TV programs, user-created content (UCC), YouTube videos, music videos, and movies), application execution files, voice files, and web pages, but are not limited thereto. For example, the content may be a group of certain files stored in a device, i.e., a folder indicating a location where files are classified and stored. The folder may include another folder or a file. In other words, the term "content" may have a wide meaning including certain data or a file.

Throughout the specification, setting security on content may mean that access to content is restricted, and removing security on content may mean restriction of access to content is removed. Alternatively, the setting or removing of the security on the content may mean that the content is encrypted or decrypted.

For example, restricting access to content may mean that at least one of executing, editing, copying, and deleting of the content is restricted by using a password while setting security on the content. Also, removing restriction on access to content may mean that at least one of executing, editing, copying, and deleting of the content is allowed when a password obtained when setting security on the content and a password obtained when removing the security on the content match each other. Alternatively, restricting access to content may mean that at least one of reference information of the content, a file name of the content, reference information of folder including the content, and a folder name is encrypted such that the content is not found. Here, reference information may be information indicating a path or address (an index node (inode) number or the like) for accessing a certain file or a folder in a file system.

As another example, encrypting content may mean that the content is converted to be non-meaningful, for example, to ciphertext. The ciphertext is obtained by converting the content by using a certain algorithm for security. In detail, encryption means converting certain information to ciphertext by using an encryption key, such as a certain bit string, and decryption means restoring the converted information by using a decryption key. Throughout the specification, an encryption key may mean data (for example, a certain bit string) obtained by processing biometric information, instead of the biometric information itself, which is used to encrypt certain content.

Methods of setting or removing security on content by using biometric information will be described in detail later with reference to accompanying drawings.

Throughout the specification, second biometric information distinguished from first biometric information may be a different type from the first biometric information. For example, the first biometric information may be fingerprint information and the second biometric information may be iris information. The second biometric information distinguished from the first biometric information may be the same type as the first biometric information. For example, the first and second biometric information may both be fingerprint information, but may be fingerprint information obtained from different fingers of the same user or obtained from fingers of different users. Alternatively, the second biometric information distinguished from the first biometric information may be biometric information obtained from biometrics modules provided in different devices. Alternatively, the second biometric information distinguished from the first biometric information may be biometric information obtained from different biometrics modules provided in one device. Alternatively, the second biometric information distinguished from the first biometric information may be biometric information obtained from one biometrics module provided in one device.

Throughout the specification, a biometrics module may be a module that may obtain certain biometric information from a body of a person. The biometrics module may include a sensor for sensing biometric information of a person. For example, the biometrics module may include a fingerprint sensor or a palm pattern sensor, but is not limited thereto.

For example, the biometrics module may include a camera. The camera may photograph a face of a person or an iris of a person.

Alternatively, the biometrics module may include a microphone for obtaining voice of a person. The biometrics module described above is only an example, and thus is not limited thereto.

According to an exemplary embodiment, when a device has set security on certain content by using fingerprint information, the device may remove the security on the certain content by using not only the fingerprint information, but also iris information that is different biometric information.

Accordingly, even if the device is unable to obtain the fingerprint information used to set the security on the certain content, for example a biometrics module used to obtain the fingerprint information, is unable to be used due to theft, loss, or malfunction, the security on the certain content may be removed by using a biometrics module for obtaining other biometric information, such as the iris information.

In other words, according to an exemplary embodiment, despite security being set on certain content by using fingerprint information, if a user loses or does not currently have a biometrics module used to obtain the fingerprint information, the user may still access the certain content on which the security is set.

One or more exemplary embodiments will now be described in detail with reference to accompanying drawings.

FIG. 1 is a diagram for describing a device 100 according to an exemplary embodiment.

Referring to FIG. 1, a user may own a plurality of devices, such as the device 100 (for example, a smart phone), a watch type wearable device 401, a glasses type wearable device 402. At this time, the watch type wearable device 401 may include a module for obtaining fingerprint information 10. The glasses type wearable device 402 may include a module for obtaining iris information 12. The device 100 may receive, which a communication unit, the fingerprint information 10 and the iris information 12 from the watch type wearable device 401 and the glasses type wearable device 402, which are paired with the device 100.

In order to protect content c10, for example, an identification (ID) card, stored in the device 100, the user may set security on the content c10 by using the fingerprint information 10.

The device 100 may store the content c10 after setting security on the content c10 based on the fingerprint information 10 obtained from the watch type wearable device 401, and may later remove the security on the content c10 based on the fingerprint information 10 obtained from the watch type wearable device 401.

However, the user may want to remove the security on the content c10 under a situation when the watch type wearable device 401 is not usable.

According to an exemplary embodiment, the security set on the content c10 by the user may be removed even when the user is unable to use the watch type wearable device 401, for example, even when the watch type wearable device 401 is stolen, lost, or malfunctions.

In other words, according to an exemplary embodiment, the security set on the content c10 may be removed by using the iris information 12 obtained from the glasses type wearable device 402.

Figure 2:
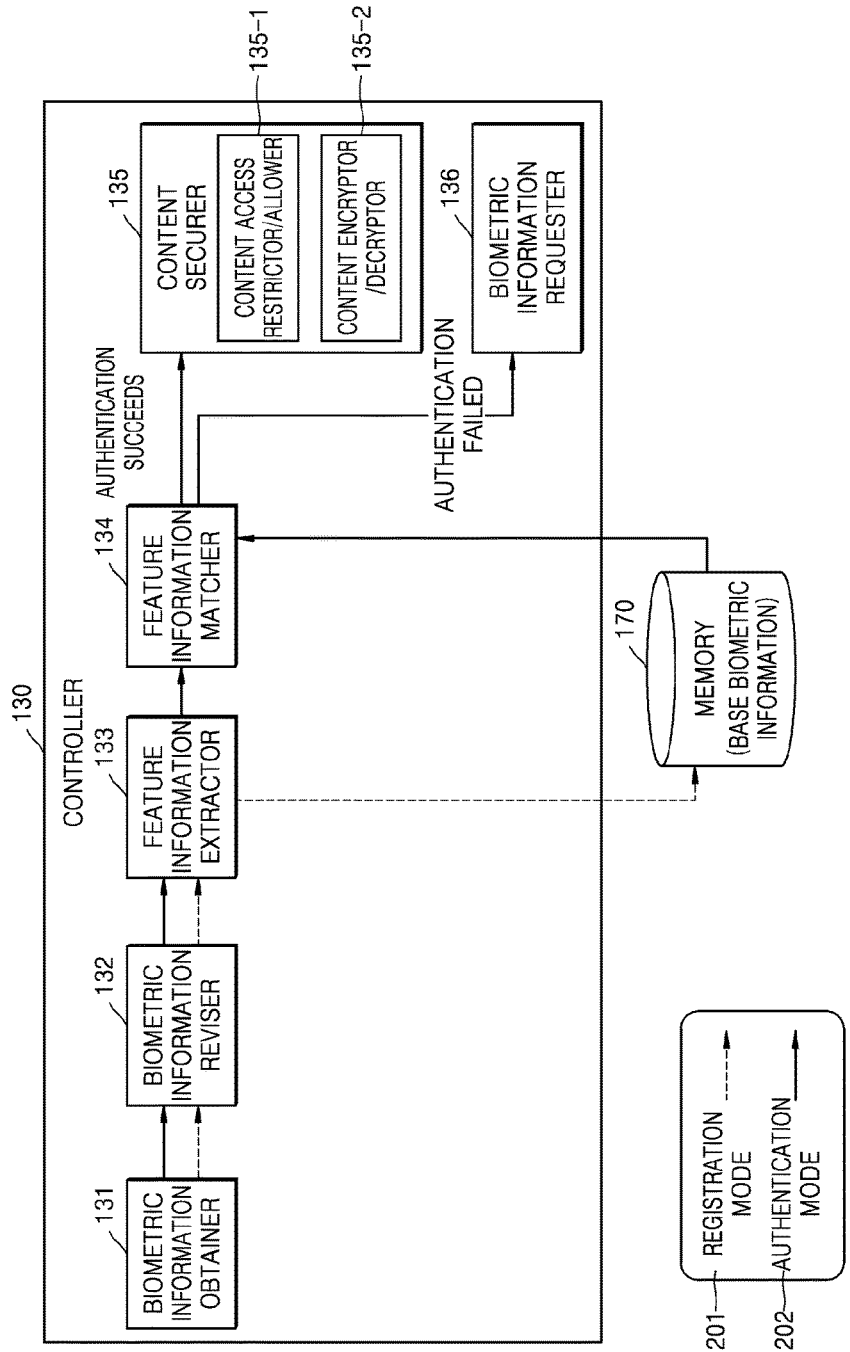
FIG. 2 is a conceptual diagram of a controller that sets or removes security on content, according to an exemplary embodiment.

FIG. 2 is a conceptual diagram of a controller 130 that sets or removes security on content, according to an exemplary embodiment.

Referring to FIG. 2, the controller 130 of the device 100 may include functional modules, such as a biometric information obtainer 131, a biometric information reviser 132, a feature information extractor 133, a feature information matcher 134, a content securer 135, and a biometric information requester 136. The functional modules according to an exemplary embodiment are classified for convenience of description, and thus at least of the functional modules may be omitted or changed, or at least two of the functional modules may be combined. The functional modules may be configured as hardware, software, or a combination of hardware and software. Alternatively, a part of the functional module may be configured as hardware and the other part of the functional module may be configured as software.

Referring to FIG. 2, the controller 130 may be in a registration mode 201 for registering biometric information of the user, or in an authentication mode 202 for authenticating the user by using the registered biometric information.

According to an exemplary embodiment, when the controller 130 is in the registration mode 201, the biometric information obtainer 131 may obtain the biometric information of the user from a sensing unit 140 of FIG. 102 or an audio-video (AV) input unit 160 of FIG. 102, described in further detail below. Alternatively, the biometric information obtainer 131 may receive biometric information from the watch type and glasses type wearable devices 401 and 402 through a communication unit 150 of FIG. 101, described in further detail below.

According to an exemplary embodiment, the biometric information reviser 132 may obtain revised biometric information by revising the obtained biometric information. For example, when it is determined that the biometric information (for example, a fingerprint image, an iris image, a vein image, or a face image) has a distorted shape or a region having low resolution, the biometric information reviser 132 may perform an image processor by using statistical data or an image processing function such that the distorted shape or the region having low resolution is revised or restored. When the quality of the biometric information is excellent, an operation of the biometric information reviser 132 may be omitted.

According to an exemplary embodiment, the feature information extractor 133 may extract feature information from the biometric information that is revised or not revised.

For example, when the biometric information is fingerprint information, the feature information extractor 133 may extract feature information including at least one feature point called minutiae from the fingerprint information. The minutiae may include feature points indicating a bifurcation point, an end point, a core, and a delta. Also, the minutiae may include feature points indicating ridges and directions or shapes of valleys between the ridges. In this case, the feature information may be a template in which the feature points are arranged in a pre-set format (or frame or bit string).

As another example, when the biometric information is iris information, the feature information extractor 133 may extract a unique pattern of an iris. In this case, the feature information may be an iris template in which the unique pattern of the iris is arranged in a template. Alternatively, when the biometric information is vein information, the feature information extractor 133 may extract a unique pattern of veins. In this case, the feature information may be a vein template in which the unique pattern of the veins is arranged in a template.

According to an exemplary embodiment, the controller 130 may store the feature information extracted by the feature information extractor 133 in a memory 170 so as to use the feature information as biometric information that is a base for user authentication. Hereinafter, the biometric information that is a base will also be referred to as base biometric information. Also, the controller 130 may store templates of fingerprint information, voice information, face information, iris information palm line information, vein information, retina information, movement pattern information, and ECG information in the memory 170 to be used as feature information of the base biometric information. The feature information of the biometric information stored in the memory 170 may be registered to be used as the base biometric information for user authentication.

The controller 130 may be in the authentication mode 202 while feature information of a plurality of pieces of base biometric information is registered in the memory 170.

When the controller 130 is in the authentication mode 202, the biometric information obtainer 131 may obtain the biometric information of the user from the sensing unit 140 or the AV input unit 160. Alternatively, the biometric information obtainer 131 may receive the biometric information from the watch type and glasses type wearable devices 401 and 402 through the communication unit 150.

According to an exemplary embodiment, the biometric information reviser 132 may obtain the revised biometric information by revising the obtained biometric information.

The feature information extractor 133 may extract the feature information from the biometric information that is revised or not revised. The feature information matcher 134 may match the feature information extracted by the feature information extractor 133 and the feature information of the base biometric information pre-stored in the memory 170. Then, the feature information matcher 134 may calculate, as a matching result, a matching score indicating a degree the two pieces of feature information match each other. The matching score may be calculated, for example, according to statistic data or probability function while considering differences, directions, or arrangement similarities between feature points of a feature template of the obtained biometric information and feature points of a feature template of the base biometric information.

The feature information matcher 134 may compare the matching score and a certain threshold value, and when the matching score is equal to or higher than the certain threshold value, may determine that user authentication has succeeded. Here, the certain threshold value may be pre-set by a manufacturer of the device 100, a provider of an application installed in the device 100, or a provider of an operating system. Alternatively, the certain threshold value may be assigned by the user through a user interface (UI). Meanwhile, the user may set a threshold value for each of a plurality of pieces of biometric information.

When the user authentication has succeeded, the content securer 135 may set or remove security on content.

For example, a content access restrictor/allower 135-1 of the content securer 135 may restrict or allow access to content. Also, a content encryptor/decryptor 135-2 of the content securer 135 may encrypt or decrypt content. Alternatively, both the content access restrictor/allower 135-1 and the content encryptor/decryptor may be used to set or remove security on content.

According to an exemplary embodiment, when the user authentication fails, the biometric information requester 136 may re-request the biometric information of the user. For example, the controller 130 may transmit a signal requesting the biometric information of the user to the watch type or glasses type wearable device 401 or 402. In response to the signal, the watch type or glasses type wearable device 401 or 402 may provide a notification screen for re-requesting the biometric information. When the biometric information is input, the watch type or glasses type wearable device 401 or 402 may transmit the input biometric information to the device 100. Alternatively, in response to the signal, the watch type or glasses type wearable device 401 or 402 may transmit previously input biometric information to the device 100 again. Upon receiving the biometric information again, the device 100 may try to authenticate the user by using the obtained biometric information.

Figure 3:
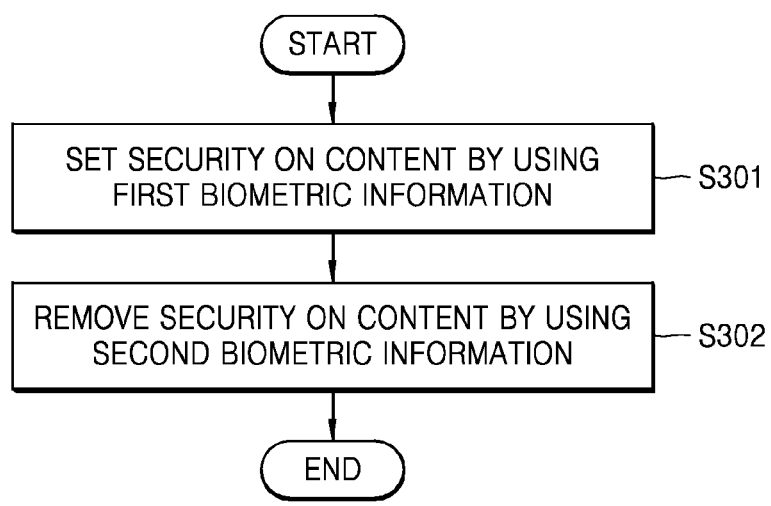
FIG. 3 is a flowchart of a method of using different biometric information to set and remove security on content, according to an exemplary embodiment.

FIG. 3 is a flowchart of a method of using different biometric information to set and remove security on content, according to an exemplary embodiment.

Referring to FIG. 3, in operation S301, the controller 130 according to an exemplary embodiment may set security on content by using first biometric information.

As shown in FIG. 1, the controller 100 according to an exemplary embodiment may set security on the content c10 by using the fingerprint information 10 obtained by the watch type wearable device 401. Here, the content c10 may be data related to personal information of the user, such as an ID card, but is not limited thereto.

For example, the watch type wearable device 401 may include a module for obtaining biometric information (hereinafter, referred to as biometrics module). For example, referring to FIG. 1, the watch type wearable device 401 may include a module for recognizing a fingerprint of a finger.

Referring back to FIG. 3, in operation S302, the controller 130 may remove the security set on the content by using second biometric information.

As shown in FIG. 1, the controller 130 may remove the security set on the content c10 by using the iris information 12 obtained by the glasses type wearable device 402. As such, the controller 130 may remove the security set on the content by using the iris information 12 instead of the fingerprint information 10 that is used to set security on the content c10.

A method of removing, by the controller 130, the security on the content by using the iris information 12 will be described in detail later.

In FIG. 1, the device 10 obtains the fingerprint information 10 and the iris information 12 from the watch type and glasses type wearable devices 401 and 402, which are external devices, but according to another exemplary embodiment, the device 100 may obtain at least one of the fingerprint information 10 and the iris information 12 from at least one biometrics module provided in the device 100. For example, the device 100 may obtain both the fingerprint information 10 and the iris information 12 from biometric modules provided in the device 10, instead of an external device.

Figure 4:
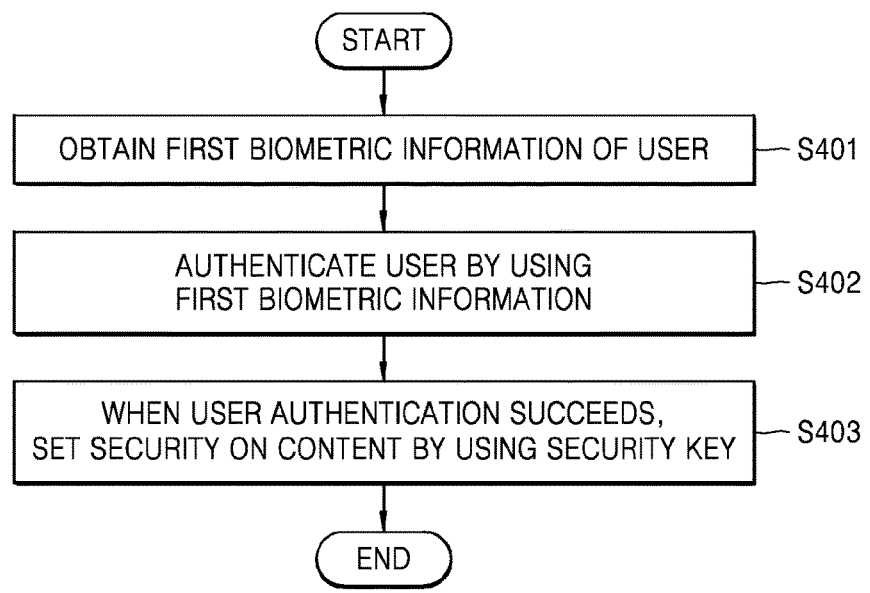
FIG. 4 is a flowchart of a method of setting security on content, according to an exemplary embodiment.

FIG. 4 is a flowchart of a method of setting security on content, according to an exemplary embodiment.

In operation S401, the controller 130 may obtain first biometric information of a user.

In operation S402, the controller 130 may authenticate the user by using the first biometric information.

The user may be authenticated by matching feature information of the first biometric information and feature information of base first biometric information pre-stored in the memory 170. When a matching score calculated as a matching result is equal to or higher than a certain threshold value, the controller 130 may determine that user authentication has succeeded.

Figure 102:
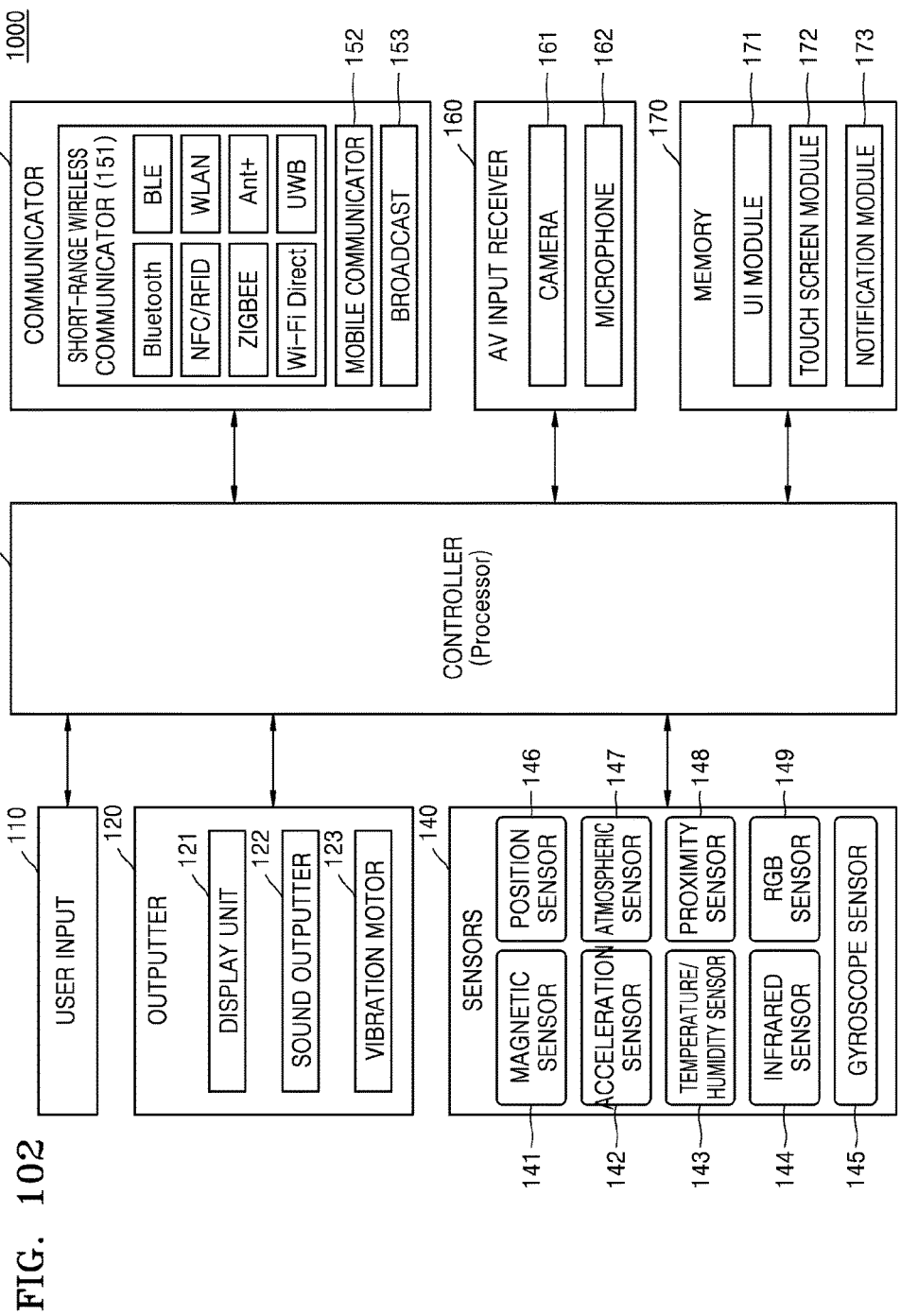

However, if the user authentication fails, the controller 130 may display a notification screen notifying failure, for example on a display unit 121 of FIG. 102.

In operation S403, when the user authentication has succeeded, the controller 130 may set security on content by using a security key.

The security key may be a password or an encryption key.

The password may be a common password or a password corresponding to biometric information. The common password can be commonly used to restrict access to content regardless of a type of biometric information. The password corresponding to biometric information can be used for a certain type of biometric information. Thus, according to an exemplary embodiment, when there are a plurality of pieces of biometric information used for user authentication, there may be a plurality of passwords corresponding to the plurality of pieces of biometric information.

The encryption key may be a common encryption key or an encryption key corresponding to biometric information. The common encryption key can be commonly used to encode content regardless of a type of biometric information. The common encryption key may be generated by using feature information of a plurality of pieces of base biometric information. The encryption key corresponding to biometric information may be used for a certain type of biometric information. Thus, according to an exemplary embodiment, when there are a plurality of pieces of biometric information used for user authentication, there may be a plurality of encryption keys corresponding to the plurality of pieces of biometric information. The encryption key may be generated by using feature information of each of the plurality of pieces of biometric information.

According to an exemplary embodiment, when the security key is a password, a security key used to set security on content and a security key used to remove the security on the content may be the same.

According to an exemplary embodiment, a security key used to set security on content and a security key used to remove the security on the content may be different from each other. When the security key is an encryption key, an encryption key used to set security on content and a decryption key used to remove the security on the content may be different from each other.

The encryption key and the decryption key may be the same when, for example, a value output by using a function and factor values of the function, which are used to generate the encryption key, is used as the decryption key.

The encryption key and the decryption key may be different from each other when, for example, a public key and a private key are generated together based on an output value (for example, a seed value) of a function while using the function and factor values of the function, which are used to encrypt content, to decrypt the content. At this time, the public key may be used as the encryption key and the private key may be used as the decryption key. In the current exemplary embodiment, a security key used to set security on content and a security key used to remove security on content are both commonly referred to as a security key, but it would be obvious to one of ordinary skill in the art that a security key used to set security on content and a security key used to remove security on content may have different values according to exemplary embodiments.

A method of obtaining a security key, such as a password or an encryption key, will be described in detail later.

Figure 5:
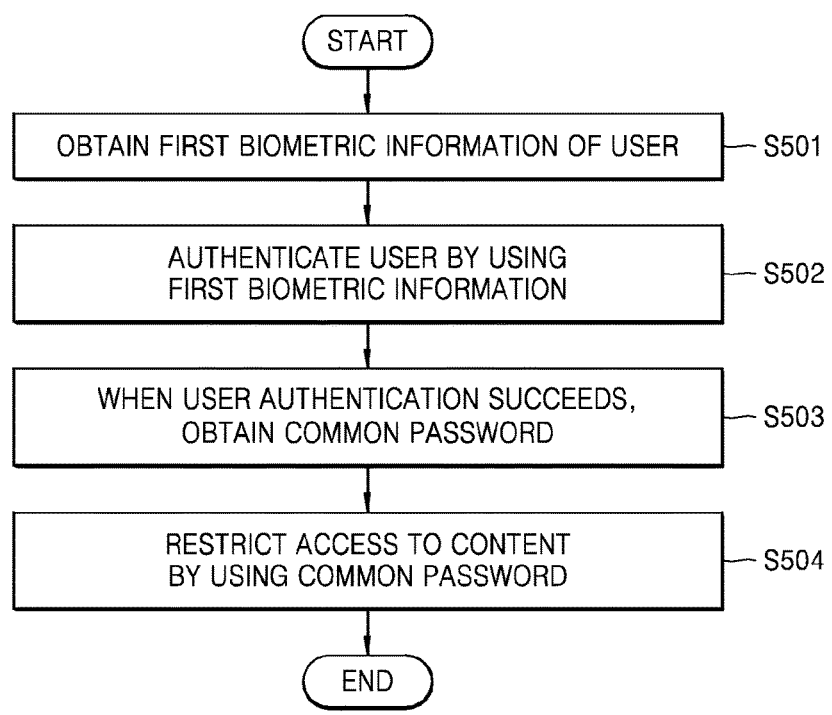
FIG. 5 is a flowchart of a method of restricting access to content so as to set security, according to an exemplary embodiment.

FIG. 5 is a flowchart of a method of restricting access to content in order to set security, according to an exemplary embodiment.

In operation S501, the controller 130 may obtain first biometric information of a user.

According to an exemplary embodiment, the controller 130 may receive the first biometric information from an external device through the communication unit 150. Alternatively, the controller 130 may obtain the first biometric information from a biometrics module provided in the device 100.

In operation S502, the controller 130 may authenticate the user by using the first biometric information.

The user may be authenticated by matching feature information of the first biometric information and feature information of base first biometric information pre-stored in the memory 170. When a matching score calculated as a matching result is equal to or higher than a certain threshold value, the controller 130 may determine that user authentication has succeeded.

When the user authentication fails, the controller 130 may display a notification screen notifying failure on the display unit 121.

In operation S503, when the user authentication has succeeded, the controller 130 may obtain a common password. The common password may be commonly used to restrict access to content regardless of a type of biometric information. For example, the common password may be a value obtained from among a plurality of values pre-stored in the memory 170. Alternatively, the common password may be a value randomly generated by the controller 130. Alternatively, the common password may be a value generated by the controller 130 by using at least one piece of base biometric information. For example, the common password may be a value generated by using a logic operation or combination result of feature information of base biometric information as a factor of a certain function.

According to an exemplary embodiment, the common password may be generated after the user authentication has succeeded. Alternatively, the common password may be generated before the user authentication is performed. For example, when feature information of base biometric information is stored in the memory 170 in the registration mode 201, the common password using the feature information of the base biometric information may be pre-generated and stored.

According to an exemplary embodiment, the common password may be stored in the memory 170, an external server, a wearable device, or a third device.

In operation S504, the controller 130 may restrict access to content by using the common password.

Figure 6:
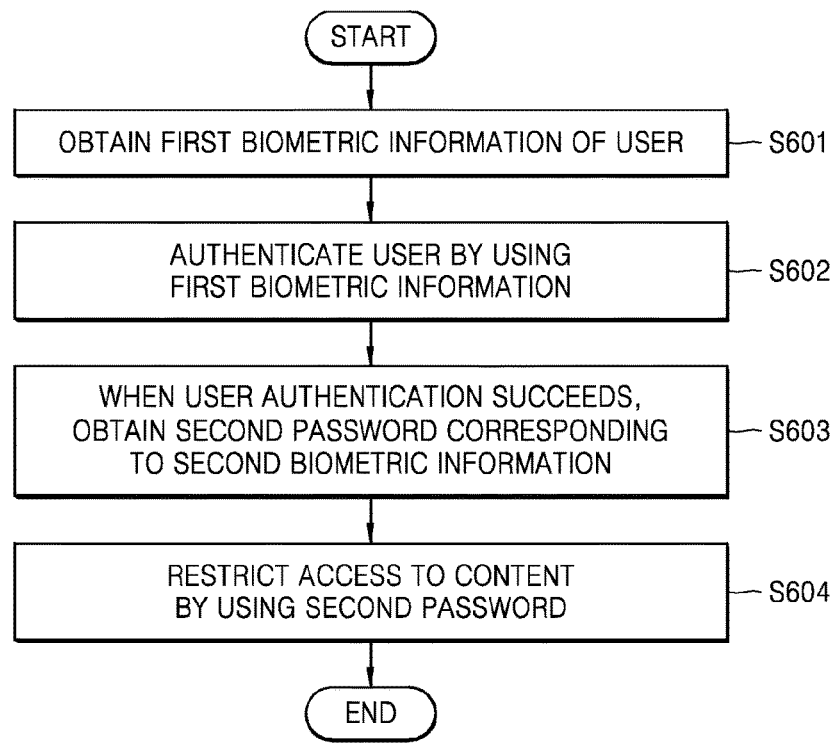
FIG. 6 is a flowchart of a method of restricting access to content so as to set security, according to another exemplary embodiment.

FIG. 6 is a flowchart of a method of restricting access to content in order to set security, according to another exemplary embodiment.

In operation S601, the controller 130 may obtain first biometric information of a user.

According to an exemplary embodiment, the controller 130 may receive the first biometric information from an external device through the communication unit 150. Alternatively, the controller 130 may obtain the first biometric information from a biometrics module provided in the device 100.

In operation S602, the controller 130 may authenticate the user by using the first biometric information.

In operation S603, when user authentication has succeeded, the controller 130 may obtain a first password corresponding to the first biometric information. Also, the controller 130 may obtain a second password corresponding to second biometric information. Passwords corresponding to biometric information may have different values according to types of biometric information. For example, the first password corresponding to the first biometric information and the second password corresponding to the second biometric information may have different values.

Meanwhile, when the user pre-sets biometric information to be used to remove security on content, the controller 130 may obtain a password corresponding to the pre-set biometric information.

A password corresponding to biometric information may be, for example, a value obtained, by the controller 130, from among a plurality of values pre-stored in the memory 170. Alternatively, a password corresponding to biometric information may be value randomly generated by the controller 130. Alternatively, a password corresponding to biometric information may be a value generated, by the controller 130, by using pre-stored base biometric information corresponding to the biometric information. For example, a password corresponding to biometric information may be a value generated by using at least a part of feature information of the pre-stored base biometric information as a factor of a certain function.

According to an exemplary embodiment, a password corresponding to biometric information may be generated after user authentication has succeeded. Alternatively, a password corresponding to biometric information may be generated before user authentication is performed. For example, in the registration mode 201, when feature information of base biometric information is stored in the memory 170, a password corresponding to the base biometric information may be pre-generated by using the feature information of the base biometric information.

According to an exemplary embodiment, a password corresponding to biometric information may be stored in the memory 170, an external server, a wearable device, or a third device.

In operation S604, the controller 130 may restrict access to content by using at least one of the first password corresponding to the first biometric information and the second password corresponding to the second biometric information.

Figure 7:
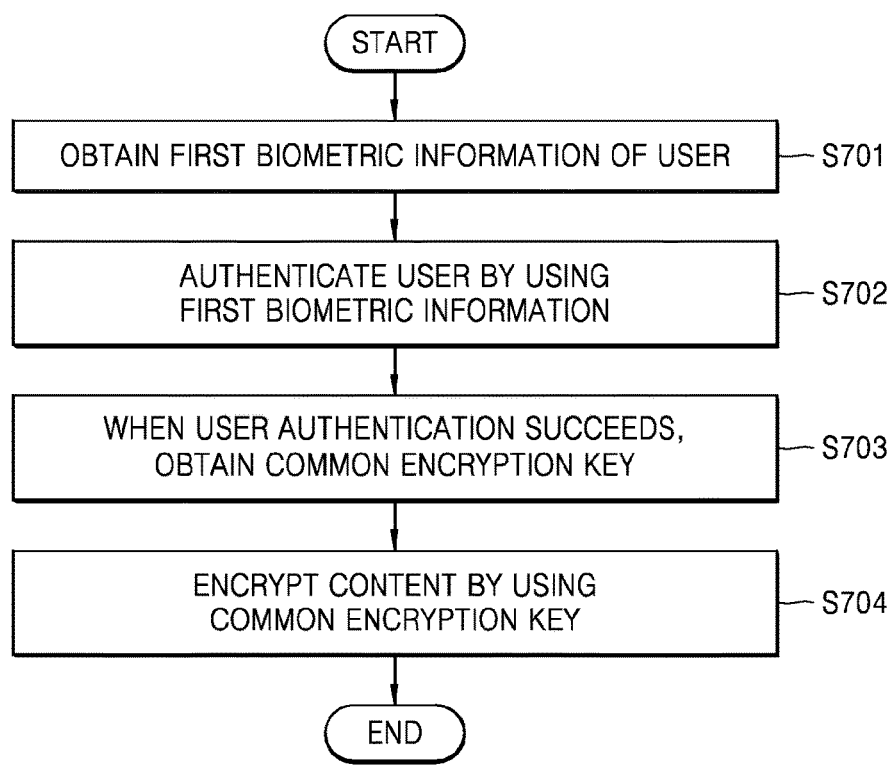
FIG. 7 is a flowchart of a method of encrypting content so as to set security, according to an exemplary embodiment.

FIG. 7 is a flowchart of a method of encrypting content so as to set security, according to an exemplary embodiment.

In operation S701, the controller 130 may obtain first biometric information of a user.

According to an exemplary embodiment, the controller 130 may receive the first biometric information from an external device through the communication unit 150. Alternatively, the controller 130 may obtain the first biometric information from a biometrics module provided in the device 100.

In operation S702, the controller 130 may authenticate the user by using the first biometric information.

The user may be authenticated by matching feature information of the first biometric information and feature information of pre-stored base first biometric information. The controller 130 may determine that user authentication has succeeded when a matching score obtained as a matching result is equal to or higher than a certain threshold value.

According to an exemplary embodiment, when it is determined that the user authentication failed, the controller 130 may display a notification screen indicating a failure on the display unit 121.

In operation S703, when the user authentication has succeeded, the controller 130 may obtain a common encryption key. The common encryption key may be commonly used to encrypt content regardless of a type of biometric information. For example, the common encryption key may be a value generated, by the controller 130, by using at least one piece of feature information from among a plurality of pieces of base biometric information. The common encryption key may be generated after the user authentication has succeeded. Alternatively, the common encryption key may be generated before the user authentication is performed. For example, in the registration mode 201, when feature information of base biometric information is stored in the memory 170, a common encryption key may be pre-generated by using the feature information of the base biometric information.

According to an exemplary embodiment, a method of generating, by the controller 130, a common encryption key by using a plurality of pieces of base biometric information may include the following operations.

The controller 130 may determine a value generated by using feature information of a plurality of pieces of base biometric information as factors of a certain function (for example, a cryptographic hash function), as an encryption key. Alternatively, some of the feature information may be used as the factors of the certain function. However, a method of generating an encryption key by using base biometric information is not limited thereto and may vary.

For example, a certain operation (for example, an XOR operation) may be applied to the feature information by using a pre-set value of a certain length (for example, 128 bits), and only a value corresponding to a certain length of the result value may be determined as an encryption key. Alternatively, password based key derivation function 2 (PBKDF2) may be used.

According to an exemplary embodiment, a result value of a function differs when a factor (feature information) of the function is different, and a function having a condition in which the factor is unable to be derived from the result value may be used as a function for generating an encryption key.

Next, in operation S704, the controller 130 may encrypt content by using the common encryption key.

Figure 8:
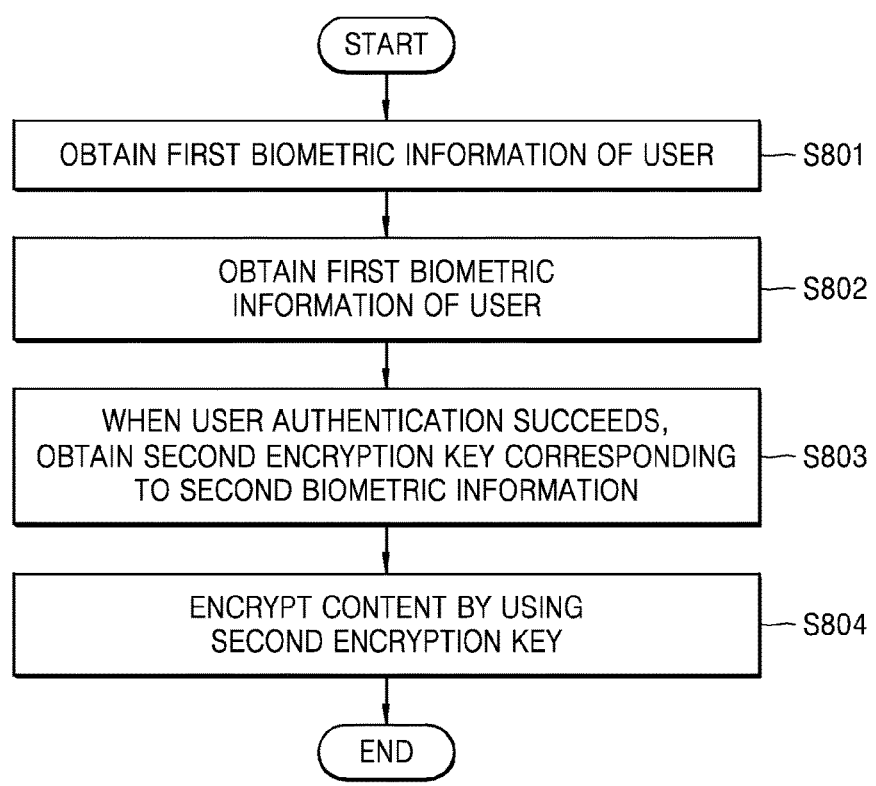
FIG. 8 is a flowchart of a method of encrypting content so as to set security, according to another exemplary embodiment.

FIG. 8 is a flowchart of a method of encrypting content so as to set security, according to another exemplary embodiment.

In operation S801, the controller 130 may obtain first biometric information of a user.

According to an exemplary embodiment, the controller 130 may receive the first biometric information from an external device through the communication unit 150. Alternatively, the controller 130 may obtain the first biometric information from a biometrics module provided in the device 100.

In operation S802, the controller 130 may authenticate the user by using the first biometric information.

The user may be authenticated by matching feature information of the first biometric information and feature information of pre-stored base first biometric information. The controller 130 may determine that user authentication has succeeded when a matching score obtained as a matching result is equal to or higher than a certain threshold value.

According to an exemplary embodiment, if it is determined that the user authentication failed, the controller 130 may display a notification screen indicating a failure, for example on the display unit 121.

In operation S803, when user authentication has succeeded, the controller 130 may obtain a first encryption key corresponding to the first biometric information. Also, the controller 130 may obtain a second encryption key corresponding to second biometric information. Encryption keys corresponding to biometric information may be different according to types of biometric information. For example, the first encryption key corresponding to the first biometric information and the second encryption key corresponding to the second biometric information may have different values.

Meanwhile, when the user pre-sets biometric information to be used to remove security on content, the controller 130 may obtain a password corresponding to the pre-set biometric information.

An encryption key corresponding to biometric information may be a value generated by using base biometric information pre-stored in the memory 170. An encryption key corresponding to biometric information may be generated after user authentication has succeeded. Alternatively, an encryption key corresponding to biometric information may be generated before the user authentication is performed. For example, in the registration mode 201, when feature information of base biometric information is stored in the memory 170, an encryption key corresponding to the base biometric information may be pre-generated by using the feature information of the base biometric information.

In detail, the controller 130 may determine a value generated by using feature information of base biometric information as a factor of a certain function (for example, a cryptographic hash function), as an encryption key. Alternatively, some of the feature information may be used as the factors of the certain function. However, a method of generating an encryption key by using base biometric information is not limited thereto and may vary.

Next, in operation S804, the controller 130 may encrypt content by using at least one of the first encryption key corresponding to the first biometric information and the second encryption key corresponding to the second biometric information.

Figure 9:
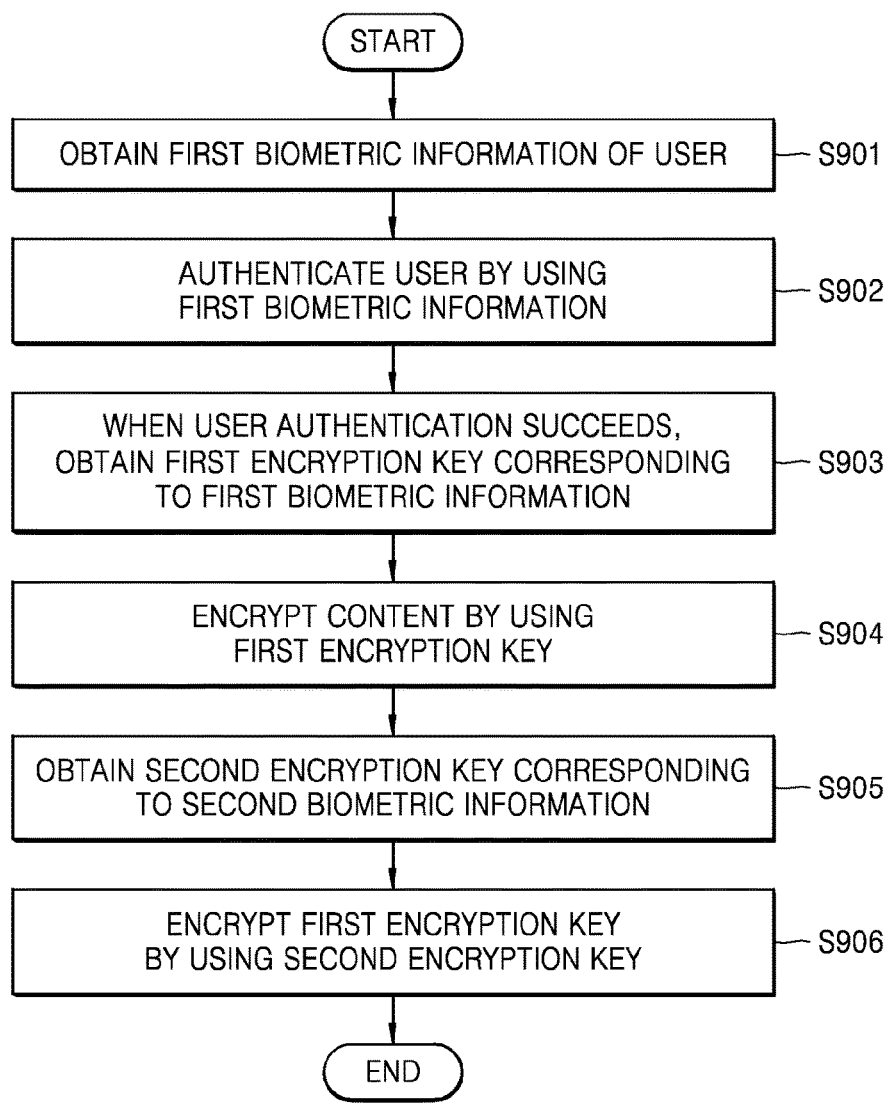
FIG. 9 is a flowchart of a method of encrypting content and an encryption key so as to set security, according to an exemplary embodiment.

FIG. 9 is a flowchart of a method of encrypting content and encryption key so as to set security, according to an exemplary embodiment.

In operation S901, the controller 130 may obtain first biometric information of a user. According to an exemplary embodiment, the controller 130 may receive the first biometric information from an external device through the communication unit 150. Alternatively, the controller 130 may obtain the first biometric information from a biometrics module provided in the device 100.

According to an exemplary embodiment, the external device may be a wearable device including a biometrics module. Examples of the external device include a watch type wearable device, a glasses type wearable device, a head mounted display device, and a band type wearable device, but are not limited thereto. The external device may include at least one of a biometrics module for obtaining fingerprint information, biometrics module for obtaining iris information, biometrics module for extracting face information, biometrics module for extracting retina information, biometrics module for extracting voice information, biometrics module for measuring a heart rate, and a biometrics module for identifying a gait pattern. However, biometrics modules described herein are only examples, and thus are not limited thereto.

In operation S902, the controller 130 may authenticate the user by using the first biometric information.

In operation S903, when user authentication has succeeded, the controller 130 may obtain a first encryption key. Here, the first encryption key may be a value generated by using base first biometric information pre-stored in the memory 170. The first encryption key may be generated after the user authentication has succeeded. Alternatively, the first encryption key may be generated before the user authentication is performed. For example, in the registration mode 201, when feature information of base first biometric information is stored in the memory 170, a first encryption key may be pre-generated by using the feature information of the base first biometric information. Since a method of generating an encryption key by using biometric information has been described above, details thereof are not provided again.

In operation S904, the controller 130 may encrypt content by using the first encryption key obtained in operation S903.

In operation S905, the controller 130 may obtain a second encryption key. The second encryption key may be, for example, a value generated by using base second biometric information pre-stored in the memory 170. The second encryption key may be generated after the content is encrypted. Alternatively, the second encryption key may be generated before the content is encrypted.

In operation S906, the controller 130 may encrypt the first encryption key by using the second encryption key generated in operation S905.

FIGS. 10 through 13 illustrate examples of a UI provided to set security on content.

As shown S1010, when a finger f10 of a user selects a button for a lock setting, the controller 130 may determine that a user input for setting security on the content c10 is received.

Figure 10:
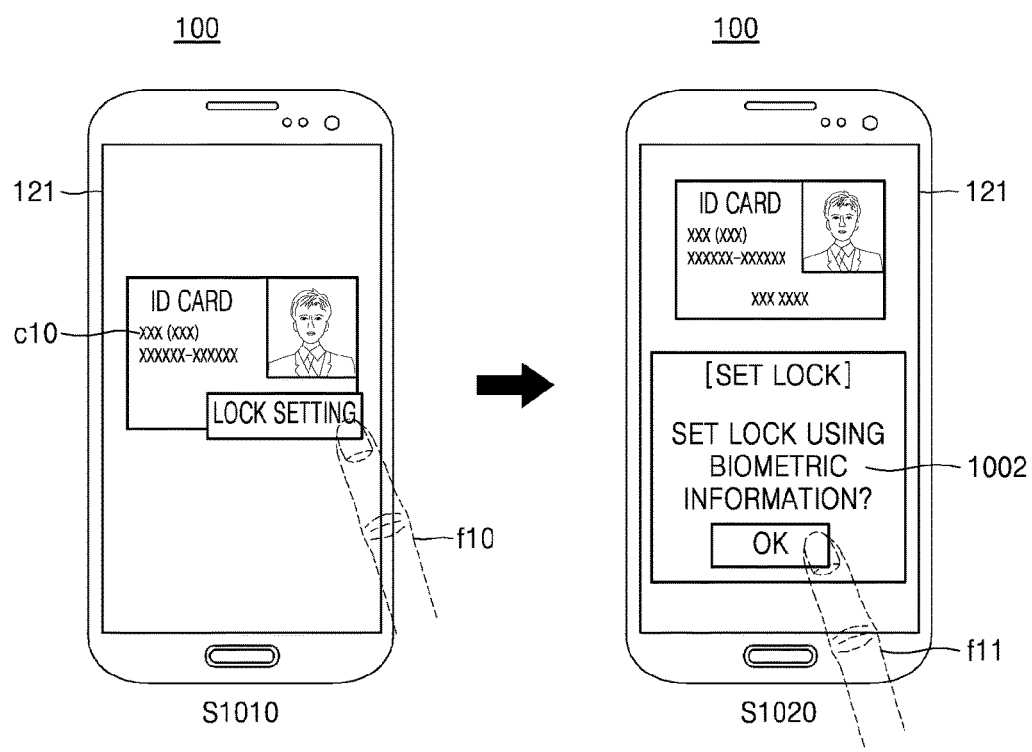
FIGS. 10 through 13 illustrate examples of a user interface (UI) provided to set security on content.

According to an exemplary embodiment, when the user input is received, the controller 130 may display a screen 1002 for a lock setting using biometric information, and a finger f11 of the user may select the lock setting using biometric information, as shown S1020. According to another exemplary embodiment, the controller 130 may display a menu screen (not shown) or an icon (not shown) for the lock setting using biometric information, on the display unit 121. In FIG. 10, the UI for setting a lock on the content c10 is illustrated, but the UI is not limited thereto.

Figure 11A:
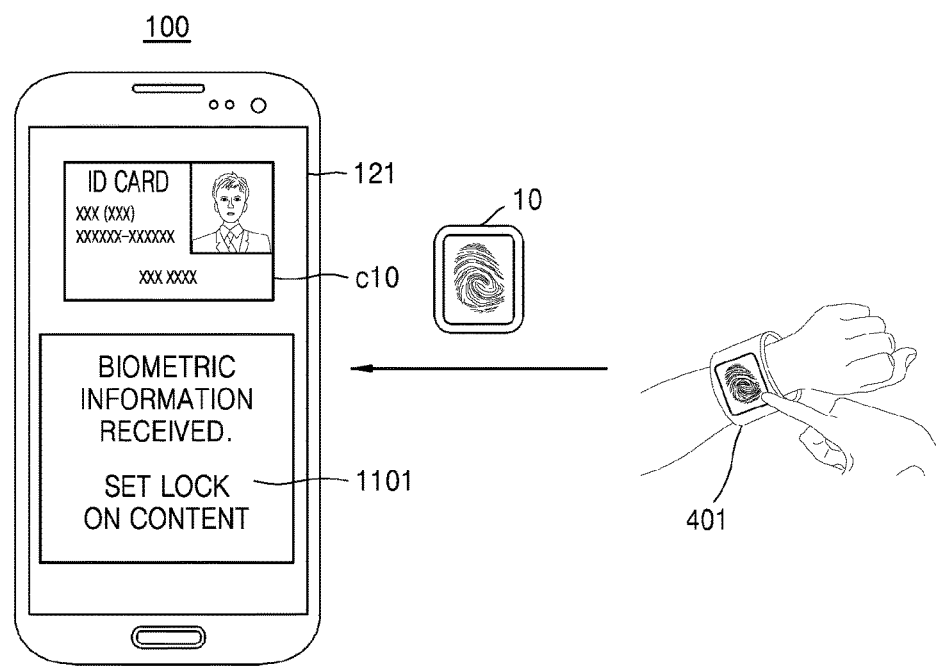

Next, as shown in FIG. 11A, the watch type wearable device 401 may obtain and transmit the fingerprint information 10 of the user to the device 100. The device 100 may receive the fingerprint information 10 from the watch type wearable device 401. The controller 130 may display, on the display unit 121, a notification screen 1101 indicating that biometric information for setting a lock on the content c10 is received. The notification screen 1101 is only an example of a UI for notifying a user that content is locked upon receiving biometric information, and thus is not limited thereto. As another example, the controller 130 may display, on the display unit 121, a screen indicating a type of received biometric information, for example, 'fingerprint information'.

Figure 11B:
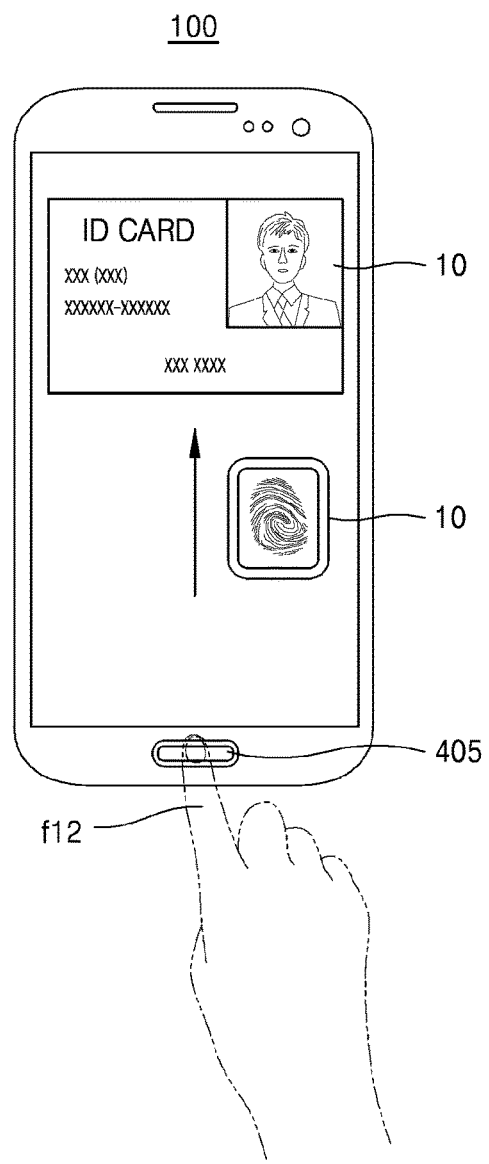

Alternatively, as shown in FIG. 11B, the device 100 may obtain biometric information through a biometrics module provided in the device 100. For example, the device 100 may include a module 405 for recognizing a fingerprint, and may obtain the fingerprint information 10 when a finger f12 of the user touches the module 405.

Figure 12:
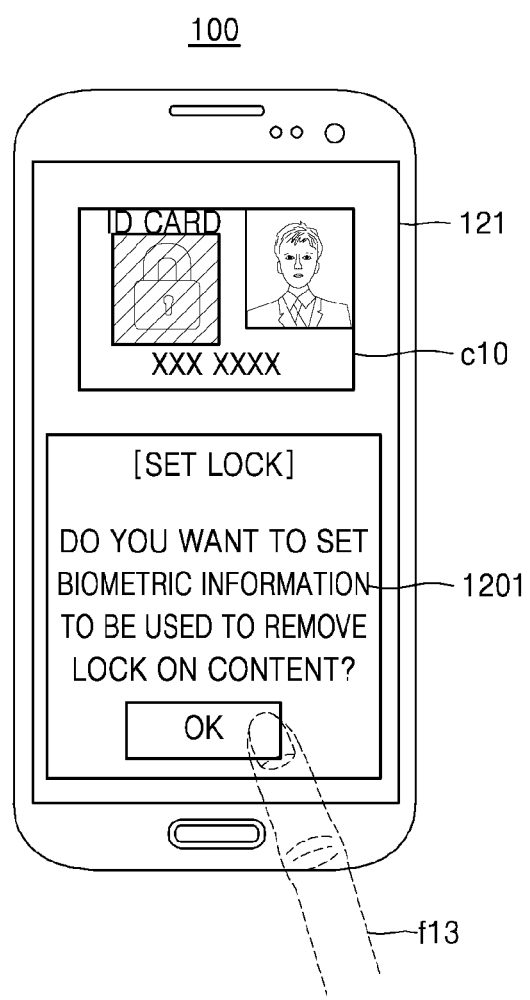

Referring to FIG. 12, the controller 130 may display, on the display unit 121, a screen 1201 for setting another piece of biometric information to be used to remove a lock on the content c10.

FIG. 12 illustrates an example of a UI provided to a user, and the user may pre-set the other piece of biometric information different from the biometric information used to set a lock on the content c10. Accordingly, the user may use the other piece of biometric information that is pre-set when removing security on the content c10 later. In FIG. 12, if a finger f13 of the user selects a button for additionally registering biometric information, the device 100 may determine that a user input for setting security on the content c10 is received.

Figure 13:
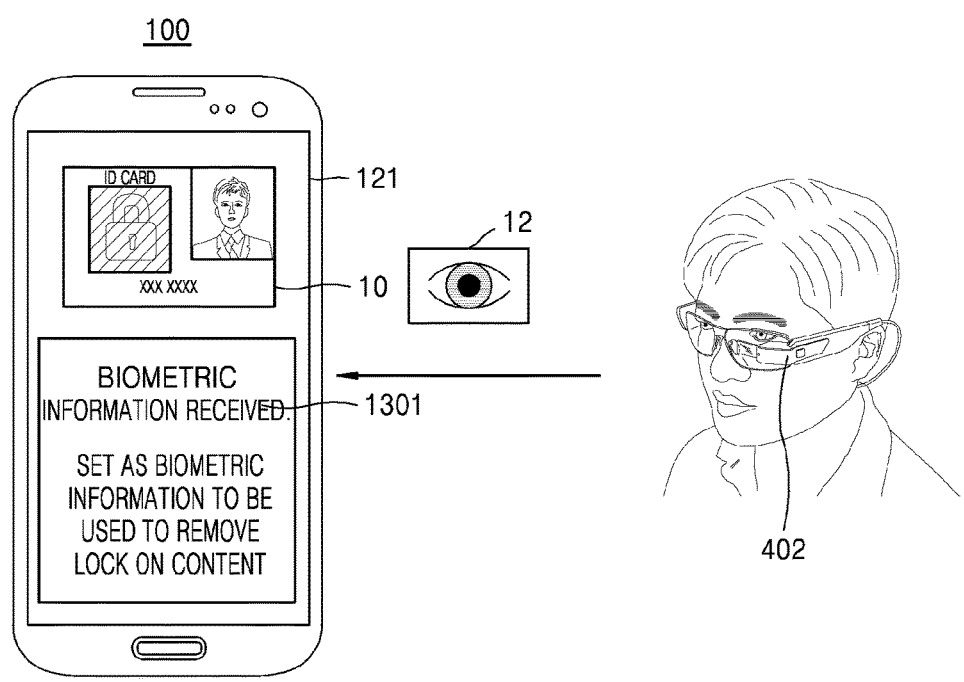

Referring to FIG. 13, the controller 130 may obtain the iris information 12 of the user from the glasses type wearable device 402.

The controller 130 may display, on the display unit 121, a screen 1301 for notifying the user that biometric information is received and the received biometric information is registered as biometric information for removing the lock on the content c10. FIG. 13 illustrates an example of a UI notifying a user that the user may remove a lock on content based on biometric information (for example, the iris information 12) other than biometric information (for example, the fingerprint information 10) used to encrypt the content.

According to an exemplary embodiment, a process of providing a UI for setting another piece of biometric information to be used to remove a lock on content, as described above with reference to FIGS. 12 and 13, may be omitted. In this case, the controller 130 may set at least one piece of base biometric information pre-stored in the memory 130 as another piece of biometric information to be used to remove the lock on the content.

Figure 14A:
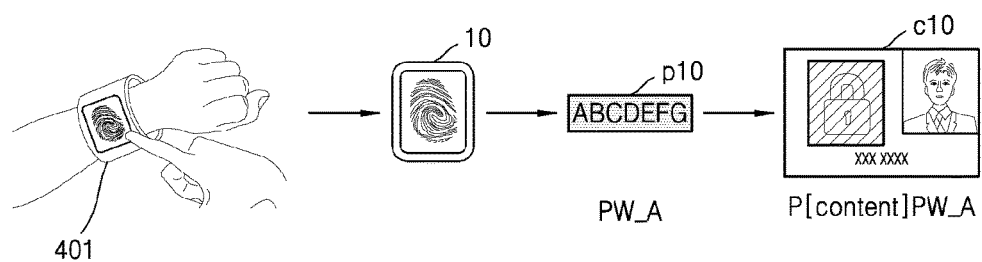
FIGS. 14A through 14C are diagrams for describing examples of setting security on content, according to exemplary embodiments.
Figure 14B:
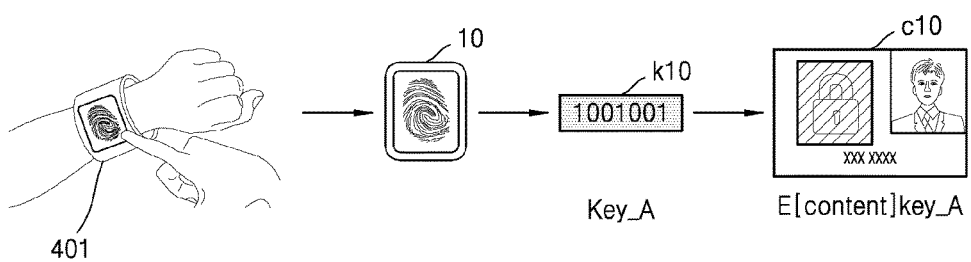
Figure 14C:
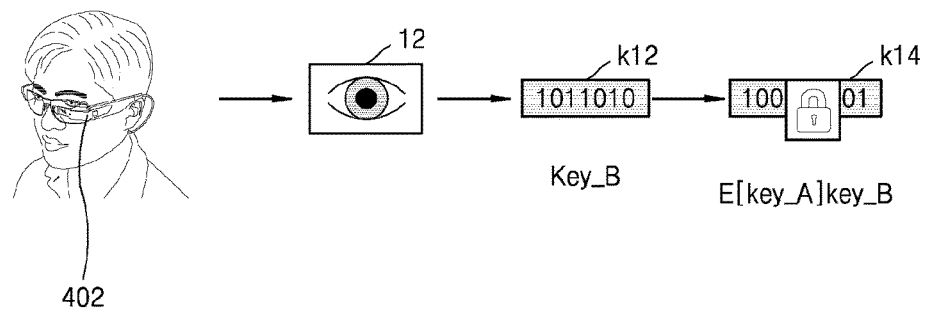

FIGS. 14A through 14C are diagrams for describing examples of setting security on content, according to exemplary embodiments.

Referring to FIG. 14A, when user authentication succeeds using the fingerprint information 10, the controller 130 may generate a common password, a first password, or a second password. The controller 130 may restrict access to the content c10 by using at least one password p10 (for example, PW_A) from among the common password, the first password, and the second password. In FIG. 14A, "P[content]PW_A" indicates that access to 'content' is restricted by using 'PW_A'.

Alternatively, referring to FIG. 14B, when user authentication succeeds using the fingerprint information 10, the controller 130 may generate a common encryption key, a first encryption key, or a second encryption key. The controller 130 may encrypt the content c10 by using at least one key k10 (for example, key_A) from among the common encryption key, the first encryption key, and the second encryption key. In FIG. 14B, "E[content]key_A" indicates that 'content' is encrypted by using 'key_A'.

Referring to FIG. 14C, when an encryption key is encrypted to set security on content, the controller 130 may generate a second encryption key k12 (for example, key_B) based on the iris information 12 obtained by the glasses type wearable device 402. For example, when a user is authenticated by using the iris information 12, the controller 130 may generate the second encryption key k12 by using base second biometric information pre-stored in the memory 170. Then, the controller 130 may obtain an encryption key k14 by encrypting the at least one key k10 by using the second encryption key k12. Here, "E[key_A]key_B" indicates that 'key_A' is encrypted by using 'key_B'.

The one or more exemplary embodiments described above are only examples and thus are not limited thereto. Also, the orders of the operations of the methods described above are not limited, and at least one operation may be omitted, an operation may be added to the method, or the order may be changed, according to one or more exemplary embodiments.

Figure 15:
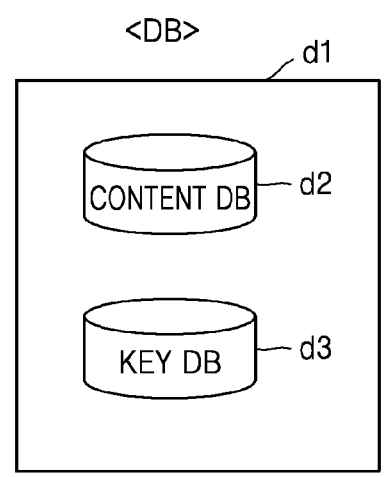
FIG. 15 is a diagram of a database according to an exemplary embodiment.

FIG. 15 is a diagram of a database (DB) d1 according to an exemplary embodiment.

The device 100 according to an exemplary embodiment may include the DB d1. Alternatively, the DB d1 of FIG. 15 may be provided in a server 200 of FIG. 79, described in further detail below.

The DB d1 may include a content DB d2 and a key DB d3.

The content DB d2 may store content on which security has been set.

For example, the content DB d2 may store "P[content]PW_A". "P[content]PW_A" may indicate that access to 'content' is restricted by using a password 'PW_A'. Hereinafter, "P[aaa]bbb" indicates that access to "aaa" is restricted by using a password "bbb", and thus descriptions thereof are not provided.

Alternatively, the content DB d2 may store "E[content]key_A". "E[content]key_A" may indicate that 'content' is encrypted by using an encryption key 'key_A'. Hereinafter, "E[ccc]ddd" indicates that "ccc" is encrypted by using an encryption key "ddd", and thus descriptions thereof are not provided.

The key DB d3 may store a security key.

For example, the key DB d3 may store at least one of a password, an encryption key, and an encrypted encryption key (for example, "E[key_A]key_B").

According to an exemplary embodiment, the content on which security is set and the security key may be respectively stored in the content DB d2 and the key DB d3, but alternatively, may be stored in one DB.

According to an exemplary embodiment, when the device 100 transmits the content and the security key to the server 200 through the communication unit 150, the server 200 may store the content and the security key respectively in the content DB d2 and the key DB d3.

According to another exemplary embodiment, when the server 200 encrypts the content or encrypts the encryption key, the server 200 may store the encrypted content and the encrypted encryption key respectively in the content DB d2 and the key DB d3. Alternatively, the server 200 may store the encrypted content and the encrypted encryption key in one DB. Alternatively, the content on which security is set and the security key may be each stored in a DB provided in any one of the server 200 and the device 100. For example, the content on which security is set may be stored in a DB provided in the server 200 and the security key may be stored in a DB provided in the device 100, or vice versa.

According to an exemplary embodiment, the content on which security is set and the security key, which are stored in the server 200, may be accessed by the device 100 or a device to which certain access authority is assigned.

Figure 16:
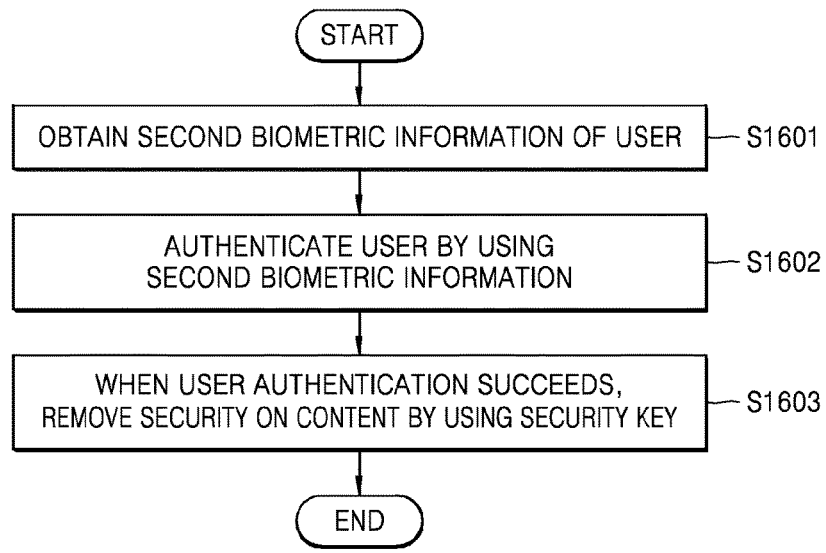
FIG. 16 is a flowchart of a method of removing security on content, according to an exemplary embodiment.

FIG. 16 is a flowchart of a method of removing security on content, according to an exemplary embodiment.

Here, a method of removing security on content by using second biometric information, according to an exemplary embodiment, may denote a method of removing security on content by using second biometric information when the security is set on the content by using first biometric information.

In operation S1601, the controller 130 may obtain second biometric information of a user.

In operation S1602, the controller 130 may authenticate the user by using the second biometric information.

User authentication may be performed by matching feature information of the second biometric information and feature information of base second biometric information pre-stored in the memory 170. The controller 130 may determine that the user authentication has succeeded when a matching score calculated as a matching result is equal to or higher than a certain threshold value. According to an exemplary embodiment, when the user authentication is determined to have failed, the controller 130 may display, for example on the display unit 121, a notification screen indicating a failure.

In operation S1603, when the user authentication has succeeded, the controller 130 may remove security on content by using a security key. The security key may be a password or a decryption key.

For example, the controller 130 may allow access to the content by using the password. Alternatively, the controller 130 may decrypt the content by using the decryption key.

A method of obtaining a password and a decryption key will be described in detail later.

Figure 17:
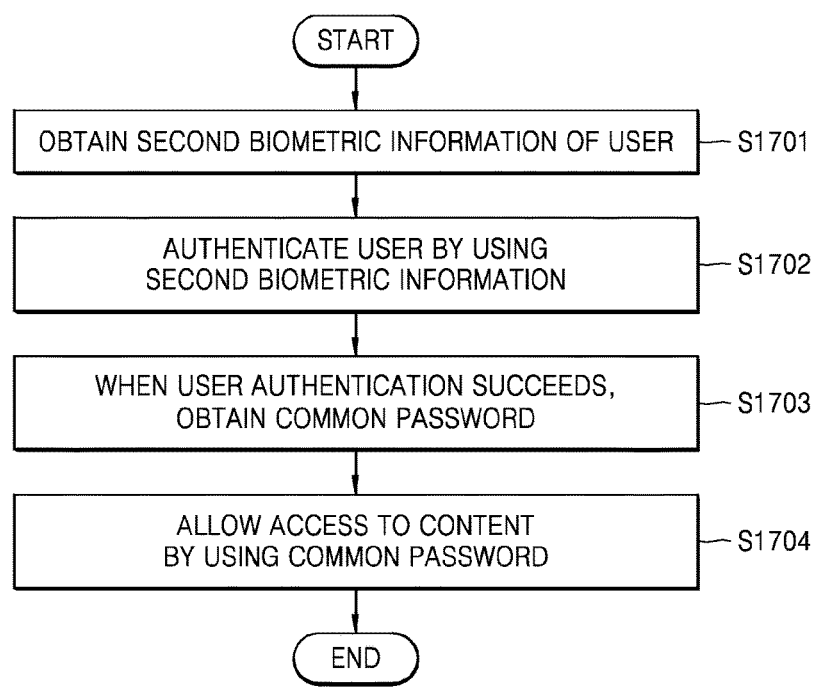
FIG. 17 is a flowchart of a method of allowing access to content so as to remove security, according to an exemplary embodiment.

FIG. 17 is a flowchart of a method of allowing access to content so as to remove security, according to an exemplary embodiment.

In operation S1701, the controller 130 may obtain second biometric information of a user.

According to an exemplary embodiment, the controller 130 may receive the second biometric information from an external device through the communication unit 150. Alternatively, the controller 130 may obtain the second biometric information from a biometrics module provided in the device 100.

In operation S1702, the controller 130 may authenticate the user by using the second biometric information.

User authentication may be performed by matching feature information of the second biometric information and feature information of base second biometric information pre-stored in the memory 170. The controller 130 may determine that the user authentication has succeeded when a matching score calculated as a matching result is equal to or higher than a certain threshold value. According to an exemplary embodiment, when the user authentication is determined to have failed, the controller 130 may display, for example on the display unit 121, a notification screen indicating a failure.

In operation S1703, when the user authentication has succeeded, the controller 130 may obtain a common password. The common password may be commonly used to restrict access to content regardless of the type of biometric information. The controller 130 may obtain the common password from, for example, the memory 170, an external server, a wearable device, or a third device.

Next, in operation S1704, the controller 130 may allow access to content by using the common password.

Figure 18:
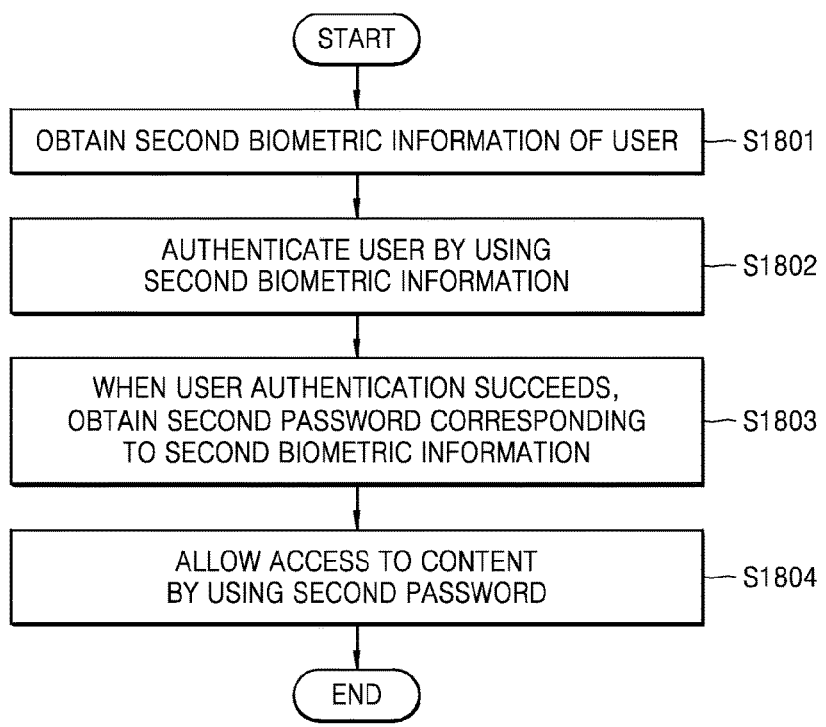
FIG. 18 is a flowchart of a method of allowing access to content so as to remove security, according to another exemplary embodiment.

FIG. 18 is a flowchart of a method of allowing access to content so as to remove security, according to another exemplary embodiment.

In operation S1801, the controller 130 may obtain second biometric information of a user.

According to an exemplary embodiment, the controller 130 may receive the second biometric information from an external device through the communication unit 150. Alternatively, the controller 130 may obtain the second biometric information from a biometrics module provided in the device 100.

In operation S1802, the controller 130 may authenticate the user by using the second biometric information.

In operation S1803, when user authentication has succeeded, the controller 130 may obtain a second password corresponding to the second biometric information. The second password may be generated by the controller 130 correspondingly to the second biometric information when security is set on content by using first biometric information. The controller 130 may obtain the second password from, for example, the memory 170, an external server, a wearable device, or a third device.

Then, in operation S1804, the controller 130 may allow access to content by using the second password.

Figure 19:
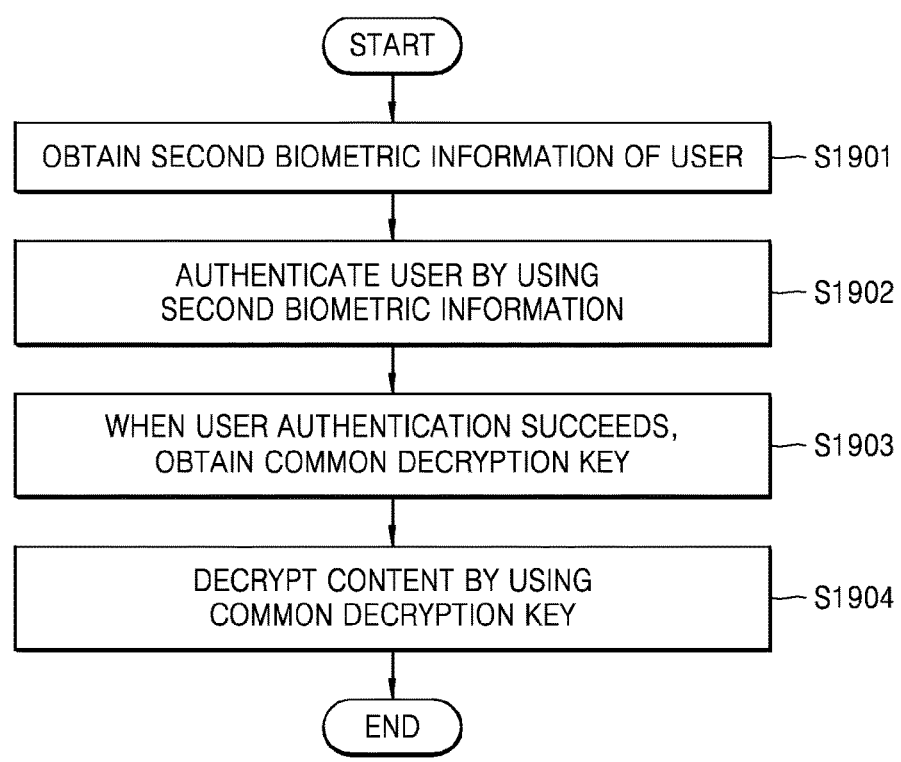
FIG. 19 is a flowchart of a method of decrypting content so as to remove security, according to an exemplary embodiment.

FIG. 19 is a flowchart of a method of decrypting content so as to remove security, according to an exemplary embodiment.

In operation S1901, the controller 130 may obtain second biometric information of a user.

According to an exemplary embodiment, the controller 130 may receive the second biometric information from an external device through the communication unit 150. Alternatively, the controller 130 may obtain the second biometric information from a biometrics module provided in the device 100.

In operation S1902, the controller 130 may authenticate the user by using the second biometric information.

In operation S1903, when user authentication has succeeded, the controller 130 may generate a common decryption key. The common decryption key may be commonly used to decrypt content regardless of a type of biometric information. For example, the common decryption key may be a value generated by using at least one piece of feature information of a plurality of pieces of base biometric information. In detail, the controller 130 may determine a value generated by using feature information of a plurality of pieces of base biometric information as factors of a certain function, as a decryption key. Alternatively, the controller 130 may use some of the feature information as factors of the certain function. However, an example of generating a decryption key by using base biometric information is not limited thereto and may vary.

In operation S1904, the controller 130 may decrypt encrypted content by using the common decryption key generated in operation S1903.

Figure 20:
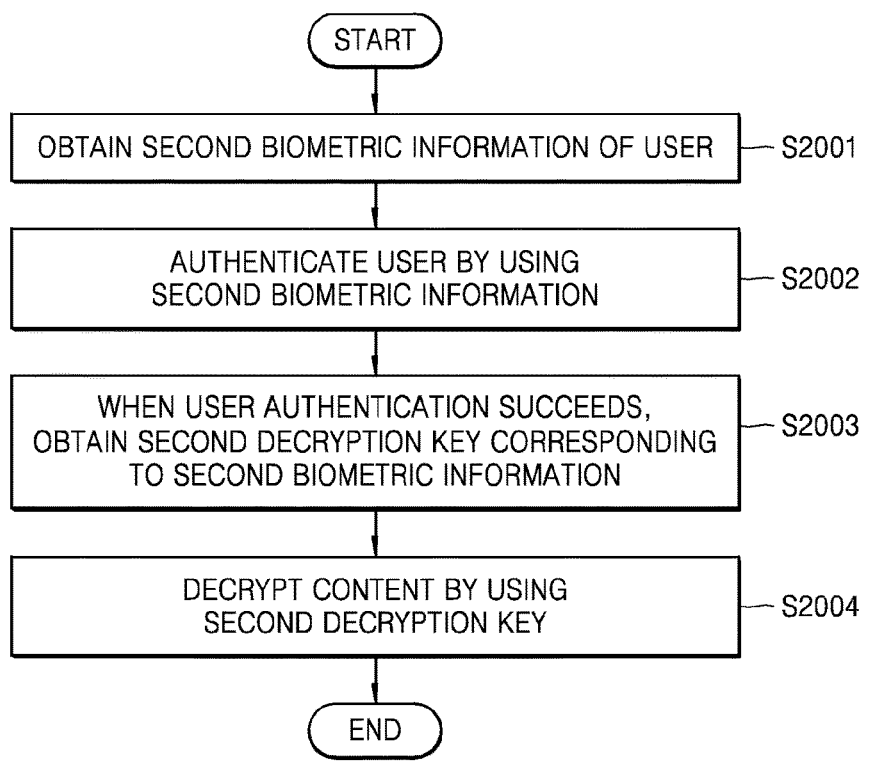
FIG. 20 is a flowchart of a method of decrypting content so as to remove security, according to another exemplary embodiment.

FIG. 20 is a flowchart of a method of decrypting content so as to remove security, according to another exemplary embodiment.

In operation S2001, the controller 130 may obtain second biometric information of a user.

According to an exemplary embodiment, the controller 130 may receive the second biometric information from an external device through the communication unit 150. Alternatively, the controller 130 may obtain the second biometric information from a biometrics module provided in the device 100.

In operation S2002, the controller 130 may authenticate a user by using the second biometric information.

In operation S2003, when user authentication has succeeded, the controller 130 may obtain a second decryption key corresponding to the second biometric information. For example, the second decryption key may be a value generated by using feature information of base second biometric information pre-stored in the memory 170. In detail, the controller 130 may determine a value generated by using feature information of second biometric information as a factor of a certain function, as the second decryption key. However, a method of generating a second decryption key by using base second biometric information is not limited thereto and may vary.

Meanwhile, a second decryption key and a second encryption key may be the same or different from each other.

A second decryption key and a second encryption key are the same when, for example, a value output by using a function and factor values of the function, which are used to generate a second encryption key, is used as the second decryption key.

A second decryption key and a second encryption key may be different from each other when, for example, a public key and a private key are generated based on an output value (for example, a seed value) of a function while using the function and factor values of the function, which are used to encrypt content, to decrypt the content. At this time, the public key may be used as the encryption key and the private key may be used as the decryption key. In this case, the public key may be used as the second encryption key and the private key may be used as the second decryption key.

In operation S2004, the controller 130 may decrypt encrypted content by using the second decryption key.

Figure 21:
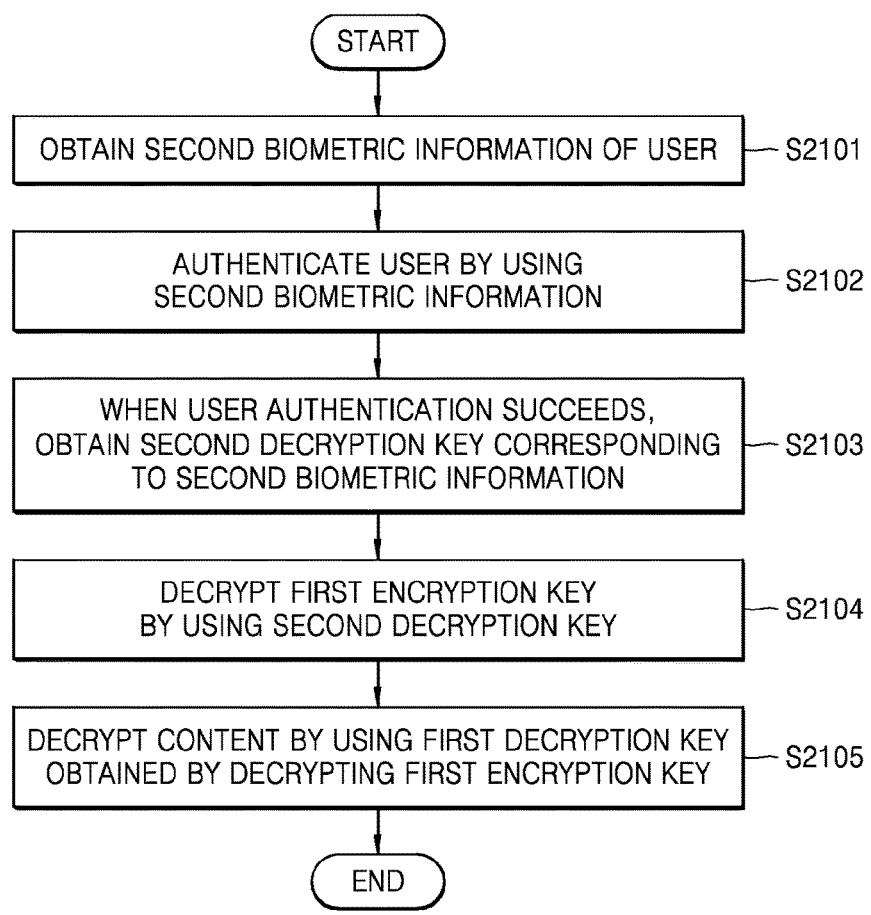
FIG. 21 is flowchart of a method of decrypting content so as to remove security, according to another exemplary embodiment.

FIG. 21 is flowchart of a method of decrypting content so as to remove security, according to another exemplary embodiment.

In operation S2101, the controller 130 may obtain second biometric information of a user.

According to an exemplary embodiment, the controller 130 may receive the second biometric information through the communication unit 150 from an external device. Alternatively, the controller 130 may obtain the second biometric information from a biometrics module provided in the device 100.

In operation S2102, the controller 130 may authenticate the user based on the second biometric information.

In operation S2103, when user authentication has succeeded, the controller 130 may obtain second decryption key corresponding to the second biometric information. For example, the second decryption key may be a value generated by using feature information of base second biometric information pre-stored in the memory 170. In detail, the controller 130 may determine a value generated by using feature information of second biometric information as a factor of a certain function, as the second decryption key. However, a method of generating a second decryption key by using base second biometric information is not limited thereto, and may vary. Meanwhile, a second decryption key and a second encryption key may be the same or different from each other.

In operation S2104, the controller 130 may decrypt a first encryption key (refer to operation S906 of FIG. 9) by using the second decryption key obtained in operation S2103.

In operation S2105, the controller 130 may decrypt content (refer to operation S904 of FIG. 9) by using a first decryption key obtained by decrypting the first encryption key in operation S2104.

Figure 22A:
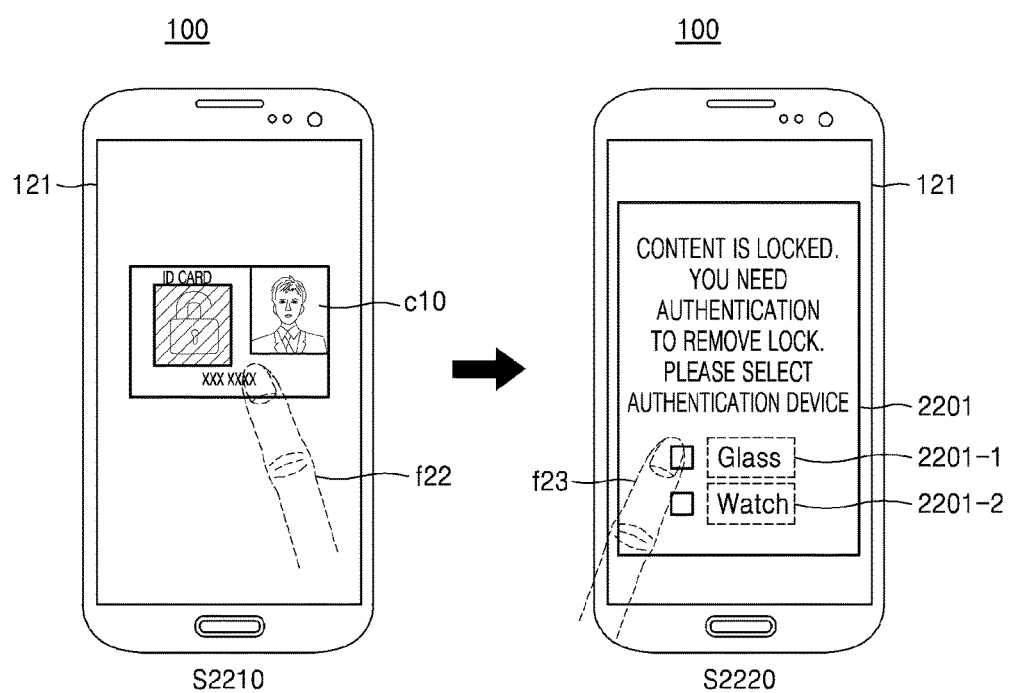
FIGS. 22A through 23 illustrate examples of a UI provided to remove security on content, according to exemplary embodiments.
Figure 22B:
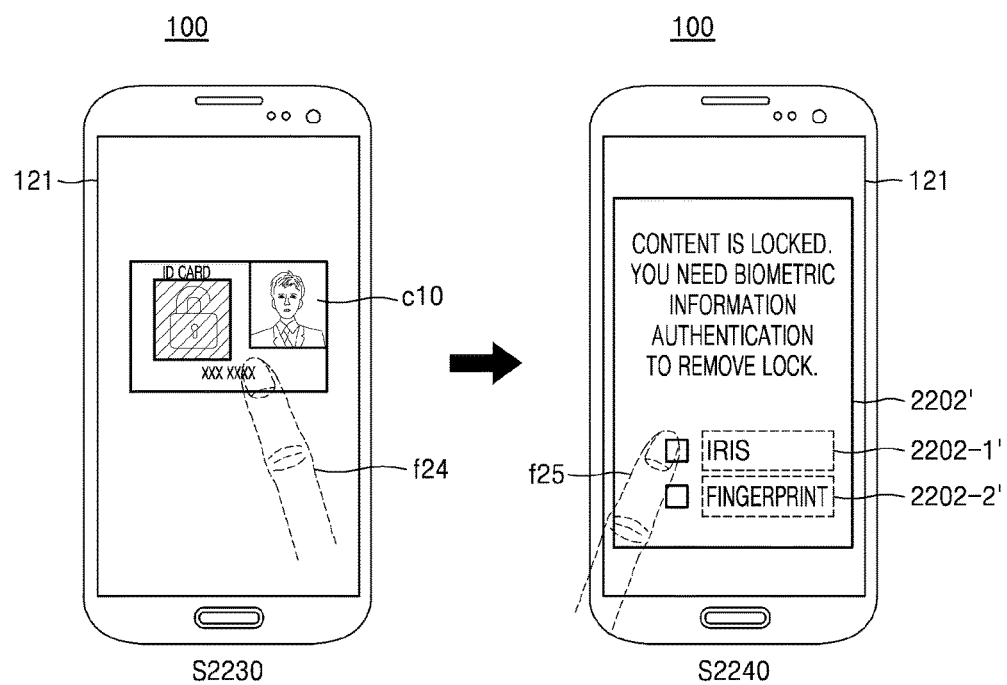
Figure 23:
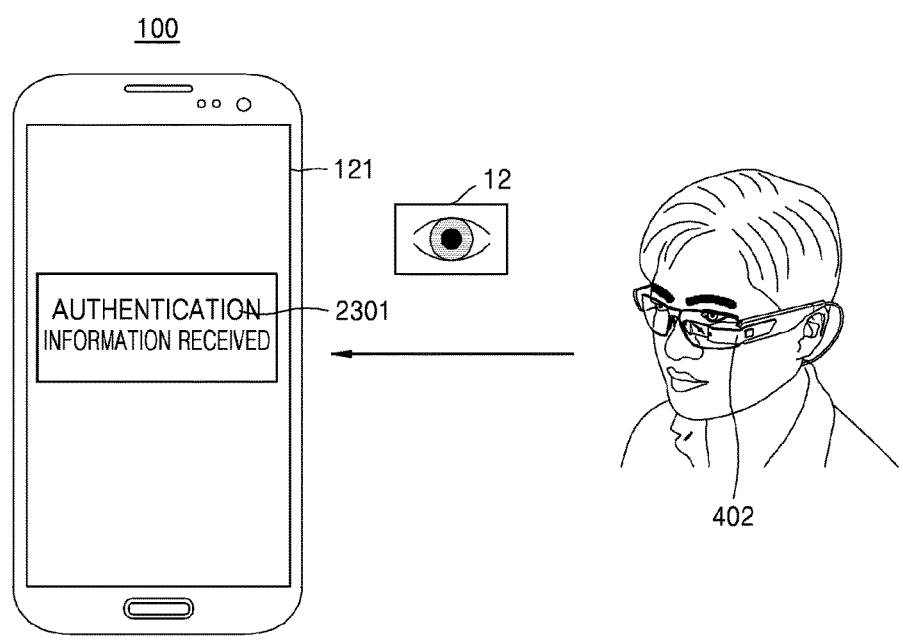

FIGS. 22A through 23 illustrate examples of a UI provided to remove security on content by using second biometric information, according to exemplary embodiments.

Referring to FIG. 22A, when a finger f22 of a user selects the content c10 on which security is set at S2210, the controller 130 may display, on the display unit 121, a screen 2201 requesting the user to input biometric information to remove the security on the content c10 at S2220. The controller 130 may display, on the display unit 121, a list of devices 2201-1 and 2201-2 that are able to obtain biometric information for removing the security on the content c10. According to an exemplary embodiment, the controller 130 may receive a user input of selecting, by a finger 23, the device 2201-2, i.e., 'Glass', as a device for obtaining biometric information.

As another example, referring to FIG. 22B, when a finger f24 of a user selects the content c10 on which security is set at S2230, the controller 130 may display, on the display unit 121, a screen 2202 requesting the user to input biometric information to remove the security on the content c10 at S2240. The controller 130 may display, on the display unit 121, types 2202-1 and 2202-2 of biometric information for removing the security on the content c10. According to an exemplary embodiment, the controller 130 may receive a user input of selecting, by a finger f25, the type 2202-2, i.e., Iris'.

FIG. 22B illustrates an example of a UI requesting a user to input biometric information for removing security when the device 100 receives a user input for accessing content on which the security is set, but the UI is not limited thereto. For example, the device 100 may not display a list of devices or types of biometric information for removing security on content, but may only display a screen requesting a user to input authentication information.

Referring to FIG. 23, the device 100 may receive the iris information 12 from the glasses type wearable device 402. The controller 130 may display, on the display unit 121, a screen 2301 indicating that authentication information is received.

FIG. 23 illustrates an example of a screen indicating that the device 100 received authentication information from an external device, but the screen is not limited thereto. For example, the controller 130 may display, on the display unit 121, a type of received biometric information (for example, Iris information'). Alternatively, the controller 130 may display, on the display unit 121, a device that obtained biometric information (for example, 'glasses type wearable device').

FIGS. 24A through 24D are diagrams for describing examples of setting security on content, according to other exemplary embodiments.

Figure 24A:
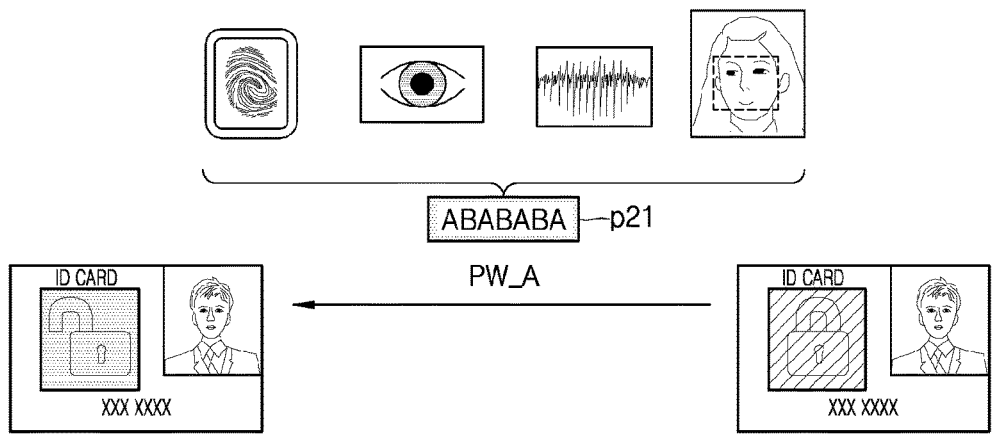
FIGS. 24A through 24E are diagrams for describing examples of setting security on content, according to other exemplary embodiments.

Referring to FIG. 24A, when a user is authenticated by using second biometric information (for example, iris information) of the user, the controller 130 may obtain a common password p21. The controller 130 may allow access to content by using the common password p21.

Figure 24B:
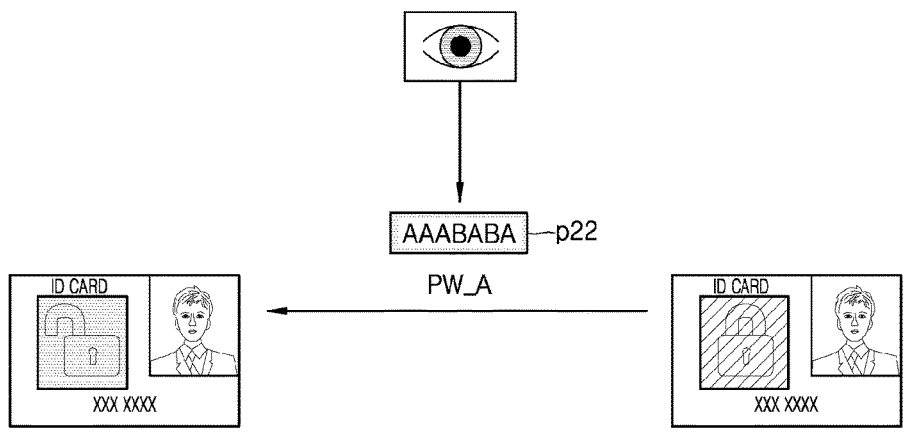

Alternatively, referring to FIG. 24B, when a user is authenticated by using second biometric information (for example, iris information) of the user, the controller 130 may obtain a password p22 corresponding to the second biometric information. The controller 130 may allow access to content by using the password p22.

Figure 24C:
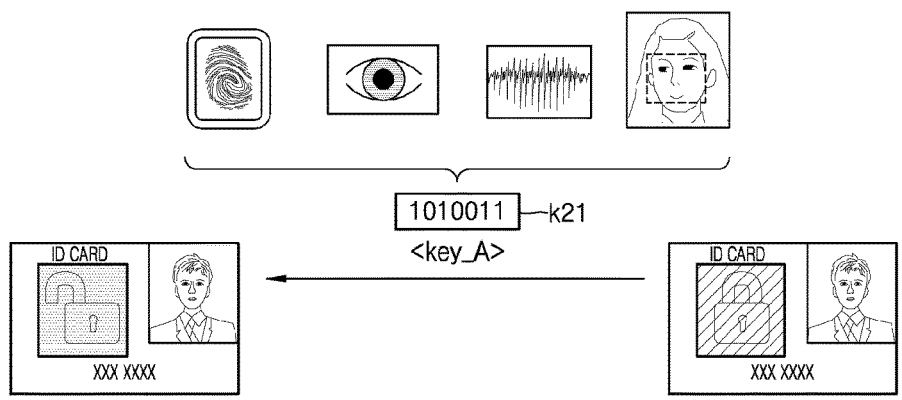

Alternatively, referring to FIG. 24C, when a user is authenticated by using second biometric information (for example, iris information) of the user, the controller 130 may generate a common decryption key k21 by using feature information of base biometric information pre-stored in the memory 170. The controller 130 may decrypt encrypted content by using the common decryption key k21.

Figure 24D:
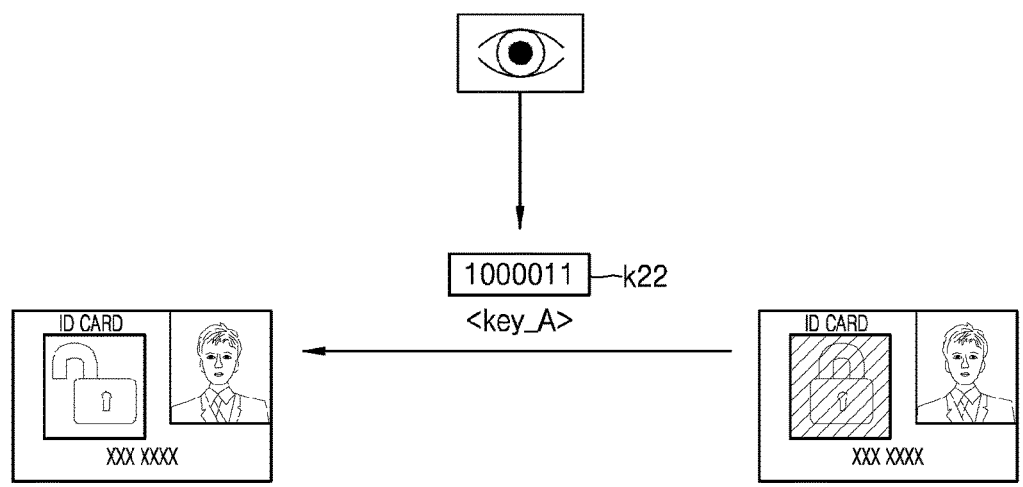

Alternatively, referring to FIG. 24D, when a user is authenticated by using second biometric information (for example, iris information) of the user, the controller 130 may generate a second decryption key k22 corresponding to the second biometric information by using feature information of base second biometric information pre-stored in the memory 170. Then, the controller 130 may decrypt encrypted content by using the second decryption key k22.

Figure 24E:
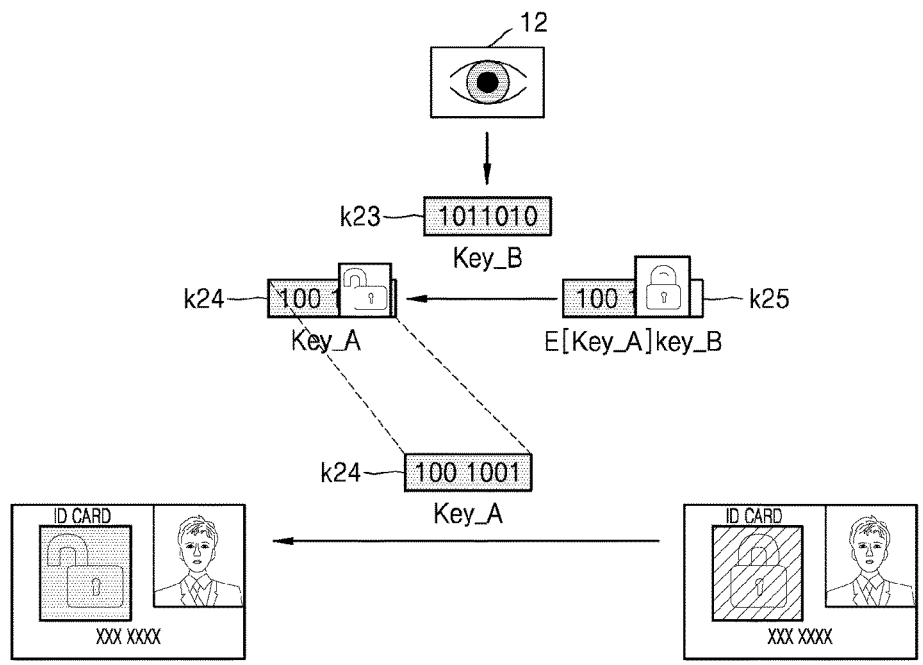

Alternatively, referring to FIG. 24E, when a user is authenticated by using the iris information 12 of the user, the controller 130 may generate a second decryption key k23, i.e., key_B, by using base second biometric information pre-stored in the memory 170. The controller 130 may decrypt an encrypted first encryption key k24, i.e., E[Key_A]key_B, by using the second decryption key k23. The controller 130 may decrypt encrypted content by using a decrypted key k25, i.e., key_A.

The one or more exemplary embodiments described above are only examples and thus are not limited thereto. Also, the orders of the operations of the methods described above are not limited, and at least one operation may be omitted, an operation may be added to the method, or the order may be changed, according to one or more exemplary embodiments.

Figure 25:
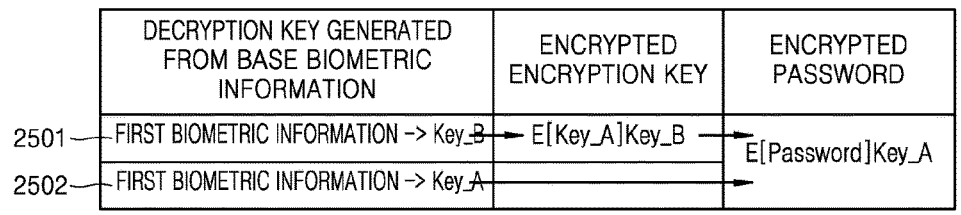
FIG. 25 is a table for describing a decrypting method according to an exemplary embodiment.

FIG. 25 is a table for describing a decrypting method according to an exemplary embodiment.

The table of FIG. 25 is used to describe a method of decrypting content after the content is encrypted.

The controller 130 may decrypt the content based on second biometric information.

In detail, as shown in a reference numeral 2501 of FIG. 25, when user authentication has succeeded by using the second biometric information, the controller 130 may generate a decryption key (Key_B) by using base second biometric information pre-stored in the memory 170. The controller 130 may decrypt an encrypted first encryption key, i.e., E[key_A]key_B, by using the decryption key. The controller 130 may decrypt encrypted content, i.e., E[content]key_A, by using a decrypted first encryption key, i.e., Key_A.

Alternatively, the controller 130 may decrypt the content based on first biometric information.

In detail, as shown in a reference numeral 2502 of FIG. 25, the controller 130 may generate a decryption key (Key_A) by using base first biometric information pre-stored in the memory 170. The controller 130 may decrypt encrypted content, i.e., E[content]key_A, by using the decryption key (Key_A).

Figure 26:
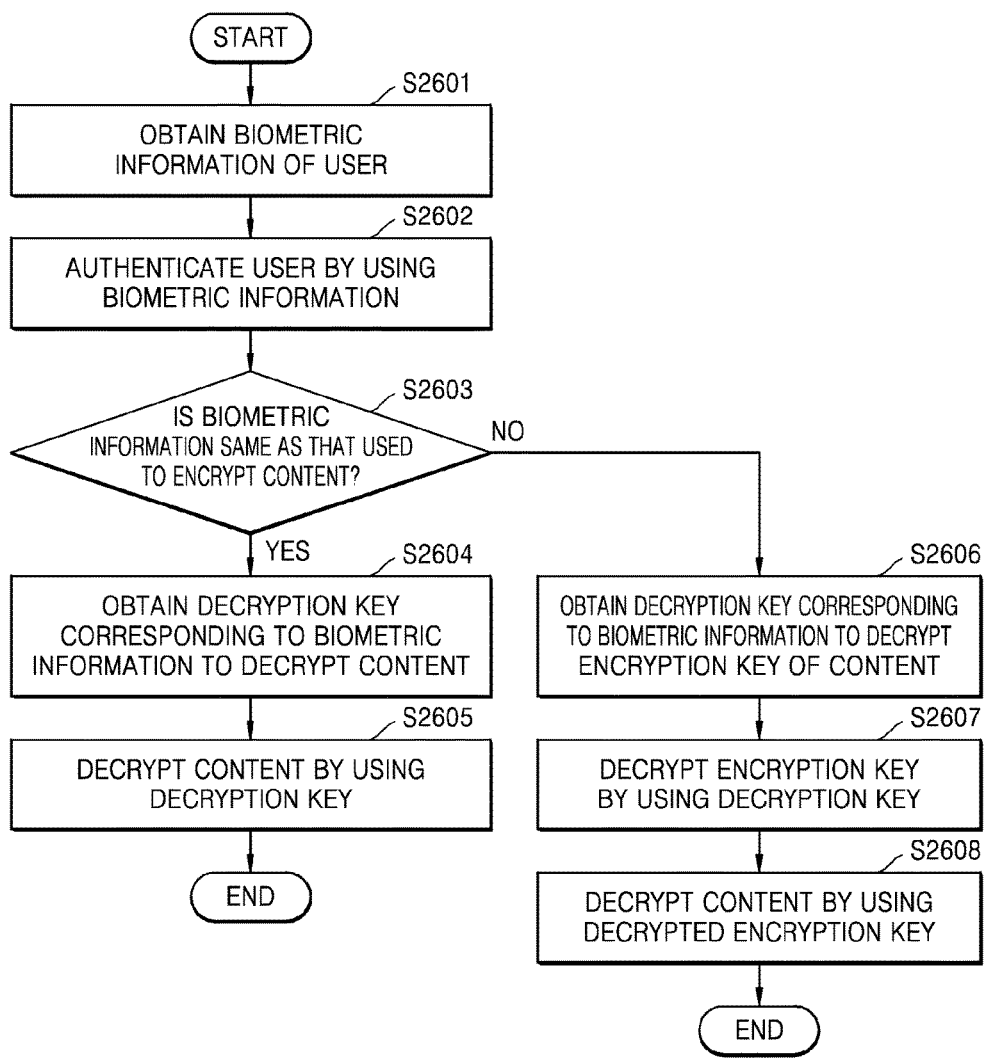
FIG. 26 is a flowchart of a method of decrypting content so as to remove security, according to another exemplary embodiment.

FIG. 26 is a flowchart of a method of decrypting content in order to remove security by using first biometric information, according to another exemplary embodiment. A method of decrypting content by using first biometric information may denote a method of decrypting content by using biometric information used to encrypt the content.

Referring to FIG. 26, in operation S2601, the controller 130 may obtain biometric information of a user.

According to an exemplary embodiment, the controller 130 may receive the biometric information from an external device through the communication unit 150. Alternatively, the controller 130 may obtain the biometric information from a biometrics module provided in the device 100.

In operation S2602, the controller 130 may authenticate the user by using the biometric information.

In operation S2603, the controller 130 may determine whether the biometric information obtained in operation S2601 is the same as biometric information used to encrypt content.

When it is determined that the biometric information is the same as that used to encrypt the content in operation S2603, the controller 130 may obtain a decryption key corresponding to the biometric information to decrypt the content, in operation S2604.

For example, the decryption key may be a value generated, by the controller 130, by using feature information of base first biometric information pre-stored in the memory 170.

In detail, the controller 130 may determine a value generated by using feature information of first biometric information as a factor of a certain function, as the decryption key. However, a method of generating a decryption key by using base first biometric information is not limited thereto, and may vary.

In operation S2605, the controller 130 may decrypt the content by using the decryption key obtained in operation S2605.

For example, when biometric information used to encrypt content is first biometric information (for example, fingerprint information), and the obtained biometric information obtained in operation S2601 is also the first biometric information (the fingerprint information), the content may be decrypted by using a decryption key corresponding to base first biometric information pre-stored in the memory 170.

When it is determined that the biometric information is different from that used to encrypt the content in operation S2603, the controller 130 may obtain a decryption key corresponding to biometric information in order to decrypt an encryption key of the content, in operation S2606.

For example, the decryption key corresponding to the biometric information may be a value generated, by the controller 130, by using feature information of base second biometric information pre-stored in the memory 170.

In operations S2607, the controller 130 may decrypt the encryption key by using the decryption key. In operation S2608, the controller 130 may decrypt the content by using the decrypted encryption key.

For example, when biometric information used to encrypt content is first biometric information (for example, fingerprint information), and the obtained biometric information obtained in operation S2601 is second biometric information (for example, iris information), an encryption key may be decrypted by using a decryption key obtained by using base second biometric information pre-stored in the memory 170, and then content may be decrypted by using the decrypted encryption key.

Figure 27A:
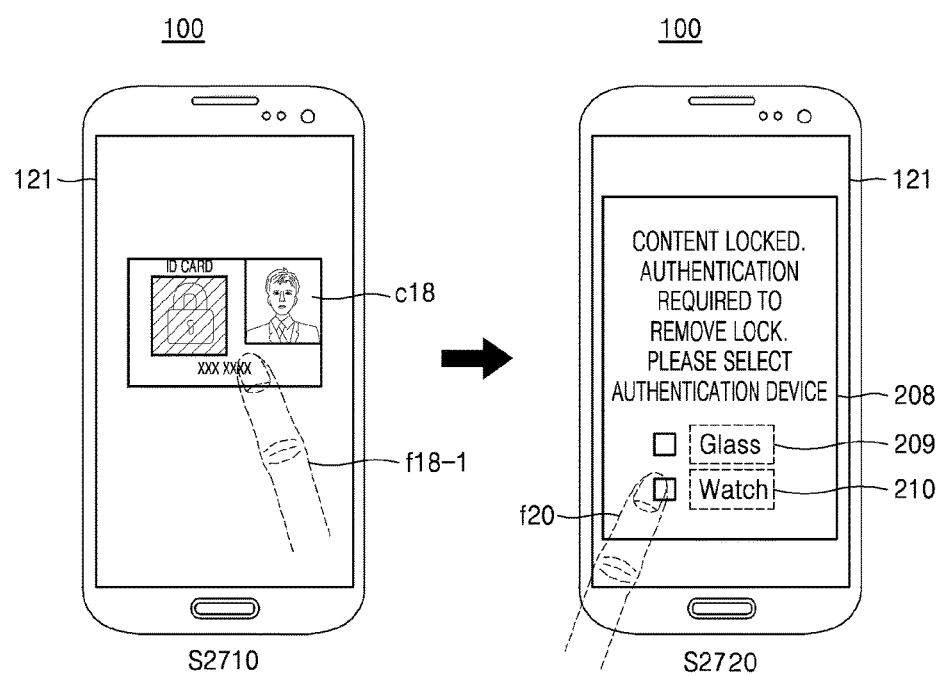
FIGS. 27A through 28 illustrate examples of a UI provided to decrypt content so as to remove security, according to exemplary embodiments.
Figure 27B:
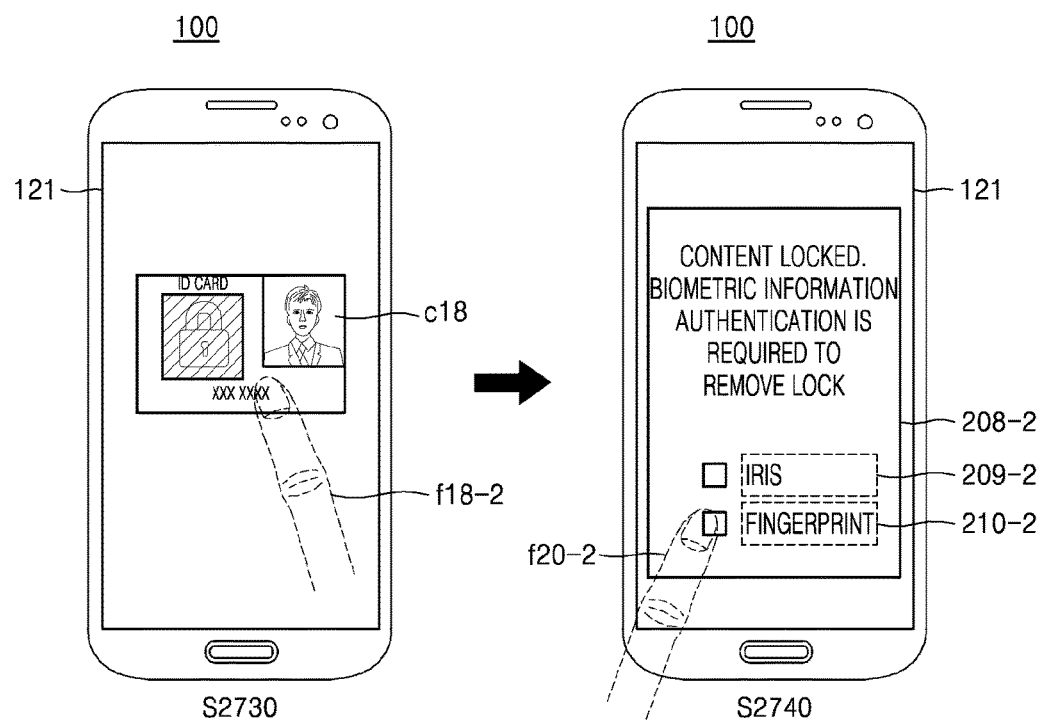
Figure 28:
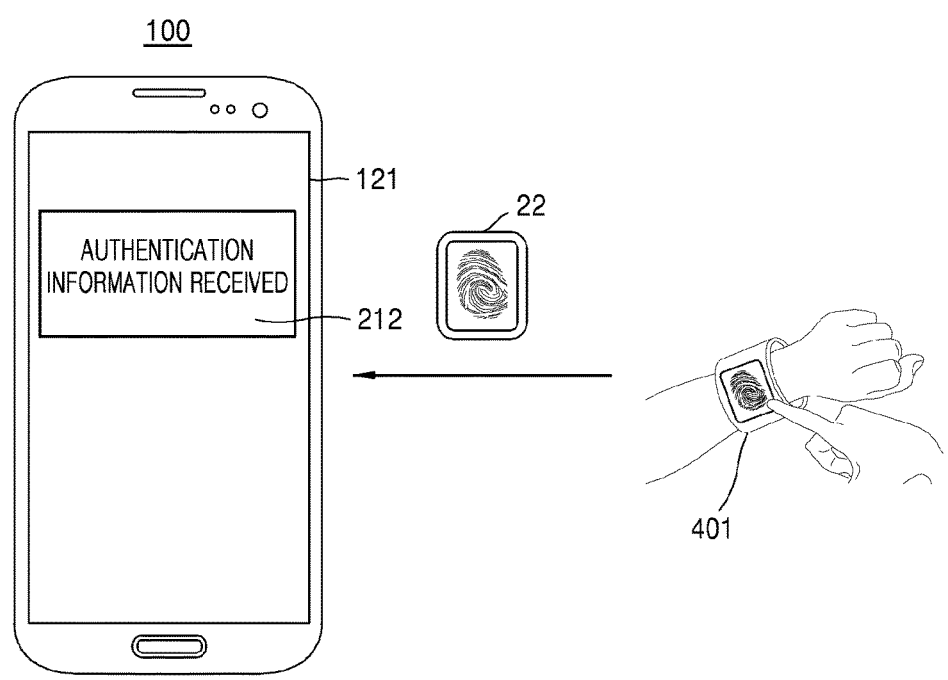

FIGS. 27A through 28 illustrate examples of a UI provided to decrypt content in order to remove security by using first biometric information, according to exemplary embodiments.

As shown in FIG. 27A, when a finger f18-1 of a user selects content c18 on which security is set at S2710, the controller 130 may display on the display unit 121, a screen 208 requesting the user to input biometric information to remove the security on the content c18 at S2720. For example, the controller 130 may display, on the display unit 121, a list of external devices 209 and 210 for removing the security on the content c18. For example, the controller 130 may receive a user input of selecting, by a finger f20, the external device 210, for example, 'Watch', as a device for obtaining biometric information.

According to another exemplary embodiment, referring to FIG. 27B, when a finger f18-2 of a user selects the content c18 at S2730, the controller 130 may display, on the display unit 121, a screen 208-2 for requesting the user to input biometric information to remove the security on the content c18 at S2740. The controller 130 may display, on the display unit 121, types 209-2 and 210-2 of biometric information for removing the security on the content c18.

For example, the controller 130 may receive a user input of selecting, by a finger f20-2, the type 210-2, i.e., a fingerprint, as a type of biometric information.

FIGS. 27A and 27B illustrate examples of a UI requesting a user to input biometric information for removing security when the device 100 receives a user input for accessing content on which the security is set, but the UI is not limited thereto. For example, the device 100 may only display a screen requesting a user to input authentication information, instead of displaying a list of devices or types of biometric information for removing security.

Referring to FIG. 28, the device 100 may receive fingerprint information 22 from the watch type wearable device 401. The controller 130 may display, on the display unit 121, a screen 212 indicating that authentication information is received. FIG. 28 illustrates an example of a screen indicating that authentication information is received from an external device, and the screen is not limited thereto.

For example, the controller 130 may display, on the display unit 121, a type of received biometric information (for example, 'fingerprint information'). Alternatively, the controller 130 may display, on the display unit 121, a device that obtained biometric information (for example, 'watch type wearable device').

The one or more exemplary embodiments described above are only examples and thus are not limited thereto. Also, the orders of the operations of the methods described above are not limited, and at least one operation may be omitted, an operation may be added to the method, or the order may be changed, according to one or more exemplary embodiments.

Figure 29:
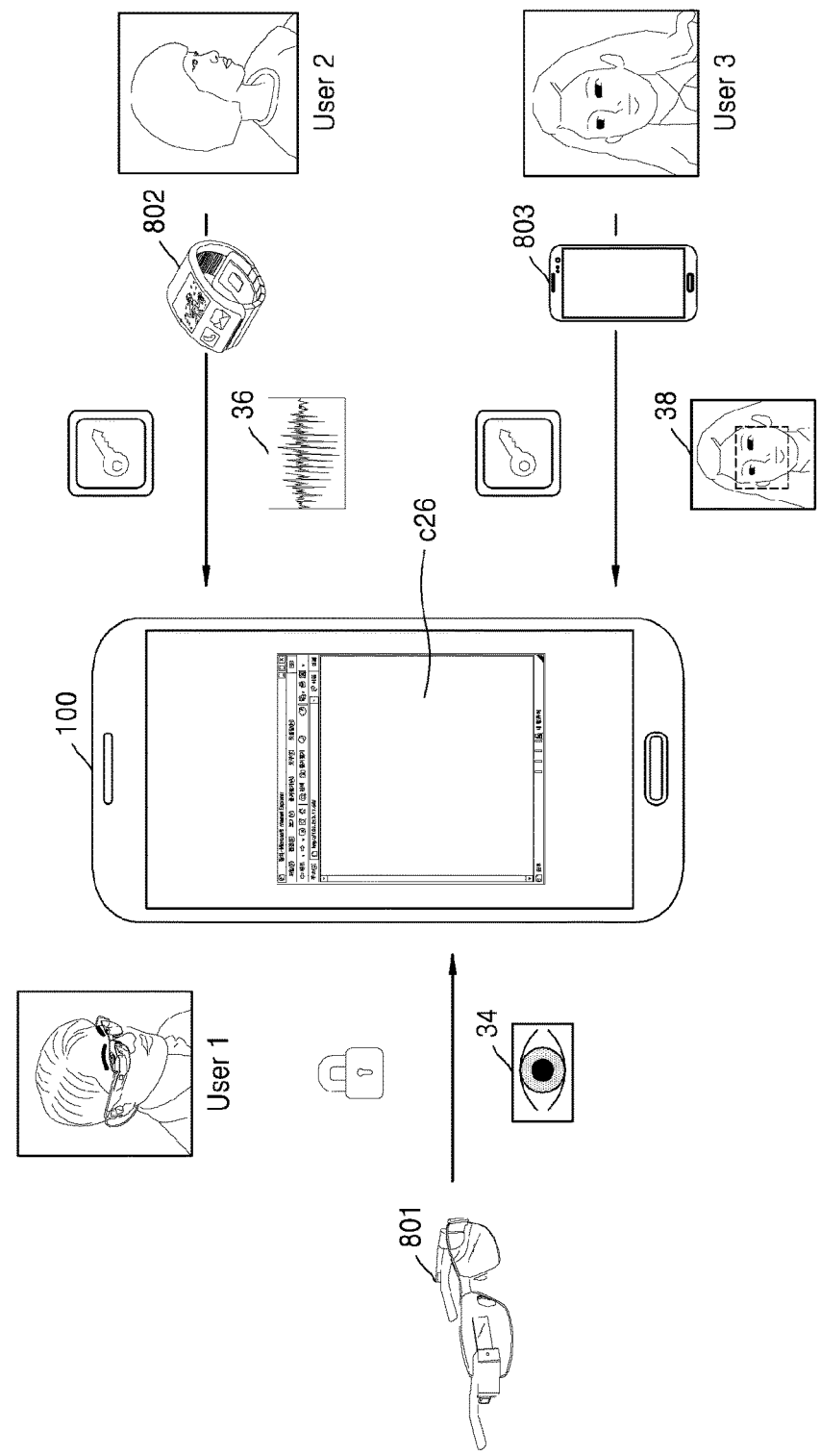
FIG. 29 is a diagram for describing an example of sharing content between a plurality of users, according to an exemplary embodiment.

FIG. 29 is a diagram for describing an example of sharing content by a plurality of users, according to an exemplary embodiment. As shown in FIG. 29, for example, when a first user User1 set security on content c26 by using biometric information of the first user User1, second use User2 and third user User3 may remove the security by using biometric information of each of the second user User2 and third user User3.

According to an exemplary embodiment, the first user User1 may own the device 100, such as a smart phone, and a glasses type wearable device 801. The glasses type wearable device 801 may include a biometrics module for obtaining iris information 34. The device 100 may obtain the iris information 34 by receiving the iris information 34 from the glasses type wearable device 801 that is paired with the device 100, through a communication unit.

The second user User2 may own a device 802, such as a watch type wearable device. The device 802 may include a microphone for obtaining voice information. Also, the third user User3 may own a device 803, such as a smart phone. The device 803 may include biometrics module for recognizing face information.

According to an exemplary embodiment, for a plurality of users to work on the content c26 together, the plurality of users may be able to remove the security set on the content c26. When the first user User1 generated the content c26, the first user User1 may wish to allow the second user User2 and the third user User3 to access the content c26. In this case, the first user User1 may set the security on the content C26 by using biometric information of the first user User1, and then set the content C26 such that the security is removed by using biometric information of each of the second user User2 and third user User3.

For example, the device 100 may set the security on the content c26 by using the iris information 34, and then set content c26 such that the security is removed by using voice information 36 of the second user User2 or face information 38 of the third user User3.

According to an exemplary embodiment, an encryption key corresponding to the iris information 34 may be encrypted by using the voice information 36, and then later be decrypted by using the voice information 36. Then, the content c26 may be decrypted by using the decrypted encryption key.

Alternatively, the encryption key corresponding to the iris information 34 may be encrypted by using the face information 38, and then later be decrypted by using the face information 38. Then, the content c26 may be decrypted by using the decrypted encryption key.

In FIG. 29, the device 100 obtains the biometric information of the first user User1 from the glasses type wearable device 801, i.e., an external device, but an exemplary embodiment is not limited thereto. According to another exemplary embodiment, the device 100 may directly obtain the biometric information of the first user User1 from a biometrics module included in the device 100.

Methods of setting and removing security, according to other exemplary embodiments will now be described in detail with reference to FIGS. 30 through 43.

Figure 30:
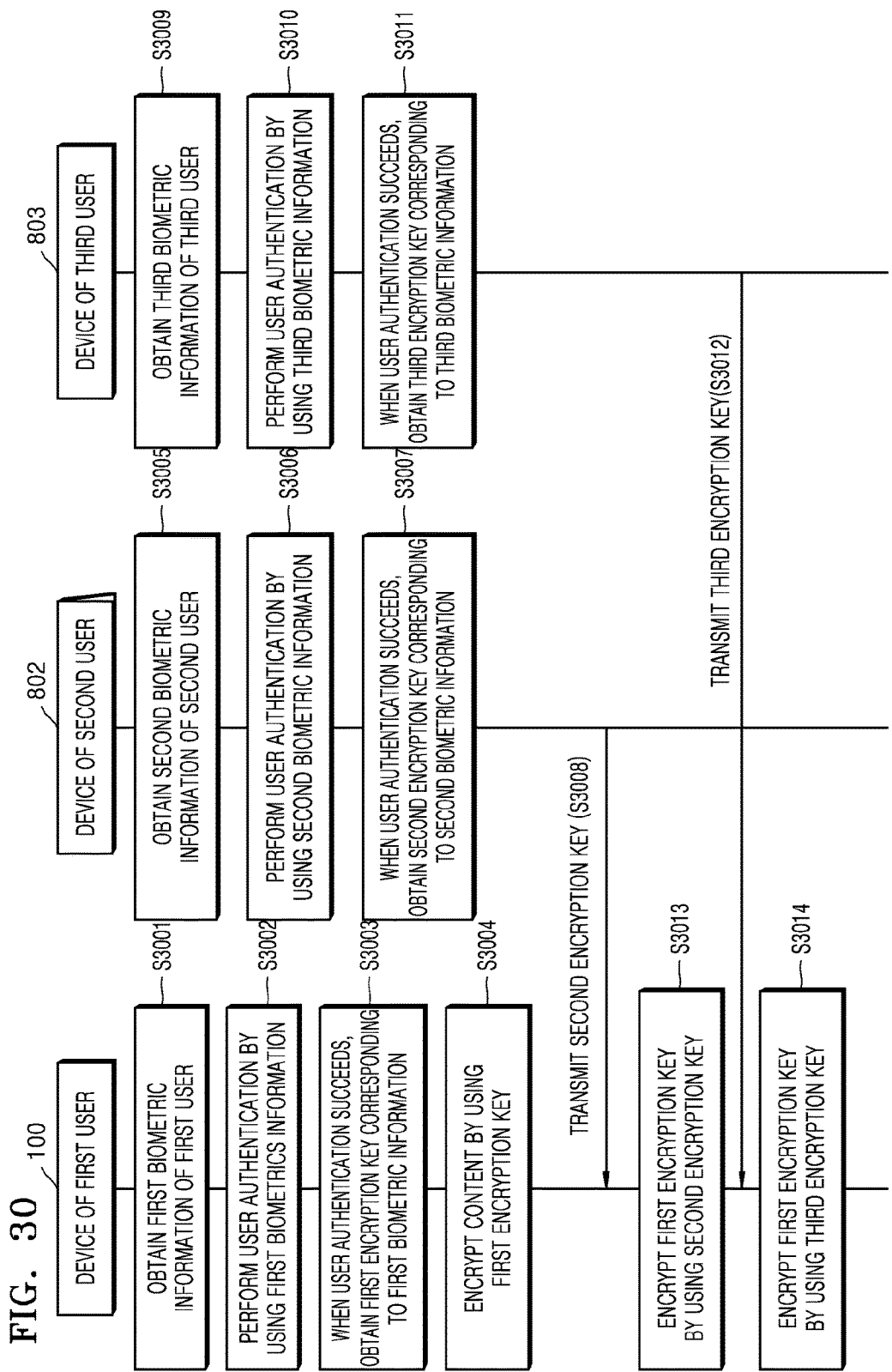
FIG. 30 is a flowchart of an encrypting method for setting security, according to an exemplary embodiment.

FIG. 30 is a flowchart of a method of encrypting content and encryption key to set security, according to an exemplary embodiment.

In operation S3001, the device 100 of a first user may obtain first biometric information of the first user. According to an exemplary embodiment, the device 100 may obtain the first biometric information from a biometrics module provided in the device 100.

In operation S3002, the controller 130 of the device 100 may perform user authentication by using the first biometric information.

The user authentication may be performed by matching feature information of the obtained first biometric information and feature information of base first biometric information pre-stored in the memory 170. The controller 130 may determine that the user authentication has succeeded when a matching score calculated as a matching result is equal to or higher than a certain threshold value.

In operation S3003, when the user authentication has succeeded, the controller 130 may obtain a first encryption key. Here, the first encryption key may be a value generated by using the base first biometric information pre-stored in the memory 170. The first encryption key may be generated after the user authentication has succeeded or before the user authentication is performed. For example, in the registration mode 201 for registering the first biometric information, when the feature information of the base first biometric information is stored in the memory 170, the first encryption key may be pre-generated and stored by using the feature information of the base first biometric information. Since a method of generating an encryption key by using biometric information has been described above, details thereof are not provided again.

In operation S3004, the controller 130 may encrypt content by using the first encryption key.

In operation S3005, the device 802 of a second user may obtain second biometric information of the second user. According to an exemplary embodiment, the device 802 may obtain the second biometric information from a biometrics module provided in the device 802.

In operation S3006, the device 802 may perform user authentication by using the second biometric information.

The user authentication may be performed by matching feature information of the obtained second biometric information and feature information of base second biometric information pre-stored in the memory 170. The controller 130 may determine that the user authentication has succeeded when a matching score calculated as a matching result is equal to or higher than a certain threshold value.

In operation S3007, when the user authentication has succeeded, the device 802 may obtain a second encryption key. Here, the second encryption key may be a value generated by using the base second biometric information pre-stored in the memory 170. The second encryption key may be generated after the user authentication has succeeded or before the user authentication is performed. For example, in the registration mode 201 for registering the second biometric information, when the feature information of the base second biometric information is stored in the memory 170, the second encryption key may be pre-generated and stored by using the feature information of the base second biometric information. Since a method of generating an encryption key by using biometric information has been described above, details thereof are not provided again.

In operation S3009, the device 803 of a third user may obtain third biometric information of the third user.

In operation S3010, the device 803 may perform user authentication by using the third biometric information.

The user authentication may be performed by matching feature information of the obtained third biometric information and feature information of base third biometric information pre-stored in the memory 170. The controller 130 may determine that the user authentication has succeeded when a matching score calculated as a matching result is equal to or higher than a certain threshold value.

In operation S3011, when the user authentication has succeeded, the device 803 may obtain a third encryption key. Here, the third encryption key may be a value generated by using base third biometric information pre-stored in the memory 170 of the device 803.

According to an exemplary embodiment, since each operation performed in the device 803 corresponds to each operation performed in the device 802, details thereof are not repeated.

In operation S3008, the device 802 may transmit the second encryption key to the device 100.

In operation S3013, the device 100 may encrypt the first encryption key by using the second encryption key received from the device 802.

Also, in operation S3012, the device 803 may transmit the third encryption key to the device 100.

In operation S3014, the device 100 may encrypt the first encryption key by using the third encryption key received from the device 803.

Figure 31:
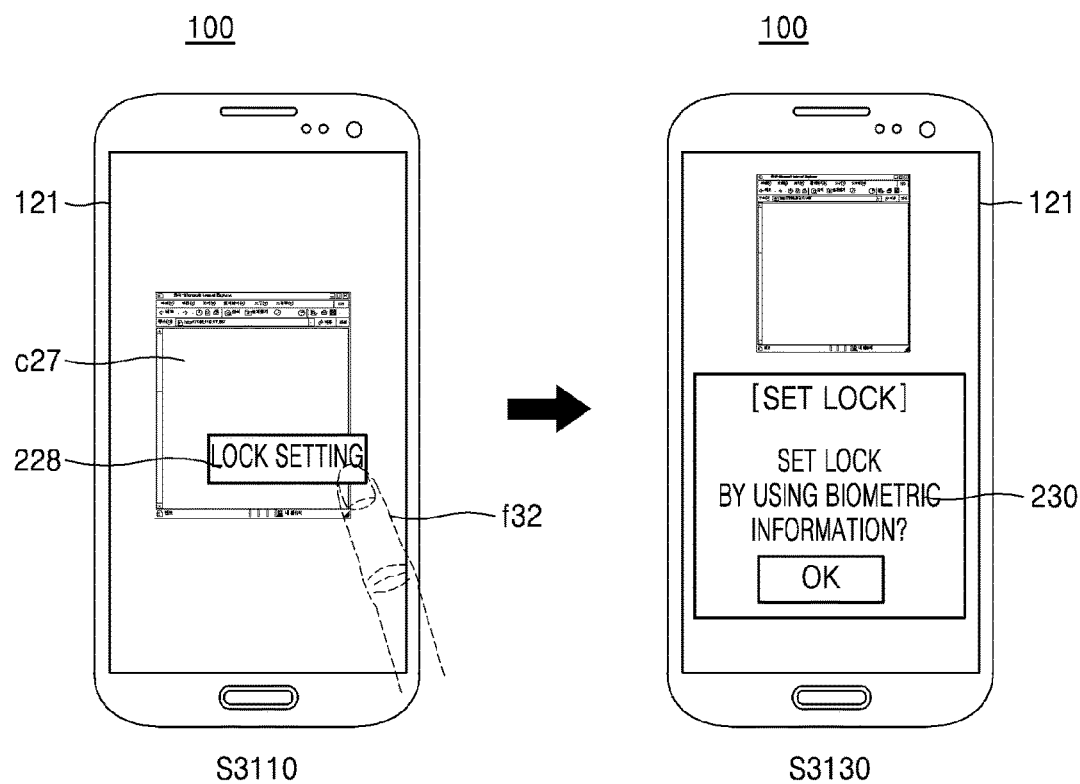
FIGS. 31 through 33 are diagrams for describing a method of encrypting content based on biometric information of a first user, according to an exemplary embodiment.
Figure 32:
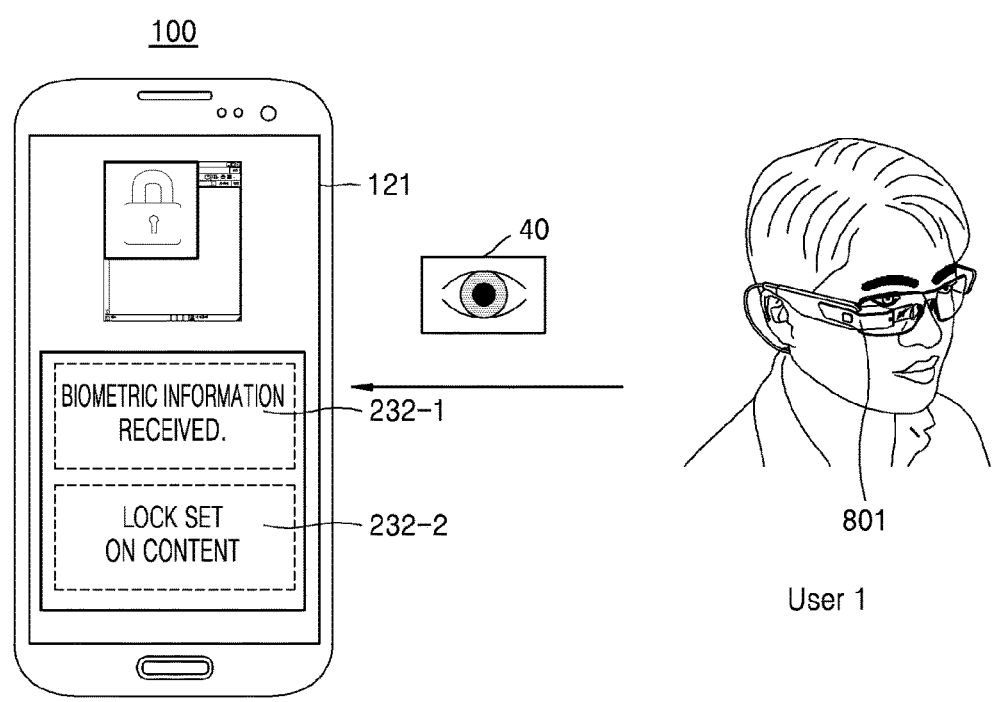

FIGS. 31 and 32 illustrate examples of a UI provided to set security on content.

Referring to S3110, the controller 130 of the device 100 may receive an input of selecting, by a finger f32 of a user, a button 228 for setting a lock on content c27, such as document data.

When the input is received, the controller 130 may display, on the display unit 121, a selection screen 230 for setting a lock on the content c27 by using biometric information at S3120.

As shown in FIG. 32, the device 100 may receive iris information 40 of the first user User1 from an external device, such as the glasses type wearable device 801 of the first user User1. The controller 130 of the device 100 may display, on the display unit 121, a screen 232-1 indicating that biometric information is received. The controller 130 may display, on the display unit 121, a screen 232-2 indicating that a lock is set on content. However, such an example of a UI of a device that received biometric information for setting a lock on content from an external device is not limited thereto.

Figure 33:
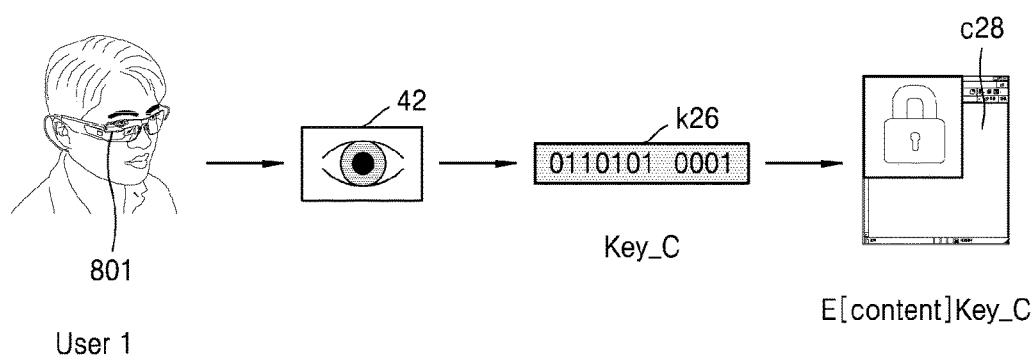
Figure 34:
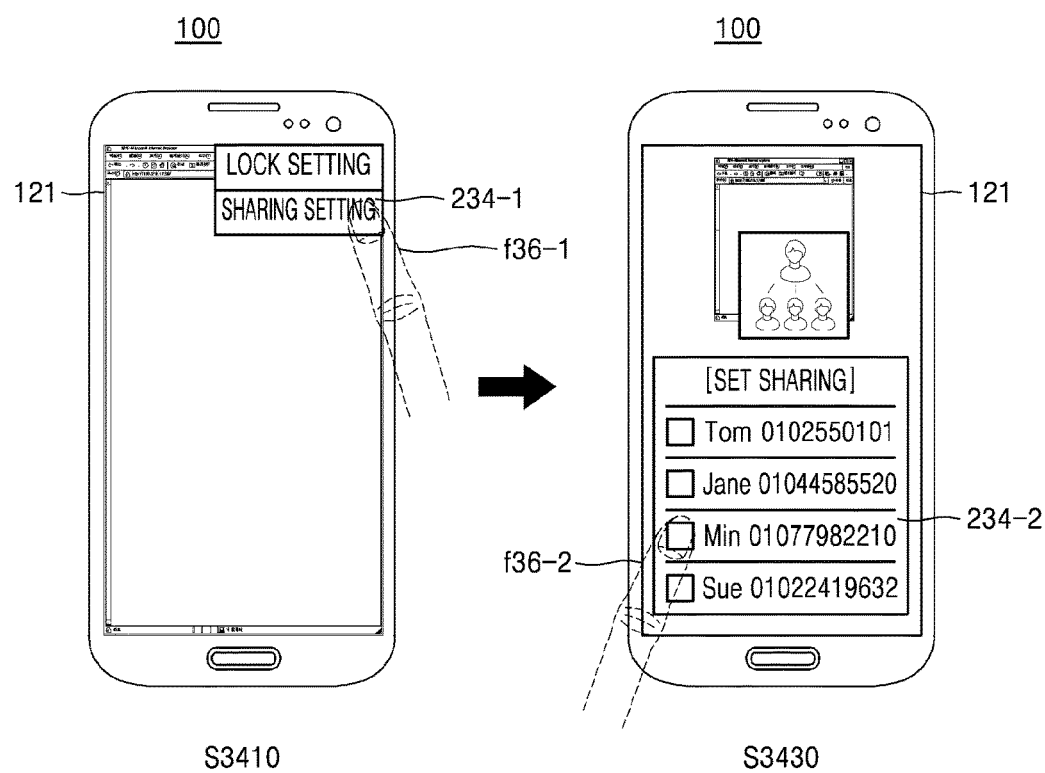
FIGS. 34 through 38 are diagrams for describing a method of sharing content by a plurality of users, according to an exemplary embodiment.

Referring to FIG. 33, the controller 130 of the device 100 may generate a first encryption key k26, for example, Key_C, by using iris information 42 obtained from the glasses type wearable device 801. For example, the controller 130 may generate the first encryption key k26 by using base iris information pre-stored in the memory 170 when the first user User1 is authenticated by using the iris information 42. The controller 130 may encrypt content c28 by using the first encryption key k26. Here, "E[content]key_C" indicates that 'content' is encrypted by using 'key_C'.

FIGS. 34 through 38 are diagrams for describing a method of sharing, by the device 100, content on which security is set with another user, according to an exemplary embodiment.

Referring to S3410, the device 100 may display a menu screen 234-1 for a sharing setting on an execution screen of content (for example, document data). When a finger f36-1 selects the menu window 234-1 for the sharing setting at S3410, the device 100 may display a contact list 234-2 stored in the device 100 as shown at S3420. When a finger f36-2 selects a certain person from the contact list 234-2, the device 100 may determine that content is to be shared to the selected certain person.

A sharing setting using a contact list described above with reference to FIG. 34 is only an example, and the sharing setting is not limited thereto. For example, the device 100 may set content to be shared by using acquaintance information by extracting the acquaintance information via face recognition performed on a certain image. Alternatively, the device 100 may set content to be shared with an acquaintance through a recent call list.

Figure 35:
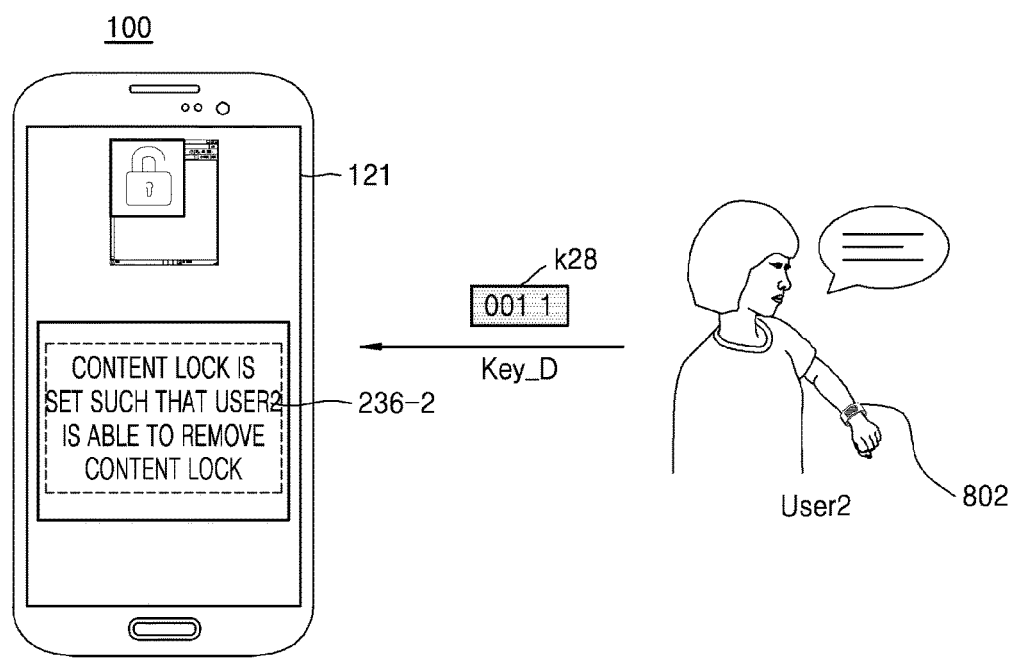

As shown in FIG. 35, the device 100 of the first user User1 may receive an encryption key k28 (Key_D) corresponding to voice information of the second user User2 from the device 802 of the second user User2. For example, when the second user User2 is authenticated by using the voice information, the device 802 may generate the encryption key k28 by using base voice information pre-stored in a memory.

According to an exemplary embodiment, the controller 130 of the device 100 may display, on the display unit 121, a screen 236-2 indicating that a content lock is set such that the second user User2 is able to remove the content lock. However, the screen 236-2 is only an example of a UI, and thus is not limited thereto.

Figure 36:
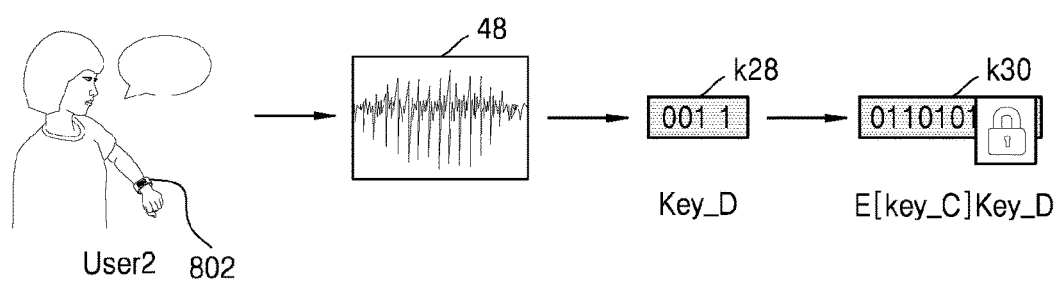

FIG. 36 is a diagram for describing a process of encrypting a first encryption key k30 (key_C) by using the second encryption key k28 (key_D).

The controller 130 of the device 802 of the second user User2 may generate the second encryption key k28 (for example, key_D) corresponding to voice information 48 of the second user User2. For example, the controller 130 may generate the second encryption key k28 by using base voice information pre-stored in a memory when the second user User2 is authenticated by using the voice information 48.

The device 100 receives the second encryption key k28 from the device 802, and may encrypt the first encryption key k3 (key_C) by using the second encryption key k28. For example, "E[key_C]key_D" indicates that 'key_C' is encrypted by using 'key_D'.

Figure 37A:
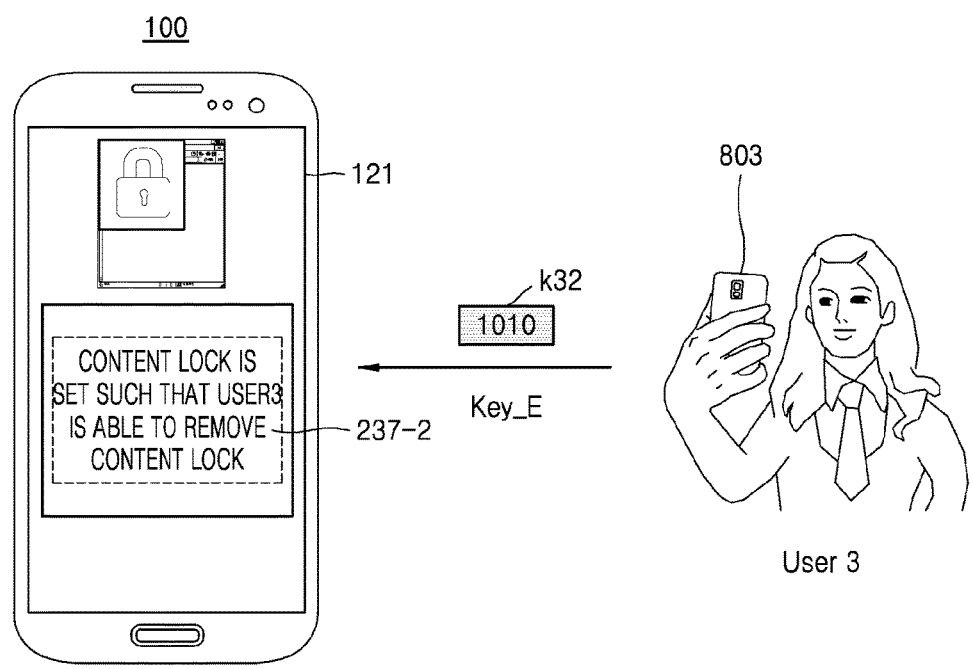
Figure 37B:
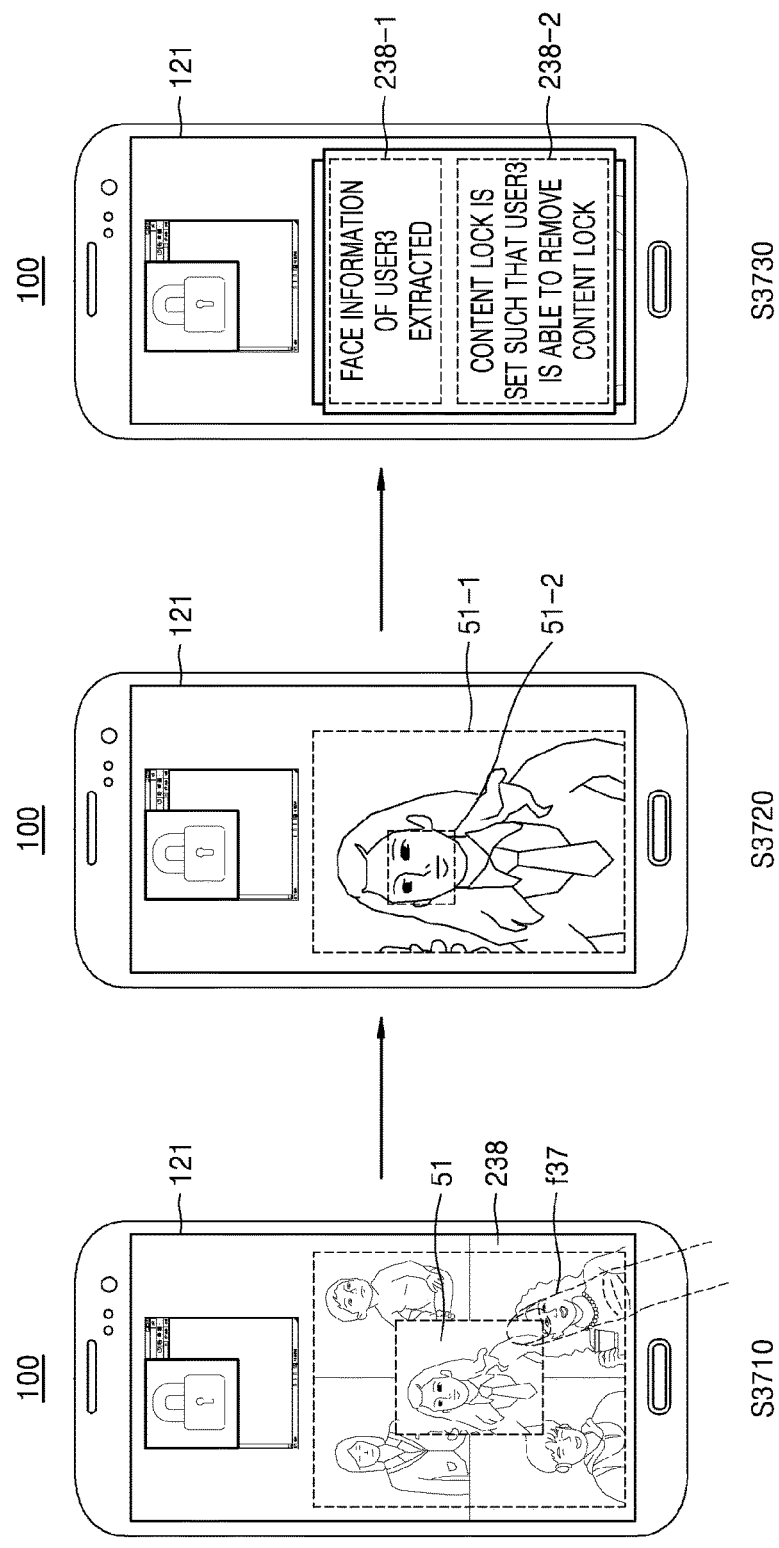

FIGS. 37A and 37B are diagrams for describing processes of sharing content with another user (the third user User3).

As shown in FIG. 37A, the device 100 of the first user User1 may receive an encryption key k32 (Key_E) corresponding to face information of the third user User3 from the device 803 of the third user User3. For example, when the third user User3 is authenticated by using the face information of the third user User3, the device 803 may generate the encryption key k32 by using base face information pre-stored in a memory. According to an exemplary embodiment, the controller 130 of the device 100 may display, on the display unit 121, a screen 237-2 indicating that a content lock is set such that the content lock may be removed by the third user User3. However, the screen 237-2 is only an example of a UI, and is not limited thereto.

According to another exemplary embodiment, referring to FIG. 37B, the device 100 may extract face information from image data pre-stored in the device 100. As shown at S3710, the device 100 may display, on the display unit 121, images 238 stored in a memory of the device 100. The device 100 may receive a user input of selecting, by a finger f37, an image 51.

As shown at S3720, the controller 130 may extract face information 51-2 of a user included in image data 51-1.

As shown at S3730, the controller 130 may display, on the display unit 121, a screen 238-1 indicating that face information of a third user User3 is extracted.

Also, the controller 130 may display, on the display unit 121, a screen 238-2 indicating that the third user User3 is set to remove a content lock. FIG. 37 illustrates examples of UIs, but the UIs are not limited thereto.

Figure 38:
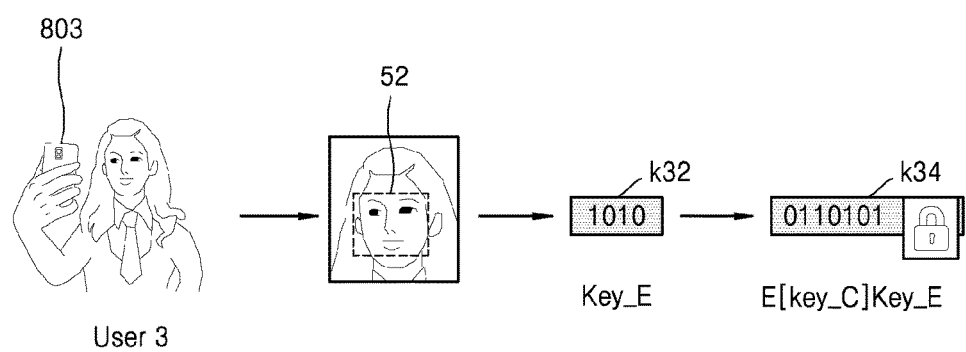

FIG. 38 is a diagram for describing a process of encrypting a first encryption key k34 (Key_C) by using a third encryption key k32 (Key_E).

Referring to FIG. 38, the controller 130 of the device 803 of the third user User3 may generate the third encryption key k32 (Key_E) corresponding to obtained face information 52. For example, when the third user User3 is authenticated by using the obtained face information 52, the controller 130 may generate the third encryption key k32 by using base face information pre-stored in a memory.

The controller 130 of the device 100 of the first user User1 may encrypt the first encryption key k34 (Key_C) by using the third encryption key k32. For example, "E[key_C] key_E" indicates that 'key_C' is encrypted by using 'key_E'.

The one or more exemplary embodiments described above are only examples and thus are not limited thereto. Also, the orders of the operations of the methods described above are not limited, and at least one operation may be omitted, an operation may be added to the method, or the order may be changed, according to one or more exemplary embodiments.

Figure 39:
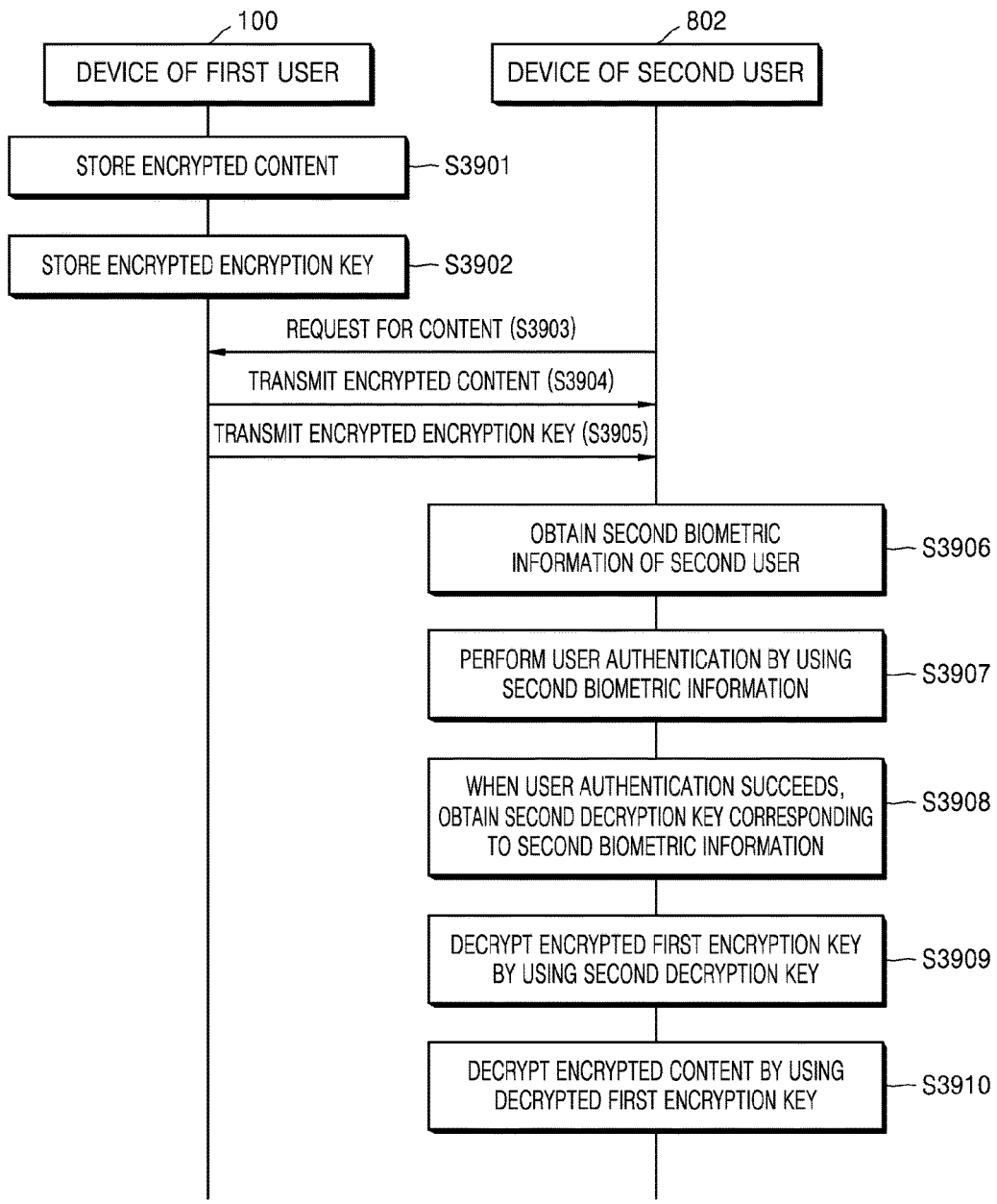
FIGS. 39 and 40 are flowcharts of a method of decrypting content, according to exemplary embodiments.
Figure 40:
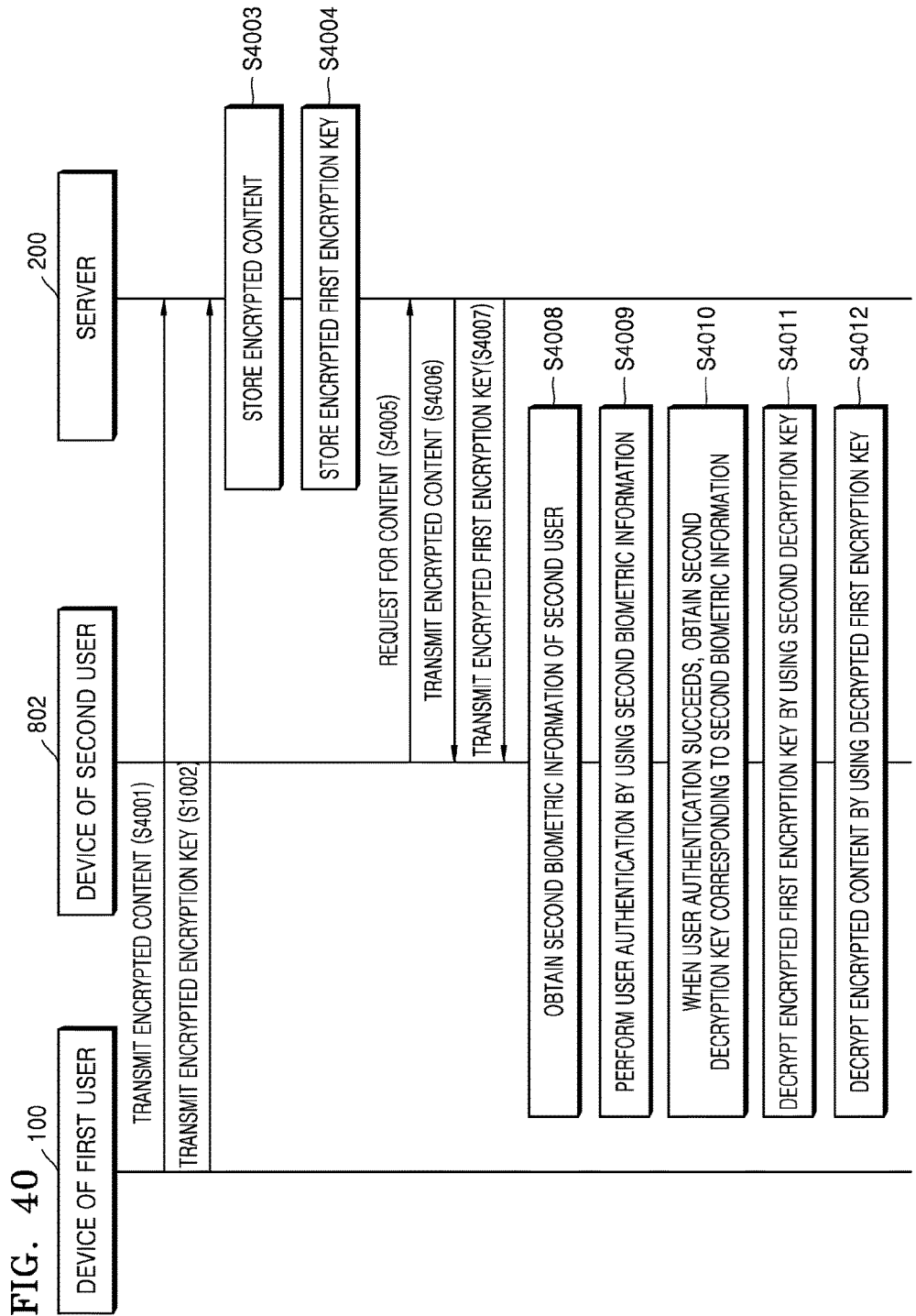

FIGS. 39 and 40 are flowcharts of a method of decrypting content, according to exemplary embodiments.

Referring to FIG. 39, in operation S3901, the device 100 of the first user User1 may store encrypted content. In operation S3902, the device 100 may store an encrypted first encryption key. In FIG. 39, the device 100 stores the encrypted content and the encrypted first encryption key.

In operation S3903, the device 802 of the second user User2 may request the device 100 for content. According to an exemplary embodiment, the device 802 that is to access the encrypted content may request the device 100 storing the encrypted content for the encrypted content.

In operation S3904, the device 100 may transmit the encrypted content to the device 802. In operation S3905, the device 100 may transmit the encrypted first encryption key to the device 802.

As described above, data transmission (for example, transmission of content, transmission of biometric information, transmission of an encryption key, and transmission of a decryption key) between a transmitter and a receiver, according to an exemplary embodiment, may be performed by using a safe channel. The safe channel means a channel having high security on communication content between the transmitter and the receiver. In other words, the safe channel may be configured by using a protocol for safely transferring data, such as a secure sockets layer (SSL) or transport layer security (TLS). For example, the safe channel may be a hypertext transfer protocol over secure sockets layer (https) configured by using a protocol, such as SSL or TLS.

Referring back to FIG. 39, in operation S3906, the device 802 may obtain second biometric information of the second user User2. According to an exemplary embodiment, the device 802 may obtain the second biometric information from a biometrics module provided in the device 802.

In operation S3907, the device 802 may perform user authentication by using the second biometric information.

In operation S3908, when the user authentication has succeeded, the controller 130 of the second device 802 may obtain a second decryption key corresponding to the second biometric information. For example, the second decryption key may be a value generated, by the controller 130, by using feature information of base second biometric information pre-stored in a memory.

In operation S3909, the device 802 may decrypt the encrypted first encryption key by using the second decryption key.

In operation S3910, the device 802 may decrypt the encrypted content by using the decrypted first encryption key.

According to an exemplary embodiment, since the device 802 decrypts the encrypted content received from the device 100, by using the second biometric information, the content of the first user User1 may be shared.

FIG. 40 is a diagram for describing an exemplary embodiment wherein the server 200 stores encrypted content and encrypted first encryption key.

Referring to FIG. 40, in operation S4001, the device 100 of the first user User1 according to an exemplary embodiment may transmit the encrypted content to the server 200. In operation S4002, the device 100 may transmit an encrypted first encryption key to the server 200. In operation S4003, the server 200 according to an exemplary embodiment may store the encrypted content. In operation S4004, the server 200 may store the encrypted first encryption key.

Meanwhile, in operation S4005, the device 802 of the second user User2 may request the server 200 for content. According to an exemplary embodiment, the device 802 that is to access the encrypted content may request the server 200 storing the encrypted content for the encrypted content.

In operation S4006, the server 200 may transmit the encrypted content to the device 802. In operation S4007, the server 200 may transmit the encrypted first encryption key to the device 802. In operation S4008, the device 802 may obtain second biometric information of the second user User2. According to an exemplary embodiment, the device 802 may obtain the second biometric information from a biometrics module provided in the device 802.

In operation S4009, the device 802 may perform user authentication by using the second biometric information.

In operation S4010, when the user authentication has succeeded, the controller 130 of the device 802 may obtain a second decryption key corresponding to the second biometric information. For example, the second decryption key may be a value generated, by the controller 130, by using feature information of base second biometric information pre-stored in a memory.

In operation S4011, the device 802 may decrypt the encrypted first encryption key by using the second decryption key. In operation S4012, the device 802 may decrypt the encrypted content by using the decrypted first encryption key.

According to an exemplary embodiment, since the device 802 decrypts the encrypted content received from the device 100, by using the second biometric information, the content of the first user User1 may be shared.

Figure 41:
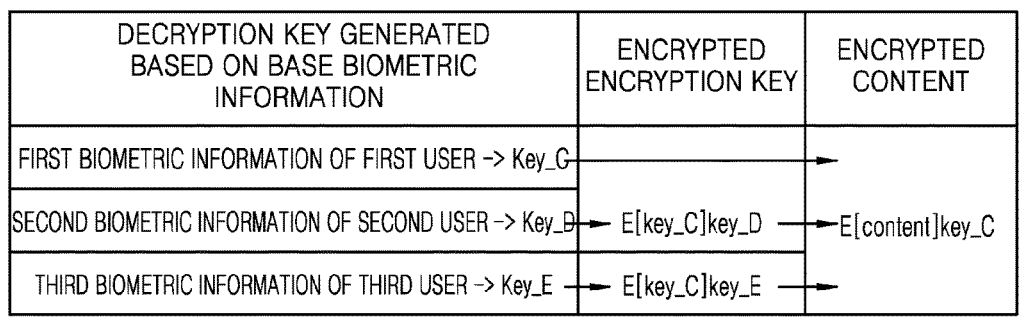
FIG. 41 is a table for describing a decrypting method according to another exemplary embodiment.

FIG. 41 is a table for describing a decrypting method according to another exemplary embodiment.

FIG. 41 illustrates a table for describing a method of decrypting content after encrypting the content. The controller 130 may decrypt the content based on second biometric information of a second user.

In detail, when user authentication has succeeded by using the second biometric information, the controller 130 may generate a decryption key (Key_D) by using base second biometric information pre-stored in a memory. The controller 130 may decrypt an encrypted encryption key, i.e., E[key_C]key_D, by using the decryption key. The controller 130 may decrypt encrypted content, i.e., E[content]key_C, by using the decrypted encryption key, i.e., Key_C.

Also, the controller 130 may decrypt the content by using third biometric information of a third user.

In detail, when user authentication has succeeded by using the third biometric information, the controller 130 may generate a decryption key (Key_E) by using base third biometric information pre-stored in a memory. The controller 130 may decrypt an encrypted encryption key, i.e., E[key_C]key_E, by using the decryption key. The controller 130 may decrypt the encrypted content, i.e., [content]key_C, by using the decrypted encryption key, i.e., Key_C.

Also, the controller 130 may decrypt the content by using first biometric information of a first user.

In detail, the controller 130 may generate a decryption key (Key_C) by using base first biometric information pre-stored in a memory. The controller 130 may decrypt the encrypted content, i.e., E[content]key_C, by using the decryption key.

Figure 42:
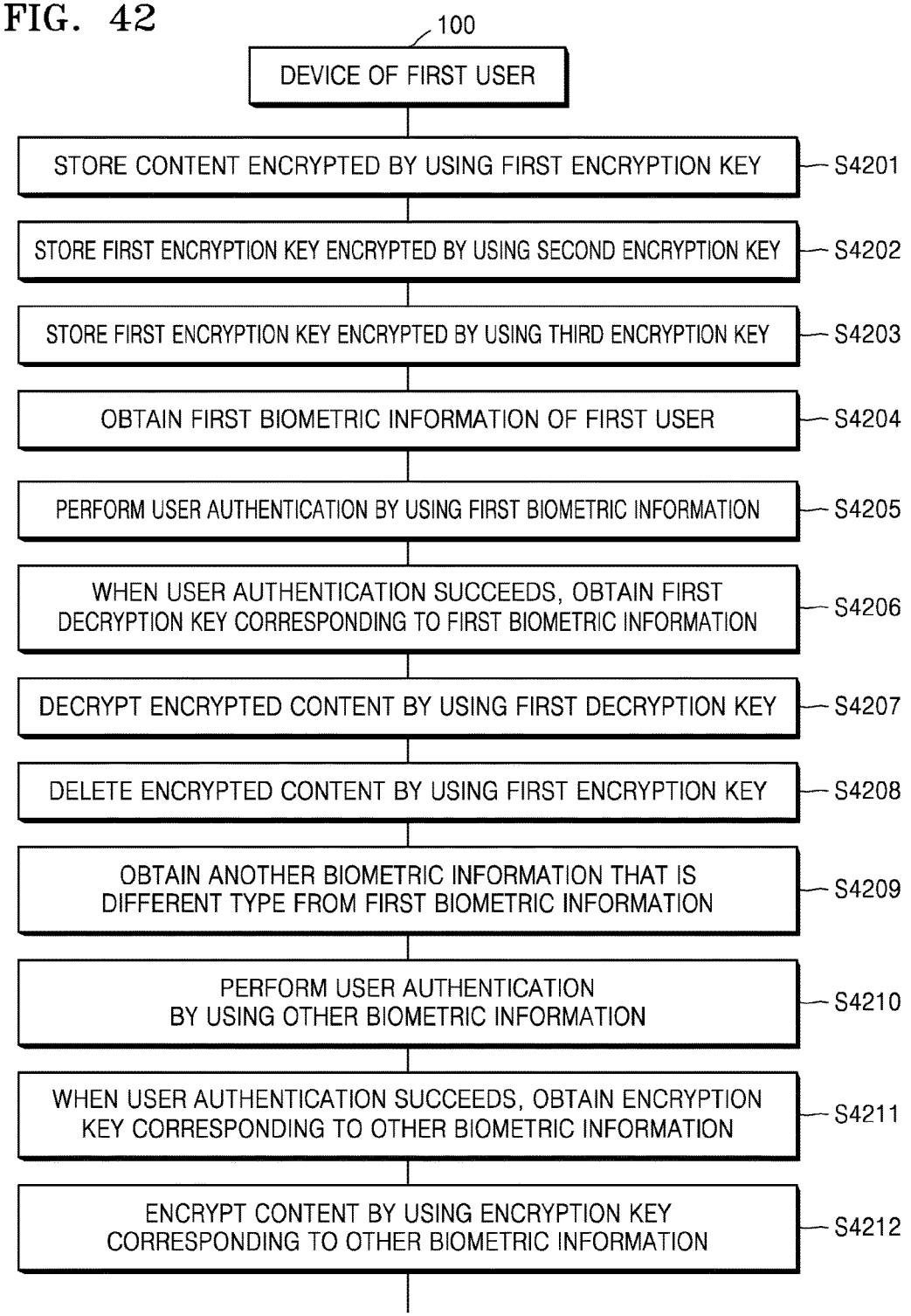
FIG. 42 is a flowchart of a method of changing a security setting, according to an exemplary embodiment.
Figure 43:
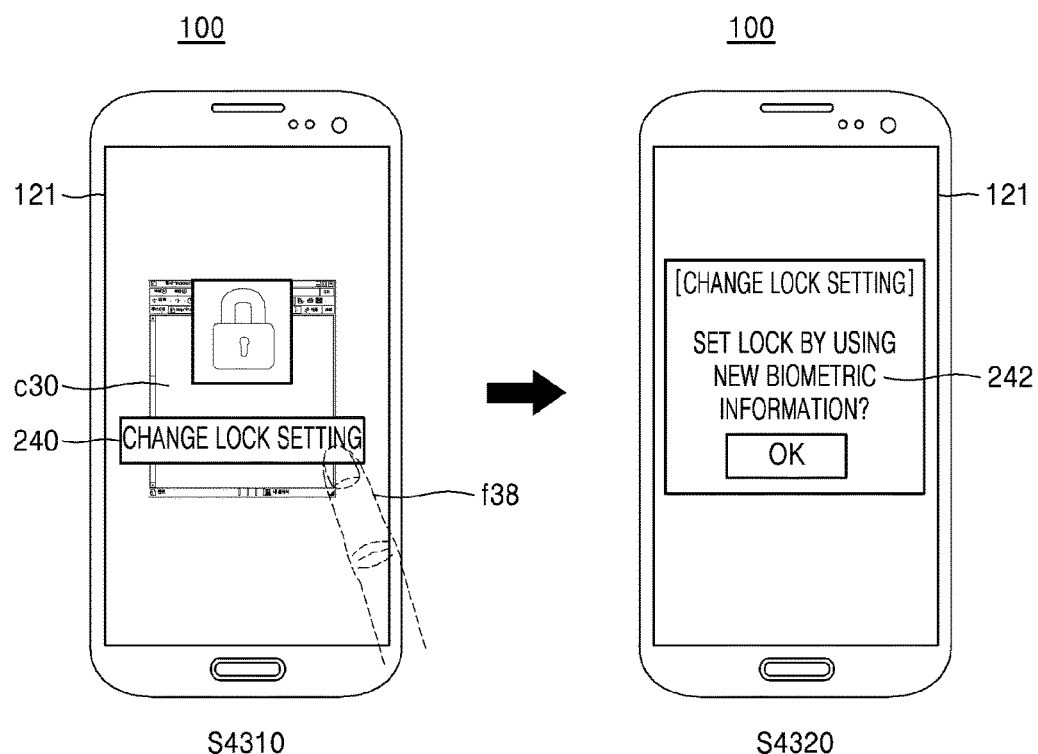
FIG. 43 is a diagram for describing an example of changing a security setting, according to an exemplary embodiment.

FIG. 42 is a flowchart of a method of changing a security setting, according to an exemplary embodiment. FIG. 43 is a diagram for describing an example of changing a security setting, according to an exemplary embodiment.

For example, according to one or more exemplary embodiments described above with reference to FIGS. 29 through 41, after a first user encrypts content, the first user may share the content with a second user and a third user. The first user may assign authority to access the encrypted content to each of the second and third users.

In order to share content, a device of the first user may encrypt a first encryption key (an encryption key used to encrypt the content) by using an encryption key generated based on each of second biometric information of the second user and third biometric information of the third user.

Meanwhile, according to an exemplary embodiment, the first user may remove the authority assigned to the second and third users.

In order to remove content sharing, the device of the first user may encrypt and store content by using a new encryption key generated based on new biometric information. In this case, even when the second and third users generate a decryption key based on the second and third biometric information and obtain the first encryption key by using the decryption key, the second and third users are unable to decrypt the content that is encrypted by using the new encryption key.

Referring to FIG. 42, in operation S4201, the device 100 of a first user may store content encrypted by using first encryption key. In operation S4202, the device 100 may store the first encryption key encrypted by using a second encryption key that is generated based on second biometric information of a second user. Also, in operation S4203, the device 100 may store the first encryption key encrypted by using a third encryption key that is generated based on third biometric information of a third user.

By performing operations S4202 and S4203, the content may be shared with the second and third users.

For example, the second encryption key may be generated based on the second biometric information of the second user. The first encryption key may be decrypted by using the second encryption key, and the content may be decrypted by using the first encryption key.

Also, the third encryption key may be generated based on the third biometric information of the third user. The first encryption key may be decrypted by using the third encryption key, and the content may be decrypted by using the first encryption key.

Meanwhile, in operation S4204, the device 100 may obtain first biometric information of the first user.

According to an exemplary embodiment, the device 100 may obtain the first biometric information from a biometrics module provided in the device 100.

In operation S4205, the device 100 may perform user authentication by using the first biometric information.

In operation S4206, when the user authentication has succeeded, the controller 130 may obtain a first decryption key corresponding to the first biometric information. For example, the first decryption key may be a value generated, by the controller 130, by using feature information of base first biometric information pre-stored in a memory.

In operation S4207, the device 100 may decrypt the encrypted content by using the first decryption key.

In operation S4208, the device 100 may delete the encrypted content by using the first encryption key. Accordingly, a content sharing effect with the second and third users may be removed.

Also, in operation S4209, the device 100 may obtain another biometric information of the first user, which is different type from the first biometric information. According to an exemplary embodiment, the device 100 may obtain the other biometric information from a biometrics module provided in the device 100.

In operation S4210, the device 100 may perform user authentication by using the other biometric information.

In operation S4211, when the user authentication has succeeded, the controller 130 of the device 100 may obtain an encryption key corresponding to the other biometric information. Here, the encryption key may be a value generated by using base biometric information pre-stored in the memory 170.

In operation S4212, the controller 130 may encrypt the content by using the encryption key corresponding to the other biometric information. Accordingly, the encrypted content is not decrypted by the second and third encryption keys generated based on the second and third biometric information, and thus the second and third users are unable to decrypt the encrypted content.

In FIG. 42, the device 100 stores encrypted content, but according to another exemplary embodiment, the encrypted content may be stored in an external server, and operations S4204 through S4212 may be performed when the device 100 requests for and receives the encrypted content from the external server.

Also, in operation S4212, the device 100 may store the encrypted content. As another example, in operation S4212, the device 100 may transmit the encrypted content to an external server.

Referring to FIG. 43 at S4310, the controller 130 of the device 100 may receive a user input of selecting, by a finger f38, a button 240 for changing a lock setting of content c30 on which a lock is set.

Referring to FIG. 43 at S4320, the controller 130 may display, on the display unit 121, a screen 242 for requesting a user to input new biometric information to change the lock setting.

FIG. 43 illustrates an example of a UI wherein security on content is removed and then security is re-set on the content by using new biometric information, and the UI is not limited thereto.

Figure 44:
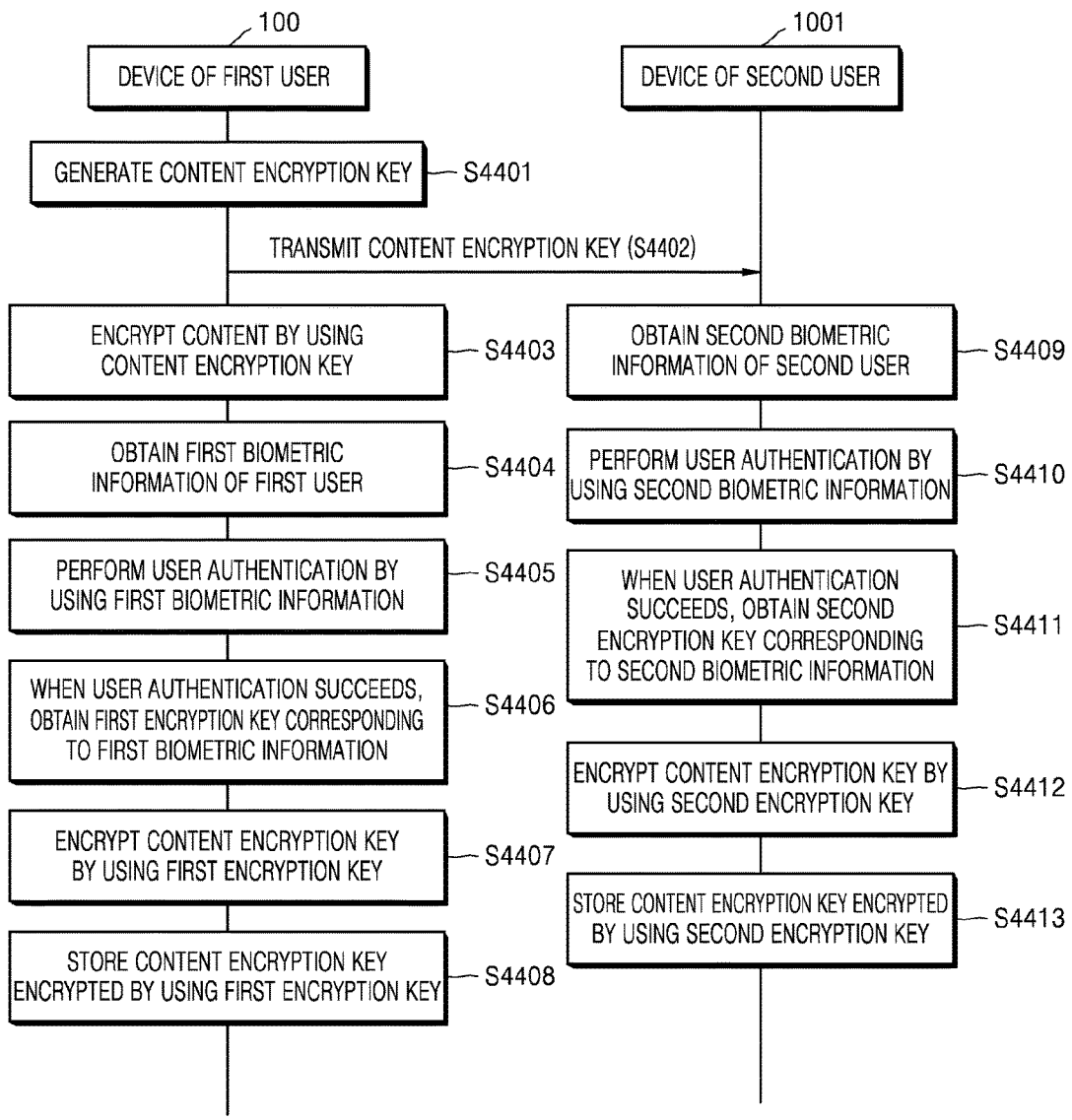
FIG. 44 is a flowchart of an encrypting method for setting security, according to an exemplary embodiment.

FIG. 44 is a flowchart of a method of setting security on content, according to an exemplary embodiment.

In operation S4401, the device 100 may generate a content encryption key.

The content encryption key may be a key randomly generated by a system for encrypting content, i.e., the device 100 of a first user.

In operation S4402, the device 100 may transmit the content encryption key to a device 1001 of a second user.

The content encryption key may be transmitted by using a safe channel. As described above, the safe channel means a channel having high security on communication content between a transmitter and a receiver. In other words, the safe channel may be configured by using a protocol for safely transferring data, such as SSL or TLS. For example, the safe channel may be https configured by applying a protocol, such as SSL or TLS.

Meanwhile, in operation S4403, the device 100 may encrypt content by using the content encryption key.

In operation S4404, the device 100 may obtain first biometric information of the first user. According to an exemplary embodiment, the device 100 may obtain the first biometric information from a biometrics module provided in the device 100.

In operation S4405, the controller 130 of the device 100 may perform user authentication by using the first biometric information.

In operation S4406, when the user authentication has succeeded, the controller 130 may obtain a first encryption key corresponding to the first biometric information. Here, the first encryption key may be a value generated by using base first biometric information pre-stored in the memory 170.

In operation S4407, the device 100 may encrypt the content encryption key by using the first encryption key. In operation S4408, the device 100 may store the content encryption key encrypted by using the first encryption key.

Meanwhile, in operation S4402, the device 1001 may receive the content encryption key from the device 100.

In operation S4409, the device 1001 may obtain second biometric information of the second user. For example, the device 1001 may obtain the second biometric information from a biometrics module provided in the device 1001.

In operation S4410, the device 1001 may perform user authentication by using the second biometric information.

In operation S4411, when the user authentication has succeeded, the controller 130 of the device 1001 may obtain a second encryption key corresponding to the second biometric information. Here, the second encryption key may be a value generated by using base second biometric information pre-stored in the memory 170.

In operation S4412, the device 1001 may encrypt the content encryption key by using the second encryption key. In operation S4413, the device 1001 may store the content encryption key encrypted by using the second encryption key.

Accordingly, the device 1001 may decrypt the content encryption key based on the second biometric information, and then decrypt the content by using the decrypted content encryption key.

The one or more exemplary embodiments described above are only examples and thus are not limited thereto. Also, the orders of the operations of the methods described above are not limited, and at least one operation may be omitted, an operation may be added to the method, or the order may be changed, according to one or more exemplary embodiments.

Figure 45:
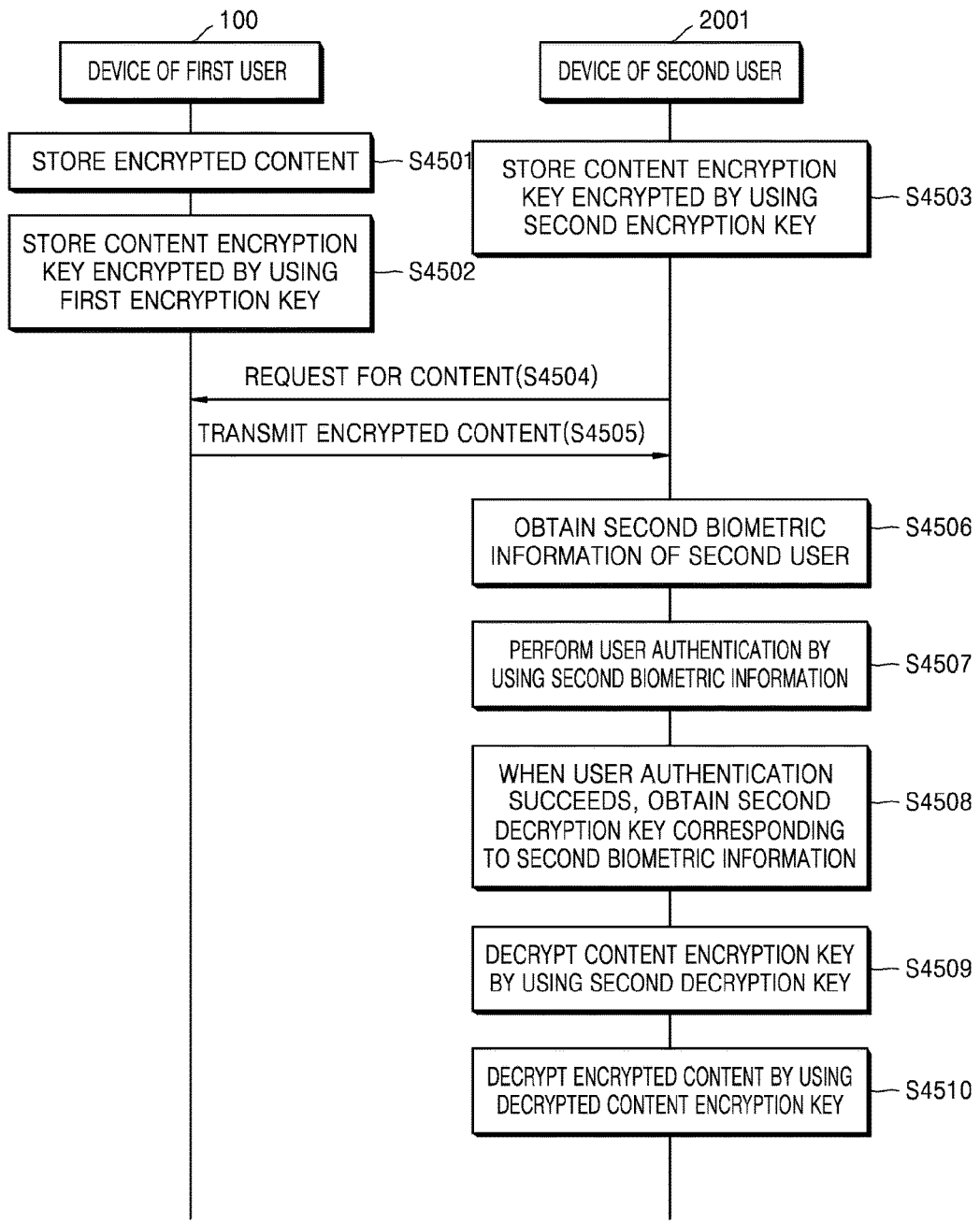
FIGS. 45 and 46 are flowcharts of a method of decrypting content, according to other exemplary embodiments.
Figure 46:
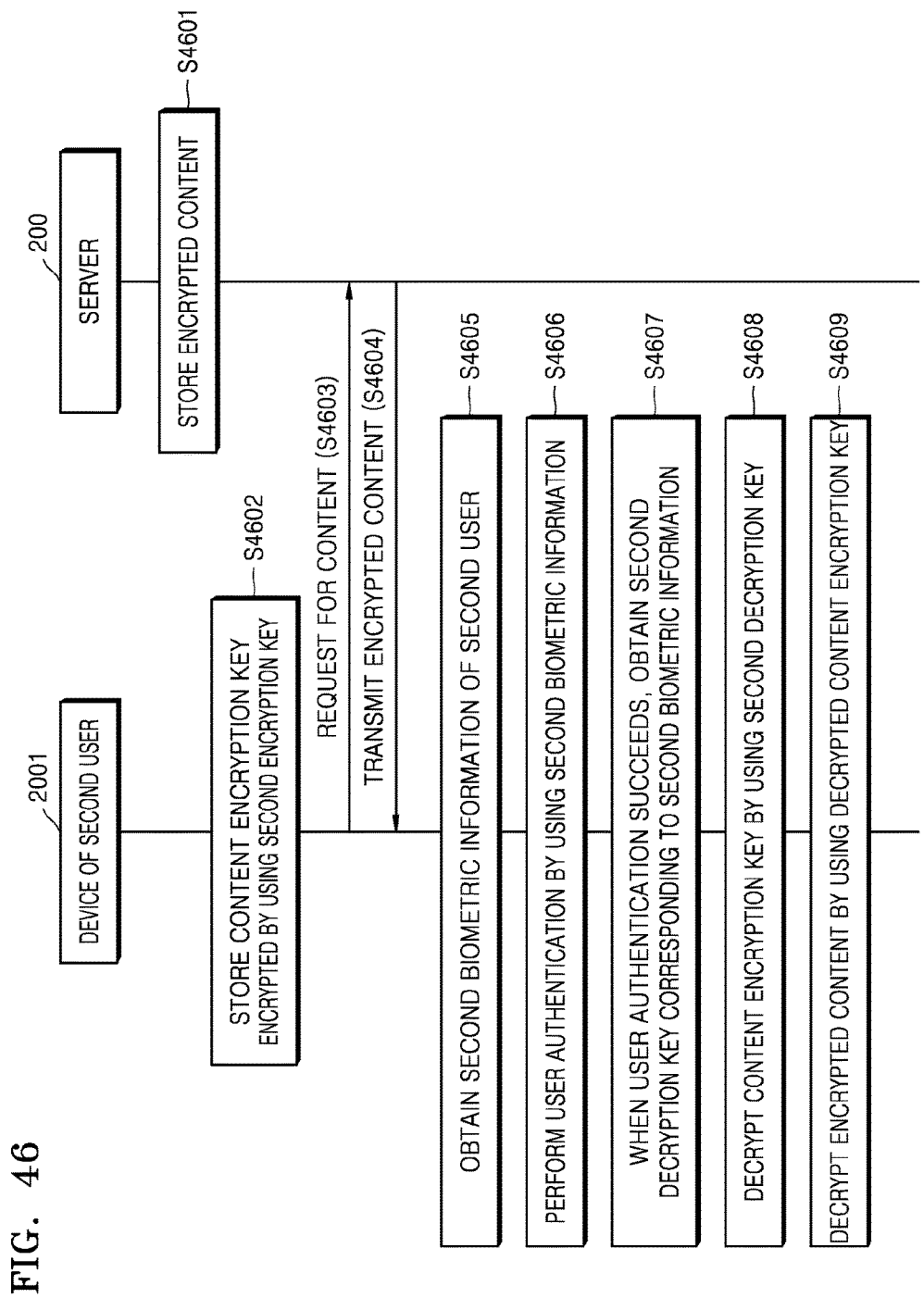

FIGS. 45 and 46 are flowcharts of a method of decrypting content, according to other exemplary embodiments.

In operation S4501, the device 100 of a first user may store encrypted content. In operation S4502, the device 100 may store a content encryption key encrypted by using a first encryption key.

Meanwhile, in operation S4503, a device 2001 of a second user may store the content encryption key encrypted by using a second encryption key.

In operation S4504, the device 2001 may request the device 100 for content. For example, the device 2001 that is to access the encrypted content may request the device 100 for the encrypted content.

In operation S4505, the device 100 may transmit the encrypted content to the device 2001.

In order to decrypt the encrypted content, in operation 4506, the device 2001 may obtain second biometric information of the second user. According to an exemplary embodiment, the device 2001 may obtain the second biometric information from a biometrics module provided in the device 2001.

In operation S4507, the device 2001 may perform user authentication by using the second biometric information.

In operation S4508, when the user authentication has succeeded, the controller 130 of the device 2001 may obtain a second decryption key corresponding to the second biometric information. For example, the second decryption key may be a value generated by using base second biometric information rep-stored in a memory.

In operation S4509, the device 2001 may decrypt the content encryption key by using the second decryption key. In operation S4510, the device 2001 may decrypt the encrypted content by using the decrypted content encryption key.

FIG. 46 illustrates an exemplary embodiment in which encrypted content is stored in the server 200.

In operation S4601, the server 200 according to an exemplary embodiment may store the encrypted content.

Also, in operation S4602, the device 2001 may store a content encryption key encrypted by using a second encryption key.

In operation S4603, the device 2001 may request the server 200 for content. For example, the device 2001 that is to access the encrypted content may request the server 200 for the encrypted content. In operation S4604, the server 200 may transmit the encrypted content to the device 2001.

In operation S4605, the device 2001 may obtain second biometric information of the second user. According to an exemplary embodiment, the device 2001 may obtain the second biometric information from a biometrics module provided in the device 2001.

In operation S4606, the device 2001 may perform user authentication by using the second biometric information.

In operation S4607, when the user authentication has succeeded, the controller 130 may obtain a second decryption key corresponding to the second biometric information.

For example, the second decryption key may be a value generated by using base second biometric information pre-stored in a memory.

In operation S4608, the device 2001 may decrypt the content encryption key by using the second decryption key. In operation S4609, the device 2001 may decrypt the encrypted content by using the decrypted content encryption key.

The one or more exemplary embodiments described above are only examples and thus are not limited thereto. Also, the orders of the operations of the methods described above are not limited, and at least one operation may be omitted, an operation may be added to the method, or the order may be changed, according to one or more exemplary embodiments.

FIG. 47 is a table for describing a decrypting method according to another exemplary embodiment.

FIG. 47 is a table for describing a method of decrypting content after the content is encrypted. The controller 130 may decrypt the content by using first biometric information of a first user.

In detail, when user authentication has succeeded by using the first biometric information, the controller 130 may generate a decryption key (Key_A) by using base first biometric information pre-stored in a memory. The controller 130 may decrypt an encrypted encryption key, i.e., E[key_con]key_A, by using the decryption key (Key_A). The controller 130 may decrypt encrypted content, i.e., E[content]key_con, by using the decrypted encryption key, i.e., Key_con.

Also, the controller 130 may decrypt the content by using second biometric information of a second user.

In detail, when user authentication has succeeded by using the second biometric information, the controller 130 may generate a decryption key (Key_B) by using base second biometric information pre-stored in a memory. The controller 130 may decrypt an encrypted encryption key, i.e., E[key_con]key_B, by using the decryption key (Key_B). The controller 130 may decrypt the encrypted content, i.e., E[content]key_con, by using the decrypted encryption key, i.e., Key_con.

Figure 48:
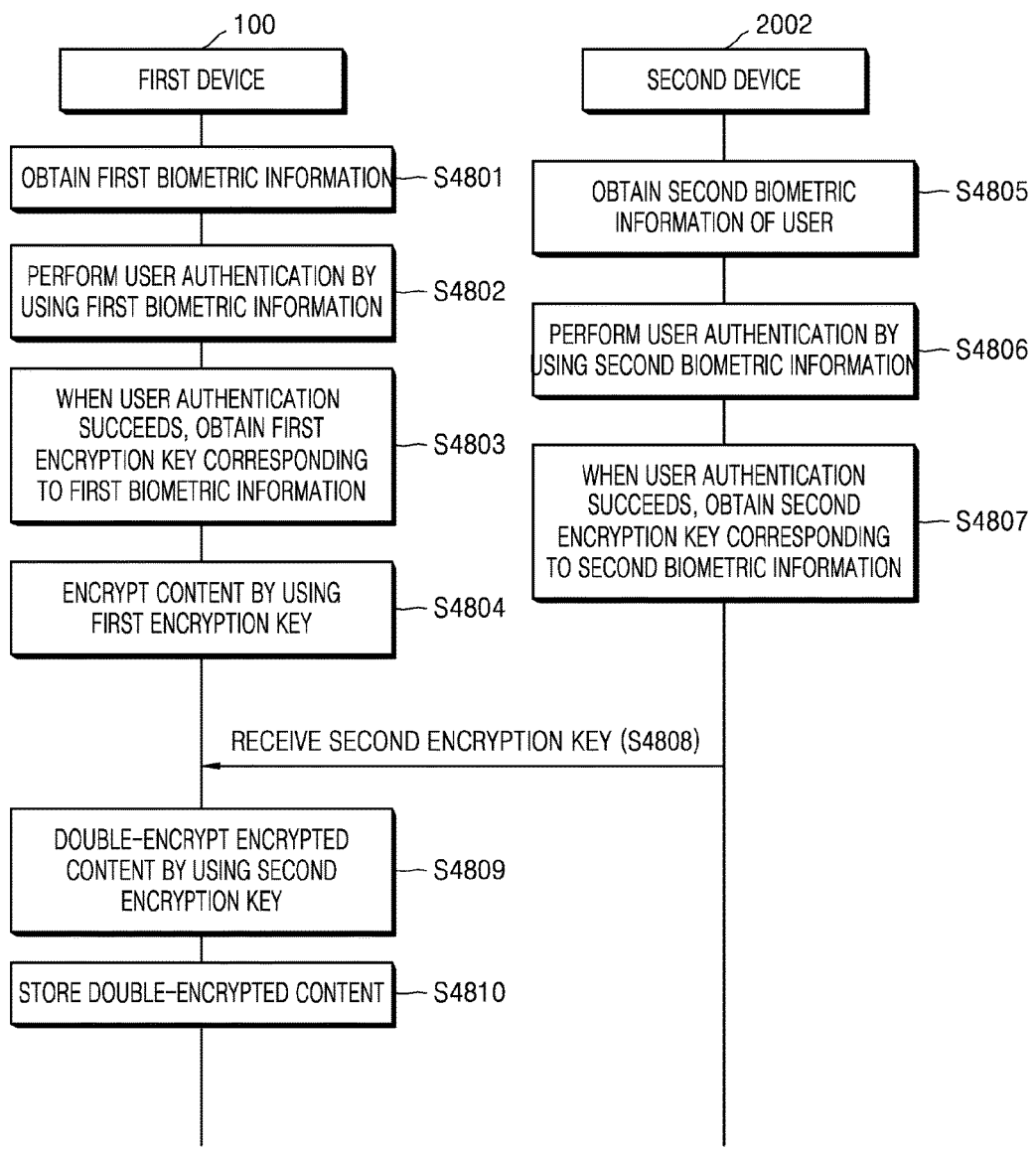
FIGS. 48 through 50 are flowcharts of an encrypting method for setting security, according to other exemplary embodiments.
Figure 49:
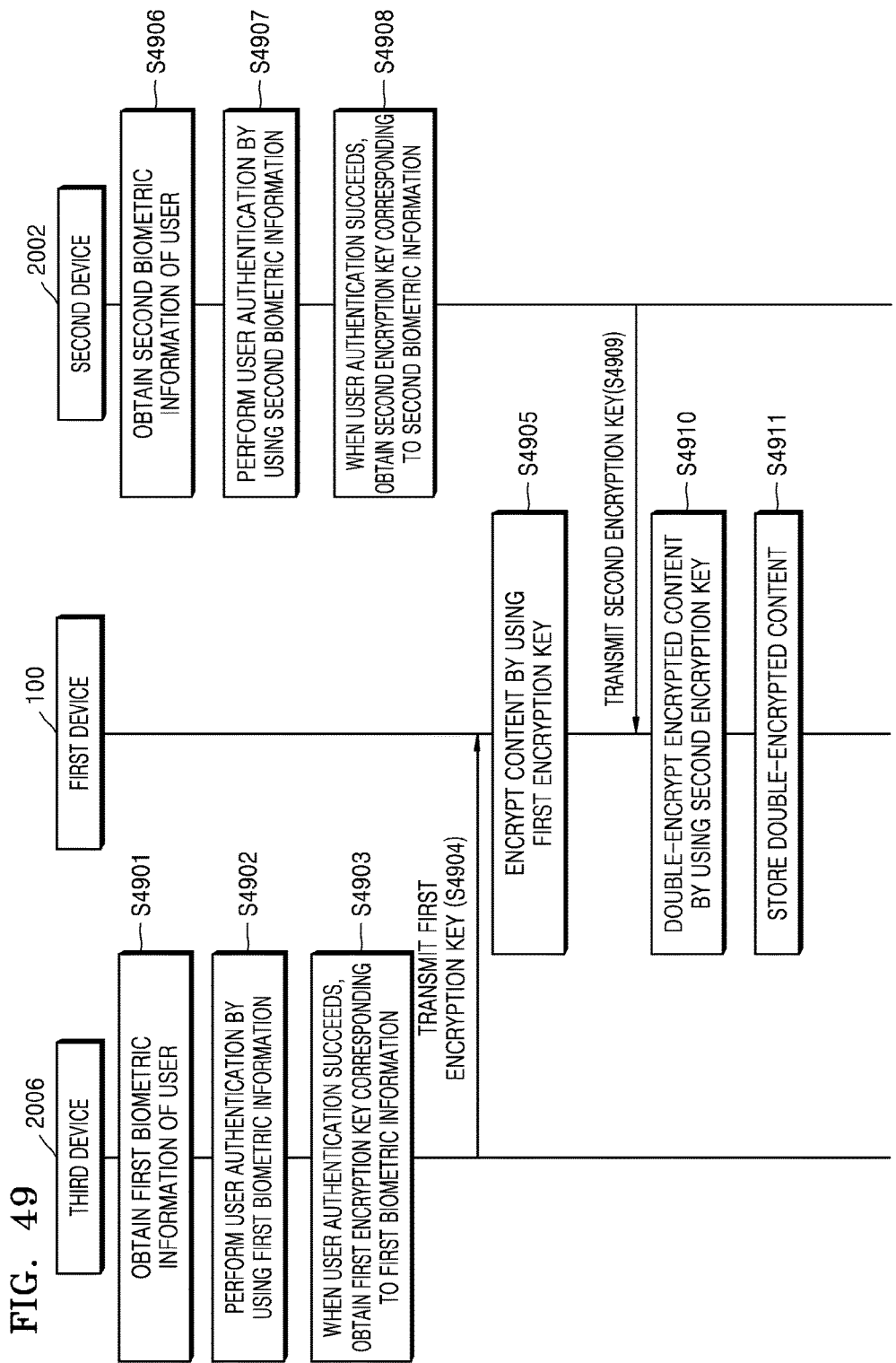
Figure 50:
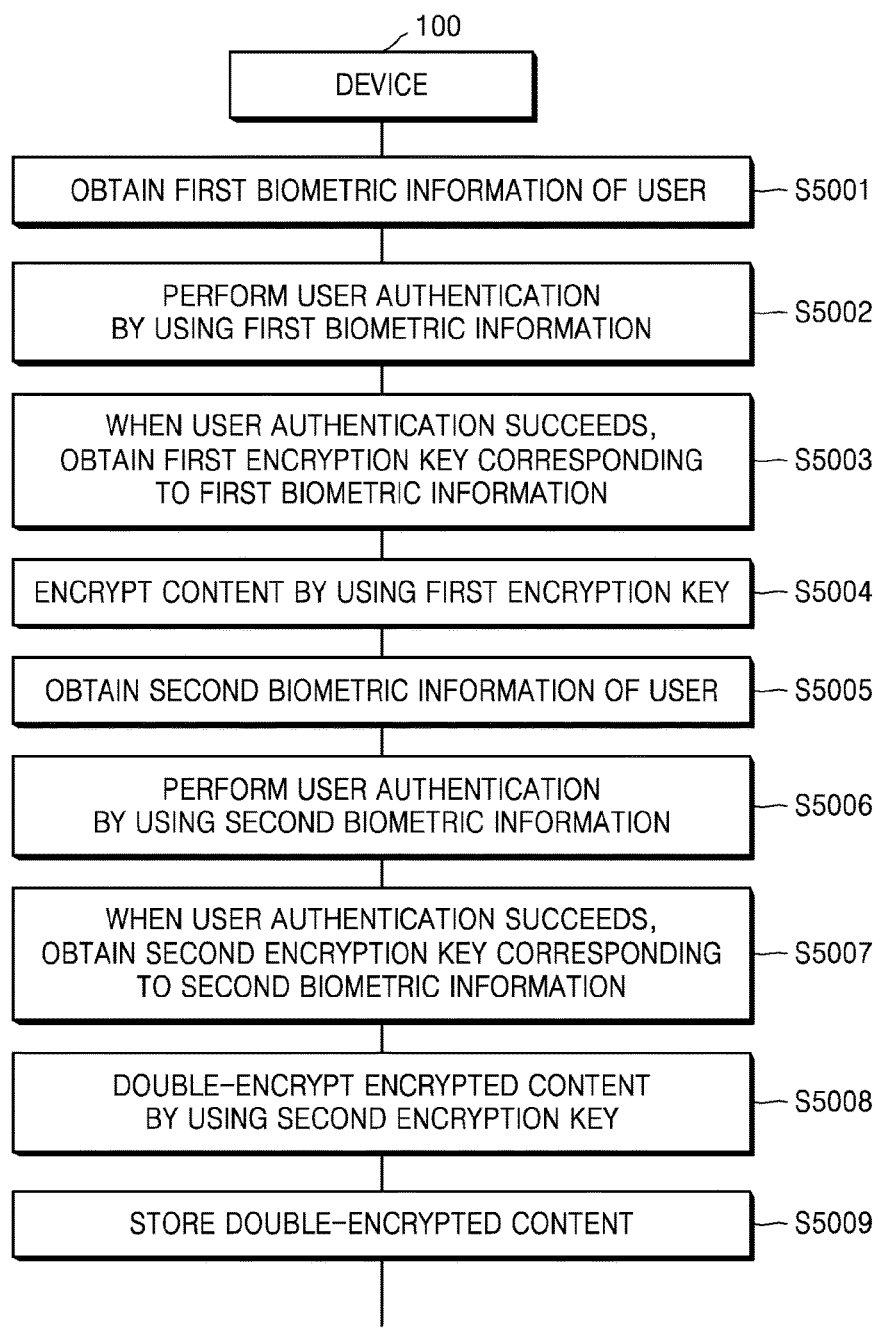

FIGS. 48 through 50 are flowcharts of a method of setting security on content, according to other exemplary embodiments.

Referring to FIG. 48, in operation S4801, the device 100 according to an exemplary embodiment may obtain first biometric information of a user. According to an exemplary embodiment, the controller 130 of the device 100 may obtain the first biometric information from a biometrics module provided in the device 100.

In operation S4802, the controller 130 may perform user authentication by using the first biometric information.

In operation S4803, when the user authentication has succeeded, the controller 130 may obtain a first encryption key corresponding to the first biometric information. Here, the first encryption key may be a value generated by using base first biometric information pre-stored in the memory 170.

In operation S4804, the device 100 may encrypt content by using the first encryption key.

In operation S4805, a second device 2002 according to an exemplary embodiment may obtain second biometric information of the user. According to an exemplary embodiment, the controller 130 of the second device 2002 may obtain the second biometric information from a biometrics module provided in the second device 2002.

In operation S4806, the controller 130 of the second device 2002 may perform user authentication by using the second biometric information.

In operation S4807, when the user authentication has succeeded, the controller 130 may obtain a second encryption key corresponding to the second biometric information. Here, the second encryption key may be a value generated by using base second biometric information pre-stored in the memory 170.

In operation S4808, the device 100 may receive the second encryption key from the second device 2002. In operation S4809, the device 100 may double-encrypt the encrypted content by using the second encryption key. In operation S4810, the device 100 may store the double-encrypted content.

According to an exemplary embodiment, the device 100 may double-encrypt the content by using the second biometric information after encrypting the content by using the first biometric information.

The device 100 and the second device 2002 may be used by the same user or different users.

In FIG. 49, the device 100 obtains first biometric information from an external device, i.e., a third device 2006.

Referring to FIG. 49, in operation S4901, the third device 2006 according to an exemplary embodiment may obtain first biometric information of a user. According to an exemplary embodiment, the third device 2006 may obtain the first biometric information from a biometrics module provided in the third device 2006.

In operation S4902, the third device 2006 may perform user authentication by using the first biometric information.

In operation S4903, when the user authentication has succeeded, the third device 2006 may obtain a first encryption key corresponding to the first biometric information. Here, the first encryption key may be a value generated by using base first biometric information pre-stored in the memory 170.

In operation S4904, the third device 2006 may transmit the first encryption key to the device 100.

In operation S4905, the device 100 may encrypt content by using the first encryption key.

Meanwhile, in operation S4906, the second device 2002 according to an exemplary embodiment may obtain second biometric information of the user. According to an exemplary embodiment, the second device 2002 may obtain the second biometric information from a biometrics module provided in the second device 200.

In operation S4907, the second device 2002 may perform user authentication by using the second biometric information.

In operation S4908, when the user authentication has succeeded, the second device 2002 may obtain a second encryption key corresponding to the second biometric information. Here, the second encryption key may be a value generated by using base second biometric information pre-stored in the memory 170.

In operation S4909, the second device 2002 may transmit the second encryption key to the device 100.

In operation S4910, the device 100 may double-encrypt the encrypted content by using the second encryption key. In operation S4911, the device 100 may store the double-encrypted content.

According to an exemplary embodiment, the device 100 may double-encrypt the content by using the second biometric information after encrypting the content by using the first biometric information.

The device 100 and the second device 2002 may be used by the same user or different users.

According to another exemplary embodiment, in FIG. 50, the device 100 double encrypts content based on a plurality of pieces of biometric information.

In operation S5001, the device 100 according to an exemplary embodiment may obtain first biometric information of a user. According to an exemplary embodiment, the device 100 may obtain the first biometric information from a biometrics module provided in the device 100.

In operation S5002, the device 100 may perform user authentication by using the first biometric information.

In operation S5003, when the user authentication has succeeded, the device 100 may obtain a first encryption key corresponding to the first biometric information. Here, the first encryption key may be a value generated by using base first biometric information pre-stored in the memory 170.

In operation S5004, the device 100 may encrypt content by using the first encryption key.

Also, in operation S5005, the device 100 may obtain second biometric information of the user. According to an exemplary embodiment, the device 100 may obtain the second biometric information from another biometrics module provided in the device 100.

In operation S5006, the device 100 may perform user authentication by using the second biometric information.

In operation S5007, when the user authentication has succeeded, the device 100 may obtain a second encryption key corresponding to the second biometric information. Here, the second encryption key may be a value generated by using base second biometric information pre-stored in the memory 170.

In operation S5008, the device 100 may double-encrypt the encrypted content by using the second encryption key. In operation S5009, the device 100 may store the double-encrypted content.

Figure 51:
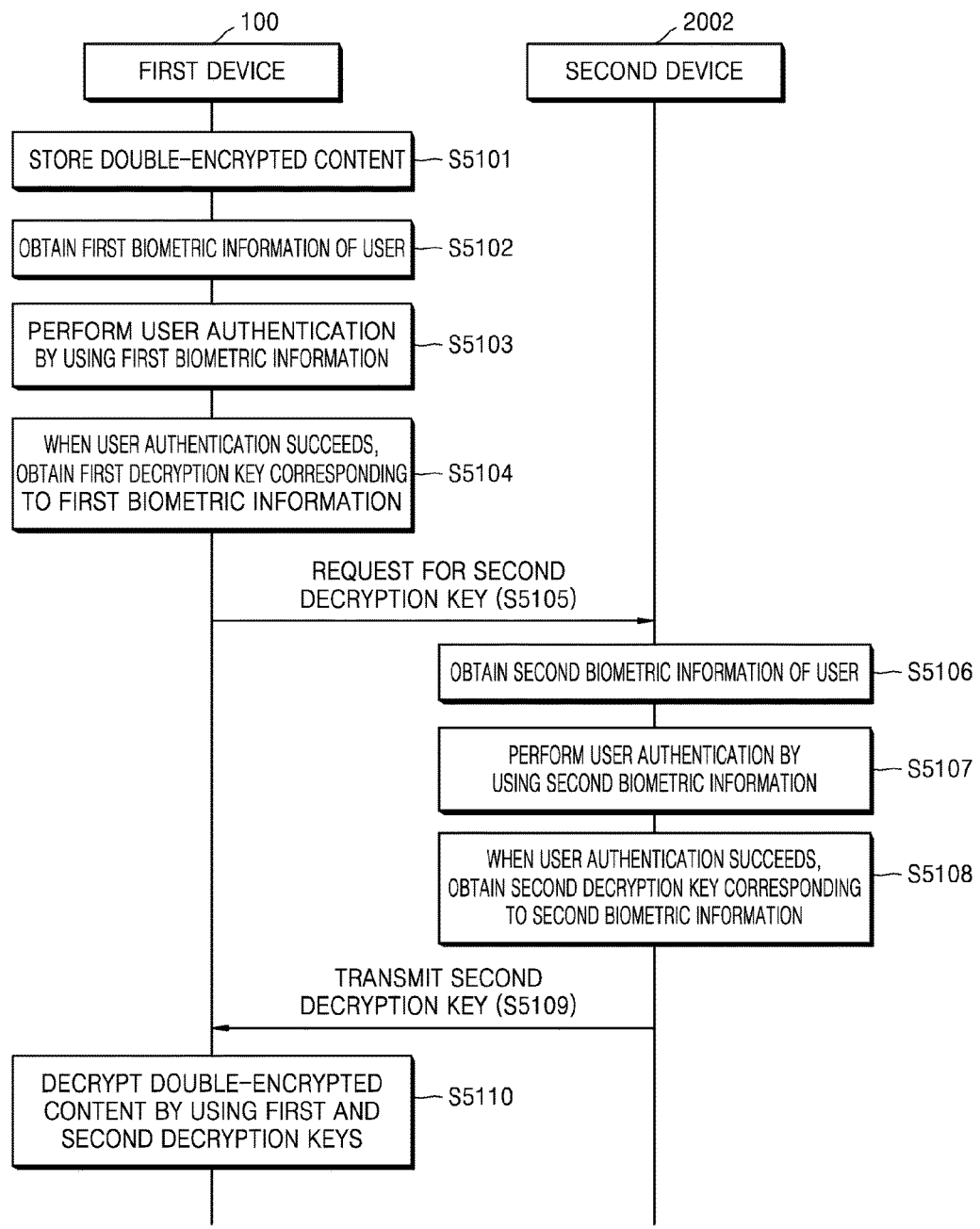
FIGS. 51 through 53 are flowcharts of a method of decrypting content, according to other exemplary embodiments.
Figure 52:
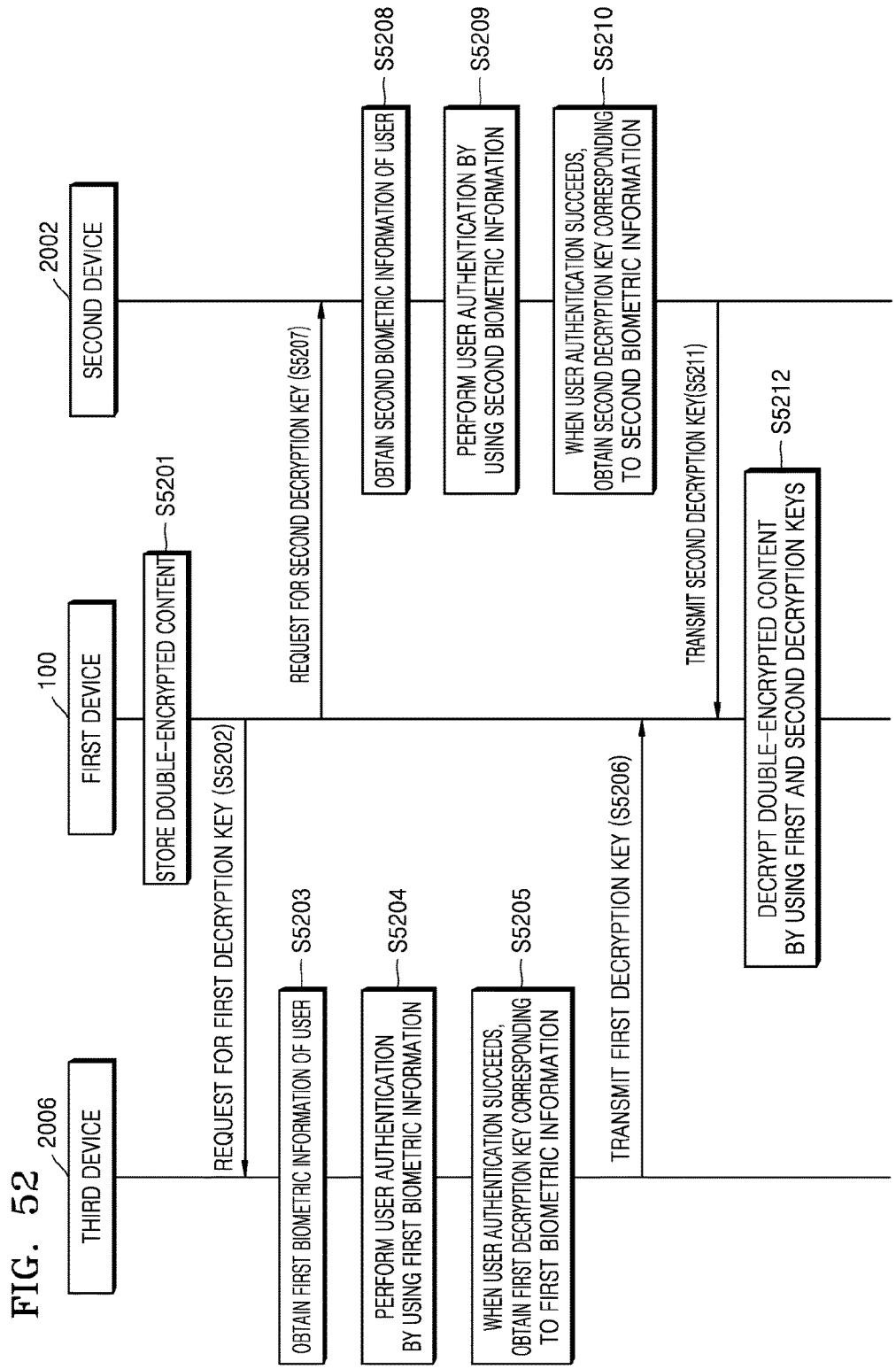
Figure 53:
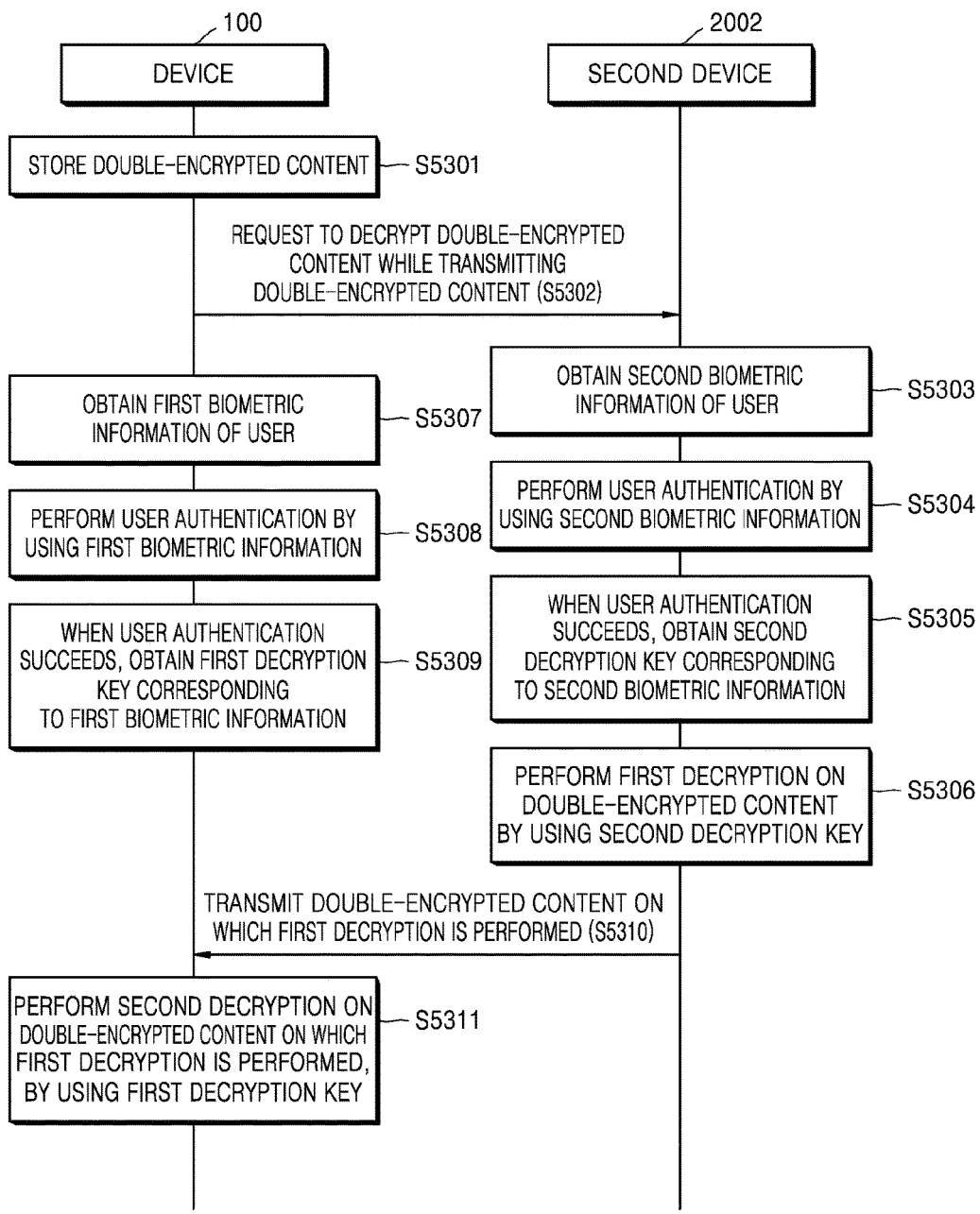

FIGS. 51 through 53 are flowcharts of a method of decrypting content, according to other exemplary embodiments.

FIG. 51 is a flowchart of a decrypting method corresponding to the encrypting method described above with reference to FIG. 48.

According to an exemplary embodiment, double-encrypted content may be decrypted via a decryption process using a first decryption key and a decryption process using a second decryption key.

In operation S5101, the device 100 according to an exemplary embodiment may store double-encrypted content.

In operation S5102, the device 100 may obtain first biometric information of a user. According to an exemplary embodiment, the device 100 may obtain the first biometric information from a biometrics module provided in the device 100.

In operation S5103, the device 100 may perform user authentication by using the first biometric information.

In operation S5104, when the user authentication has succeeded, the device 100 may obtain a first decryption key corresponding to the first biometric information. For example, the first decryption key may be a value generated by using base first biometric information pre-stored in a memory.

Meanwhile, in operation S5105, in order to decrypt the double-encrypted content, the device 100 may send a request to the second device 2002 for a second decryption key. Also, in operation S5106, the second device 2002 may obtain second biometric information of the user. According to an exemplary embodiment, the second device 200 may obtain the second biometric information from a biometrics module provided in the second device 200.

In operation S5107, the second device 2002 may perform user authentication by using the second biometric information.

In operation S5108, when the user authentication has succeeded, the second device 2002 may obtain a second decryption key corresponding to the second biometric information. For example, the second decryption key may be a value generated by using base second biometric information pre-stored in a memory.

In operation S5109, the second device 2002 may transmit the second decryption key to the device 100. In operation S5110, the device 100 may decrypt the double-encrypted content by using the first and second decryption keys. For example, the device 100 may decrypt the double-encrypted content (for example, E[E[content]Key_A]Key_B) by using the first decryption key (for example, Key_A) and the second decryption key (for example, Key_B).

FIG. 52 is a flowchart of a decrypting method corresponding to the encrypting method described above with reference to FIG. 49.

According to an exemplary embodiment, double-encrypted content may be decrypted via a decryption process using a first decryption key and a decryption process using a second decryption key.

In operation S5201, the device 100 according to an exemplary embodiment may store double-encrypted content. In operation S5202, in order to decrypt the double-encrypted content, the device 100 may send a request to the third device 2006 for a first decryption key.

Meanwhile, in operation S5203, the third device 2006 may obtain first biometric information of a user. According to an exemplary embodiment, the third device 2006 may obtain the first biometric information from a biometrics module provided in the third device 2006.

In operation S5204, the third device 2006 may perform user authentication by using the first biometric information.

In operation S5205, when the user authentication has succeeded, the third device 2006 may obtain a first decryption key corresponding to the first biometric information. For example, the first decryption key may be a value generated by using base first biometric information pre-stored in a memory.

In operation S5206, the third device 2006 may transmit the first decryption key to the device 100.

Meanwhile, in operation S5207, in order to decrypt the double-encrypted content, the device 100 may send a request to the second device 2002 for a second decryption key.

In operation S5208, the second device 2002 may obtain second biometric information of the user. According to an exemplary embodiment, the second device 2002 may obtain the second biometric information from a biometrics module provided in the second device 200.

In operation S5209, the device 2002 may perform user authentication by using the second biometric information In operation S5210, when the user authentication has succeeded, the second device 200 may obtain a second decryption key corresponding to the second biometric information. For example, the second decryption key may be a value generated by using base second biometric information pre-stored in a memory.

In operation S5211, the second device 2002 may transmit the second decryption key to the device 100.

In operation S5212, upon receiving the first and second decryption keys, the device 100 may decrypt the double-encrypted content by using the first and second decryption keys. For example, the device 100 may decrypt the double-encrypted content (for example, E[E[content]Key_A] Key_B) by using the first decryption key (for example, Key_A) and the second decryption key (for example, Key_B).

In FIG. 53, the first device 100 requests the second device 2002 to decrypt content.

According to an exemplary embodiment, double-encrypted content may be decrypted via a decryption process using a first decryption key and a decryption process using a second decryption key.

In operation S5301, the device 100 according to an exemplary embodiment may store double-encrypted content.

In operation S5302, the device 100 may request the second device 2002 to decrypt the double-encrypted content while transmitting the double-encrypted content.

In operation S5303, the second device 2002 may obtain second biometric information of a user. According to an exemplary embodiment, the second device 2002 may obtain the second biometric information from a biometrics module provided in the second device 2002.

In operation S5304, the second device 2002 may perform user authentication by using the second biometric information.

In operation S5305, when the user authentication has succeeded, the second device 2002 may obtain a second decryption key corresponding to the second biometric information. For example, the second decryption key may be a value generated by using base second biometric information pre-stored in a memory.

In operation S5306, the second device 2002 may perform first decryption on the double-encrypted content by using the second decryption key. For example, the second device 2002 may decrypt the double-encrypted content based on the second biometric information obtained by the second device 200.

In operation S5310, the second device 2002 may transmit the double-encrypted content on which the first decryption is performed to the device 100.

Meanwhile, in operation S5307, the first device 100 may obtain first biometric information of the user. According to an exemplary embodiment, the device 100 may obtain the first biometrics information from a biometrics module provided in the device 100.

In operation S5308, the device 100 may perform user authentication by using the first biometric information.

In operation S5309, when the user authentication has succeeded, the first device 100 may obtain a first decryption key corresponding to the first biometric information. For example, the first decryption key may be a value generated by using base first biometric information pre-stored in a memory.

In operation S5311, the device 100 may perform second decryption on the double-encrypted content on which the first encryption has been performed, by using the first decryption key. For example, the device 100 may decrypt the double-encrypted content on which the first decryption has been performed (for example, E[content]Key_A]) by using the first decryption key (for example, Key_A).

The one or more exemplary embodiments described above are only examples and thus are not limited thereto. Also, the orders of the operations of the methods described above are not limited, and at least one operation may be omitted, an operation may be added to the method, or the order may be changed, according to one or more exemplary embodiments.

FIG. 54 is a table for describing a decrypting method according to another exemplary embodiment.

FIG. 54 is a table for describing a method of decrypting content after encrypting the content according to the one or more exemplary embodiments described above with reference to FIGS. 48 through 53.

The controller 130 may decrypt content by using first biometric information and second biometric information.

In detail, when user authentication has succeeded by using the first biometric information, the controller 130 may generate a decryption key (Key_A) by using base first biometric information pre-stored in a memory. Also, when user authentication has succeeded by using the second biometric information, the controller 130 may generate a decryption key (Key_B) by using base second biometric information pre-stored in a memory.

The controller 130 may decrypt double-encrypted content (E[E[content]key_A]Key_B) by using the decryption key (Key_B), and then decrypt the content (E[content]key_A) by using the decryption key (Key_A), thereby decrypting the double-encrypted content E[E[content]key_A]Key_B.

As another example, double-encrypted content (E[E[content]Key_B]Key_A) may be decrypted by using the decryption key (Key_A), and then decrypted by using the decryption key (Key_B).

Figure 55:
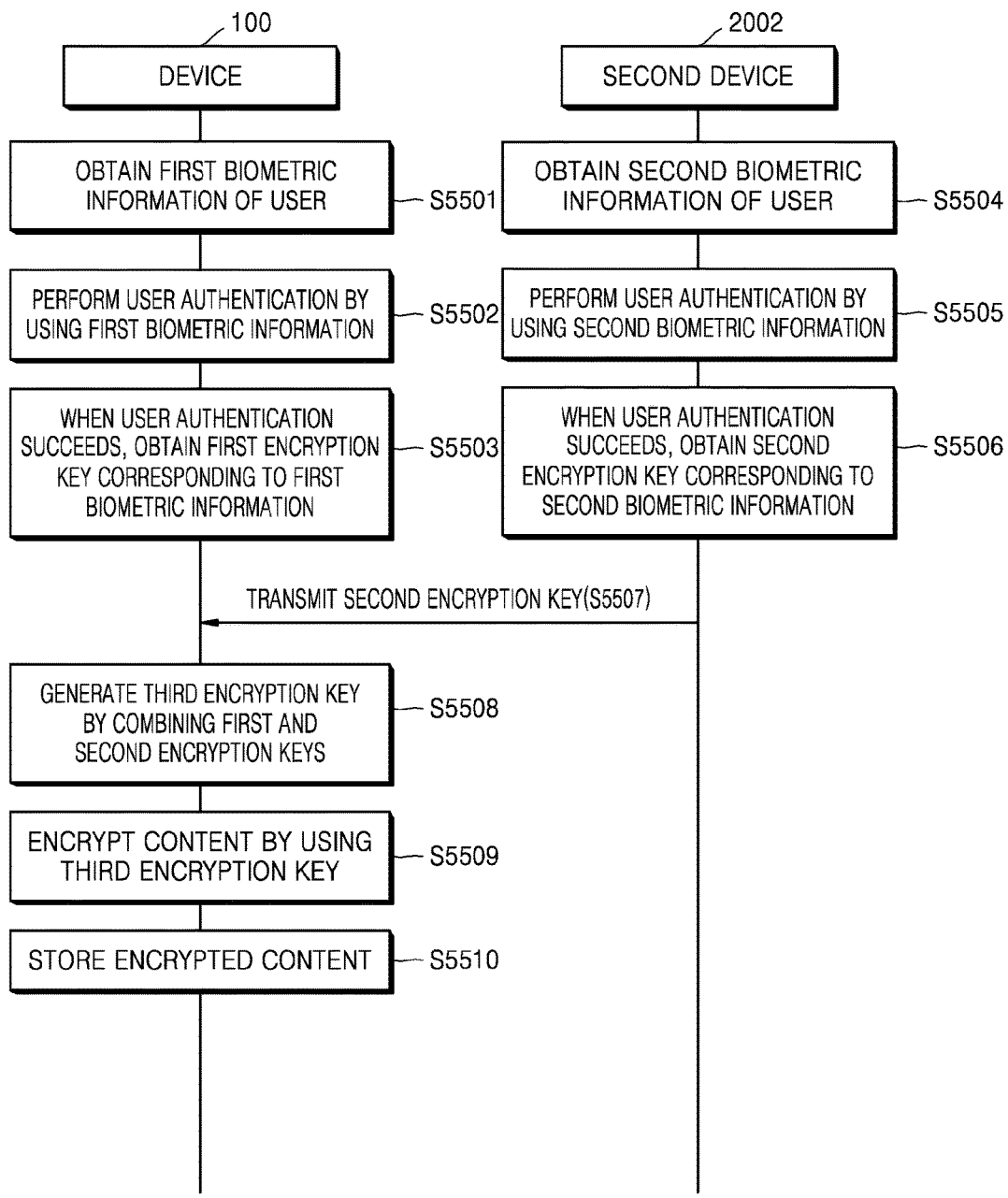
FIGS. 55 and 56 are flowcharts of an encrypting method for setting security, according to other exemplary embodiments.
Figure 56:
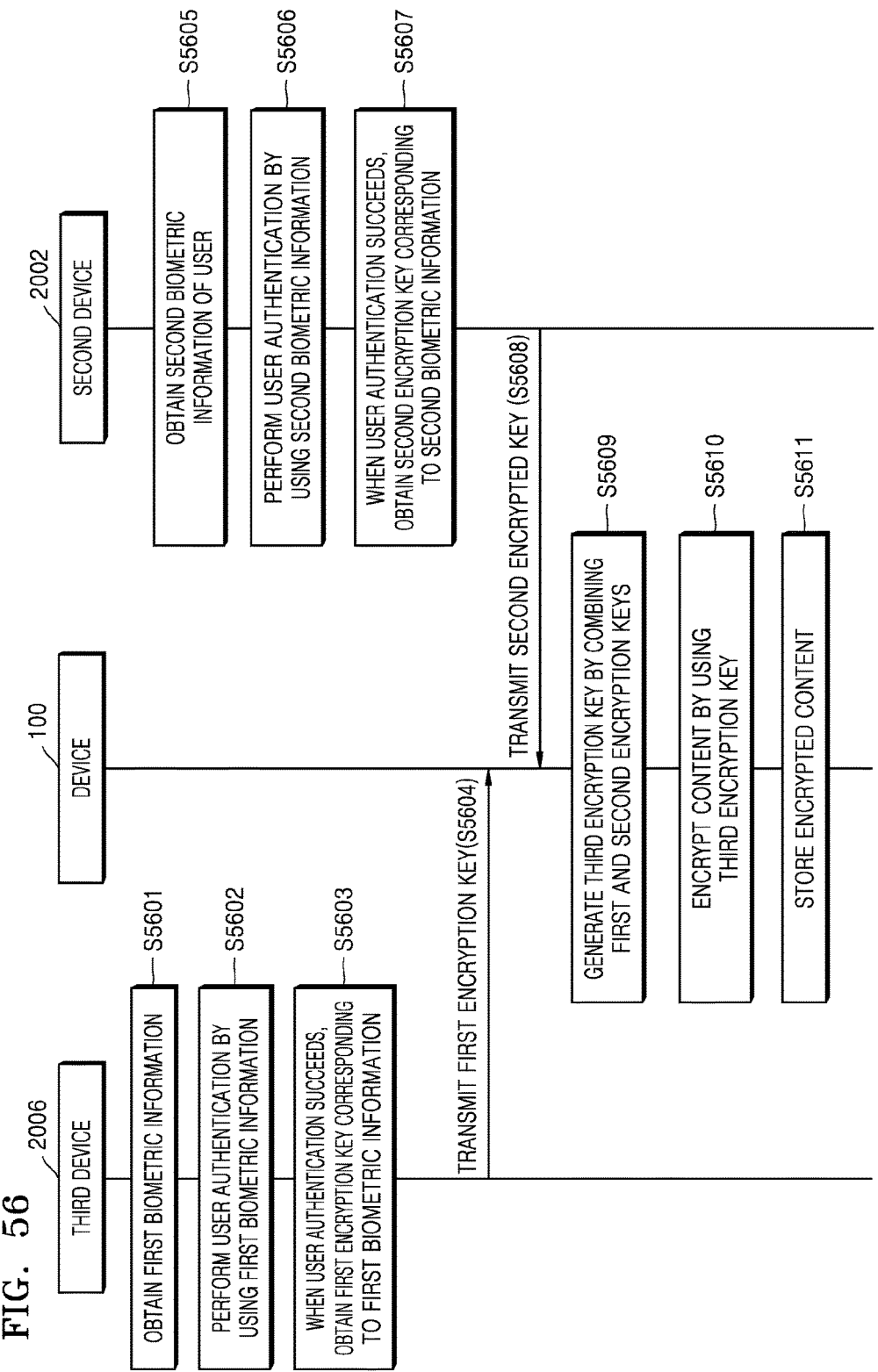

FIGS. 55 and 56 are flowcharts of an encrypting method for setting security, according to other exemplary embodiments. In FIGS. 55 and 56, content is encrypted by using an encryption key that is generated by combining a plurality of encryption keys based on a plurality of pieces of biometric information.

Referring to FIG. 55, in operation S5501, the device 100 may obtain first biometric information of a user. According to an exemplary embodiment, the device 100 may obtain the first biometric information from a biometrics module provided in the device 100.

In operation S5502, the device 100 may perform user authentication by using the first biometric information.

In operation S5503, when the user authentication has succeeded, the device 100 may obtain a first encryption key corresponding to the first biometric information. For example, the first encryption key may be a value generated by using base first biometric information pre-stored in a memory.

Meanwhile, in operation S5504, the second device 2202 may obtain second biometric information of the user. According to an exemplary embodiment, the second device 2002 may obtain second biometric information from a biometrics module provided in the second device 2002.

In operation S5505, the second device 2002 may perform user authentication by using the second biometric information.

In operation S5506, when the user authentication has succeeded, the second device 2002 may obtain a second encryption key corresponding to the second biometric information. For example, the second encryption key may be a value generated by using base second biometric information pre-stored in a memory.

In operation S5507, the second device 2002 may transmit the second encryption key to the device 100.

In operation S5508, the device 100 may generate a third encryption key by combining the first encryption key and the second encryption key.

In operation S5509, the device 100 may encrypt content by using the third encryption key.

In operation S5510. The device 100 may store the encrypted content.

Referring to FIG. 56, the device 100 obtains first biometric information from an external device (the third device 2006).

In operation S5601, the third device 2006 may obtain first biometric information of a user. According to an exemplary embodiment, the third device 2006 may obtain the first biometric information from a biometrics module provided in the third device 2006.

In operation S5602, the third device 2006 may perform user authentication by using the first biometric information.

In operation S5603, when the user authentication has succeeded, the third device 2006 may obtain a first encryption key corresponding to the first biometric information. For example, the first encryption key may be a value generated by using base first biometric information pre-stored in a memory.

In operation S5604, the third device 2006 may transmit the first encryption key to the device 100.

Meanwhile, in operation S5605, the second device 2202 may obtain second biometric information of the user. According to an exemplary embodiment, the second device 2002 may obtain second biometric information from a biometrics module provided in the second device 2002.

In operation S5606, the second device 2002 may perform user authentication by using the second biometric information.

In operation S5607, when the user authentication has succeeded, the second device 2002 may obtain a second encryption key corresponding to the second biometric information. For example, the second encryption key may be a value generated by using base second biometric information pre-stored in a memory.

In operation S5608, the second device 2002 may transmit the second encryption key to the device 100.

In operation S5609, the device 100 may generate a third encryption key by combining the first encryption key and the second encryption key. In operation S5610, the device 100 may encrypt content by using the third encryption key. In operation S56110. The device 100 may store the encrypted content.

Figure 57:
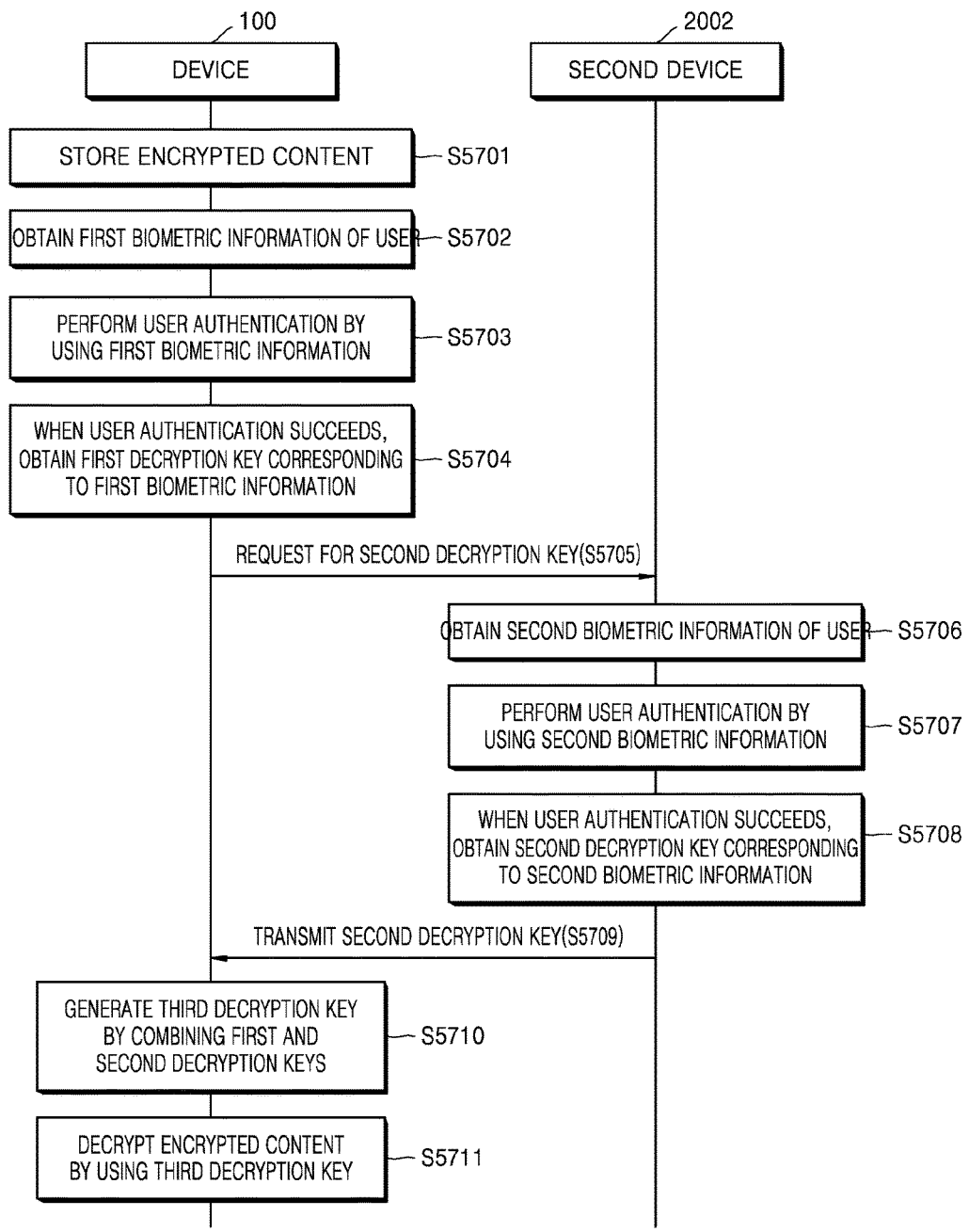
FIGS. 57 through 59 are flowcharts of a method of decrypting content, according to other exemplary embodiments.
Figure 58:
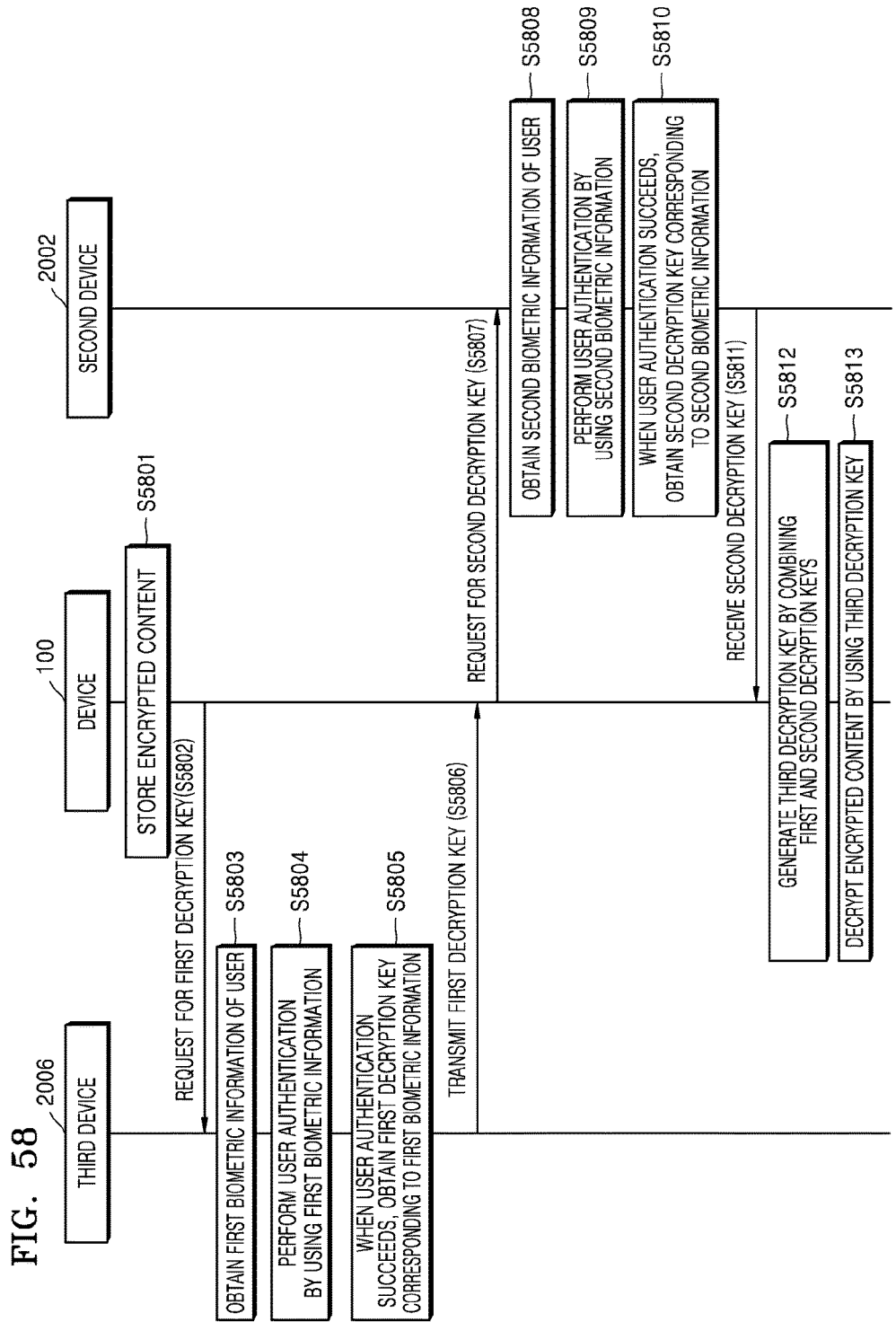
Figure 59:
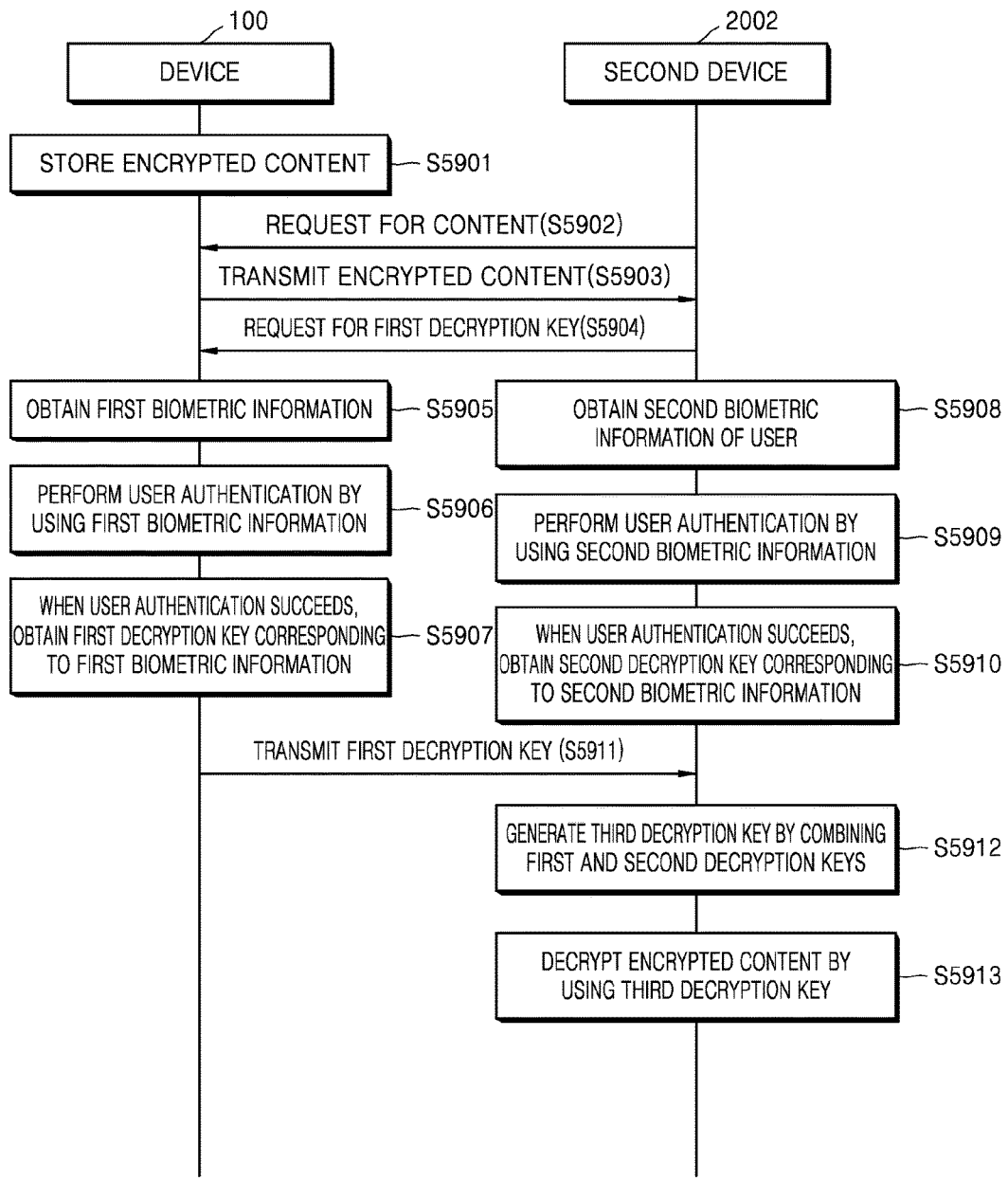

FIGS. 57 through 59 are flowcharts of a method of decrypting content, according to other exemplary embodiments.

FIG. 57 is a flowchart for describing a decrypting method corresponding to an encrypting method described above with reference to FIG. 55.

In operation S5701, the device 100 according to an exemplary embodiment may store encrypted content.

In operation S5702, the device 100 may obtain first biometric information of a user. According to an exemplary embodiment, the device 100 may obtain the first biometric information from a biometrics module provided in the device 100.

In operation S5703, the device 100 may perform user authentication by using the first biometric information.

In operation S5704, when the user authentication has succeeded, the device 100 may obtain first decryption key corresponding to the first biometric information. For example, the first decryption key may be a value generated by using base first biometric information pre-stored in a memory.

In operation S5705, the device 100 may send a request to the second device 2002 for a second decryption key.

In operation S5706, the second device 2002 may obtain second biometric information of the user. According to an exemplary embodiment, the second device 2002 may obtain the second biometric information from a biometrics module provided in the second device 2002.

In operation S5707, the second device 2002 may perform user authentication by using the second biometric information.

In operation S5708, when the user authentication has succeeded, the second device 2002 may obtain a second decryption key corresponding to the second biometric information. For example, the second decryption key may be a value generated by using base second biometric information pre-stored in a memory.

In operation S5709, the second device 2002 may transmit the second decryption key to the device 100.

In operation S5710, the device 100 may generate a third decryption key by combining the second decryption key received from the second device 2002 and the first decryption key obtained in operation S5704.

In operation S5711, the device 100 may decrypt the encrypted content by using the third decryption key.

FIG. 58 is a flowchart for describing a decrypting method corresponding to an encrypting method described above with reference to FIG. 56.

The device 100 according to an exemplary embodiment may receive a first decryption key corresponding to first biometric information of a user from an external device (the third device 2006).

In operation S5801, the device 100 according to an exemplary embodiment may store encrypted content.

In operation S5802, the device 100 may send a request to the third device 2006 for a first decryption key.

In operation S5803, the third device 2006 may obtain first biometric information of a user. According to an exemplary embodiment, the third device 2006 may obtain the first biometric information from a biometrics module provided in the third device 2006.

In operation S5804, the third device 2006 may perform user authentication by using the first biometric information.

In operation S5805, when the user authentication has succeeded, the third device 2006 may obtain first decryption key corresponding to the first biometric information. For example, the first decryption key may be a value generated by using base first biometric information pre-stored in a memory.

In operation S5806, the third device 2006 may transmit the first decryption key to the device 100.

Meanwhile, in order to decrypt the encrypted content, in operation S5807, the device 100 may send a request to the second device 2002 for a second decryption key. In operation S5808, the second device 2002 may obtain second biometric information of the user. According to an exemplary embodiment, the second device 2002 may obtain the second biometric information from a biometrics module provided in the second device 2002.

In operation S5809, the second device 2002 may perform user authentication by using the second biometric information.

In operation S5810, when the user authentication has succeeded, the second device 2002 may obtain a second decryption key corresponding to the second biometric information. For example, the second decryption key may be a value generated by using base second biometric information pre-stored in a memory.

In operation S5811, the second device 2002 may transmit the second decryption key to the device 100.

In operation S5812, the device 100 may generate a third decryption key by combining the first decryption key received in operation S5806 and the second decryption key received in operation S5811.

In operation S5813, the device 100 may decrypt the encrypted content by using the third decryption key.

In FIG. 59, the second device 2002 decrypts encrypted content.

In operation S5901, the device 100 according to an exemplary embodiment may store encrypted content.

In operation S5902, the second device 2002 that is to access the encrypted content may send a request to the device 100 for the encrypted content.

In operation S5903, the device 100 may transmit the encrypted content to the second device 2002.

Also, in order to decrypt the encrypted content, in operation S5904, the second device 200 may send a request to the device 100 for a first decryption key.

In operation S5905, the device 100 may obtain first biometric information of a user. According to an exemplary embodiment, the device 100 may obtain the first biometric information from a biometrics module provided in the device 100.

In operation S5906, the device 100 may perform user authentication by using the first biometric information.

In operation S5907, when user authentication has succeeded, the device 100 may obtain a first decryption key corresponding to the first biometric information. For example, the first decryption key may be a value generated by using base first biometric information pre-stored in a memory.

In operation S5911, the device 100 may transmit the first decryption key to the second device 2002.

Meanwhile, in operation S5908, the second device 2002 may obtain second biometric information of the user. According to an exemplary embodiment, the second device 2002 may obtain the second biometric information from a biometrics module provided in the second device 2002.

In operation S5909, the second device 2002 may perform user authentication by using the second biometric information.

In operation S5910, when the user authentication has succeeded, the second device 2002 may obtain a second decryption key corresponding to the second biometric information. For example, the second decryption key may be a value generated by using base second biometric information pre-stored in a memory.

In operation S5912, the second device 2002 may generate a third decryption key by combining the first decryption key received in operation S5911 and the second decryption key obtained in operation S5910.

In operation S5913, the second device 2002 may decrypt the encrypted content by using the third decryption key.

The one or more exemplary embodiments described above are only examples and thus are not limited thereto. Also, the orders of the operations of the methods described above are not limited, and at least one operation may be omitted, an operation may be added to the method, or the order may be changed, according to one or more exemplary embodiments.

Figure 60:
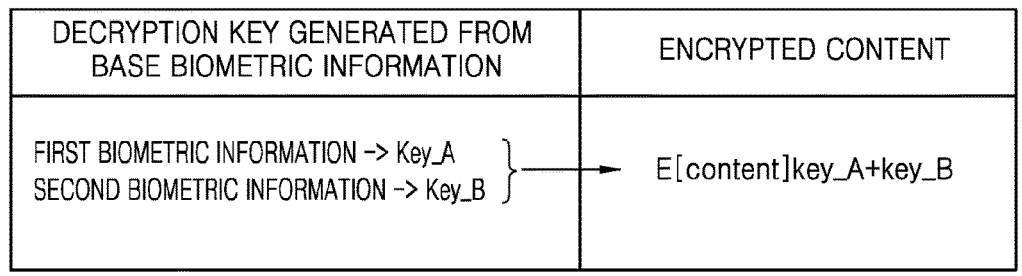
FIG. 60 is a table for describing a decrypting method according to another exemplary embodiment.

FIG. 60 is a table for describing a decrypting method according to another exemplary embodiment.

In other words, FIG. 60 is a table for describing a method of decrypting content after encrypting the content according to the exemplary embodiments described above with reference to FIGS. 55 through 59.

The controller 130 may decrypt content by using first biometric information and second biometric information.

In detail, when user authentication has succeeded by using the first biometric information, the controller 130 may generate a decryption key (Key_A) by using base first biometric information pre-stored in a memory.

Also, when user authentication has succeeded by using the second biometric information, the controller 130 may generate a decryption key (Key_B) by using base second biometric information pre-stored in a memory.

The controller 130 may generate a combination decryption key by combining the decryption keys, i.e., Key_A and Key_B. The controller 130 may decrypt encrypted content, i.e., E [content]key_A+Key_B by using the combination decryption key. Here, "E[content]Key_A+Key_B" indicates content encrypted by using an encryption key generated by combining Key_A and Key_B.

Figure 61:
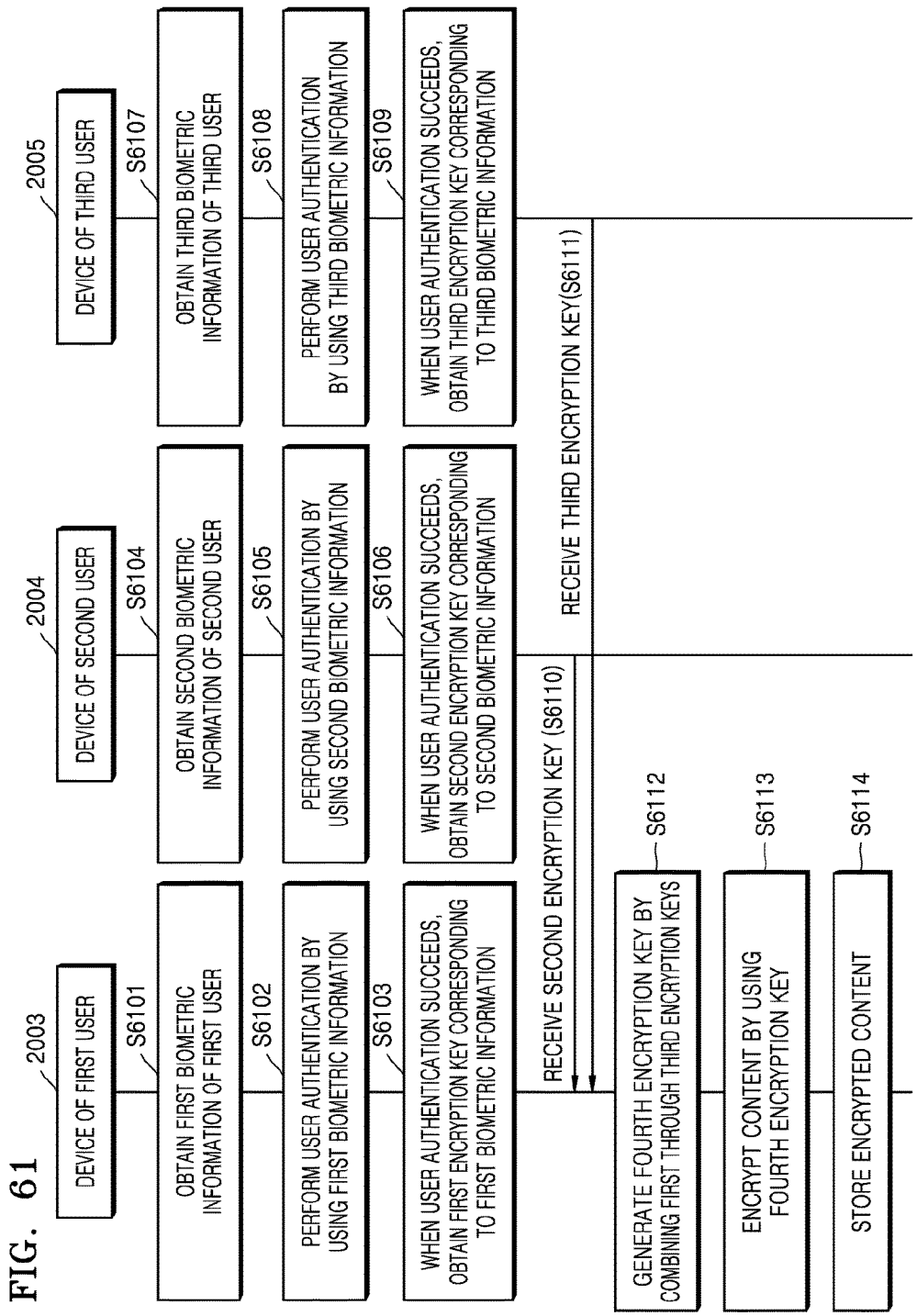
FIGS. 61 and 62 are flowcharts of an encrypting method for setting security, according to other exemplary embodiments.
Figure 62:
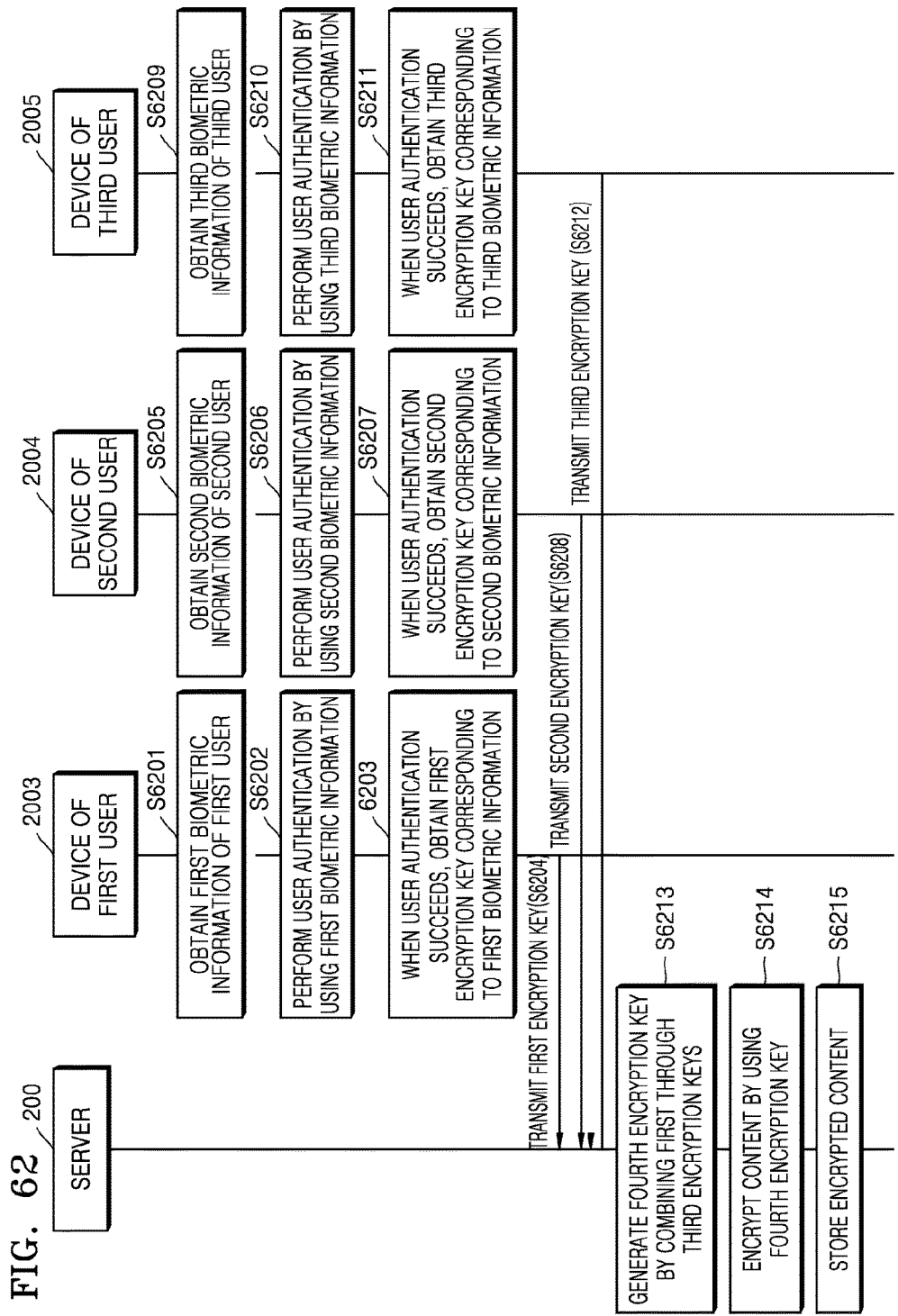

FIGS. 61 and 62 are flowcharts of an encrypting method for setting security, according to other exemplary embodiments.

In FIGS. 61 and 62, when content is encrypted by a plurality of users, for example, N users, the content may be decrypted by all of the plurality of users, for example, the N users.

A device 2003 of a first user, according to an exemplary embodiment, may encrypt content based on first through third biometric information respectively of first through third users.

Referring to FIG. 61, in operation S6101, the device 2003 may obtain the first biometric information of the first user. According to an exemplary embodiment, the device 2003 may obtain the first biometric information from a biometrics module provided in the device 2003.

In operation S6102, the device 2003 may perform user authentication by using the first biometric information.

In operation S6103, when the user authentication has succeeded, the device 2003 may obtain a first encryption key corresponding to the first biometric information. For example, the first encryption key may be a value generated by using base first biometric information pre-stored in a memory.

Meanwhile, in operation S6104, a device 2004 of the second user may obtain the second biometric information of the second user. According to an exemplary embodiment, the device 2004 may obtain the second biometric information from a biometrics module provided in the device 2004.

In operation S6105, the device 2004 may perform user authentication by using the second biometric information.

In operation S6106, when the user authentication has succeeded, the device 2004 may obtain an encryption key corresponding to the second biometric information. For example, the second encryption key may be a value generated by using base second biometric information pre-stored in a memory.

In operation S6110, the device 2004 may transmit the second encryption key to the device 2003.

Also, in operation S6107, a device 2005 of the third user may obtain the third biometric information of the third user. According to an exemplary embodiment, the device 2005 may obtain the third biometric information from a biometrics module provided in the device 2005.

In operation S6108, the device 2005 may perform user authentication by using the third biometric information.

In operation S6109, when the user authentication has succeeded, the device 2005 may obtain a third encryption key corresponding to the third biometric information. For example, the third encryption key may be a value generated by using base third biometric information pre-stored in a memory.

In operation S6111, the device 2005 may transmit the third encryption key to the device 2003.

Meanwhile, in operation S6112, the device 2003 may generate a fourth encryption key by combining the first encryption key obtained in operation S6103, the second encryption key received in operation S6110, and the third encryption key received in operation S6111.

In operation S6113, the device 2003 may encrypt content by using the fourth encryption key. In operation S6114, the device 2003 may store the encrypted content.

In FIG. 62, the server 200 encrypts content.

In operation S6201, the device 2003 may obtain the first biometric information of the first user. According to an exemplary embodiment, the device 2003 may obtain the first biometric information from a biometrics module provided in the device 2003.

In operation S6202, the device 2003 may perform user authentication by using the first biometric information.

In operation S6203, when the user authentication has succeeded, the device 2003 may obtain a first encryption key corresponding to the first biometric information. For example, the first encryption key may be a value generated by using base first biometric information pre-stored in a memory.

In operation S6204, the device 2003 may transmit the first encryption key to the server 200.

Meanwhile, in operation S6205, the device 2004 may obtain the second biometric information of the second user. According to an exemplary embodiment, the device 2004 may obtain the second biometric information from a biometrics module provided in the device 2004.

In operation S6206, the device 2004 may perform user authentication by using the second biometric information.

In operation S6207, when the user authentication has succeeded, the device 2004 may obtain an encryption key corresponding to the second biometric information. For example, the second encryption key may be a value generated by using base second biometric information pre-stored in a memory.

In operation S6208, the device 2004 may transmit the second encryption key to the server 200.

Also, in operation S6209, the device 2005 may obtain the third biometric information of the third user. According to an exemplary embodiment, the device 2005 may obtain the third biometric information from a biometrics module provided in the device 2005.

In operation S6210, the device 2005 may perform user authentication by using the third biometric information.

In operation S6211, when the user authentication has succeeded, the device 2005 may obtain a third encryption key corresponding to the third biometric information. For example, the third encryption key may be a value generated by using base third biometric information pre-stored in a memory.

In operation S6212, the device 2005 may transmit the third encryption key to the server 200.

Meanwhile, in operation S6213, the server 200 may generate a fourth encryption key by combining the first encryption key received in operation S6204, the second encryption key received in operation S6208, and the third encryption key received in operation S6212. In operation S6214, the server 200 may encrypt content by using the fourth encryption key. In operation S6215, the server 200 may store the encrypted content.

Figure 63:
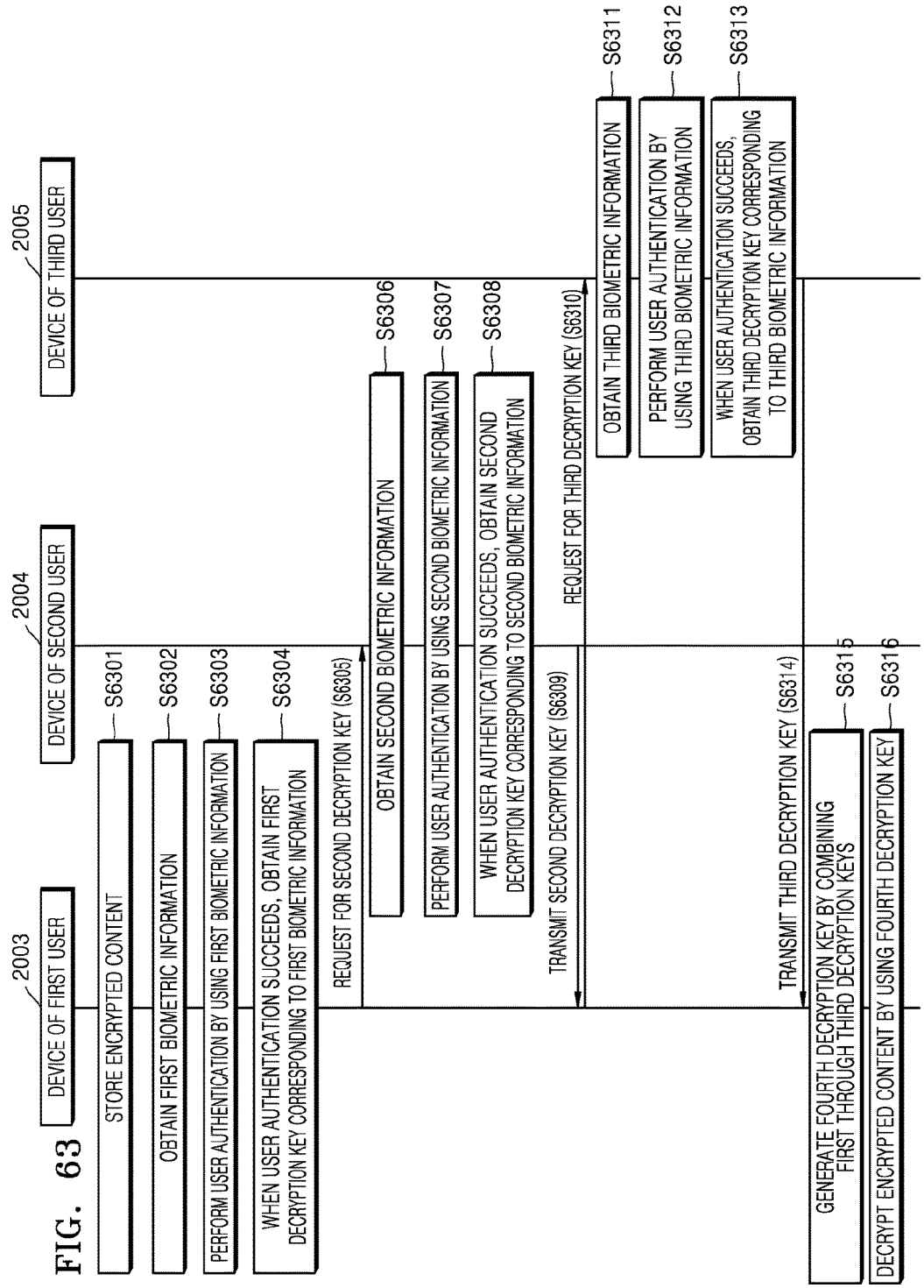
FIGS. 63 and 64 are flowcharts of a method of decrypting content, according to other exemplary embodiments.
Figure 64:
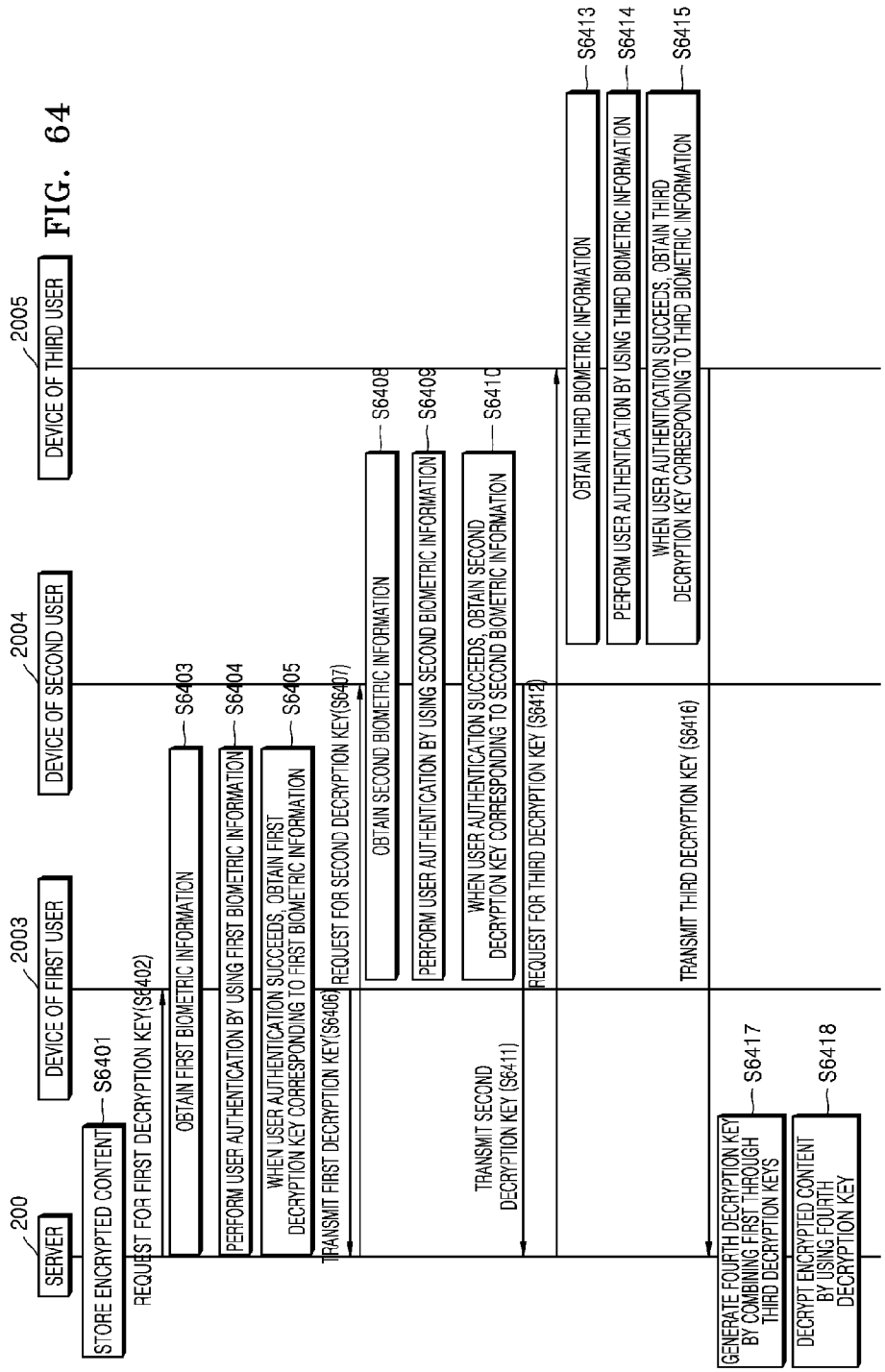

FIGS. 63 and 64 are flowcharts of a method of decrypting content, according to other exemplary embodiments.

Referring to FIG. 63, the device 2003 decrypts content.

In operation S6301, the device 2003 according to an exemplary embodiment may store encrypted content.

In operation S6302, the device 2003 may obtain first biometric information of the first user. According to an exemplary embodiment, the device 2003 may obtain the first biometric information from a biometrics module provided in the device 2003.

In operation S6303, the device 2003 may perform user authentication by using the first biometric information.

In operation S6304, when the user authentication has succeeded, the device 2003 may obtain a first decryption key corresponding to the first biometric information. For example, the first decryption key may be a value generated by using base first biometric information pre-stored in a memory.

In operation S6305, in order to decrypt the encrypted content, the device 2003 may send a request to the device 2004 for a second decryption key.

In operation S6306, the device 2004 may obtain second biometric information of the second user. According to an exemplary embodiment, the device 2004 may obtain the second biometric information from a biometrics module provided in the device 2004.

In operation S6307, the device 2004 may perform user authentication by using the second biometric information.

In operation S6308, when the user authentication has succeeded, the device 2004 may obtain a second decryption key corresponding to the second biometric information. For example, the second decryption key may be a value generated by using base second biometric information pre-stored in a memory.

In operation S6309, the device 2004 may transmit the second decryption key to the device 2003.

Meanwhile, in operation S6310, in order to decrypt the encrypted content, the device 2003 may send a request to the device 2005 for a third decryption key. In operation S6311, the device 2005 may obtain third biometric information of the third user. According to an exemplary embodiment, the device 2005 may obtain the third biometric information from a biometrics module provided in the device 2005.

In operation S6312, the device 2005 may perform user authentication by using the third biometric information.

In operation S6313, when the user authentication has succeeded, the device 2005 may obtain a third decryption key corresponding to the third biometric information. For example, the third decryption key may be a value generated by using base third biometric information pre-stored in a memory.

In operation S6314, the device 2005 may transmit the third decryption key to the device 2003.

In operation S6315, the device 2003 may generate a fourth decryption key by combining the first decryption key obtained in operation S6304, the second decryption key received in operation S6309, and the third decryption key received in operation S6314. In operation S6316, the device 2003 may decrypt the encrypted content by using the fourth decryption key.

Referring to FIG. 64, the server 200 decrypts content.

In operation S6401, the server 200 according to an exemplary embodiment may store encrypted content. In operation S6402, in order to decrypt the encrypted content, the server 200 may request the device 2003 for a first decryption key.

In operation S6403, the device 2003 may obtain first biometric information of the first user. According to an exemplary embodiment, the device 2003 may obtain the first biometric information from a biometrics module provided in the device 2003.

In operation S6404, the device 2003 may perform user authentication by using the first biometric information.

In operation S6405, when the user authentication has succeeded, the device 2003 may obtain a first decryption key corresponding to the first biometric information. For example, the first decryption key may be a value generated by using base first biometric information pre-stored in a memory.

In operation S6406, the device 2003 may transmit the first decryption key to the server 200.

Meanwhile, in operation S6407, in order to decrypt the encrypted content, the server 200 may send a request to the device 2004 for a second decryption key. In operation S6408, the device 2004 may obtain second biometric information of the second user. According to an exemplary embodiment, the device 2004 may obtain the second biometric information from a biometrics module provided in the device 2004.

In operation S6409, the device 2004 may perform user authentication by using the second biometric information.

In operation S6410, when the user authentication has succeeded, the device 2004 may obtain a second decryption key corresponding to the second biometric information. For example, the second decryption key may be a value generated by using base second biometric information pre-stored in a memory.

In operation S6411, the device 2004 may transmit the second decryption key to the server 200.

Meanwhile, in operation S6412, in order to decrypt the encrypted content, the server 200 may send a request to the device 2005 for a third decryption key. In operation S6413, the device 2005 may obtain third biometric information of the third user. According to an exemplary embodiment, the device 2005 may obtain the third biometric information from a biometrics module provided in the device 2005.

In operation S6414, the device 2005 may perform user authentication by using the third biometric information.

In operation S6415, when the user authentication has succeeded, the device 2005 may obtain a third decryption key corresponding to the third biometric information. For example, the third decryption key may be a value generated by using base third biometric information pre-stored in a memory.

In operation S6416, the device 2005 may transmit the third decryption key to the device 2003.

In operation S6417, the server 200 may generate a fourth decryption key by combining the first decryption key received in operation S6406, the second decryption key received in operation S6411, and the third decryption key received in operation S6416.

In operation S6418, the server 200 may decrypt the encrypted content by using the fourth decryption key.

The one or more exemplary embodiments described above are only examples and thus are not limited thereto. Also, the orders of the operations of the methods described above are not limited, and at least one operation may be omitted, an operation may be added to the method, or the order may be changed, according to one or more exemplary embodiments.

Figure 65:
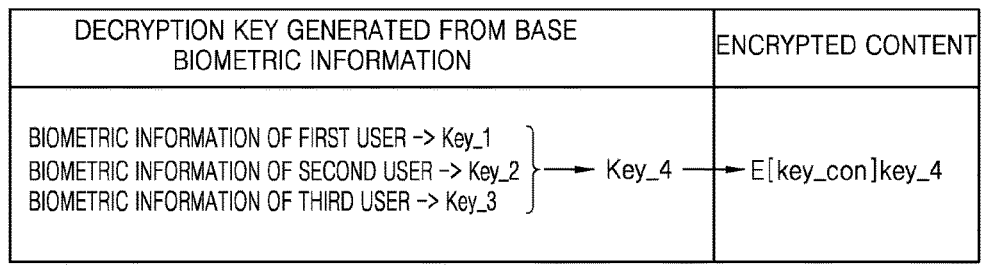
FIG. 65 is a table for describing a decrypting method according to another exemplary embodiment.

FIG. 65 is a table for describing a decrypting method according to another exemplary embodiment.

In other words, FIG. 65 is a table for describing a method of decrypting content after encrypting the content according to the one or more exemplary embodiments described above with reference to FIGS. 61 through 64.

The controller 130 may decrypt content based on biometric information of a first user, biometric information of a second user, and biometric information of a third user.

In detail, when user authentication has succeeded by using the biometric information of the first user, the controller 130 may generate a decryption key (Key_1) by using base biometric information of the first user pre-stored in a memory.

When user authentication has succeeded by using the biometric information of the second user, the controller 130 may generate a decryption key (Key_2) by using base biometric information of the second user pre-stored in a memory. Also, when user authentication has succeeded by using the biometric information of the third user, the controller 130 may generate a decryption key (Key_3) by using base biometric information of the third user pre-stored in a memory.

Then, the controller 130 may generate a decryption key (Key_4) by combining Key_1, Key_2, and Key_3.

Encrypted content (for example, E[content]Key_4) may be decrypted by using the decryption key (Key_4). Here, "E[content]Key_4" indicates content encrypted by using 'Key_4'.

Figure 66:
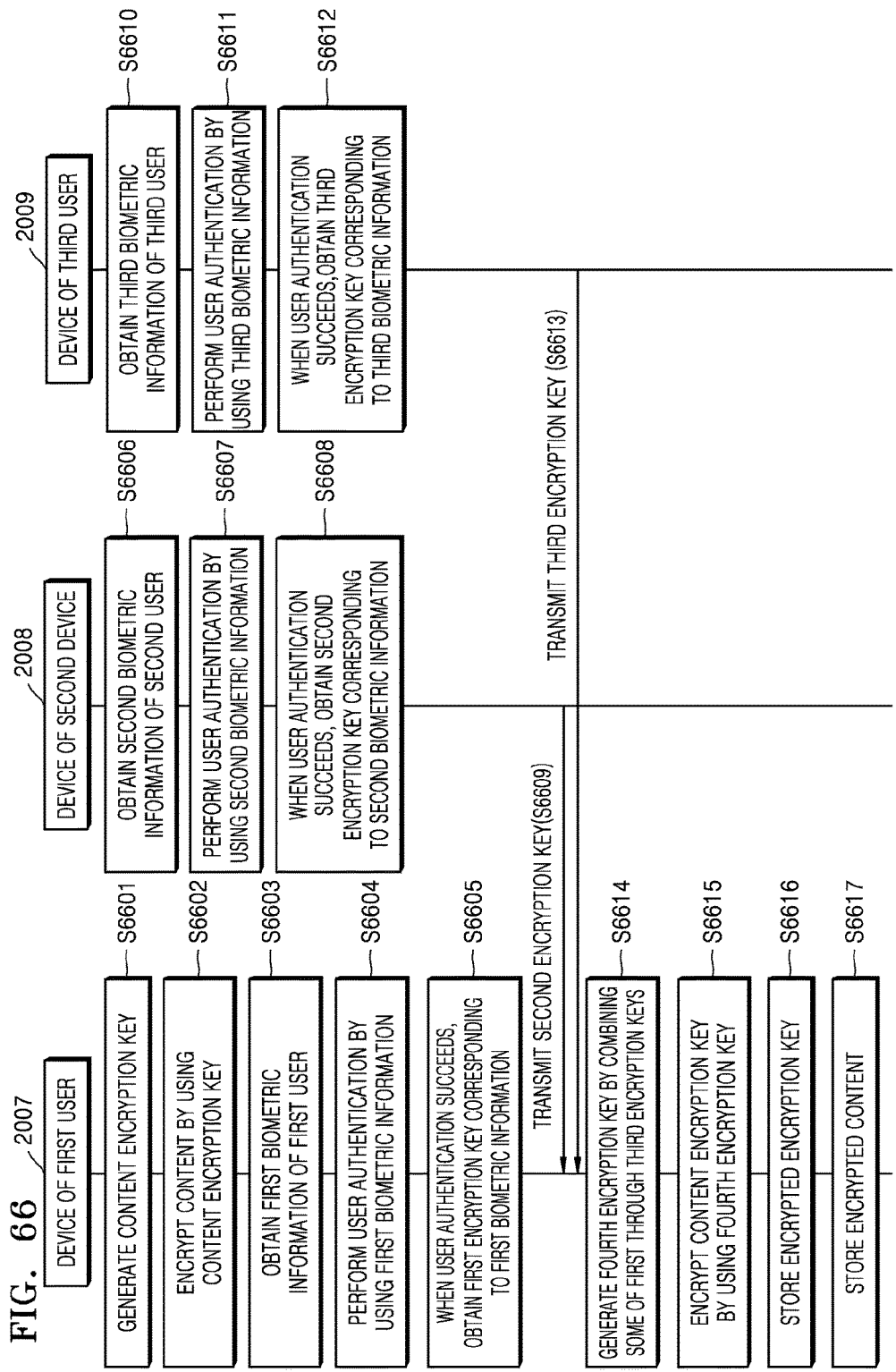
FIGS. 66 and 67 are flowcharts of an encrypting method for setting security, according to other exemplary embodiments.
Figure 67:
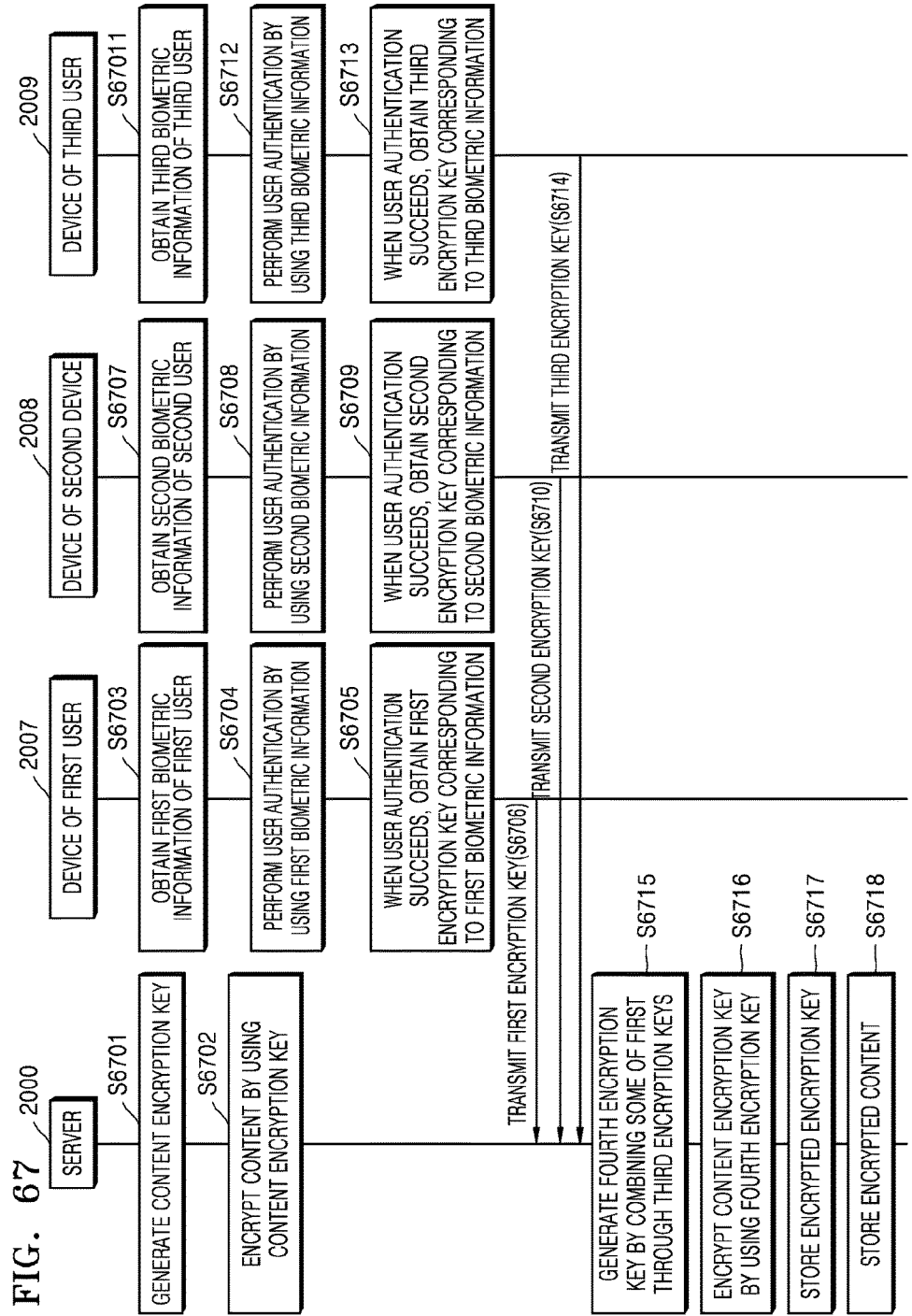

FIGS. 66 and 67 are flowcharts of an encrypting method for setting security, according to other exemplary embodiments.

In FIGS. 66 through 69, when content is encrypted by a plurality of users (for example, N users), the content may be decrypted by some of the plurality of users (for example, k users from among the N users).

Referring to FIG. 66, in operation S6601, a device 2007 of a first user may generate a content encryption key. The content encryption key may be a key randomly generated by a system for encrypting content, i.e., the device 2007.

In operation S6602, the device 2007 may encrypt content by using the content encryption key.

In operation S6603, the device 2007 may obtain first biometric information of the first user. According to an exemplary embodiment, the device 2007 may obtain the first biometric information from a biometrics module provided in the device 2007.

In operation S6604, the device 2007 may perform user authentication by using the first biometric information.

In operation S6605, when the user authentication has succeeded, the device 2007 may obtain a first encryption key corresponding to the first biometric information. For example, the first encryption key may be a value generated by using base first biometric information pre-stored in a memory.

Meanwhile, in operation S6606, a device 2008 of a second device may obtain second biometric information of the second user. According to an exemplary embodiment, the device 2008 may obtain the second biometric information from a biometrics module provided in the device 2008.

In operation S6607, the device 2007 may perform user authentication by using the second biometric information.

In operation S6608, when the user authentication has succeeded, the device 2008 may obtain a second encryption key corresponding to the second biometric information. For example, the second encryption key may be a value generated by using base second biometric information pre-stored in a memory.

In operation S6609, the device 2008 may transmit the second encryption key to the device 2007.

Also, in operation S6610, a device 2009 of a third user may obtain third biometric information of the third user. According to an exemplary embodiment, the device 2009 may obtain the third biometric information from a biometrics module provided in the device 2009.

In operation S6611, the device 2009 may perform user authentication by using the third biometric information.

In operation S6612, when the user authentication has succeeded, the device 2009 may obtain a third encryption key corresponding to the third biometric information. For example, the third encryption key may be a value generated by using base third biometric information pre-stored in a memory.

In operation S6613, the device 2009 may transmit the third encryption key to the device 2007.

In operation S6614, the device 2007 may generate a fourth encryption key by combining some of the first through third encryption keys. The fourth encryption keys may be generated as much as the number of $_NC_K$ combinations (the number of combinations of selecting K from among N).

For example, a device may be set content such that the content is encrypted by three users and is decrypted by two users. In this case, $_3C_2$ encryption keys (fourth encryption keys) may be generated. For example, an encryption key in which first and second encryption keys are combined, an encryption key in which first and third encryption keys are combined, and an encryption key in which second and third encryption keys are combined may be generated.

In operation S6615, the device 2007 may encrypt the content encryption key by using the fourth encryption key. In operation S6616, the device 2007 may store the encrypted encryption key. In operation S6617, the device 2007 may store the encrypted content.

Referring to FIG. 67, a server 2000 generates a content encryption key and encrypts content.

In operation S6701, the server 2000 according to an exemplary embodiment may generate a content encryption key. The content encryption key may be a key randomly generated by a system for encrypting content, i.e., the server 2000. In operation S6702, the server 2000 may encrypt content by using the content encryption key.

In operation S6703, the device 2007 may obtain first biometric information of the first user. According to an exemplary embodiment, the device 2007 may obtain the first biometric information from a biometrics module provided in the device 2007.

In operation S6704, the device 2007 may perform user authentication by using the first biometric information.

In operation S6705, when the user authentication has succeeded, the device 2007 may obtain a first encryption key corresponding to the first biometric information. For example, the first encryption key may be a value generated by using base first biometric information pre-stored in a memory.

In operation S6706, the device 2008 may transmit the first encryption key to the server 2000.

Meanwhile, in operation S6707, the device 2008 may obtain second biometric information of the second user. According to an exemplary embodiment, the device 2008 may obtain the second biometric information from a biometrics module provided in the device 2008.

In operation S6708, the device 2007 may perform user authentication by using the second biometric information.

In operation S6709, when the user authentication has succeeded, the device 2008 may obtain a second encryption key corresponding to the second biometric information. For example, the second encryption key may be a value generated by using base second biometric information pre-stored in a memory.

In operation S6710, the device 2008 may transmit the second encryption key to the server 2000.

Also, in operation S6711, the device 2009 may obtain third biometric information of the third user. According to an exemplary embodiment, the device 2009 may obtain the third biometric information from a biometrics module provided in the device 2009.

In operation S6712, the device 2009 may perform user authentication by using the third biometric information.

In operation S6713, when the user authentication has succeeded, the device 2009 may obtain a third encryption key corresponding to the third biometric information. For example, the third encryption key may be a value generated by using base third biometric information pre-stored in a memory.

In operation S6714, the device 2009 may transmit the third encryption key to the server 2000.

In operation S6715, the server 2000 may generate a fourth encryption key by combining some of the first through third encryption keys. The fourth encryption keys may be generated as much as the number of $_NC_K$ combinations (the number of combinations of selecting K from among N).

For example, a server may be set content such that the content is encrypted by three users and is decrypted by two users. In this case, $_3C_2$ encryption keys (fourth encryption keys) may be generated. For example, an encryption key in which first and second encryption keys are combined, an encryption key in which first and third encryption keys are combined, and an encryption key in which second and third encryption keys are combined may be generated.

In operation S6716, the server 2000 may encrypt the content encryption key by using the fourth encryption key. In operation S6717, the server 2000 may store the encrypted encryption key. In operation S6718, the server 2000 may store the encrypted content.

Figure 68:
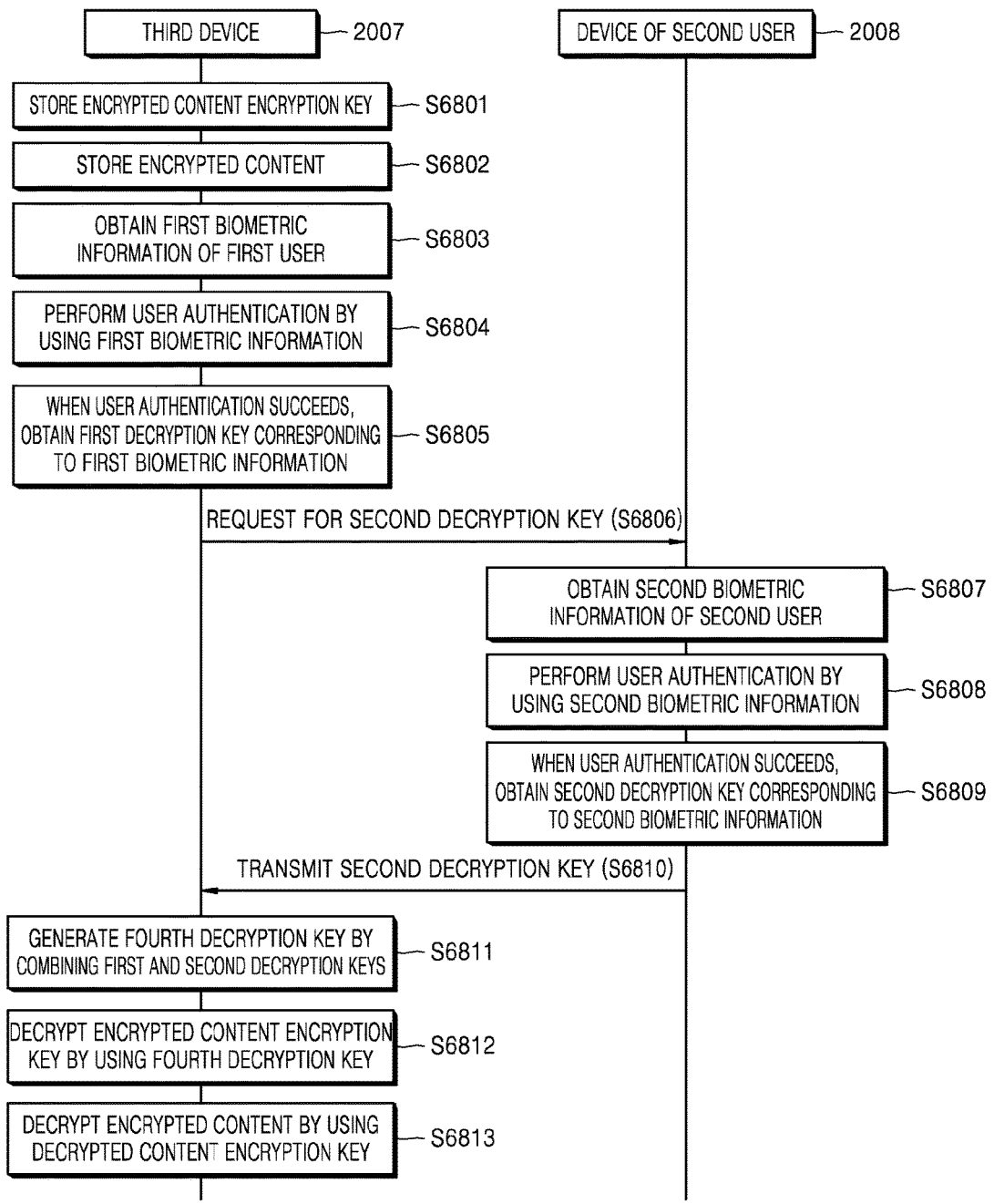

FIGS. 68 and 69 are flowcharts of a method of decrypting content, according to other exemplary embodiments.

Referring to FIG. 68, the device 2007 decrypts encrypted content.

In operation S6801, the device 2007 may store an encrypted content encryption key. In operation S6802, the device 2007 may store encrypted content.

In operation S6803, the device 2007 may obtain first biometric information of the first user. According to an exemplary embodiment, the device 2007 may obtain the first biometric information from a biometrics module provided in the device 2007.

In operation S6804, the device 2007 may perform user authentication by using the first biometric information.

In operation S6805, when the user authentication has succeeded, the device 2007 may obtain a first decryption key corresponding to the first biometric information. For example, the first decryption key may be a value generated by using base first biometric information pre-stored in a memory.

Meanwhile, in operation S6806, in order to decrypt the encrypted content, the device 2007 may request the device 2008 for a second decryption key. In operation S6807, the device 2008 may obtain second biometric information of the second user. According to an exemplary embodiment, the device 2008 may obtain the second biometric information from a biometrics module provided in the device 2008.

In operation S6808, the device 2008 may perform user authentication by using the second biometric information.

In operation S6809, when the user authentication has succeeded, the device 2008 may obtain a second decryption key corresponding to the second biometric information. For example, the second decryption key may be a value generated by using base second biometric information pre-stored in a memory.

In operation S6810, the device 2008 may transmit the second decryption key to the device 2007.

In operation S6811, the device 2007 may generate a fourth decryption key by combining the first and second decryption keys. In operation S6812, the device 2007 may decrypt the encrypted content encryption key by using the fourth decryption key. In operation S6813, the device 2007 may decrypt the encrypted content by using the decrypted content encryption key.

In FIGS. 68 and 69, content is encrypted by three users and decrypted by two users. In FIG. 68, a device of a first user decrypts content, but an exemplary embodiment is not limited thereto. In other words, a device of a second user or a third user may decrypt content.

Referring to FIG. 69, the server 200 decrypts encrypted content.

In operation S6901, the server 200 may store an encrypted content encryption key. In operation S6902, the server 200 may store encrypted content.

In order to decrypt the encrypted content, in operation S6903, the server 200 may send a request to the device 2007 for a first decryption key. In operation S6904, the device 2007 may obtain first biometric information of the first user. According to an exemplary embodiment, the device 2007 may obtain the first biometric information from a biometrics module provided in the device 2007.

In operation S6905, the device 2007 may perform user authentication by using the first biometric information.

In operation S6906, when the user authentication has succeeded, the device 2007 may obtain a first decryption key corresponding to the first biometric information. For example, the first decryption key may be a value generated by using base first biometric information pre-stored in a memory.

In operation S6907, the device 2007 may transmit the first decryption key to the server 200.

Meanwhile, in operation S6908, in order to decrypt the encrypted content, the server 200 may send a request to the device 2008 for a second decryption key. In operation S6909, the device 2008 may obtain second biometric information of the second user. According to an exemplary embodiment, the device 2008 may obtain the second biometric information from a biometrics module provided in the device 2008.

In operation S6910, the device 2008 may perform user authentication by using the second biometric information.

In operation S6911, when the user authentication has succeeded, the device 2008 may obtain a second decryption key corresponding to the second biometric information. For example, the second decryption key may be a value generated by using base second biometric information pre-stored in a memory.

In operation S6912, the device 2008 may transmit the second decryption key to the server 200.

In operation S6913, the server 200 may generate a fourth decryption key by combining the first and second decryption keys. In operation S6914, the server 200 may decrypt the encrypted content encryption key by using the fourth decryption key. In operation S6915, the server 200 may decrypt the encrypted content by using the decrypted content encryption key.

FIG. 70 is a table for describing a decrypting method according to another exemplary embodiment.

FIG. 70 is a table for describing a method of decrypting content after the content is encrypted, according to the one or more exemplary embodiments described above with reference to FIGS. 66 through 69.

The controller 130 may decrypt content by using at least two pieces from among biometric information of a first user, biometric information of a second user, and biometric information of a third user.

In detail, when user authentication has succeeded by using the biometric information of the first user, the controller 130 may generate a decryption key (Key_1) by using base biometric information of the first user pre-stored in a memory. Also, when user authentication has succeeded by using the biometric information of the second user, the controller 130 may generate a decryption key (Key_2) by using base biometric information of the second user pre-stored in a memory. Then, the controller 130 may generate a decryption key (Key_4') by combining Key_1 and Key_2.

Also, when user authentication has succeeded by using the biometric information of the third user, the controller 130 may generate a decryption key (Key_3) by using base biometric information of the third user pre-stored in a memory. Then, the controller 130 may generate a decryption key (Key_4") by combining Key_2 and Key_3.

Also, the controller 130 may generate a decryption key (Key_4''') by combining Key_1 and Key_3.

An encrypted content encryption key (E[key_con]Key_4) may be decrypted by using Key_4', Key_4", or Key_4'''. Here, "E[key_con]Key_4" indicates a content encryption key encrypted by using Key_4.

Encrypted content (E[content]Key_con) may be decrypted by using the decrypted content encryption key (key_con). Here, "E[content]Key_con" indicates content encrypted by using a content encryption key.

Figure 71:
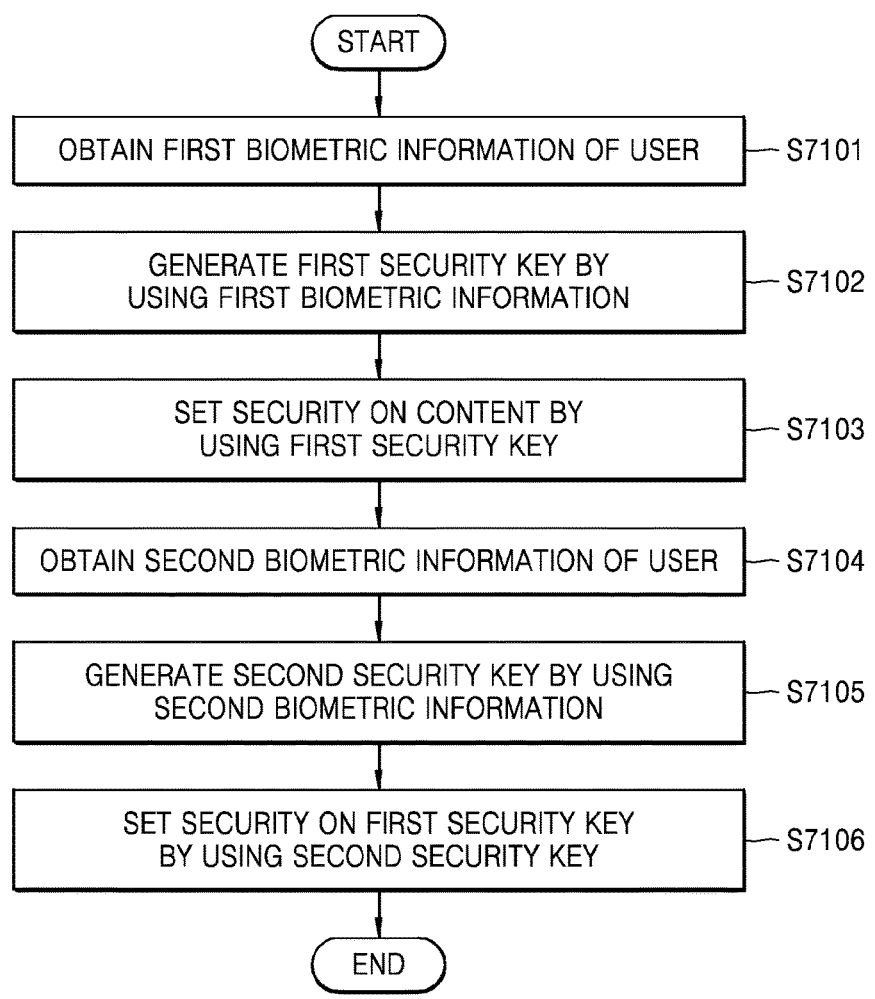
FIG. 71 is a flowchart of a method of setting security on content, according to another exemplary embodiment.

FIG. 71 is a flowchart of a method of setting security on content, according to another exemplary embodiment.

In operation S7101, the controller 130 of the device 100 may obtain first biometric information of a user.

In operation S7102, the controller 130 may generate a first security key by using the first biometric information.

The first security key may be a key generated by using feature information of the first biometric information, and may be a password or an encryption key.

A password or an encryption key may be a value generated by using at least a part of feature information of biometric information as a factor of a certain function.

Details about a method of generating a password or an encryption key are not described since a factor of a certain function may be replaced by feature information of biometric information obtained in operation S7101, according to an exemplary embodiment of generating the password or the encryption key by using feature information of pre-stored base biometric information as a factor of a certain function. Meanwhile, feature information of biometric information used in the method may be rougher than feature information of base biometric information. For example, when biometric information is a fingerprint, intervals of extracting feature points of a fingerprint obtained by the feature information extractor 133 may be wider than intervals of extracting feature points of base biometric information.

Accordingly, even when base biometric information is not used, it is highly likely that a security key generated by using biometric information obtained while setting security and a security key generated by using biometric information obtained while removing security may match each other. When intervals of extracting feature points of a fingerprint obtained by the feature information extractor 133 increase, a possibility that values of security keys match each other may increase. The intervals of extracting the feature points may be pre-set by a manufacturer of the device 100, a provider of an application installed in the device 100, or a provider of an operating system installed in the device 100. Alternatively, the intervals may be assigned by a user through a UI. Meanwhile, the user may assign the intervals for each of a plurality of pieces of biometric information.

In operation S7103, the controller 130 may set security on content by using the first security key. For example, when the first security key is a password, the first security key may be used to restrict access to the content. Alternatively, when the first security key is an encryption key, the first security key may be used to encrypt the content.

In operation S7104, the controller 130 may obtain second biometric information of the user, as another piece of biometric information.

In operation S7105, the controller 140 may generate a second security key by using the second biometric information.

The second security key is a key generated by using feature information of the second biometric information, and may be a password or an encryption key. Since a method of generating a password or an encryption key has been described above with reference to operation S7102, details thereof are not repeated.

Then, in operation S7106, the controller 130 may set security on the first security key by using the second security key. For example, when the second security key is a password, the second security key may be used to restrict access to the first security key. Alternatively, when the second security key is an encryption key, the second security key may be used to encrypt the first security key.

Figure 72:
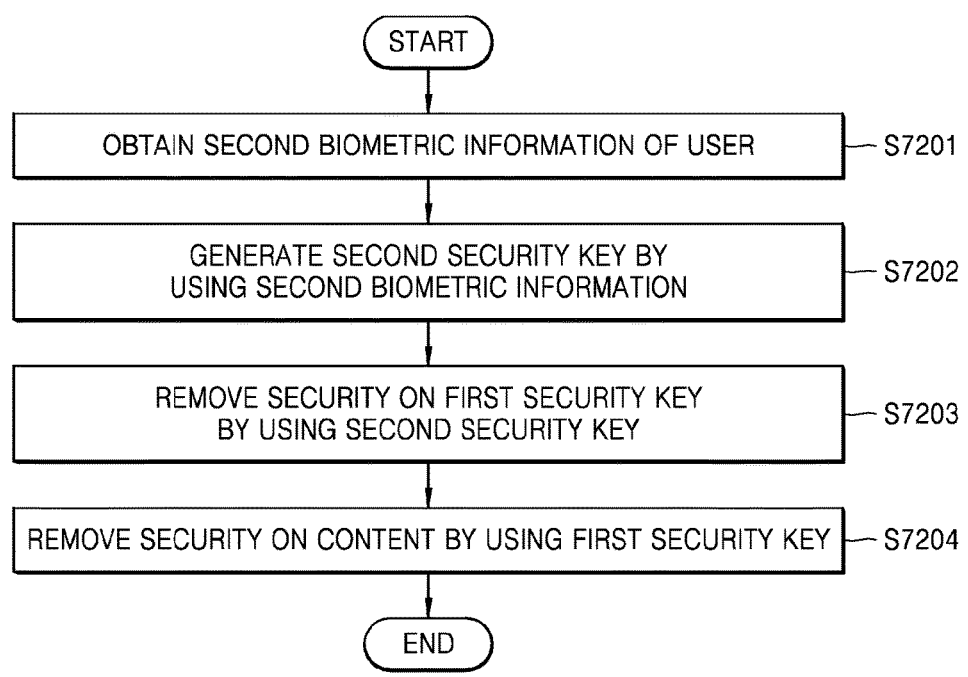
FIG. 72 is a flowchart of a method of removing security on content, according to another exemplary embodiment.

FIG. 72 is a flowchart of a method of removing security on content, according to another exemplary embodiment.

In operation S7201, the controller 130 of the device 100 may obtain second biometric information of a user.

In operation S7202, the controller 130 may generate a second security key by using the second biometric information. The second security key is a key generated by using feature information of the second biometric information, and may be a password or an encryption key.

In operation S7203, the controller 130 may remove security on a first security key by using the second security key. For example, when the second security key is a password, the second security key may be used to remove restriction on access to the first security key. Alternatively, when the second security key is a decryption key, the second security key may be used to decrypt the first security key.

In operation S7204, the controller 130 may remove security on content by using the first security key. For example, when the first security key is a password, the first security key may be used to remove restriction on access to the content. Alternatively, when the first security key is a decryption key, the first security key may be used to decrypt the content.

FIGS. 73 through 78 are diagrams for describing examples of a user input for executing content, according to exemplary embodiments.

According to an exemplary embodiment, when security is set on content based on first biometric information of a user, the controller 130 of the device 100 may obtain second biometric information of the user, which is of a different type than the first biometric information, and remove the security based on the second biometric information, according to a user input for executing the content while removing the security.

According to an exemplary embodiment, a user input for executing content may be at least one of user inputs received during each process a screen is changed until the content is executed.

Figure 73:
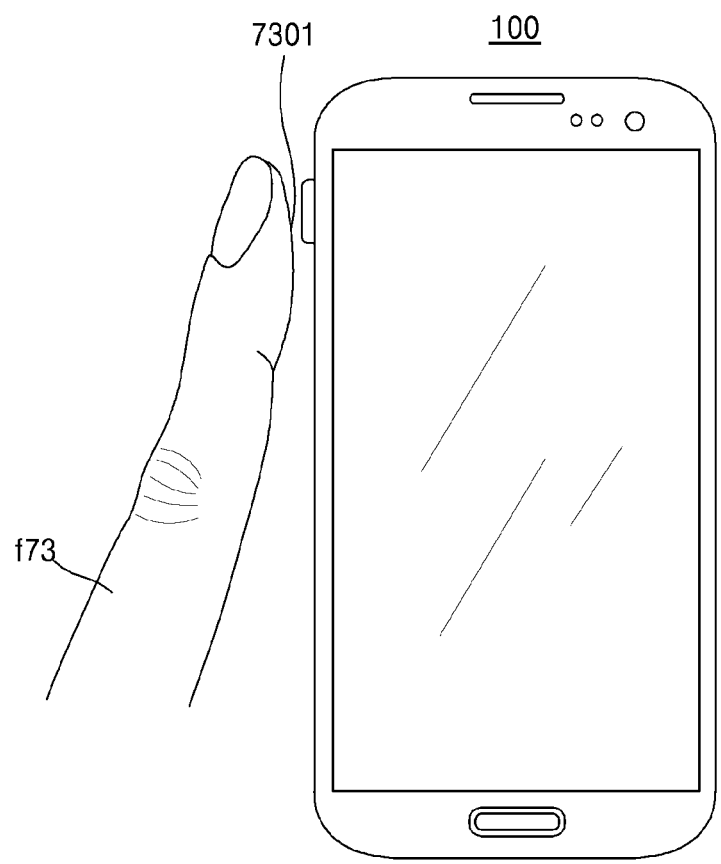
FIGS. 73 through 78 are diagrams for describing examples of a user input for executing content, according to exemplary embodiments.

For example, referring to FIG. 73, the controller 130 may receive a user input of activating the display unit 121. For example, the controller 130 may receive a user input of selecting, by a finger f73, a button 7301 mounted on one side of the device 100. Here, the activating of the display unit 121 means that an off-state of the display unit 121 is changed to an on-state or the display unit 121 is no longer in a black screen.

When the user input for activating the display unit 121 is received, the controller 130 may display, on the display unit 121, a notification screen for requesting the user to input the second biometric information for removing the security. Then, according to a signal for inputting the second biometric information, the controller 130 may receive the second biometric information from a biometrics module provided in the device 100 or from an external device through the communication unit 150. When the second biometric information is obtained through the biometrics module or the communication unit 150, the controller 130 may remove the security on the content based on the second biometric information.

Figure 74:
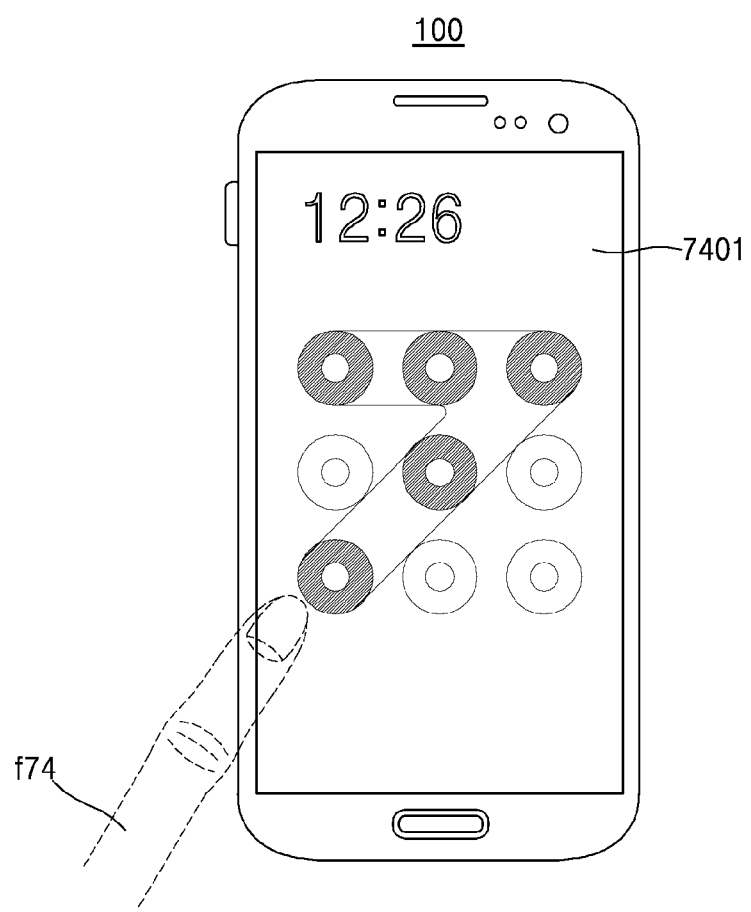

Alternatively, when the user input is received, the controller 130 may display a lock screen 7401 on the display unit 121, as shown in FIG. 74. The lock screen 7401 may be a screen requesting the user to input a pattern or a password to remove a lock, a screen requesting input from the user, such as a drag gesture, to enter a home screen, or a screen requesting the user to input biometric information to remove security on content.

While the lock screen 7401 is displayed on the display unit 121, the controller 130 may receive a user input for removing the lock screen 7401.

When the lock screen 7401 is a screen requesting the user to input the second biometric information to remove the security on the content, and a signal for inputting the second biometric information is input, the controller 130 may receive the second biometric information from a biometrics module provided in the device 100 or from an external device through the communication unit 150. Upon obtaining the second biometric information, the controller 130 may remove the security on the content based on the second biometric information.

Figure 75:
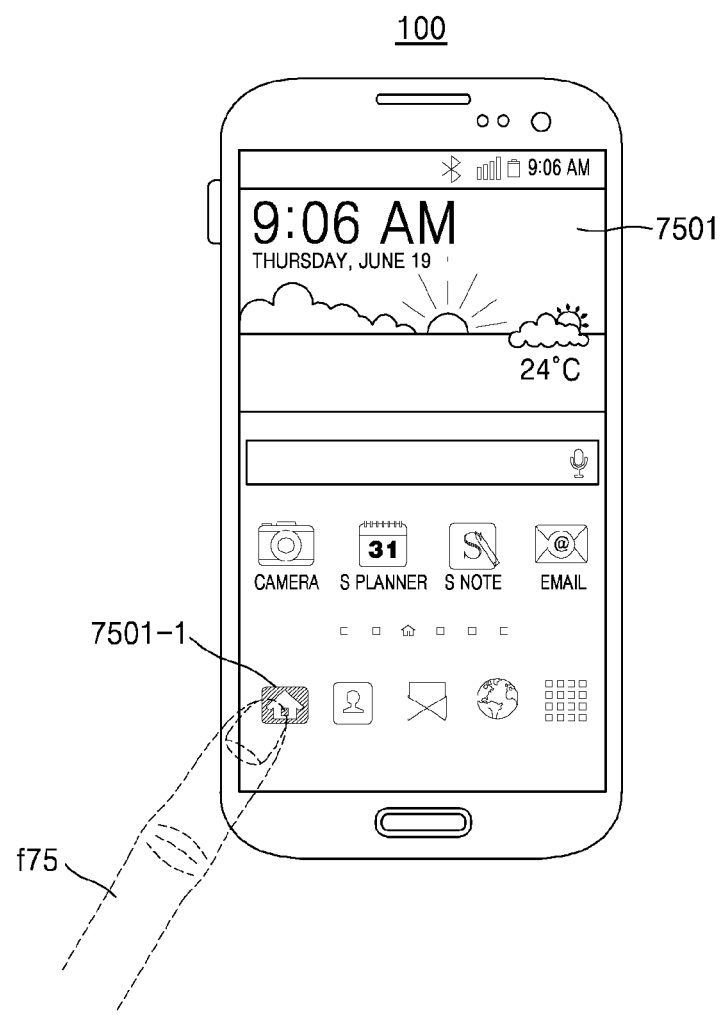

Meanwhile, when the lock screen 7401 is the screen requesting the user to input a pattern or a password, and a user input of inputting, by a finger f74, the pattern or the password is received, the controller 130 may display a home screen 7501 on the display unit 121, as shown in FIG. 75.

While the home screen 7501 is displayed on the display unit 121, the controller 130 may receive a user input of selecting, by a finger f75, identification (ID) information 7501-1 of an application for executing the content. The application for executing the content may be a gallery application, a video reproducing application, an image editing application, a search application, or any other type of application as desired.

Upon receiving the user input of selecting the ID information 7501-1, the controller 130 may display, on the display unit 121, a notification screen requesting the user to input the second biometric information to remove the security on the content. According to a signal for inputting biometric information of the user, the controller 130 may obtain the second biometric information from a biometrics module provided in the device 100. Alternatively, the controller 130 may receive the second biometric information from an external device through the communication unit 150. Upon obtaining the second biometric information, the controller 130 may remove the security on the content based on the second biometric information.

Figure 76:
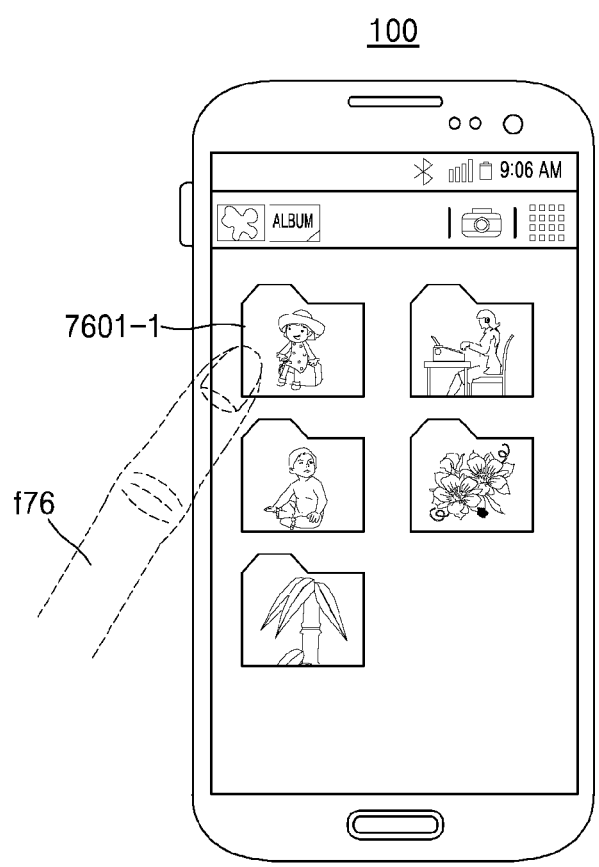

Alternatively, when the user input of selecting the ID information 7501-1 is received, the controller 130 may display an application execution screen 7601 on the display unit 121, as shown in FIG. 76.

While the application execution screen 7601 is displayed, the controller 130 may receive a user input of selecting, by a finger f76, a group 7601-1 including content, such as a folder or a layer.

Upon receiving the user input of selecting the group 7601-1, the controller 130 may display, on the display unit 121, a notification screen requesting the user to input the second biometric information to remove the security on the content. According to a signal for inputting the second biometric information of the user, the controller 130 may obtain the second biometric information from a biometrics module provided in the device 100. Alternatively, the controller 130 may receive the second biometric information from an external device through the communication unit 150. Upon obtaining the second biometric information, the controller 130 may remove the security on the content based on the second biometric information.

Figure 77:
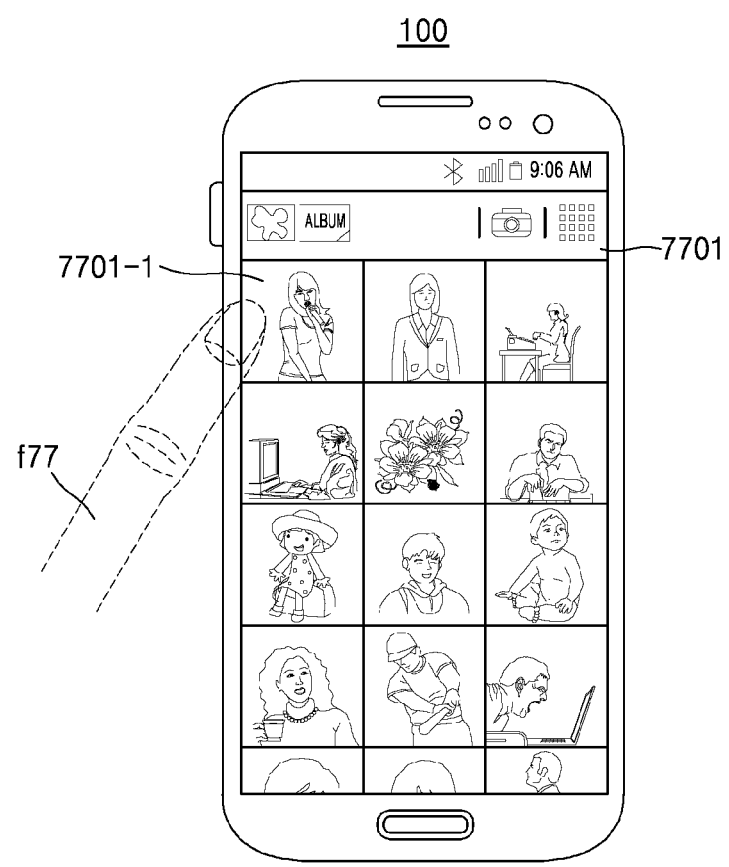

Alternatively, when the user input of selecting the group 7601-1 is received, the controller 130 may display a screen 7701 including ID information 7701-1 of the content on the display unit 121, as shown in FIG. 77. The ID information 7701-1 may include, for example, a file name of the content or a representative image of the content.

While the screen 7701 including the ID information 7701-1 is displayed on the display unit 121, the controller 130 may receive a user input of selecting, by a finger f77, the ID information 7701-1.

Upon receiving the user input of selecting the ID information 7701-1, the controller 130 may display, on the display unit 121, a notification screen requesting the user to input the second biometric information for removing the security on the content. According to a signal for inputting the second biometric information of the user, the controller 130 may obtain the second biometric information from a biometrics module provided in the device 100. Alternatively, the controller 130 may receive the second biometric information from an external device through the communication unit 150. Upon obtaining the second biometric information, the controller 130 may remove the security on the content based on the second biometric information.

Figure 78:
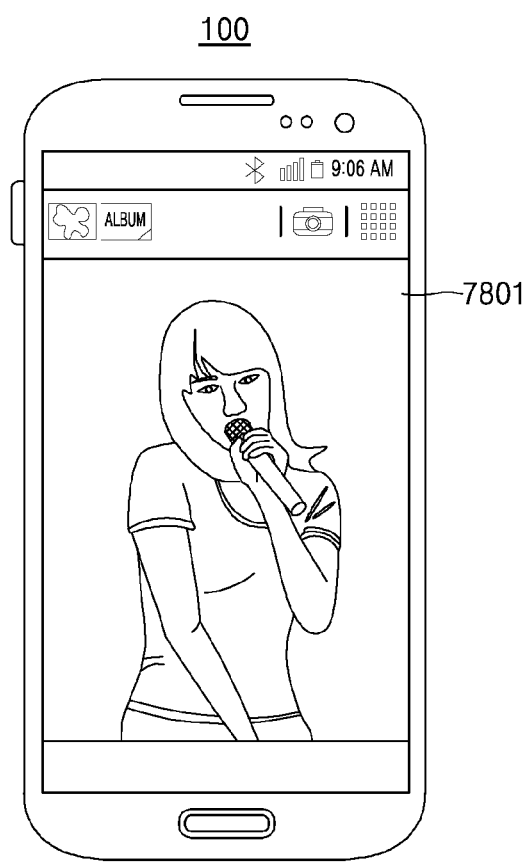

Alternatively, when the user input of selecting the ID information 7701-1 is received, the controller 130 may display content 7801 on the display unit 121 as shown in FIG. 78.

Figure 79:
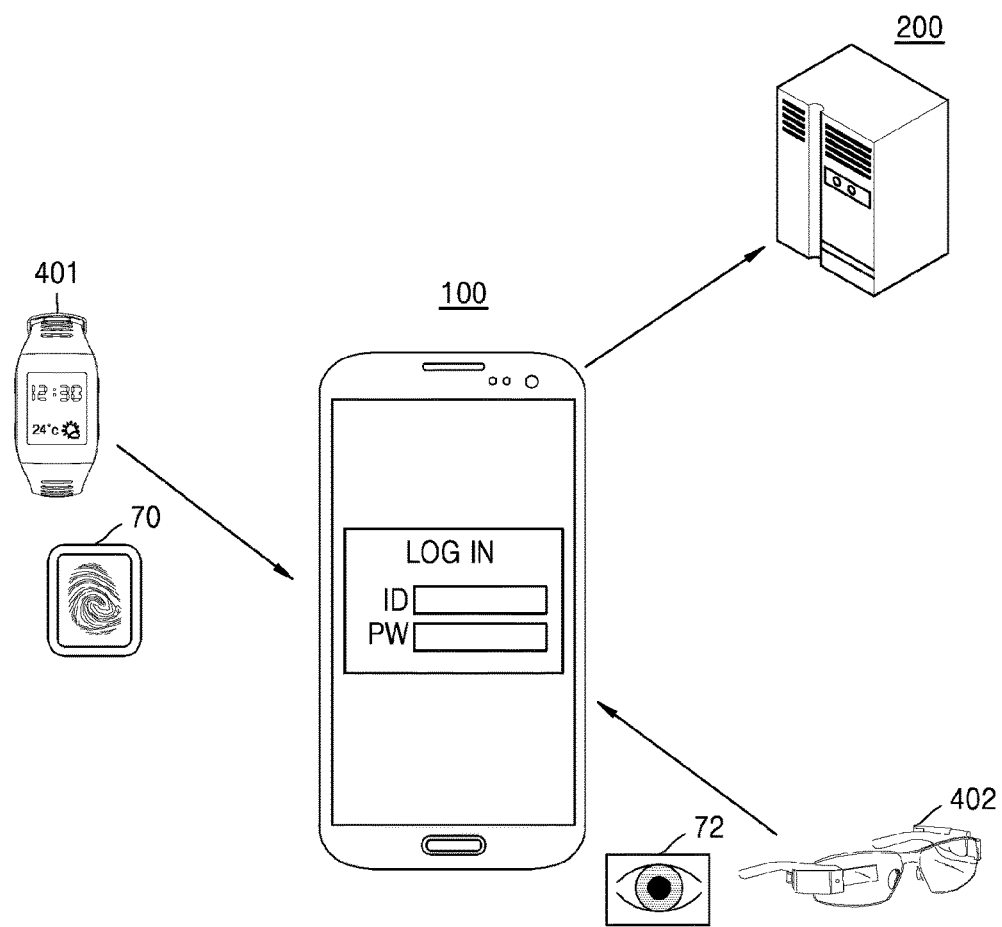
FIG. 79 is a diagram for describing an example of a device logging in to a server, according to an exemplary embodiment.

FIG. 79 is a diagram for describing an example of the device 100 logging in to the server 200, according to an exemplary embodiment.

Referring to FIG. 79, the device 100 (for example, a smart phone) may log in to the server 200. Here, when the device 100 logs in to the server 200, the device 100 may be able to receive information in a certain region (for example, a physical or logical space providing content or certain service of a certain website) on which security is set of the server 200.

For example, a user may input login information to access the certain region of the server 200 through the device 100. The device 100 may transmit the login information to the server 200. When user authentication has succeeded by using the login information, the device 100 may log in to the server 200.

According to an exemplary embodiment, the user may use biometric information as the login information. A plurality of pieces of biometric information may be used as the login information. For example, the user may log in to the server 200 based on first biometric information or second biometric information. Alternatively, the user may log in to the server 200 based on both the first and second biometric information.

In detail, the controller 130 may obtain fingerprint information 70 from a watch type wearable device 701, as the first biometric information. When user authentication has succeeded by using the first biometric information, the controller 130 may obtain a first password corresponding to the first biometric information.

A password corresponding to biometric information may be a value obtained, by the controller 130, from among a plurality of values pre-stored in the memory 170. Alternatively, a password corresponding to biometric information may be a value randomly generated by the controller 130. Alternatively, a password corresponding to biometric information may be a value generated, by the controller 130, by using base biometric information stored in the memory 170, which corresponds to the biometric information. For example, the password corresponding to the biometric information may be a value generated by using at least a part of feature information of the base biometric information as a factor of a certain function (for example, a one-way hash function, such as secure hash algorithm-1 (SHA-1), SHA-256, or SHA-512). A password corresponding to biometric information may be generated after user authentication has succeeded or before user authentication is performed. For example, in the registration mode 201 for registering biometric information, when feature information of base biometric information is stored in the memory 170, a password corresponding to biometric information may be pre-generated and stored by using the feature information of the base biometric information.

A password corresponding to biometric information may be stored in the memory 170, an external server, a wearable device, or a third device.

Then, the device 100 may transmit the first password to the server 200. When user authentication has succeeded by using the first password, the device 100 may receive login acceptance information from the server 200, and log in to the server 200.

Also, the controller 130 may obtain iris information 72 from a glasses type wearable device 702 as second biometric information. When user authentication has succeeded by using the second biometric information, the controller 130 may obtain a second password corresponding to the second biometric information. Since a method of obtaining, by the controller 130, a password corresponding to biometric information has been described above, details thereof are not provided again.

Then, the device 100 may transmit the second password to the server 200. When user authentication has succeeded by using the second password, the device 100 may receive login acceptance information from the server 200 and log in to the server 200.

A method of logging in to a server, according to an exemplary embodiment, will now be described in detail with reference to FIGS. 80 through 97.

Figure 80:
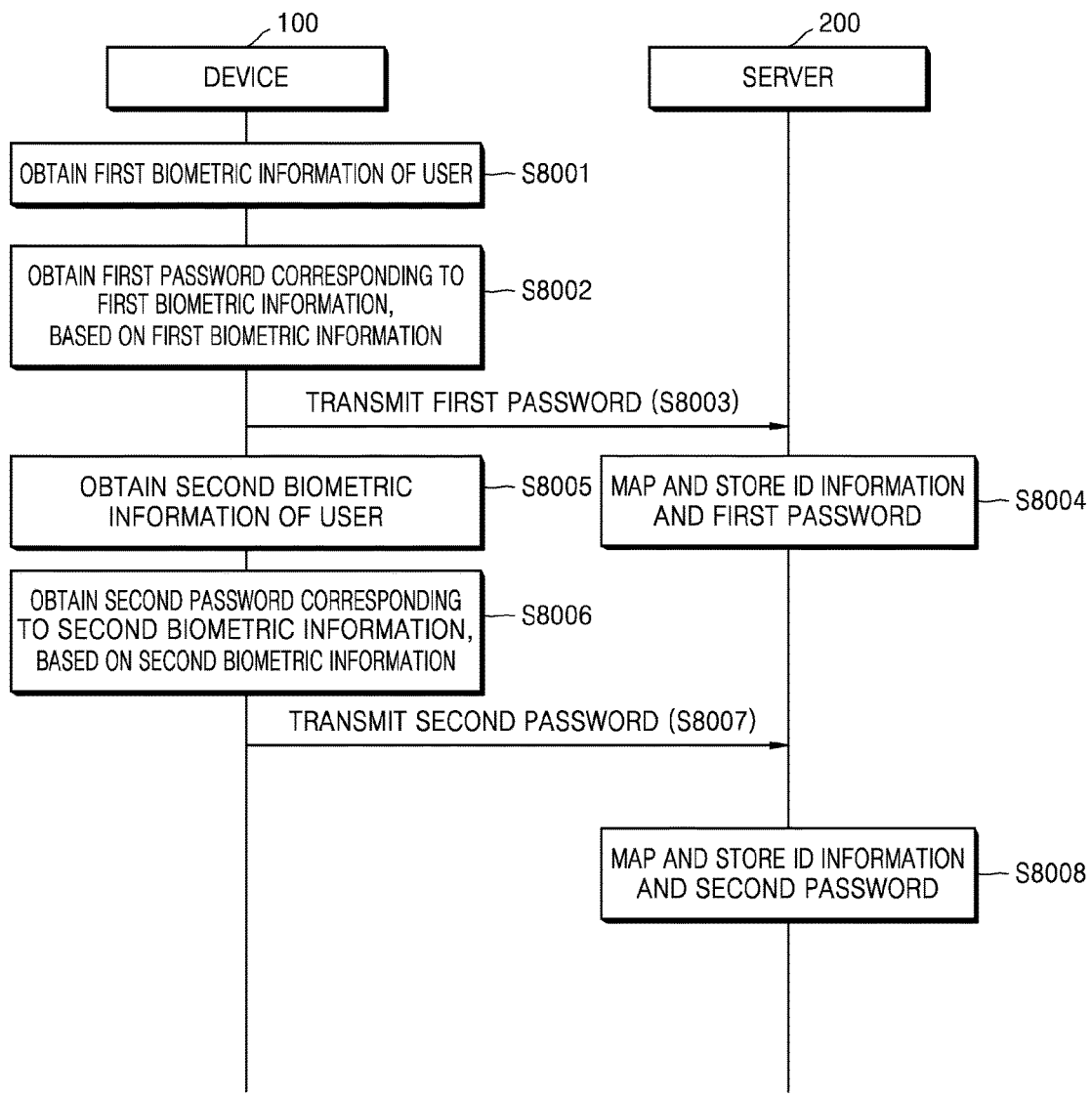
FIG. 80 is a flowchart of a method of registering, by a device, biometric information in a server, according to an exemplary embodiment.

FIG. 80 is a flowchart of a method of registering, by the device 100, biometric information in the server 200, according to an exemplary embodiment.

Referring to FIG. 80, in operation S8001, the device 100 may obtain first biometric information of a user (for example, fingerprint information).

For example, the controller 130 of the device 100 may obtain the first biometric information from a biometrics module included in the device 100. As another example, the device 100 may obtain the first biometric information from an external device.

In operation S8002, the device 100 may obtain a first password corresponding to the first biometric information, based on the first biometric information.

For example, when user authentication has succeeded by using the first biometric information, the controller 130 may obtain the first password corresponding to the first biometric information. Since a method of obtaining, by the controller 130, a password corresponding to biometric information has been described above, details thereof are not provided again.

In operation S8003, the device 100 may transmit the first password to the server 200. The device 100 may transmit ID information of the device 100 or the user together with the first password, or before or after transmitting the first password. The ID information of the device 100 may be a serial number or a media access control (MAC) address of the device 100. Also, the ID information of the user may be a login ID, an email address, or a user specific management number.

In operation S8004, the server 200 may store the first password after mapping the first password to the ID information of the device 100 or the user. Meanwhile, the server 200 may obtain ID information from a third server. For example, when the first password includes biometric information of the user, the server 100 may transmit the first password to a third certificate authority managing biometric information, and obtain the ID information of the user from the third certificate authority.

In operation S8005, the device 100 may obtain second biometric information of the user (for example, iris information).

In operation S8006, the device 100 may obtain a second password corresponding to the second biometric information, based on the second biometric information.

For example, when user authentication has succeeded by using the second biometric information, the controller 130 of the device 100 may obtain the second password corresponding to the second biometric information.

In operation S8007, the device 100 may transmit the second password to the server 200. The device 100 may transmit the ID information of the device 100 or the user together with the second password, or before or after transmitting the second password.

In operation S8008, the server 200 may store the second password after mapping the second password to the ID information of the device 100 or the user. Meanwhile, the server 200 may obtain ID information from a third server.

According to an exemplary embodiment, the first password mapped to the ID information of the device 100 or the user may be pre-stored in the server 200. The server 200 may store the first and second passwords after mapping the first and second passwords to the ID information of the device 100 or the user.

Figure 81:
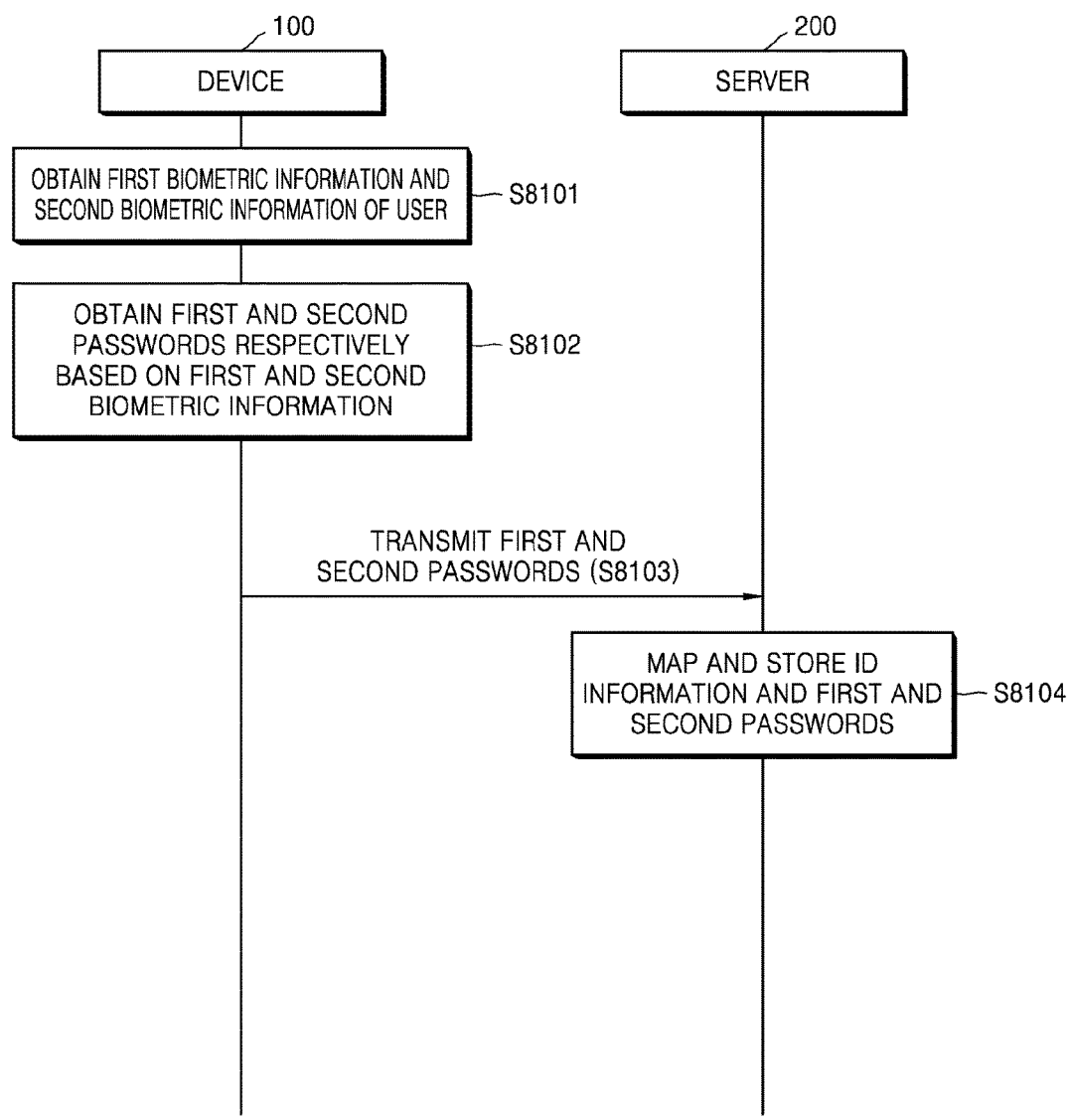
FIG. 81 is a flowchart of a method of registering, by a device, biometric information in a server, according to another exemplary embodiment.

FIG. 81 is a flowchart of a method of registering, by the device 100, biometric information in the server 200, according to another exemplary embodiment.

Referring to FIG. 81, in operation S8101, the device 100 may obtain first biometric information (for example, fingerprint information) and second biometric information (for example, iris information) of a user.

In operation S8102, the device 100 may obtain first and second passwords respectively based on the first and second biometric information. Since methods of obtaining first and second passwords have been described above with reference to FIG. 80, details thereof are not provided again.

In operation S8103, the device 100 may transmit the first and second passwords to the server 200. The device 100 may transmit ID information of the device 100 or the user together with the first and second passwords, or before or after transmitting the first and second passwords.

In operation S8104, the server 200 may store the first and second passwords after mapping the first and second passwords to the ID information of the device 100 or the user. Alternatively, the server 200 may obtain ID information from a third server and map and store the first and second passwords and the ID information.

FIGS. 82 through 85 are diagrams for describing an example of UI provided to register biometric information in the server 200, according to exemplary embodiments.

Figure 82:
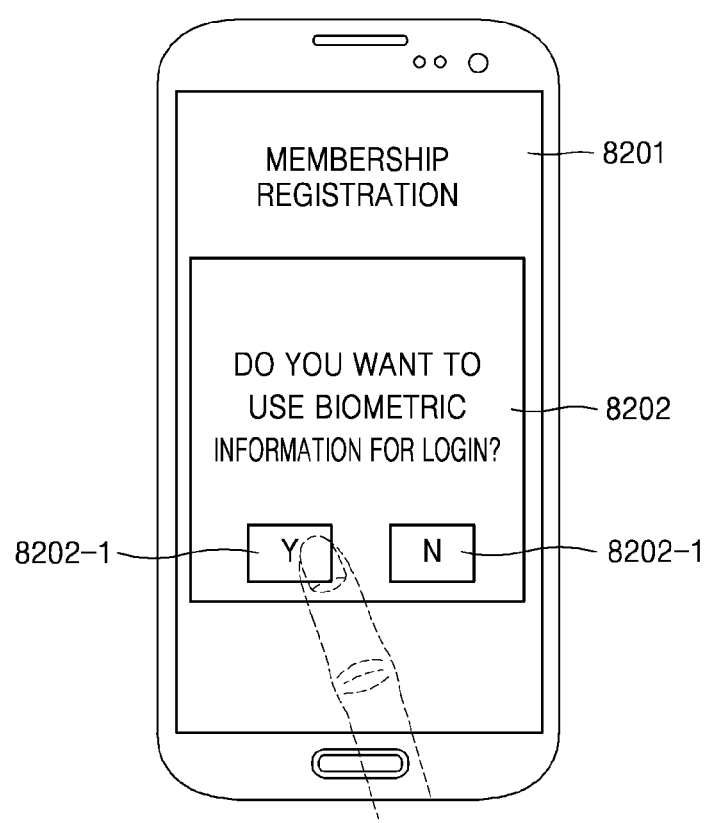
FIGS. 82 through 85 are diagrams for describing an example of a UI provided to register biometric information in a server, according to exemplary embodiments.

As shown in FIG. 82, when a user logs in to the server 200 to receive a certain service, the controller 130 may display, on the display unit 121, a screen 8201 requesting the user to first register as a member. The controller 130 may display, on the display unit 121, a notification screen 8202 asking the user whether to use biometric information for login. Then, the controller 130 may receive a user input of selecting an acceptance button 8202-1 on the notification screen 8202 for using biometric information. However, if the user selects a rejection button 8202-2 on the notification screen 8202, the controller 130 may display, on the display unit 121, a screen requesting the user to input text for setting a password.

Figure 83:
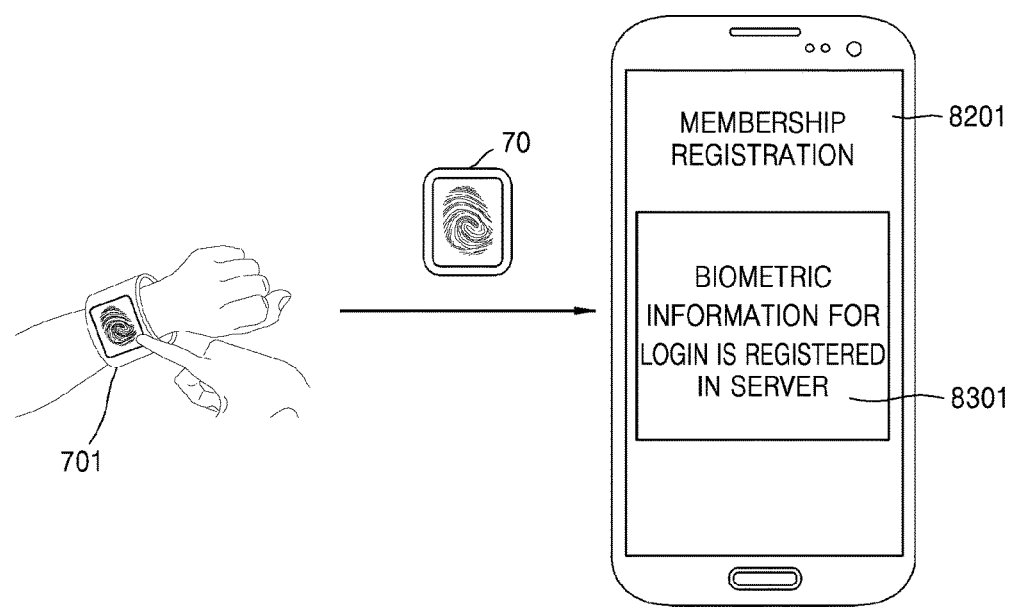

In response to the user input of selecting the acceptance button 8202-1, the controller 130 may obtain the fingerprint information 70, as first biometric information, from the watch type wearable device 701, as shown in FIG. 83. Alternatively, the controller 130 may obtain the first biometric information from a biometrics module provided in the device 100.

The controller 130 may transmit a first password obtained based on the first biometric information to the server 200. When the first password is stored in the server 200 after being mapped to ID information, the controller 130 may display, on the display unit 121, a notification screen 8301 notifying the user that the first biometric information is registered in the server 200.

Figure 84:
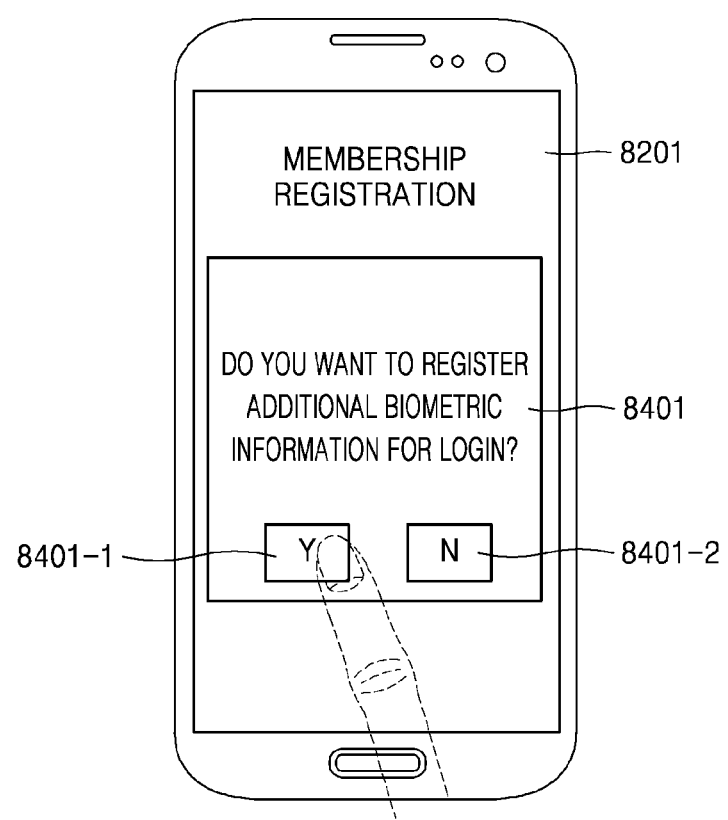

According to an exemplary embodiment, as shown in FIG. 84, the controller 130 may display, on the controller 130, a notification screen 8401 asking the user whether to additionally register biometric information for login. The controller 130 may receive a user input of selecting an acceptance button 8401-1 on the notification screen 8401 to additionally register biometric information. However, if the user selects a rejection button 8401-2 on the notification screen 8401, the controller 130 may end registration of biometric information of login and display, on the display unit 121, a next screen for membership registration.

Figure 85:
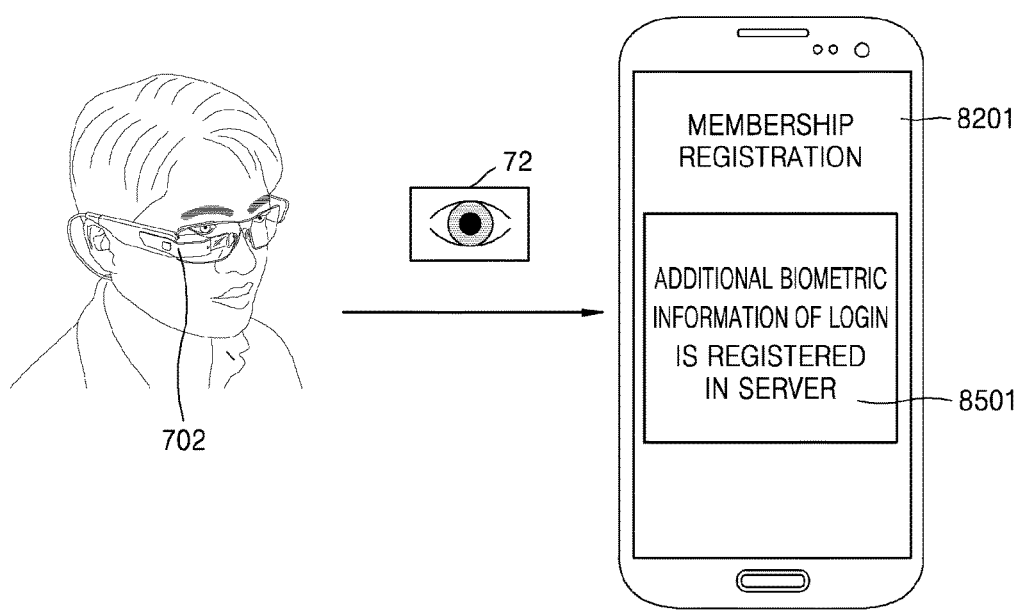

In response to the user input of selecting the acceptance button 8401-1, the controller 130 may obtain the iris information 72, as second biometric information, from the glasses type wearable device 702, as shown in FIG. 85. Alternatively, the controller 130 may obtain the second biometric information from a biometrics module provided in the device 100.

Then, the controller 130 may display, on the display unit 121, a notification screen 8501 notifying the user that the second biometric information is registered in the server 200.

Figure 86A:
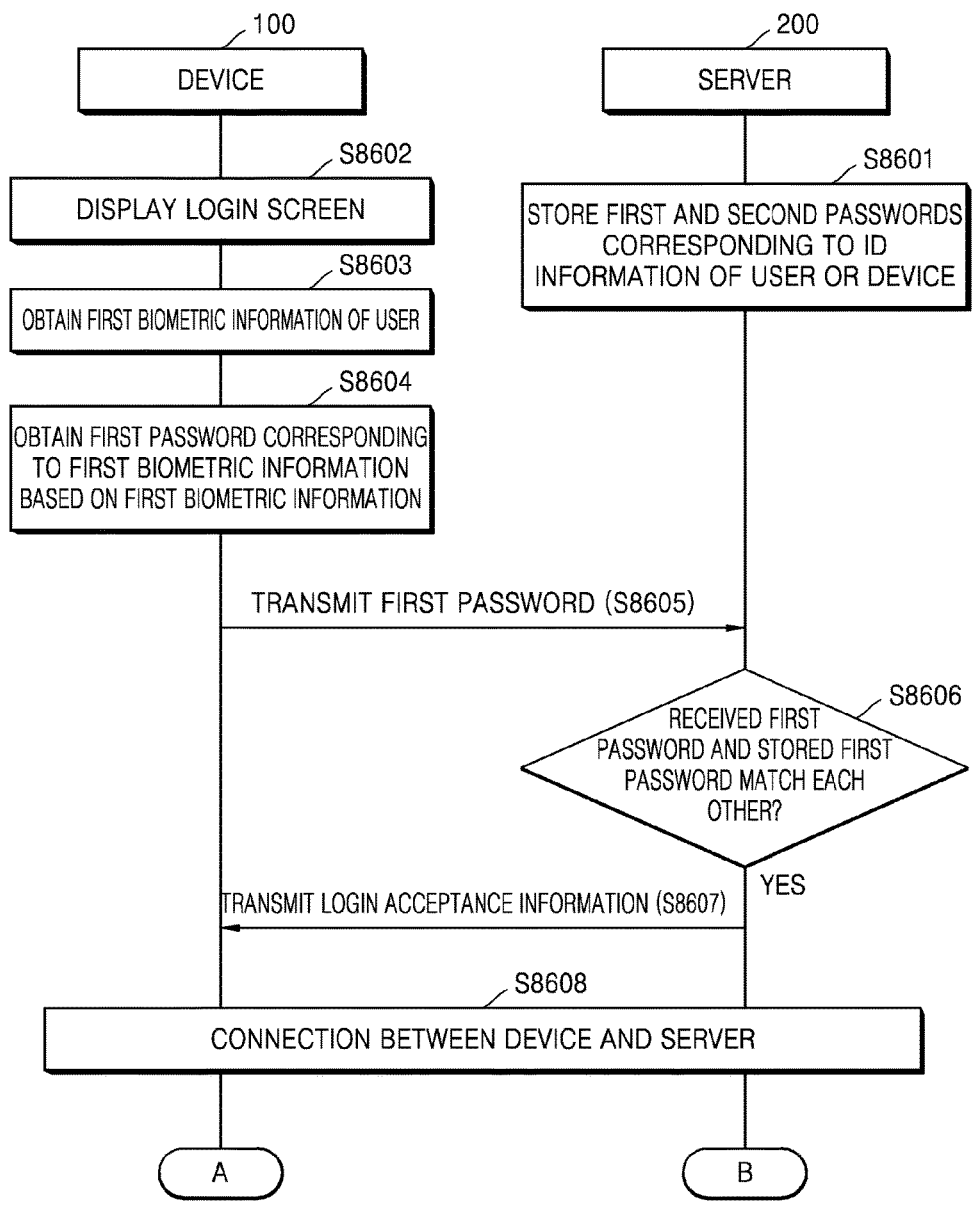
FIGS. 86A and 86B are flowcharts of a method of logging in, by a device, to a server, according to an exemplary embodiment.
Figure 86B:
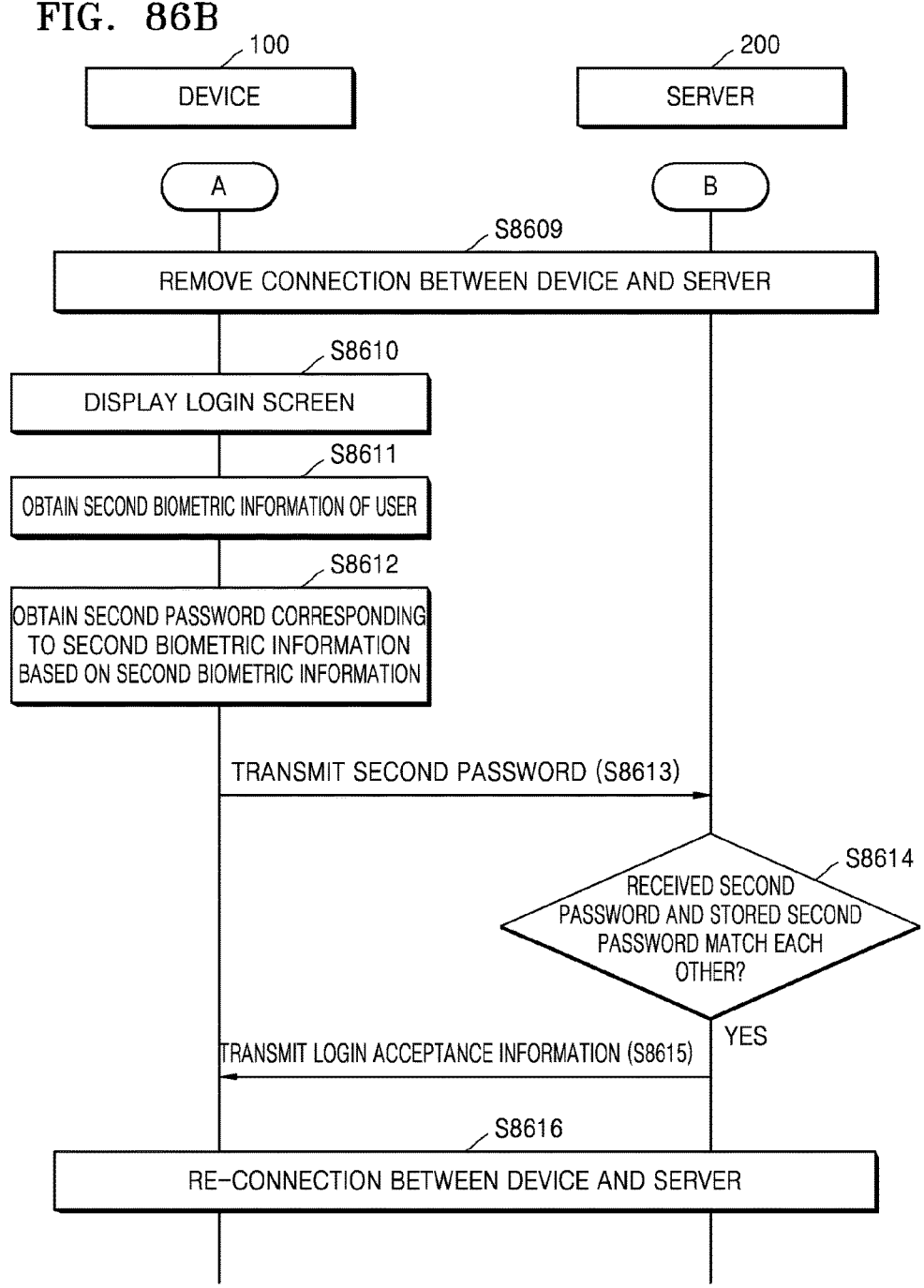

FIGS. 86A and 86B are flowcharts of a method of logging in, by the device 100, to the server 200, according to an exemplary embodiment.

Referring to FIG. 86A, in operation S8601, the server 200 may store first and second passwords corresponding to ID information of the device 100 or a user.

In this case, in operation S8602, the device 100 may display a login screen for accessing a certain service provided by the server 200.

In operation S8603, the device 100 may obtain first biometric information of the user. For example, the device 100 may provide a guide screen requesting the user to input the first biometric information, and obtain the first biometric information according to consent of the user. Alternatively, the device 100 may automatically obtain the first biometric information when the login screen is displayed.

In operation S8604, the device 100 may obtain the first password corresponding to the first biometric information, based on the first biometric information.

For example, when user authentication has succeeded by using the first biometric information, the device 100 may obtain the first password corresponding to the first biometric information. The user authentication may be performed by matching feature information of the first biometric information and feature information of base first biometric information pre-stored in the memory 170. When a matching score calculated as a matching result is equal to or higher than a certain threshold value, the controller 130 may determine that the user authentication has succeeded, The first password corresponding to the first biometric information may be obtained, by the controller 130, correspondingly to the first biometric information when the first biometric information is registered in the server 200. The controller 130 may obtain the first password corresponding to the first biometric information from the memory 170, an external server, a wearable device, or a third device.

In operation S8605, the device 100 may transmit the first password corresponding to the first biometric information to the server 200. The device 100 may transmit the first password together with the ID information of the device 100 or the user, or before or after transmitting the first password.

In operation S8606, the server 200 may determine whether the received first password matches the stored first password. In detail, the server 200 may obtain the stored first password corresponding to the first biometric information, which is mapped to the received ID information, and determine whether the received first password and the stored first password match each other.

When the received first password and the stored first password match each other, the server 200 may transmit login acceptance information to the device 100 in operation S8607.

Upon receiving the login acceptance information, the device 100 may access the certain service provided by the server 200 in operation S8608. In other words, the device 100 and the server 200 may be connected to each other for transmission and reception of content related to the certain service.

Referring to FIG. 86B, the connection for transmission and reception of content related to the certain service between the device 100 and the server 200 may be removed in operation S8609. For example, the connection may be released in response to a user input of removing login, i.e., logging out, through the device 100.

In operation S8610, after the connection is removed, the device 100 may display a login screen for accessing the certain service provided by the server 200 in response to a user input for re-logging in to the server 200.

In operation S8611, the device 100 may obtain second biometric information that is of a different type than the first biometric information obtained in operation S8603. For example, the device 100 may provide guide information requesting the user to select one of the first biometric information and the second biometric information, and may obtain the second biometric information according to a user input of selecting the second biometric information. Alternatively, the device 100 may automatically obtain the second biometric information when the login screen is displayed.

In operation S8612, the device 100 may obtain a second password corresponding to the second biometric information based on the second biometric information. Since methods of obtaining first and second passwords have been described above with reference to FIG. 79, details thereof are not provided again.

In operation S8613, the device 100 may transmit the second password corresponding to the second biometric information to the server 200. The device 100 may transmit the second password together with the ID information of the device 100 or the user, or before or after transmitting the second password.

In operation S8614, the server 200 may determine whether the received second password and the stored second password match each other. In detail, the server 200 may obtain the stored second password corresponding to the second biometric information, which is mapped to the received ID information, and determine whether the received second password and the stored second password match each other.

When the received second password and the stored second password match each other, the server 200 may transmit login acceptance information to the device 100 in operation S8615.

Upon receiving the login acceptance information, the device 100 is able to access the certain service provided by the server 200, in operation S8616. In other words, the device 100 and the server 200 may be re-connected to each other for transmission and reception of content related to the certain service.

Figure 87:
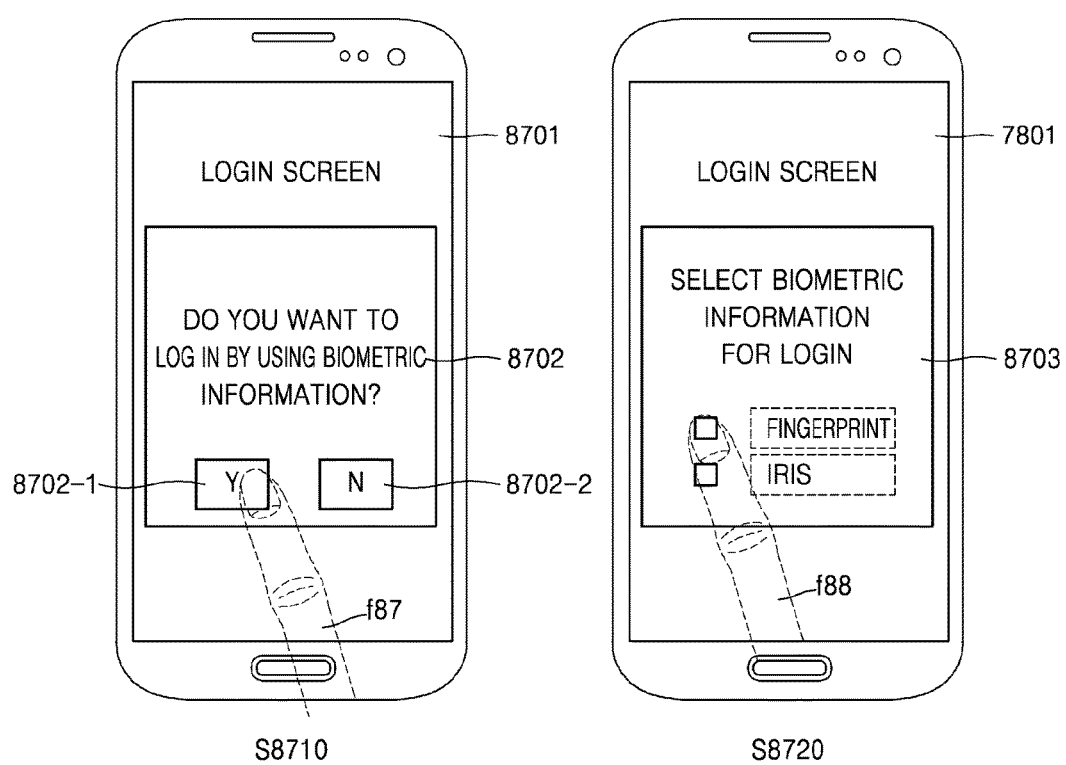
FIGS. 87 through 88B are diagrams for describing examples of a UI provided for a device to log in to a server, according to exemplary embodiments.
Figure 88A:
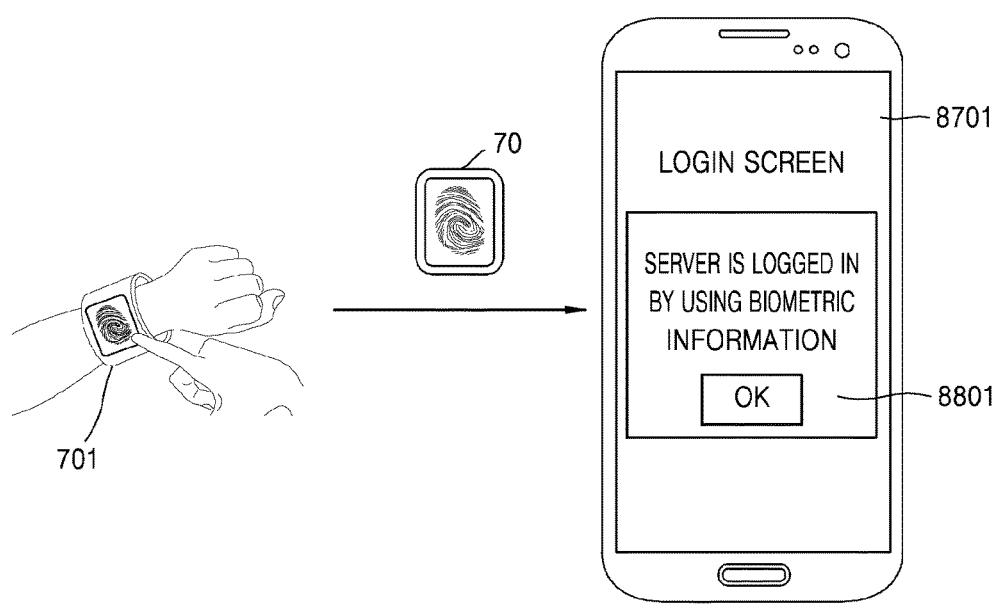
Figure 88B:
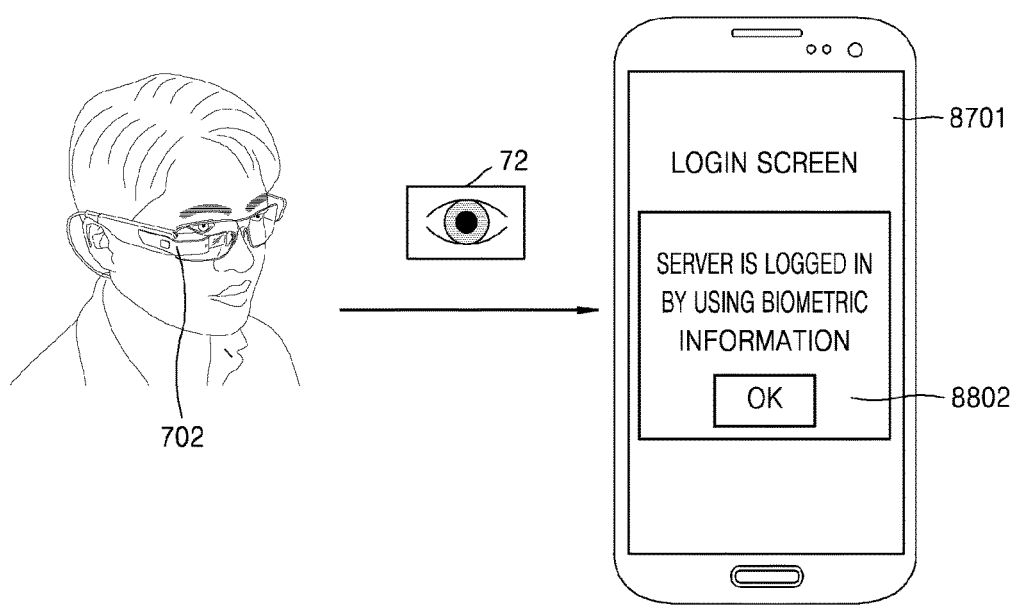

FIGS. 87 through 88B are diagrams for describing examples of a UI provided for the device 100 to log in to the server 200, according to exemplary embodiments.

As shown in FIG. 87 at S8710, the controller 130 may display, on the display unit 121, a login screen 8701 for accessing a certain service provided by the server 200. The controller 130 may display, on the display unit 121, a notification screen 8702 asking the user whether to log in to the server 200 by using biometric information. The controller 130 may receive a user input selecting, by a finger f87, an acceptance button 8702-1 on the notification screen 8702 agreeing to use biometric information for login. However, if the user selects a rejection button 8702-2 on the notification screen 8702, the controller 130 may display, on the display unit 121, a screen requesting the user to input a password for login.

In response to the user input of selecting the acceptance button 8701-1, the controller 130 may display, on the display unit 121, a notification screen 8702 for selecting biometric information, as shown in FIG. 87 at S8720. When there are first biometric information (for example, fingerprint information) and second biometric information (for example, iris information) as biometric information for login, the controller 130 may receive a user input of selecting, by a finger f88, the first biometric information.

In response to the user input of selecting the first biometric information, the controller 130 may obtain the fingerprint information 70 as the first biometric information from the watch type wearable device 701, as shown in FIG. 88A. Alternatively, the controller 130 may obtain the first biometric information from a biometrics module provided in the device 100.

The controller 130 may obtain a first password corresponding to the first biometric information based on the first biometric information. For example, when user authentication has succeeded by using the first biometric information, the controller 130 may obtain the first password corresponding to the first biometric information.

The controller 130 may transmit the first password to the server 200. Upon receiving login acceptance information, the controller 130 may display, on the display unit 121, a notification screen 8801 notifying the user that the server 200 is logged in by using biometric information.

Meanwhile, at S8720 in FIG. 87, the controller 130 may receive a user input of selecting the second biometric information (for example, iris information).

In this case, as shown in FIG. 88B, the controller 130 may obtain the iris information 72 as the second biometric information from the glasses type wearable device 702. Alternatively, the controller 130 may obtain the second biometric information from a biometrics module provided in the device 100.

The controller 130 may obtain a second password corresponding to the second biometric information based on the second biometric information. For example, when user authentication has succeeded by using the second biometric information, the controller 130 may obtain the second password corresponding to the second biometric information. The controller 130 may transmit the second password to the server 200. Upon receiving login acceptance information, the controller 130 may display, on the display unit 121, a notification screen 8802 notifying the user that the server 200 is logged in by using biometric information.

Figure 89:
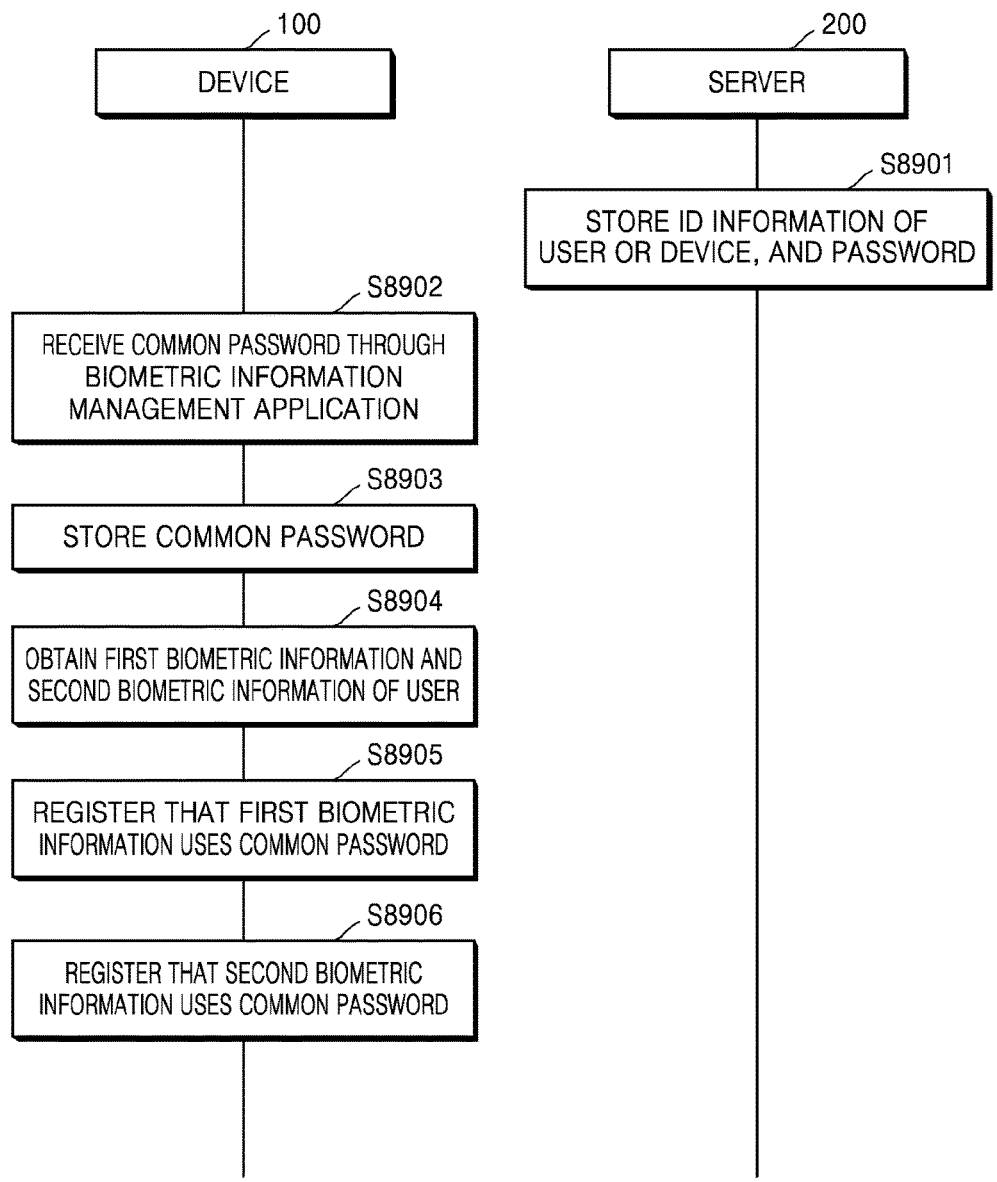
FIG. 89 is a flowchart of a method of registering, by a device, biometric information in a server, according to another exemplary embodiment.

FIG. 89 is a flowchart of a method of registering, by the device 100, biometric information in the server 200, according to another exemplary embodiment.

Referring to FIG. 89, in operation S8901, the server 200 may store ID information of a user of the device 100 required for login, and a password mapped to the ID information.

In operation S8902, the device 100 may receive a common password from the user to log in to the server 200, through a biometric information management application. The common password may be a password commonly used to log in to the server 200 regardless of a type of biometric information.

The device 100 may receive the ID information of the user or the device 100, together with the common password. Alternatively, the ID information of the user or the device may be received before or after the common password is received.

In operation S8903, the device 100 may store the common password. When the controller 130 received the ID information of the user or the device 100, the controller 130 may store the common password after mapping the common password to the ID information of the user or the device 100.

In operation S8904, the device 100 may obtain first biometric information (for example, fingerprint information) and second biometric information (for example, iris information) of the user.

In operation S8905, when user authentication has succeeded by using the first biometric information, the device 100 may register that the first biometric information uses the common password. Also, in operation S8906, when user authentication has succeeded by using the second biometric information, the device 100 may register that the second biometric information uses the common password. User authentication may be performed by matching feature information of obtained biometric information and feature information of pre-stored base biometric information. The controller 130 may determine that user authentication has succeeded when a matching score calculated as a matching result is equal to or higher than a certain threshold value.

According to an exemplary embodiment, the controller 130 may register information about biometric information using a common password. For example, the controller 130 registering that the first and second biometric information use the common password may mean that biometric information using the common password is the first and second biometric information.

FIGS. 90 through 94 are diagrams for describing examples of a UI provided to register biometric information in the server 200, according to other exemplary embodiments.

Figure 90:
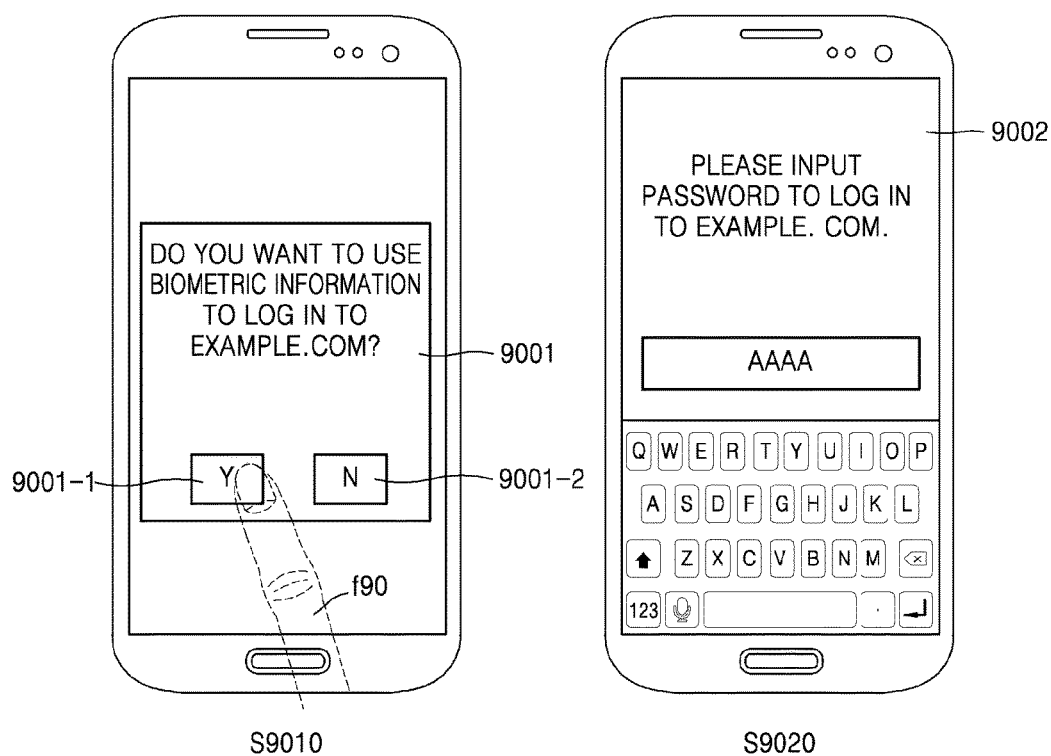
FIGS. 90 through 94 are diagrams for describing examples of a UI provided to register biometric information in a server, according to other exemplary embodiments.

As shown in FIG. 90 at S9010, the controller 130 may display, on the display unit 121, a notification screen 9001 asking a user whether to use biometric information to login to a certain service (for example, a certain website) provided by the server 200. Then, the controller 130 may receive a user input of selecting, by a finger f90, an acceptance button 9001-1 on the notification screen 9001 to use biometric information.

In response to the user input of selecting the acceptance button 9001-1, the controller 130 may display, on the display unit 121, a screen 9002 requesting the user to input a common password for logging in to the server 200, as shown at S9020. When the common password is input from the user, the controller 130 may store the common password.

Figure 91:
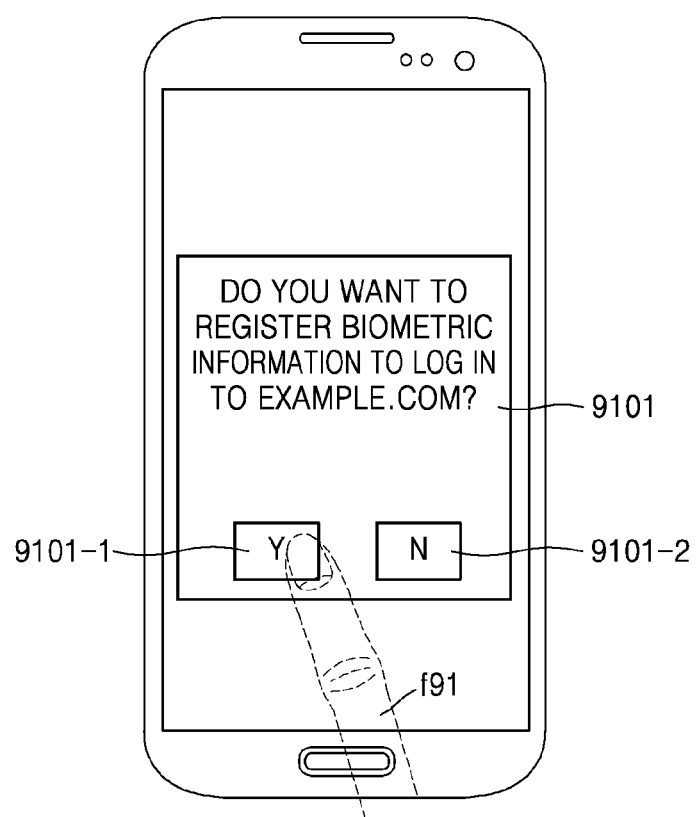

Then, as shown in FIG. 91, the controller 103 may display, on the display unit 121, a notification screen 9101 asking the user whether to register biometric information for login. Then, the controller 130 may receive a user input of selecting, by a finger f91, an acceptance button 9101-1 on the notification screen 9101 to register biometric information.

Figure 92:
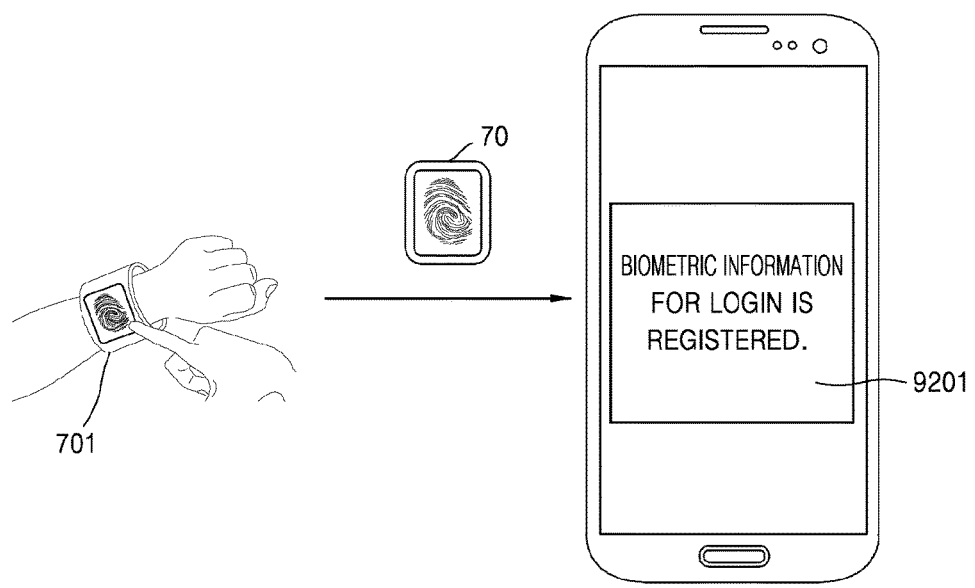

In response to the user input of selecting the acceptance button 9101-1, the controller 130 may obtain the fingerprint information 70 as first biometric information from the watch type wearable device 701, as shown in FIG. 92. Alternatively, the controller 130 may receive the first biometric information from a biometrics module provided in the device 100.

When user authentication has succeeded by using the first biometric information, the controller 130 may register that the first biometric information uses the common password.

The controller 130 may display, on the display unit 121, a notification screen 9201 indicating that the first biometric information is registered to use the common password.

Figure 93:
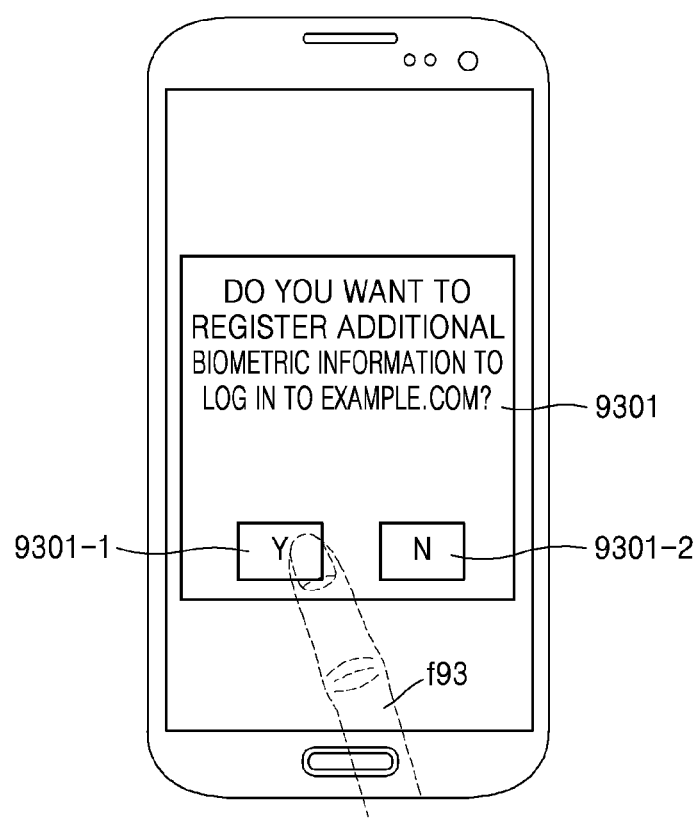

Then, as shown in FIG. 93, the controller 130 may display, on the display unit 121, a notification screen 9301 asking the user whether to additionally register biometric information for login. Then, the controller 130 may receive a user input of selecting, by a finger f93, an acceptance button 9301-1 on the notification screen 9301 to additionally register biometric information. Meanwhile, if the user selects a rejection button 9301-2 on the notification screen 9301, the controller 130 may end the additional registration of biometric information for login.

Figure 94:
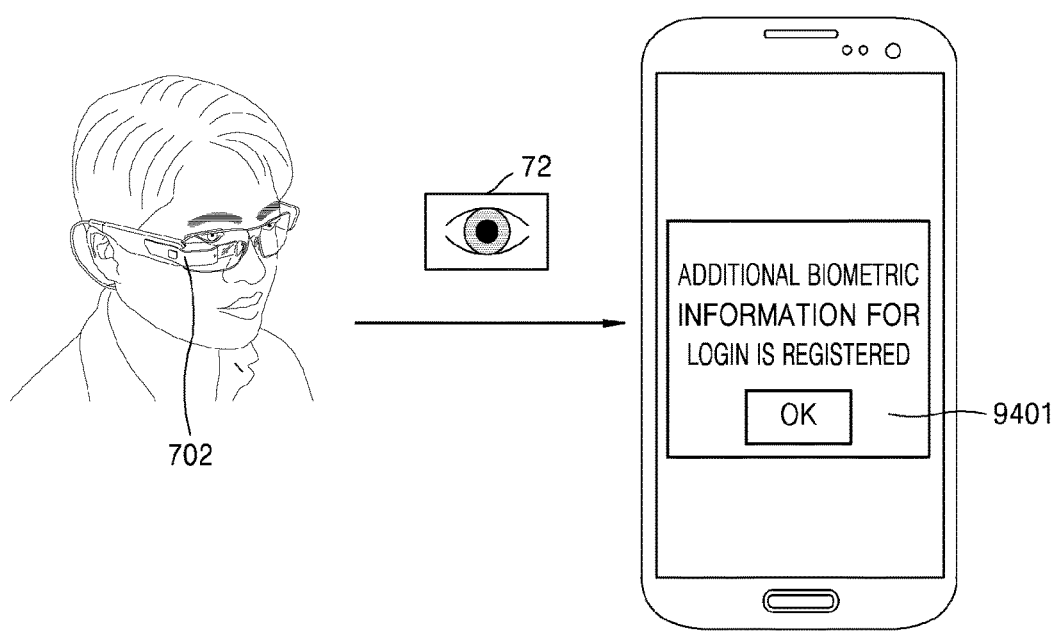

In response to the user input selecting the acceptance button 9301-1, the controller 130 may obtain the iris information 72 as second biometric information from the glasses type wearable device 702, as shown in FIG. 94. Alternatively, the controller 130 may obtain the first biometric information from a biometrics module provided in the device 100.

When user authentication has succeeded by using the second biometric information, the controller 130 may register that the second biometric information uses the common password. The controller 130 may display, on the display unit 121, a notification screen 9401 indicating that the second biometric information is registered to use the common password.

Figure 95A:
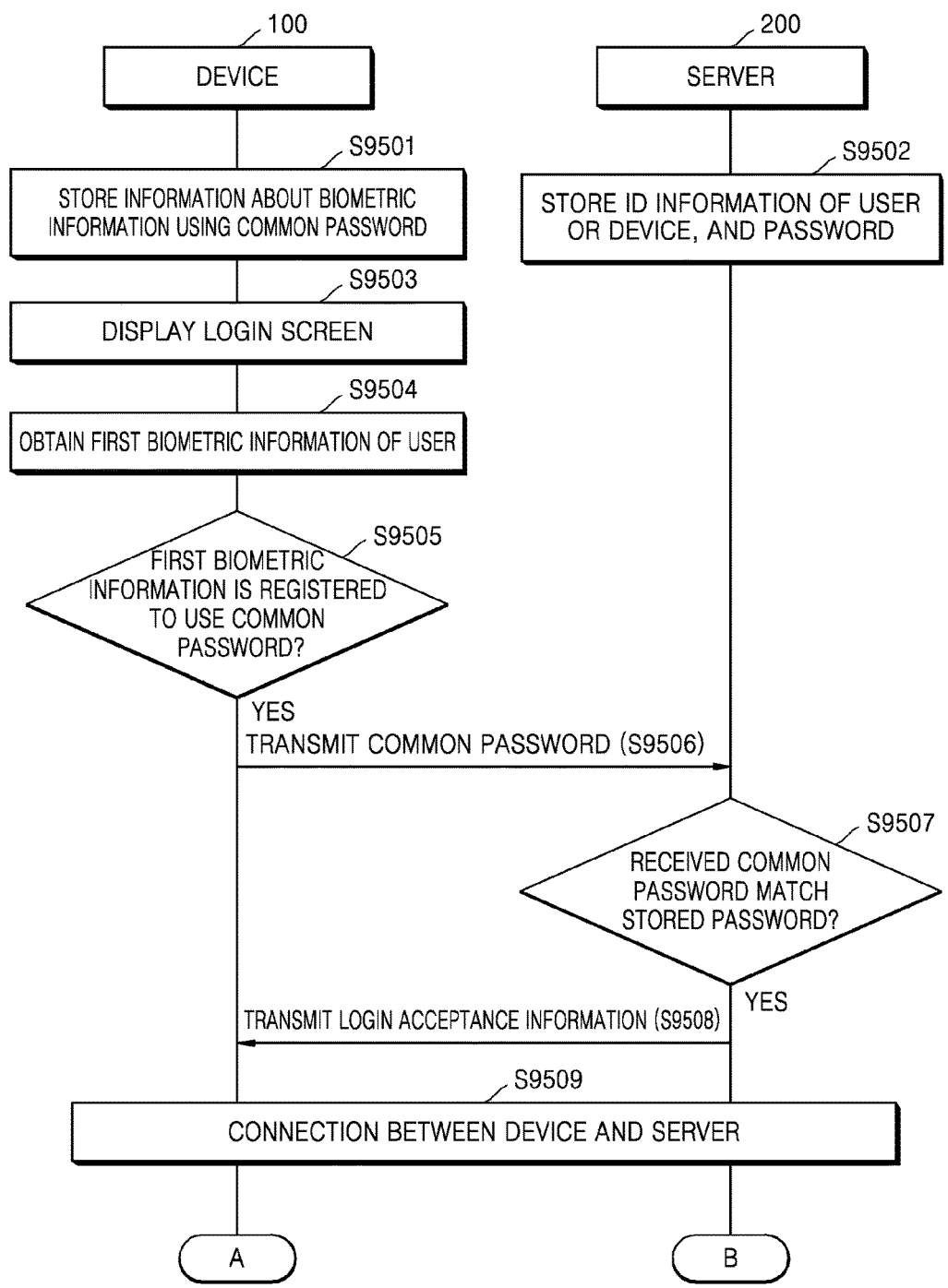
FIGS. 95A and 95B are flowcharts of a method of accessing, by a device, a server, according to an exemplary embodiment.
Figure 95B:
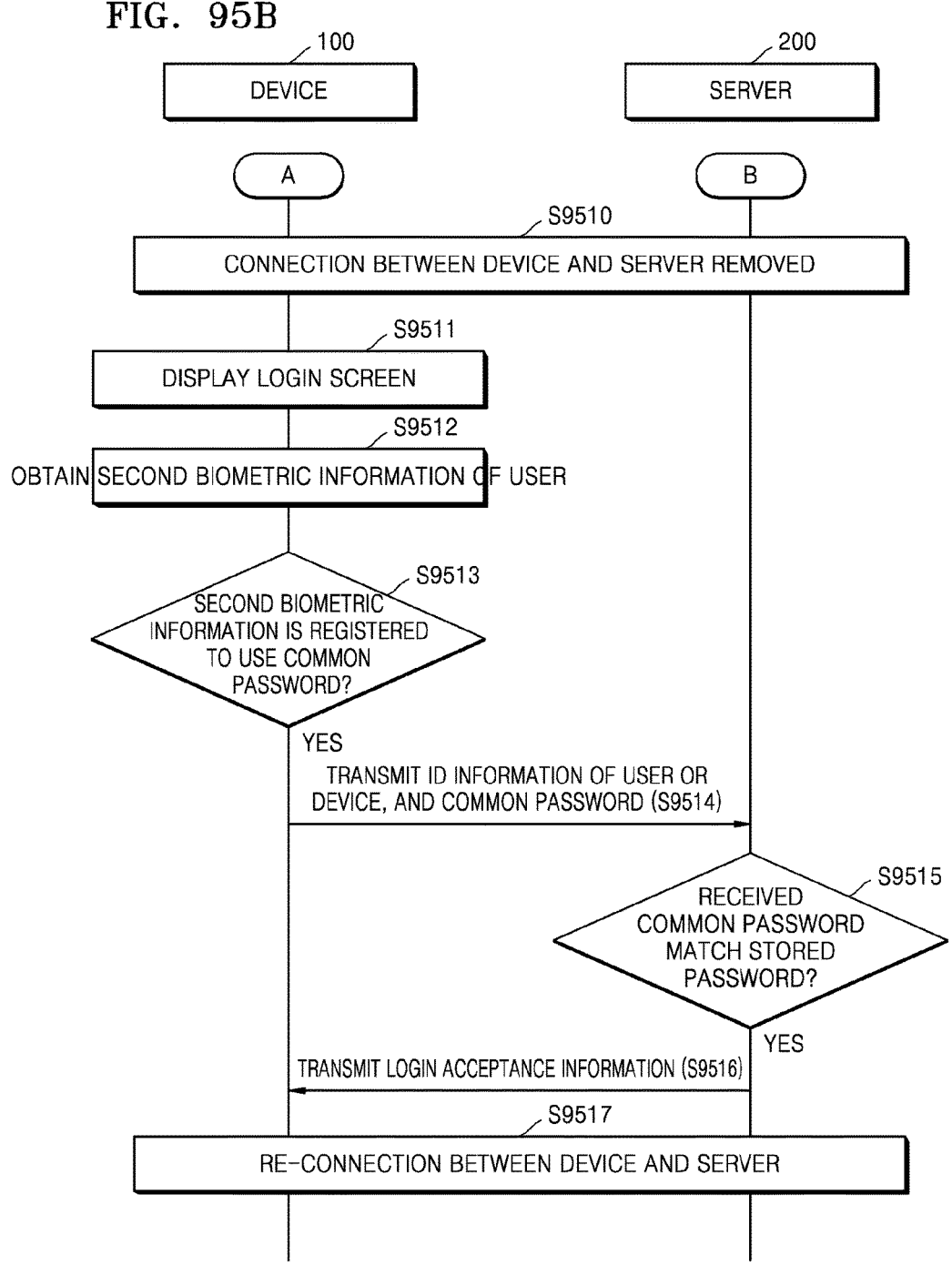

FIGS. 95A and 95B are flowcharts of a method of accessing, by the device 100, the server 200, according to an exemplary embodiment.

Referring to FIG. 95A, in operation S9501, the device 100 may store a common password required to log in to the server 200, and information about biometric information using the common password.

Also, in operation S9502, the server 200 may store ID information of a user or the device 100, and a password mapped to the ID information.

In operation S9503, the device 100 may display a login screen for accessing a certain service provided by the server 200.

In operation S9504, the device 100 may obtain first biometric information of the user. For example, the device 100 may provide a notification screen asking the user whether to use biometric information to access the server 200 through a biometric information management application, and obtain the first biometric information according to consent of the user. Alternatively, the device 100 may automatically obtain the first biometric information from the user when the login screen is displayed.

In operation S9505, the device 100 may determine whether the first biometric information is registered to use the common password based on the first biometric information. For example, when user authentication has succeeded by using the first biometric information, the device 100 may determine whether the first biometric information is registered as biometric information for using the common password. The user authentication may be performed by matching feature information of the obtained first biometric information and feature information of pre-stored base first biometric information.

When it is determined that the first biometric information is registered to use the common password, the device 100 may transmit the ID information of the user or the device 100 and the common password to the server 200 in operation S9506. Alternatively, the ID information of the user or the device 100 may be transmitted before or after the common password is transmitted.

In operation S9507, the server 200 may determine whether the received ID information of the user or the device 100 and the received common password match the stored ID information of the user or the device 100 and the stored password. When the received ID information of the user or the device 100 and the received common password match the stored ID information of the user or the device 100 and the stored password, the server 200 may transmit login acceptance information to the device 100, in operation S9508.

Upon receiving the login acceptance information, the device 100 may access the certain service provided by the server 200, in operation S9509. In other words, the device 100 and the server 200 may be connected to each other for transmission and reception of content related to the certain service.

Referring to FIG. 95B, in operation S9510, a connection between the device 100 and the server 200 for transmission and reception of content related to the certain service may be removed. For example, the connection may be removed in response to a user input of removing logging in, i.e., logging out, through the device 100.

In operation S9511, after the connection is removed, the device 100 may display, on the display unit 121, a login screen for accessing the certain service provided by the server 200, in response to a user input to re-log in to the server 200.

In operation S9512, the device 100 may obtain second biometric information of the user, which is of a different type than the first biometric information obtained in operation S9504. For example, the device 100 may provide guide information requesting the user to select one of the first biometric information and the second biometric information, and obtain the second biometric information according to a user input of selecting the second biometric information. Alternatively, the device 100 may automatically obtain the second biometric information from the user when the login screen is displayed.

In operation S9513, the device 100 may determine whether the second biometric information is registered to use the common password, based on the second biometric information. For example, when user authentication has succeeded by using the second biometric information, the device 100 may determine whether the second biometric information is registered as biometric information for using the common password. The user authentication may be performed by matching feature information of the obtained second biometric information and feature information of pre-stored base second biometric information.

When it is determined that the second biometric information is registered to use the common password, the device 100 may transmit the ID information of the user or the device 100 and the common password to the server 200 in operation S9514.

In operation S9515, the server 200 may determine whether the received ID information of the user or the device 100 and the received common password match the stored ID information of the user or the device 100 and the stored password. When the received ID information of the user or the device 100 and the received common password match the stored ID information of the user or the device 100 and the stored password, the server 200 may transmit login acceptance information to the device 100, in operation S9516.

Upon receiving the login acceptance information, the device 100 may access the certain service provided by the server 200, in operation S9517. In other words, the device 100 and the server 200 may be re-connected to each other for transmission and reception of content related to the certain service.

Figure 96:
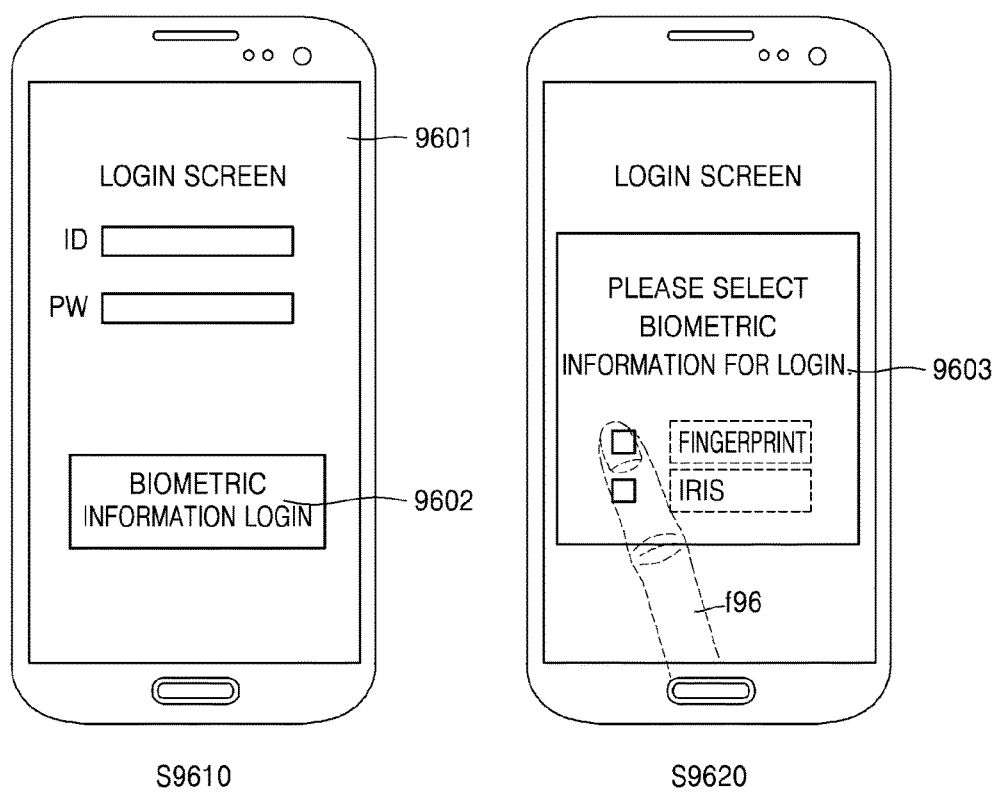
FIGS. 96 through 97B are diagrams for describing examples of a UI provided for a device to log in to a server, according to other exemplary embodiments.
Figure 97A:
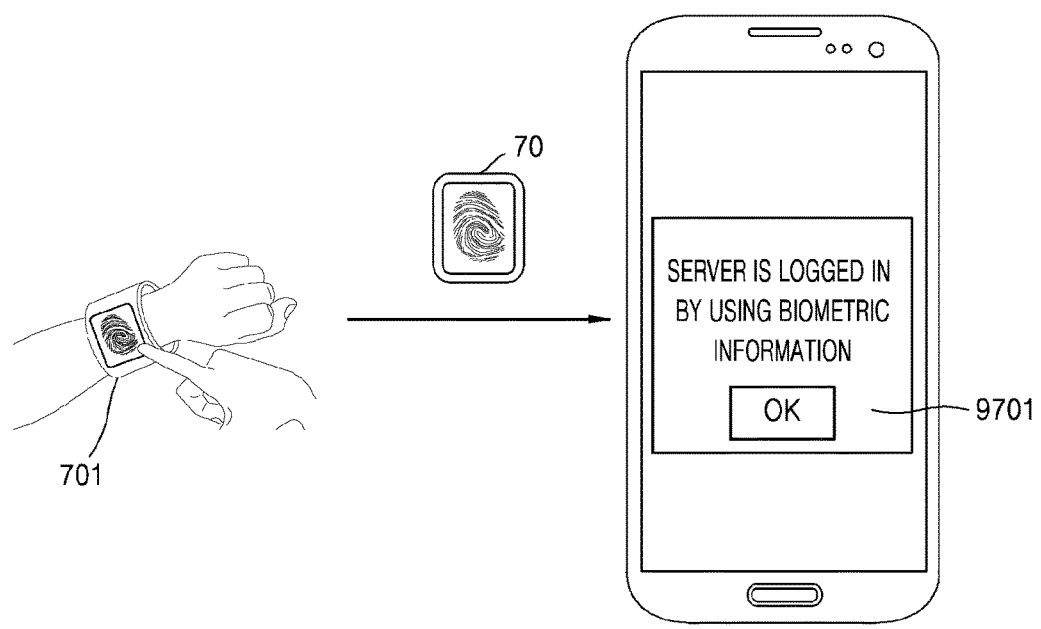
Figure 97B:
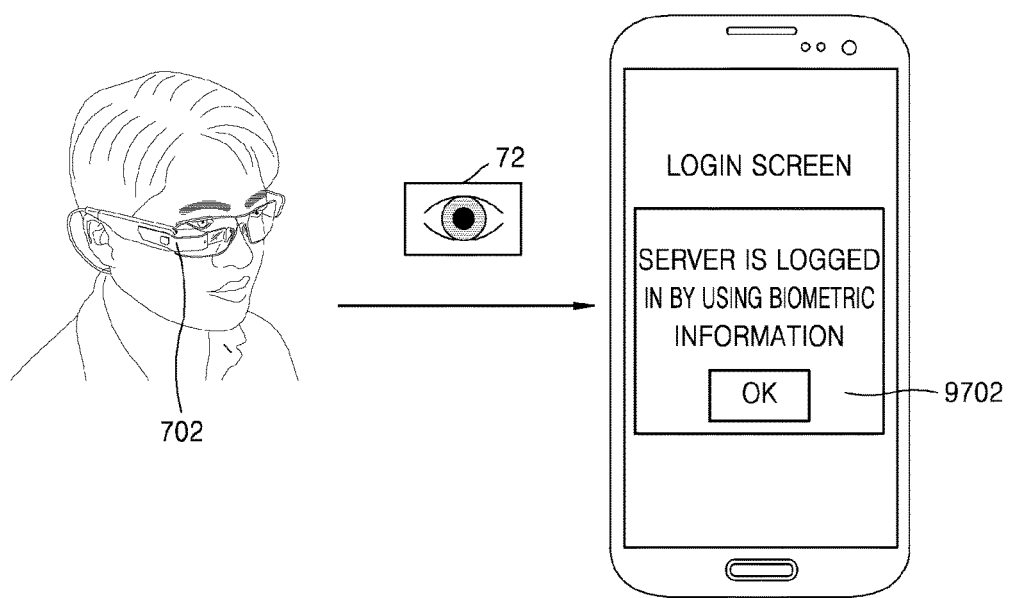

FIGS. 96 through 97B are diagrams for describing examples of a UI provided for the device 100 to log in to the server 200, according to other exemplary embodiments.

As shown in FIG. 96 at S9610, the controller 130 may display, on the display unit 121, a login screen 9601 for accessing a certain service provided by the server 200.

According to an exemplary embodiment, when a biometric information management application is managing a common password for logging in to the server 200. The controller 130 may display, on the display unit 121, a biometric information login button 9602 for login using biometric information. The controller 130 may receive a user input of selecting the biometric information login button 9602.

As shown at S9620, in response to the user input, the controller 130 may display, on the display unit 121, a notification screen 9603 for selecting biometric information. When there are first biometric information (for example, fingerprint information) and second biometric information (for example, iris information) as biometric information for login, the controller 130 may receive a user input of selecting the first biometric information.

In response to the user input of selecting the first biometric information, the controller 130 may obtain the fingerprint information 71 as the first biometric information from the watch type wearable device 701, as shown in FIG. 97A. Alternatively, the controller 130 may obtain the first biometric information from a biometrics module provided in the device 100.

The controller 130 may obtain a common password based on the first biometric information. For example, when user authentication has succeeded by using the first biometric information, the controller 130 may obtain a first password corresponding to the first biometric information through the biometric information management application.

Then, the controller 130 may transmit the first password to the server 200. Upon receiving login acceptance information, the controller 130 may display, on the display unit 121, a notification screen 9701 indicating that the server 200 is logged in by using biometric information.

Alternatively, the controller 130 may receive a user input of selecting the second biometric information in FIG. 96 at S9620. According to an exemplary embodiment, as shown in FIG. 97B, the controller 130 may obtain the iris information 72 as the second biometric information from the glasses type wearable device 702. Alternatively, the controller 130 may obtain the second biometric information from a biometrics module provided in the device 100.

The controller 130 may obtain the common password based on the second biometric information. For example, when user authentication has succeeded by using the second biometric information, the controller 130 may obtain the common password through the biometric information management application. Also, the controller 130 may transmit the common password to the server 200. Upon receiving login acceptance information, the controller 130 may display, on the display unit 121, a notification screen 9702 indicating that the server 200 is logged in by using biometric information.

The one or more exemplary embodiments described above are only examples and thus are not limited thereto. Also, the orders of the operations of the methods described above are not limited, and at least one operation may be omitted, an operation may be added to the method, or the order may be changed, according to one or more exemplary embodiments.

Data transmission (for example, transmission of content, transmission of biometric information, transmission of an encryption key, and transmission of a decryption key) between a transmitter and a receiver, according to an exemplary embodiment, may be performed by using a safe channel. The safe channel means a channel having high security on communication content between the transmitter and the receiver. For example, the safe channel may be a protocol, such as https.

Also, the one or more exemplary embodiments described above are not limitedly applied to content, but may also be applied to a file name of content, reference information of content, a group of pieces of content, reference information of the group, or an application.

For example, the controller 130 of the device 100 may set security on a group including pieces of content, by using first biometric information. The security is set on the group by setting security on the group itself or by setting security on each piece of content included in the group. According to an exemplary embodiment, the controller 130 may remove the security on the group by using second biometric information.

As another example, the controller 130 may set security on an application by using first biometric information. The security is set on the application by setting security on ID information of the application, reference information of the application, or an execution file of the application. According to an exemplary embodiment, the controller 130 may remove the security on the application by using second biometric information.

Also, the one or more exemplary embodiments may be applied to a lock screen restricting access to a home screen.

Figure 98:
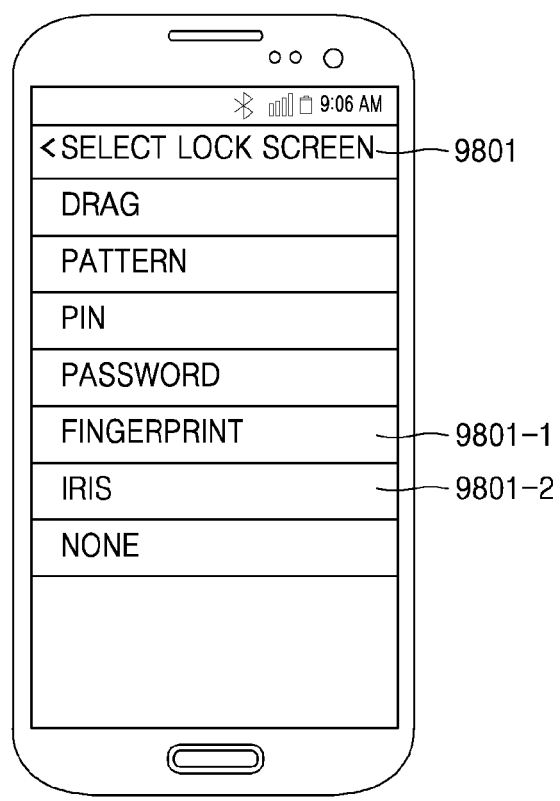
FIG. 98 illustrates an example of a UI provided to set security on a lock screen, according to an exemplary embodiment.

FIG. 98 illustrates an example of a UI provided to set security on a lock screen, according to an exemplary embodiment.

As shown in FIG. 98, the controller 130 of the device 100 may display, on the display unit 121, a lock screen setting screen 9801 for restricting access to a home screen. The lock screen setting screen 9801 may include an item 9801-1 for setting security based on first biometric information, i.e., fingerprint information, and an item 9802-2 for setting security based on second biometric information, i.e., iris information.

According to an exemplary embodiment, when a user input of selecting the item 9801-1 is received, the controller 130 may obtain the first biometric information. User authentication may be performed by matching feature information of the obtained first biometric information and feature information of pre-stored base first biometric information. When the user authentication has succeeded, the controller 130 may set a lock screen for restricting access to a home screen by using the first biometric information.

According to another exemplary embodiment, when a user input of selecting the item 9801-2 is received, the controller 130 may obtain the second biometric information. User authentication may be performed by matching feature information of the obtained second biometric information and feature information of pre-stored base second biometric information. When the user authentication has succeeded, the controller 130 may set a lock screen for restricting access to a home screen by using the second biometric information.

Figure 99:
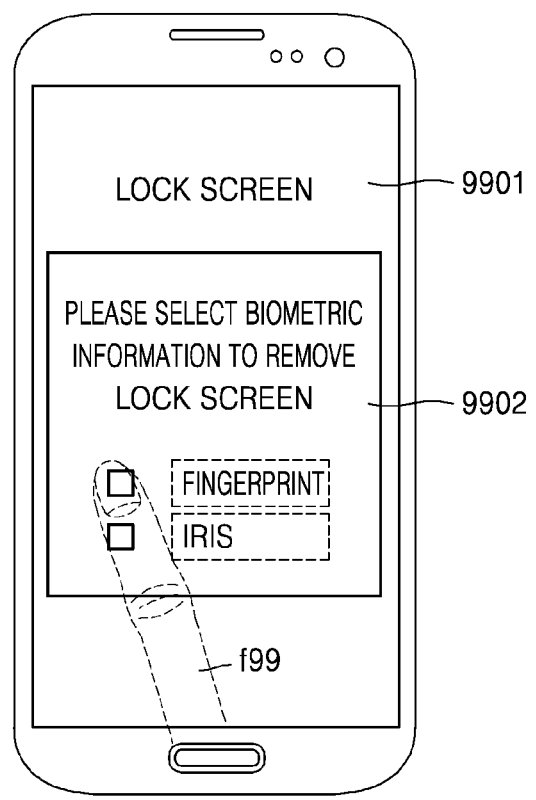
FIGS. 99 through 100B are diagrams for describing examples of a UI provided to remove security on a lock screen, according to exemplary embodiments.
Figure 100A:
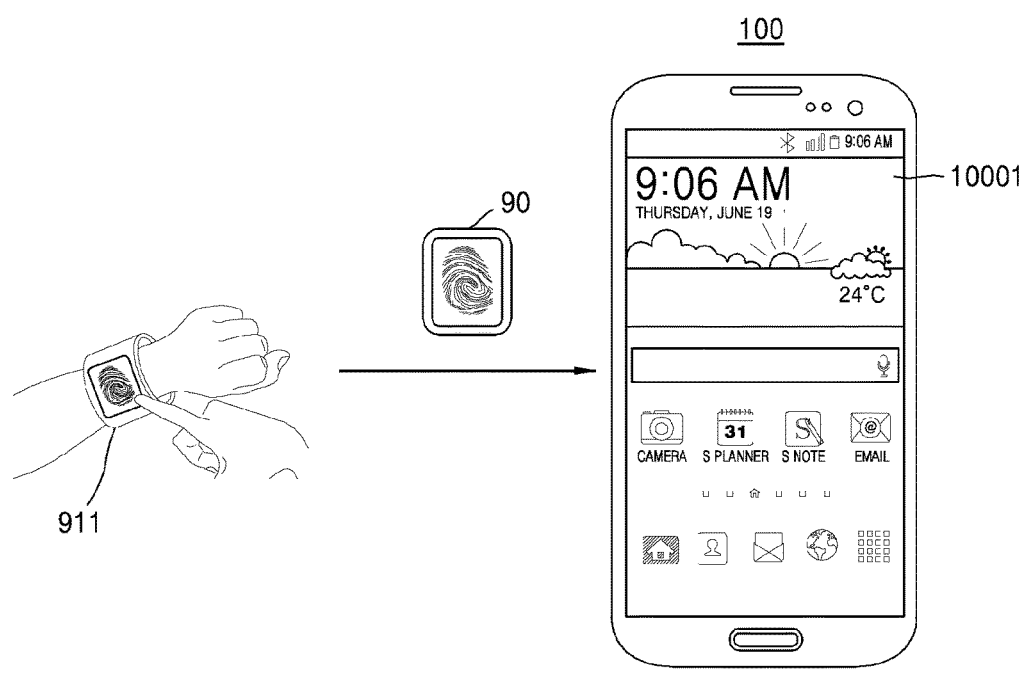
Figure 100B:
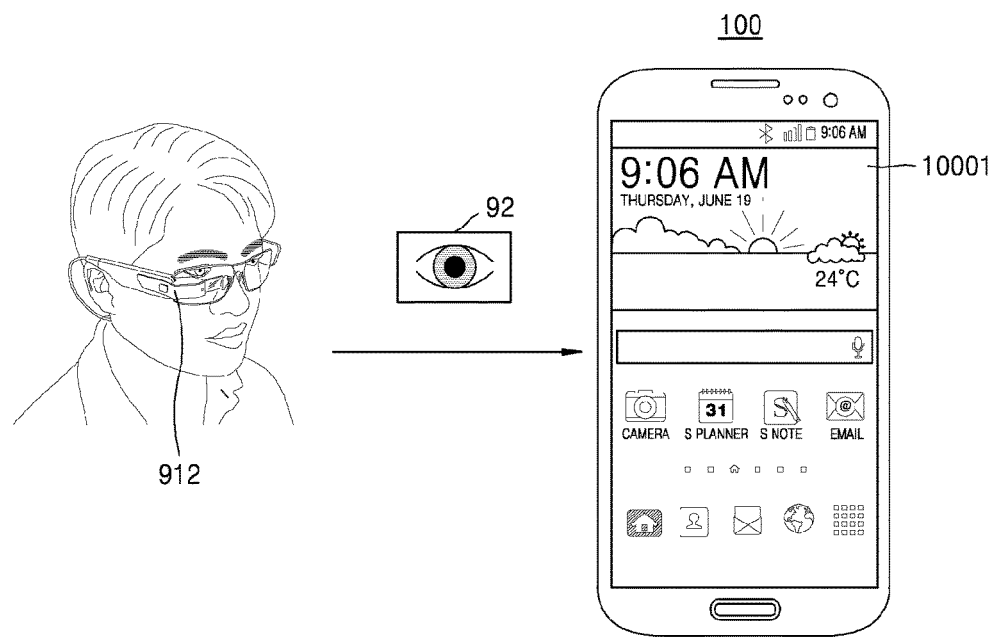

FIGS. 99 through 100B are diagrams for describing examples of a UI provided to remove security on a lock screen, according to exemplary embodiments.

According to an exemplary embodiment, the controller 130 of the device 100 may receive a user input of activating the display unit 121.

Upon receiving the user input, the controller 130 may display, on the display unit 121, a notification screen 9902 requesting the user to select biometric information to remove a lock screen 9901 as shown in FIG. 99. When there are first biometric information (for example, fingerprint information) and second biometric information (for example, iris information) for removing the lock screen 9901, the controller 130 may receive a user input of selecting, by a finger f99, the first biometric information.

In response to the user input selecting the first biometric information, the controller 130 may obtain fingerprint information 90 as the first biometric information from a first external device 911, as shown in FIG. 100A. Alternatively, the controller 130 may obtain the first biometric information from a biometrics module provided in the device 100.

The controller 130 may display a home screen 10001 based on the first biometric information. For example, the controller 130 may display, on the display unit 121, the home screen 10001 after removing a lock screen when user authentication has succeeded by using the first biometric information.

Alternatively, in FIG. 99, the controller 130 may receive a user input selecting the second biometric information.

According to an exemplary embodiment, the controller 130 may receive iris information 92 as the second biometric information from a second external device 912 as shown in FIG. 100B. Alternatively, the controller 130 may obtain the second biometric information from a biometrics module provided in the device 100. The controller 130 may display, on the display unit 121, the home screen 10001 based on the second biometric information. For example, when user authentication has succeeded by using the second biometric information, the controller 130 may remove a lock screen and display the home screen 10001 on the display unit 121.

Figure 101:
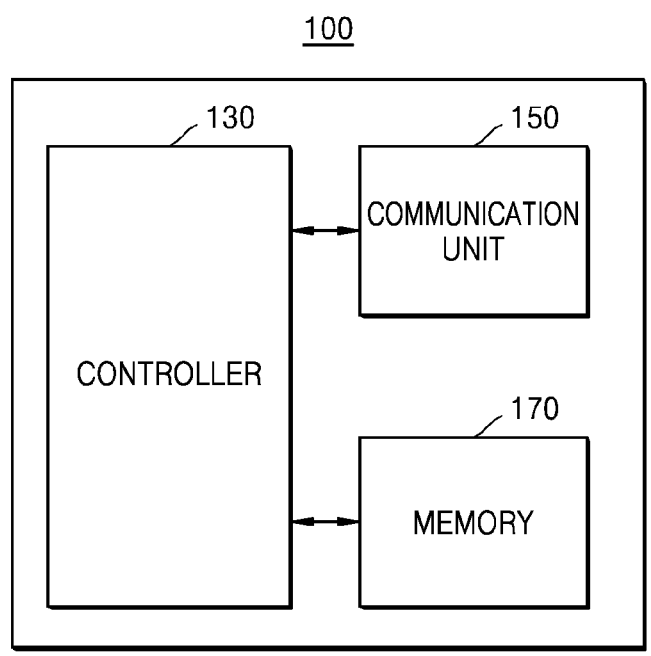
FIGS. 101 and 102 are block diagrams of a device according to exemplary embodiments.

FIGS. 101 and 102 are block diagrams of the device 100 according to exemplary embodiments.

As shown in FIG. 101, the device 100 according to an exemplary embodiment may include the controller 130, the communicator 150, and the memory 170. However, not all illustrated components are essential. The device 100 may include more or less components than those shown in FIG. 101.

For example, as shown in FIG. 102, the device 100 according to an exemplary embodiment may further include a user input 110, an outputter 120, the AV input 160, and the memory 170, as well as the display 121, the sensors 140, the communicator 150, and the controller 130.

The components of the device 100 will now be described in detail.

The user input 110 is used by a user to input data for controlling the device 100. Examples of the user input 110 include a keypad, a dome switch, a touch pad (a touch capacitance type, a pressure resistance film type, an infrared light detecting type, a surface ultrasound conducting type, an integral tension measuring type, or a piezo-effect type), a jog wheel, and a jog switch, but are not limited thereto.

The user input 110 may be controlled by the controller 130 to receive a user input. For example, the user input 110 may receive a user input for removing a lock on the device 100.

The outputter 120 is controlled by the controller 130 to output an audio signal, a video signal, or a vibration signal, and may include the display 121, a sound outputter 122, and a vibration motor 123.

The display 111 may be controlled by the controller 130 to display information processed by the device 100. The display unit 121 may display and change a UI for removing the lock on the device 100. Also, the display 121 may display a home screen while the lock on the device 100 is removed.

Meanwhile, when the display 121 is configured as a touch screen by forming a layer structure with a touch pad, the display 121 may also be used as an input device as well as an output device. The display 121 may include at least one of a liquid crystal display (LCD), a thin-film transistor-liquid crystal display (TFT-LCD), an organic light-emitting diode (OLED), a flexible display, a 3D display, and an electrophoretic display. According to an exemplary embodiment of the device 100, the device 100 may include at least two displays 121. Here, the at least two displays 121 may be disposed to face each other by using a hinge.

The sound outputter 122 outputs audio data received from the communication unit 150 or stored in the memory 170. Also, the sound outputter 122 outputs a sound signal related to a function performed by the device 100, such as a call signal reception sound, a message reception sound, or an alarm sound. The sound output unit 122 may include a speaker or a buzzer.

The vibration motor 123 may output a vibration signal. For example, the vibration motor 123 may output a vibration signal corresponding to an output of audio data or video data, for example, a call signal reception sound or a message reception sound. Also, the vibration motor 123 may output a vibration signal when a touch screen is touched.

The controller 130 generally controls an overall operation of the device 100. For example, the controller 130 may generally control the user input 110, the outputter 120, the sensors 140, the communicator 150, and the A/V input 160 by executing programs stored in the memory 170.

In detail, the controller 130 according to an exemplary embodiment may obtain second biometric information of a user, which is of a different type than first biometric information of the user, according to a user input for executing content, and remove security set on content by using the first biometric information, based on the second biometric information.

Also, when the security on the content is to be removed based on the second biometric information, the controller 130 may remove the security by using at least one of a password and a decryption key when user authentication has succeeded by using the second biometric information.

The password may be a common password that is commonly used for the first and the second biometric information or a second password corresponding to the second biometric information, and the controller 130 may remove restriction on access to content by using the password when security on the content is to be removed.

The decryption key may be a common decryption key that is commonly used for the first biometric information and the second biometric information or a second decryption key corresponding to the second biometric information, and the controller 130 may decrypt encrypted content by using the decryption key when security on the content is to be removed.

When the decryption key is the second decryption key corresponding to the second biometric information, the controller 130 may decrypt a first encryption key corresponding to the first biometric information by using the second decryption key, and then decrypt encrypted content by using a first decryption key obtained by decrypting the first encryption key.

Also, the controller 130 may obtain the second biometric information when the second biometric information is selected through a screen for selecting one of the first biometric information and the second biometric information.

Also, the controller 130 may obtain the second biometric information from at least one external device through the communication unit 150.

The device 100 according to an exemplary embodiment may further include at least one biometrics module for recognizing biometric information of the user, and the controller 130 may obtain the second biometric information from the at least one biometrics module.

Also, the controller 130 according to an exemplary embodiment may log in to the server 200 based on the first biometric information of the user.

Also, the controller 130 may obtain the second biometric information of the user, which is different type from the first biometric information, after the login to the server 200 is removed.

Also, the controller 130 may transmit a password related to the second biometric information to the server 200 through the communication unit 150.

Also, when user authentication has succeeded by using the password, the device 100 may re-log in to the server 200.

The sensors 140 may detect a state of the device 100 or a state around the device 100, and transmit the detected state to the controller 130. The sensors 140 may include at least one of a magnetic sensor 141, an acceleration sensor 142, a temperature/humidity sensor 143, an infrared sensor 144, a gyroscope sensor 145, a position sensor 146 such as a global positioning system (GPS), an atmospheric sensor 147, a proximity sensor 148, and an red, green, blue (RGB) sensor 149 such as an illuminance sensor, but a component included in the sensing unit 140 is not limited thereto. Because functions of each sensor may be intuitively inferred by one of ordinary skill in the art based on its name, details thereof are not described herein.

Also, the sensors 140 may include a sensor for detecting a touch input of an input tool and a sensor for detecting a touch input of a user. In this case, the sensor for detecting the touch input of the user may be included in the touch screen or the touch pad. Also, the sensor for detecting the touch input of the input tool may be disposed below the touch screen or the touch pad, or in the touch screen or the touch pad.

The communicator 150 may include at least one component enabling the device 100 to communicate with an external device or a server. For example, the communicator 150 may include a short-range wireless communicator 151, a mobile communicator 152, and a broadcast receiver 153.

The short-range wireless communicator 151 may include a Bluetooth communicator, a BLE communicator, an NFC communicator, a wireless local area network (WLAN) (Wi-Fi) communicator, a Zigbee communicator, an infrared data association (IrDA) communicator, a Wi-Fi direct (WFD) communicator, an UWB communicator, and an Ant+ communicator, but components included in the short-range wireless communicator 141 are not limited thereto.

The mobile communicator 152 transmits and receives a wireless signal to and from at least one of a base station, an external terminal, and a server, on a mobile communication network. Here, a wireless signal may include data having various formats according to transmission and reception of a voice call signal, a video telephone call signal, or a text/multimedia message.

The broadcast receiver 153 receives a broadcast signal and/or broadcast related information from an external source, through a broadcast channel. The broadcast channel may include a satellite channel or a terrestrial broadcasting channel. In some exemplary embodiments, the device 100 may not include the broadcast receiver 153.

The A/V input 160 is used to receive an audio signal or a video signal, and may include a camera 161 and a microphone 162. The camera 161 may obtain an image frame of a still image or a moving image via an image sensor in a video telephone mode or a photographing mode. An image captured via the image sensor may be processed by the controller 130 or a separate image processor (not shown).

An image frame processed by the camera 161 may be stored in the memory 170 or transmitted to an external device through the communicator 150. According to an exemplary embodiment of the device 100, the device 100 may include at least two cameras 161.

The microphone 162 receives an external sound signal and processes the external sound signal to electric voice data. For example, the microphone 162 may receive a sound signal from an external device or a narrator. The microphone 162 may use any one of various noise removing algorithms to remove noise generated while receiving the external sound signal.

The memory 170 may store a program for processes and control of the controller 130, and may store input/output data.

The memory 170 may include at least storage medium from among a flash memory, a hard disk, a multimedia card micro type memory, a card type memory (for example, a secure digital (SD) card or an extreme digital (XD) card), a random access memory (RAM), a static random access memory (SRAM), a read-only memory (ROM), an electrically erasable programmable read-only memory (EE-PROM), a programmable read-only memory (PROM), a magnetic memory, a magnetic disk, and an optical disk. Also, the device 100 may operate a web storage server or a cloud server that performs a storage function of the memory 170 in the Internet.

Programs stored in the memory 170 may be classified into a plurality of modules based on functions, and may be classified into a UI module 171, a touch screen module 172, and a notification module 173.

According to an exemplary embodiment, the memory 170 may store content on which security is set based on first biometric information of a user. Also, the memory 170 may store a first encryption key that is encrypted by using a second encryption key generated based on second biometric information.

Also, the memory 170 may store templates of fingerprint information, voice information, face information, iris information palm line information, vein information, retina information, movement pattern information, and ECG information, and the stored templates may be used as feature information of base biometric information.

Also, the memory 170 may store feature information extracted by the feature information extractor 133 according to control of the controller 130, and the stored feature information may be used as feature information of base biometric information for user authentication.

The UI module 171 may provide a specialized UI or GUI linked to the device 100 according to applications. The touch screen module 172 may detect a touch gesture of a user on a touch screen, and transmit information about the touch gesture to the controller. The touch screen module 172 according to an exemplary embodiment may recognize and analyze a touch code. The touch screen module 172 may be configured as separate hardware including a controller.

Various sensors may be disposed inside or around the touch screen to detect a touch or a proximity touch on the touch screen. An example of a sensor for detecting a touch on the touch screen includes a tactile sensor. The tactile sensor detects a contact that can be felt by a person on a certain object. The tactile sensor may detect various types of information, such as a roughness of a contact surface, a rigidness of a contact object, and a temperature of a touch point.

Another example of a sensor for detecting a touch on the touch screen includes a proximity sensor. The proximity sensor detects an existence of an object approaching or near a predetermined detection surface by using electromagnetic field force or infrared ray, without having to detect a mechanical contact. Examples of the proximity sensor include a transmission photoelectric sensor, a direct reflective type photoelectric sensor, a mirror reflective type photoelectric sensor, a high frequency oscillation proximity sensor, a capacitance type proximity sensor, a magnetic type proximity sensor, and an infrared proximity sensor. Examples of a touch gesture of a user include tap, touch and hold, double-tap, drag, panning, flick, drag-and-drop, and swipe.

The notification module 173 may generate a signal for notifying an event occurrence in the device 100. Examples of an event that occurs in the device 100 include call signal reception, a message reception, key signal input, and schedule notification. The notification module 173 may output a notification signal in a video signal format through the display 121, in an audio signal format through the sound outputter 122, or in a vibration signal format through the vibration motor 123.

Figure 103:
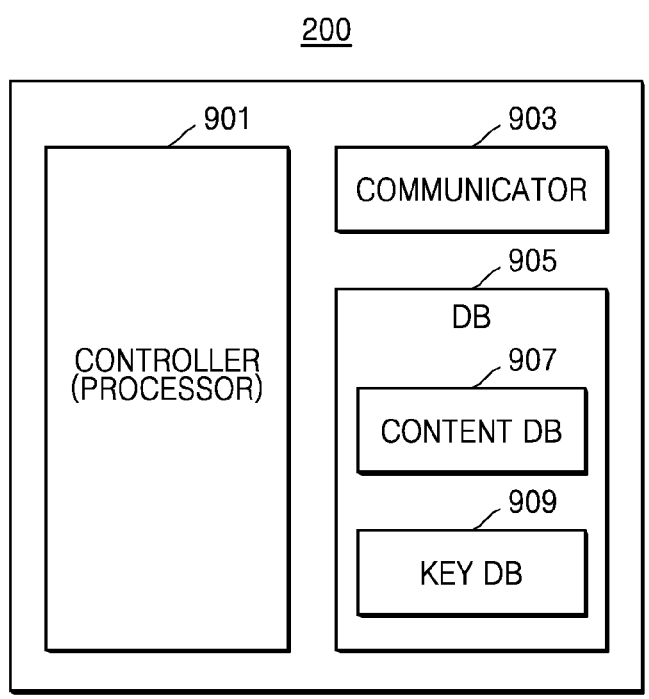
FIG. 103 is a block diagram of a server according to an exemplary embodiment.

FIG. 103 is a block diagram of the server 200 according to exemplary embodiment.

As shown in FIG. 103, the server 200 according to an exemplary embodiment may include a controller 901, a communicator 903, and a database (DB) 905. The DB 905 may include a content DB 907 and a key DB 909. However, not all illustrated components are essential. The server 200 may include more or less components than those shown in FIG. 103.

The controller 901 generally controls overall operations of the server 200.

In detail, the controller 901 may store an encrypted encryption key in the key DB 909. The controller 901 may store encrypted content in the content DB 907.

The controller 901 may generate an encryption key based on biometric information of a user. Also, the controller 901 may generate a decryption key based on biometric information of a user. Also, the controller 901 may generate a decryption key by combining a plurality of decryption keys. Also, the controller 901 may decrypt encrypted content by using a decryption key.

An exemplary embodiment may also be realized in a form of a computer-readable recording medium, such as a program module executed by a computer. A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically includes a computer-readable command, a data structure, a program module, other data of a modulated data signal, or another transmission mechanism, and an example thereof includes an arbitrary information transmission medium.

Also, herein, "unit" may be a hardware component such as a processor or a circuit and/or a software component executed by a hardware component such as a processor.

It will be understood by those of ordinary skill in the art that various changes in form and details may be made therein without departing from the spirit and scope of the present invention. Hence, it will be understood that the exemplary embodiments described above are not limiting the scope of the invention. For example, each component described in a single type may be executed in a distributed manner, and components described distributed may also be executed in an integrated form.

What is claimed is:

1. A method of providing a user interface at an electronic device, the method comprising:
    displaying a registration screen associated with notification screens for setting biometric login options, each of the biometric login options corresponding to a respective biometric information category of a plurality of biometric information categories;
    obtaining a first piece of biometric information of a user corresponding to a first biometric information category of the plurality of biometric information categories using at least one first notification screen of the notification screens;
    storing the first piece of biometric information in a memory of the electronic device, wherein the first piece of biometric information is associated with an identification of the user based on a password of the user for unlocking the electronic device;
    obtaining a second piece of biometric information of the user corresponding to a second biometric information category of the plurality of biometric information categories using at least one second notification screen of the notification screens;
    storing the second piece of biometric information in the memory of the electronic device, wherein the second piece of biometric information is associated with the identification of the user based on the password for unlocking the electronic device;
    pairing with an external electronic device having a first biometric module to establish a short-range wireless connection between the electronic device and the external electronic device;
    displaying a lock screen for selection from among first and second biometric login options respectively indicating the first and second biometric information categories corresponding to the first and second pieces of biometric information of the user stored in the memory of the electronic device;
    based on the first biometric login option being selected from among the first and second biometric login options displayed with the lock screen, obtaining, based on communicating with the external electronic device having the first biometric module over the short-range wireless connection, first input biometric information of the user corresponding to the first biometric information category;
    displaying an authentication failure notification screen based on unsuccessful authentication of the user using the obtained first input biometric information of the user and the first piece of biometric information stored in the memory of the electronic device;

based on the second biometric login option being selected from among the first and second biometric login options, operating a second biometric module of the electronic device to obtain second input biometric information corresponding to the second biometric information category;

obtaining, using the second biometric module of the electronic device, the second input biometric information of the user corresponding to the second biometric information category; and displaying an unlocked screen based on successful authentication of the user using the obtained second input biometric information of the user and the second piece of biometric information stored in the memory of the electronic device.

2. The method of claim 1, wherein the displaying of the lock screen comprises presenting a login option for unlocking the electronic device, without presenting in the lock screen a user interface item for opening an application executable by the electronic device, and wherein the displaying of the unlocked screen comprises presenting in the unlocked screen the user interface item for opening the application executable by the electronic device.

3. The method of claim 1, wherein each of the plurality of biometric information categories comprises one from among fingerprints, voice patterns, facial recognition patterns, iris patterns, vein distribution patterns, retina patterns, gait patterns, and electrocardiograms (ECG).

4. The method of claim 1, wherein the displaying of the lock screen comprises:

presenting a login option including an entry field for receiving the password of the user based on which the first piece of biometric information and the second piece of biometric information are associated with the identification of the user, and presenting a user interface item indicating that alternative login options for unlocking the electronic device are available for the user while presenting the entry field.

5. The method of claim 4, wherein the displaying of the lock screen further comprises:

based on the user interface item being selected, presenting the biometric login options as available login options for unlocking the electronic device.

6. The method of claim 1, wherein the second biometric login option being selected from the first and second biometric login options comprises receiving, by the electronic device, user selection of the second biometric login option from the first and second biometric login options displayed with the lock screen.

7. The method of claim 1, wherein the displaying the lock screen comprises displaying biometric login options for pieces of biometric information stored in the memory associated with the identification of the user based on the password for unlocking the electronic device.

8. The method of claim 1, wherein the displaying of the registration screen comprises presenting the one or more notification screens for setting the biometric login options while the registration screen is displayed.

9. An electronic device for providing a user interface, the electronic device comprising:

a memory storing instructions; and a processor configured to execute the instructions to at least:

control to display a registration screen associated with notification screens for setting biometric login options, each of the biometric login options corresponding to a respective biometric information category of a plurality of biometric information categories;

control to obtain a first piece of biometric information of a user corresponding to a first biometric information category of the plurality of biometric information categories using at least one first notification screen of the notification screens;

control to store the first piece of biometric information in the memory of the electronic device, wherein the first piece of biometric information is associated with an identification of the user based on a password of the user for unlocking the electronic device;

control to obtain a second piece of biometric information of the user corresponding to a second biometric information category of the plurality of biometric information categories using at least one second notification screen of the notification screens;

control to store the second piece of biometric information in the memory of the electronic device, wherein the second piece of biometric information is associated with the identification of the user based on the password for unlocking the electronic device;

control to pair with an external electronic device having a first biometric module to establish a short-range wireless connection between the electronic device and the external electronic device;

control to display a lock screen for selection from among first and second biometric login options respectively indicating the first and second biometric information categories corresponding to the first and second pieces of biometric information of the user stored in the memory of the electronic device;

based on the first biometric login option being selected from among the first and second biometric login options displayed with the lock screen, control to obtain, based on communicating with the external electronic device having the first biometric module over the short-range wireless connection, first input biometric information of the user corresponding to the first biometric information category;

control to display an unlocked screen based on successful authentication of the user using the obtained first input biometric information of the user and the first piece of biometric information stored in the memory of the electronic device;

control to display an authentication failure notification screen based on unsuccessful authentication of the user using the obtained first input biometric information of the user and the first piece of biometric information stored in the memory of the electronic device;

based on the second biometric login option being selected from among the first and second biometric login options after displaying the authentication failure notification screen, control to operate a second biometric module of the electronic device to obtain second input biometric information corresponding to the second biometric information category;

control to obtain, using the second biometric module of the electronic device, the second input biometric information of the user corresponding to the second biometric information category; and control to display the unlocked screen based on successful authentication of the user using the obtained second input biometric information of the user and the second piece of biometric information stored in the memory of the electronic device.

10. The electronic device of claim 9, wherein the controlling to display the lock screen comprises controlling to present a login option for unlocking the electronic device, without presenting in the lock screen a user interface item for opening an application executable by the electronic device, and
wherein the controlling to display the unlocked screen comprises controlling to present in the unlocked screen the user interface item for opening the application executable by the electronic device.

11. The electronic device of claim 9, wherein each of the plurality of biometric information categories comprises one from among fingerprints, voice patterns, facial recognition patterns, iris patterns, vein distribution patterns, retina patterns, gait patterns, and electrocardiograms (ECG).

12. The electronic device of claim 9, wherein the controlling to display the lock screen comprises:
controlling to present a login option including an entry field for receiving the password of the user based on which the first piece of biometric information and the second piece of biometric information are associated with the identification of the user, and
controlling to present a user interface item indicating that alternative login options are available for the user while presenting the entry field.

13. The electronic device of claim 12, wherein the controlling to display the lock screen further comprises:
based on an input to the user interface item, controlling to present the biometric login options as available login options for unlocking the electronic device.

14. The electronic device of claim 9, wherein the second biometric login option being selected from the first and second biometric login options comprises controlling to receive, by the electronic device, user selection of the second biometric login option from the first and second biometric login options displayed with the lock screen.

15. The electronic device of claim 9, wherein the controlling to display the lock screen comprises controlling to display biometric login options for pieces of biometric information stored in the memory associated with the identification of the user based on the password for unlocking the electronic device.

16. The electronic device of claim 9, wherein the controlling to display the registration screen comprises controlling to present the one or more notification screens for setting the biometric login options while the registration screen is displayed.

17. A non-transitory computer-readable medium storing instructions executable by a processor of an electronic device to cause the processor to perform operations comprising:
controlling to display a registration screen associated with notification screens for setting biometric login options, each of the biometric login options corresponding to a respective biometric information category of a plurality of biometric information categories;
controlling to obtain a first piece of biometric information of a user corresponding to a first biometric information category of the plurality of biometric information categories using at least one first notification screen of the notification screens;
controlling to store the first piece of biometric information in a memory of the electronic device, wherein the first piece of biometric information is associated with an identification of the user based on a password of the user for unlocking the electronic device;
controlling to obtain a second piece of biometric information of the user corresponding to a second biometric information category of the plurality of biometric information categories using at least one second notification screen of the notification screens;
controlling to store the second piece of biometric information in the memory of the electronic device, wherein the second piece of biometric information is associated with the identification of the user based on the password for unlocking the electronic device;
controlling to pair with an external electronic device having a first biometric module to establish a short-range wireless connection between the electronic device and the external electronic device;
controlling to display a lock screen for selection from among first and second biometric login options respectively indicating the first and second biometric information categories corresponding to the first and second pieces of biometric information of the user stored in the memory of the electronic device;
based on the first biometric login option being selected from among the first and second biometric login options displayed with the lock screen;
controlling to obtain, based on communicating with the external electronic device having the first biometric module over the short-range wireless connection, first input biometric information of the user corresponding to the first biometric information category;
controlling to display an unlocked screen based on successful authentication of the user using the obtained first input biometric information of the user and the first piece of biometric information stored in the memory of the electronic device;
controlling to display an authentication failure notification screen based on unsuccessful authentication of the user using the obtained first input biometric information of the user and the first piece of biometric information stored in the memory of the electronic device;
based on the second biometric login option being selected from among the first and second biometric login options, controlling to operate a second biometric module of the electronic device to obtain second input biometric information corresponding to the second biometric information category;
controlling to obtain, using the second biometric module of the electronic device, the second input biometric information of the user corresponding to the second biometric information category; and
controlling to display the unlocked screen based on successful authentication of the user using the obtained second input biometric information of the user and the second piece of biometric information stored in the memory of the electronic device.

18. The non-transitory computer-readable medium of claim 17, wherein the controlling to display the lock screen comprises controlling to present a login option for unlocking the electronic device, without presenting in the lock screen a user interface item for opening an application executable by the electronic device, and
wherein the controlling to display the unlocked screen comprises controlling to present in the unlocked screen the user interface item for opening the application executable by the electronic device.

19. The non-transitory computer-readable medium of claim 17, wherein each of the plurality of biometric information categories comprises one from among fingerprints, voice patterns, facial recognition patterns, iris patterns, vein distribution patterns, retina patterns, gait patterns, and electrocardiograms (ECG).

20. The non-transitory computer-readable medium of claim 17, wherein the controlling to display the lock screen comprises:
controlling to present a login option including an entry field for receiving the password of the user based on which the first piece of biometric information and the second piece of biometric information are associated with the identification of the user, and
controlling to present a user interface item indicating that alternative login options for unlocking the electronic device are available for the user while presenting the entry field.

21. The non-transitory computer-readable medium of claim 20, wherein the controlling to display the lock screen further comprises:
based on the user interface item being selected, controlling to present the biometric login options as available login options for unlocking the electronic device.

22. The non-transitory computer-readable medium of claim 17, wherein the second biometric login option being selected from the first and second biometric login options comprises controlling to receive, by the electronic device, user selection of the second biometric login option from the first and second biometric login options displayed with the lock screen.

23. The non-transitory computer-readable medium of claim 17, wherein the controlling to display the lock screen comprises controlling to display biometric login options for pieces of biometric information stored in the memory associated with the identification of the user based on the password for unlocking the electronic device.

24. The non-transitory computer-readable medium of claim 17, wherein the controlling to display the registration screen comprises controlling to present the one or more notification screens for setting the biometric login options while the registration screen is displayed.

25. An electronic device for providing a user interface, the electronic device comprising:
a memory storing instructions; and
a processor configured to execute the instructions to at least:
control to display a registration screen associated with notification screens for setting biometric login options, each of the biometric login options corresponding to a respective biometric information category of a plurality of biometric information categories;
control to obtain a first piece of biometric information of a user corresponding to a first biometric information category of the plurality of biometric information categories using at least one first notification screen of the notification screens;
control to store the first piece of biometric information in the memory of the electronic device, wherein the first piece of biometric information is associated with an identification of the user based on a password of the user for unlocking the electronic device;
control to obtain a second piece of biometric information of the user corresponding to a second biometric information category of the plurality of biometric information categories using at least one second notification screen of the notification screens;
control to store the second piece of biometric information in the memory of the electronic device, wherein the second piece of biometric information is associated with the identification of the user based on the password for unlocking the electronic device;
control to pair with an external electronic device having a first biometric module to establish a short-range wireless connection between the electronic device and the external electronic device;
control to display a lock screen for selection from among first and second biometric login options respectively indicating the first and second biometric information categories corresponding to the first and second pieces of biometric information of the user stored in the memory of the electronic device;
based on the first biometric login option being selected from among the first and second biometric login options displayed with the lock screen, control to obtain, based on communicating with the external electronic device having the first biometric module over the short-range wireless connection, first input biometric information of the user corresponding to the first biometric information category;
control to display an authentication failure notification screen based on unsuccessful authentication of the user using the obtained first input biometric information of the user and the first piece of biometric information stored in the memory of the electronic device;
based on the second biometric login option being selected from among the first and second biometric login options, control to operate a second biometric module of the electronic device to obtain second input biometric information corresponding to the second biometric information category;
control to obtain, using the second biometric module of the electronic device, the second input biometric information of the user corresponding to the second biometric information category; and
control to display an unlocked screen based on successful authentication of the user using the obtained second input biometric information of the user and the second piece of biometric information stored in the memory of the electronic device.

26. The electronic device of claim 25, wherein the second biometric login option being selected from the first and second biometric login options comprises controlling to receive, by the electronic device, user selection of the second biometric login option from the first and second biometric login options presented in the lock screen.

27. The electronic device of claim 25, wherein the controlling to display the lock screen comprises controlling to display biometric login options for pieces of biometric information stored in the memory associated with the identification of the user based on the password for unlocking the electronic device.

28. The electronic device of claim 25, wherein the controlling to display the registration screen comprises controlling to present the one or more notification screens for setting the biometric login options while the registration screen is displayed.

* * * * *